United States Patent
Johnson et al.

(10) Patent No.: US 9,906,360 B2
(45) Date of Patent: Feb. 27, 2018

(54) SECURING ACCESSIBLE SYSTEMS USING VARIABLE DEPENDENT CODING

(71) Applicant: IRDETO CANADA CORPORATION, Ottawa (CA)

(72) Inventors: Harold Johnson, Ottawa (CA); Yuan Xiang Gu, Ottawa (CA); Michael Wiener, Ottawa (CA); Yongxin Zhou, Mequon, WI (US)

(73) Assignee: IRDETO B.V., Hoofddorp (NL)

( * ) Notice: Subject to any disclaimer, the term of this patent is extended or adjusted under 35 U.S.C. 154(b) by 0 days.

(21) Appl. No.: 14/389,358

(22) PCT Filed: Mar. 28, 2013

(86) PCT No.: PCT/CA2013/000304
§ 371 (c)(1),
(2) Date: Sep. 29, 2014

(87) PCT Pub. No.: WO2013/142980
PCT Pub. Date: Oct. 3, 2013

(65) Prior Publication Data
US 2015/0067875 A1 Mar. 5, 2015

Related U.S. Application Data

(60) Provisional application No. 61/617,991, filed on Mar. 30, 2012, provisional application No. 61/618,010, filed on Mar. 30, 2012.

(51) Int. Cl.
*H04L 9/00* (2006.01)
*H04L 9/28* (2006.01)
(Continued)

(52) U.S. Cl.
CPC ........ *H04L 9/0693* (2013.01); *G06F 12/1408* (2013.01); *G06F 21/14* (2013.01);
(Continued)

(58) Field of Classification Search
CPC ... H04L 9/0693; H04L 9/0618; H04L 9/0631; H04L 9/14; H04L 2209/04;
(Continued)

(56) References Cited

U.S. PATENT DOCUMENTS 6,088,452 A 7/2000 Johnson et al.
6,192,475 B1 2/2001 Wallace
(Continued)

FOREIGN PATENT DOCUMENTS

CN 101088095 A 12/2007
CN 101627394 A 1/2010
(Continued)

OTHER PUBLICATIONS

Extended European Search Report cited in corresponding European Application No. 13768730.7 dated Oct. 27, 2015.
(Continued)

*Primary Examiner* — Aravind Moorthy
(74) *Attorney, Agent, or Firm* — Marc Kaufman; Rimon PC

(57) ABSTRACT

Systems and techniques for securing accessible computer-executable program code and systems are provided. One or more base functions may be generated and blended with existing program code, such that it may be difficult or impossible for a potential attacker to distinguish the base functions from the existing code. The systems and code also may be protected using a variety of other blending and protection techniques, such as fractures, variable dependent coding, dynamic data mangling, and cross-linking, which may be used individually or in combination, and/or may be blended with the base functions.

18 Claims, 25 Drawing Sheets

(51) Int. Cl.
| | |
|---|---|
| H04L 9/06 | (2006.01) |
| G06F 12/14 | (2006.01) |
| H04L 9/14 | (2006.01) |
| G06F 21/14 | (2013.01) |
| G06F 21/60 | (2013.01) |
| G06F 21/55 | (2013.01) |
| G06F 21/54 | (2013.01) |

(52) U.S. Cl.
CPC ............. *G06F 21/54* (2013.01); *G06F 21/55* (2013.01); *G06F 21/60* (2013.01); *H04L 9/0618* (2013.01); *H04L 9/0631* (2013.01); *H04L 9/14* (2013.01); *G06F 2221/034* (2013.01); *H04L 2209/04* (2013.01); *H04L 2209/16* (2013.01)

(58) Field of Classification Search
CPC . H04L 2209/16; G06F 21/54; G06F 12/1408; G06F 21/60; G06F 21/55; G06F 21/14; G06F 2221/034
USPC ...................................... 726/26; 380/262, 28
See application file for complete search history.

(56) References Cited

U.S. PATENT DOCUMENTS

| | | | |
|---|---|---|---|
| 6,594,761 | B1 | 7/2003 | Chow et al. |
| 6,668,325 | B1 | 12/2003 | Collberg et al. |
| 6,779,114 | B1 | 8/2004 | Chow et al. |
| 6,842,682 | B2 | 1/2005 | Chow et al. |
| 6,842,862 | B2 | 1/2005 | Chow et al. |
| 7,350,085 | B2 | 3/2008 | Johnson et al. |
| 7,366,914 | B2 | 4/2008 | Graunke |
| 7,634,091 | B2 | 12/2009 | Zhou et al. |
| 2002/0025037 | A1* | 2/2002 | Sano ..................... H04L 9/0643 380/44 |
| 2003/0142819 | A1* | 7/2003 | Bellocchio .......... G06F 11/3608 380/28 |
| 2003/0163718 | A1 | 8/2003 | Johnson et al. |
| 2004/0139340 | A1 | 7/2004 | Johnson et al. |
| 2004/0215962 | A1* | 10/2004 | Douceur ............... H04L 9/3247 713/167 |
| 2004/0236955 | A1 | 11/2004 | Chow et al. |
| 2005/0166191 | A1 | 7/2005 | Kandanchatha et al. |
| 2005/0183072 | A1 | 8/2005 | Horning et al. |
| 2006/0136867 | A1 | 6/2006 | Schneider et al. |
| 2009/0287706 | A1* | 11/2009 | Bourges-Waldegg .. H04L 63/06 |
| 2011/0296192 | A1 | 12/2011 | Hayashi et al. |

FOREIGN PATENT DOCUMENTS

| | | |
|---|---|---|
| EP | 2009572 A1 | 12/2008 |
| WO | 02095546 A2 | 11/2002 |
| WO | 2008101341 A1 | 8/2008 |

OTHER PUBLICATIONS

International Search Report and Written Opinion cited in corresponding International Application No. PCT/CA2013/000304 dated Jul. 22, 2013.
Extended European Search Report cited in corresponding European Application No. 13768955.0 dated Oct. 9, 2015.
Extended European Search Report cited in corresponding European Application No. 13767519.5 dated Oct. 22, 2015.
Extended European Search Report cited in corresponding European Application No. 13767371.1 dated Feb. 5, 2016.
"Advanced Encryption Standard (AES)", Federal Information Processing Standard Publication 197, Nov. 26, 2001.
Prof Michael Backes: "Lecture Notes for CS-578 Cryptography (SS2007)", Nov. 25, 2011.
Alfred V. Aho, Ravi Sethi, Jefery D. Illman, Compliers: Principles, Techniques, and Tools. 1986, Addison-Wesley ISBN 0-201-100088-6.
K.E. Batcher, Sorting Networks and their Applications. Proc. AMPS Spring Joint Comput. Conf., vol. 32, pp. 307 314. 1968.
"Batcher Odd-even mergesort", accessed on Mar. 3, 2015, en.wikipedia.org/wiki/Batcher_odd-even_mergesort.
"Odd-even mergesort" accessed on Mar. 3, 2015, www.iti.fh-flensburg.de/lang/algorithmen/sortieren/networks/oemen.htm.
Keith Cooper, Timothy J. Harvey, and Ken Kennedy, A Simple, Fast Dominance Algorithm. Software Practice and Experience. 2001. No. 4, pp. 1-10.
Extended Euclidean Algorithm, Algorithm 2.107 on p. 67 in A.J. Menezes, P.C. van Oorschot, S.A. Vanstone, Handbook of Applied Cryptography, CRC Press. 2001 (5th printing with corrections). Down-loadable from http://www.cacr.math.uwaterloo.ca/hac/.
National Institute of Standards and Technology (NIST) , Advanced Encryption Standard (AES). FIPS Publication 197, Nov. 26, 2001. http://csrc.nist.gov/publications/fips/fips197/fips-197.pdf.
Alexander Klimov, Applications of T-Functions in Cryptography, PhD thesis under Adi Shamir, Weizmann Institute of Science, Oct. 2004. Theorem 5.3 p. 41.
Des, §7.4, pp. 250-259, in A.J. Menezes, P.C. van Oorschot, S.A. Vanstone, Handbook of Applied Cryptography. CRC Press, 2001 (5th printing with corrections). Downloadable from http://www.cacr.math.uwaterloo.ca/hac/.
Ronald L. Rivest, Permutation Polynomials Modulo $2\omega$. Finite Fields and their Applications, vol. 7, 2001 , pp. 287-292.
Ronald L. Rivest. Permutation Polynomials Modulo $2\omega$. Laboratory for Computer Science. MIT, Oct. 25, 1999.
A.J. Menezes, P.C. van Oorschot, S.A. Vanstone, Handbook of Applied Cryptography, §1.3. pp. 6 Hi. CRC Press, 2001 (5th printing with corrections). Downloadable from http://www.cacr.math.uwaterloo.ca/hac/.
Zhaopeng Dai et al, "The Single Cycle T-functions", National Basic Research Program of China, 2000.
Dexter Kozen, Susan Landau, Polynomial decomposition algorithms. J. Symb. Comp. 7(5)(1989), 445-456.
Medhu Sudan. Algebra and computation. MIT lecture notes. On line: http://people.csail.mit.edu/madhu/FT98/course.html.
James Xiao, Y. Zhou, Generating large non-singular matrices over an arbitrary field with block of full rank, 2002.
Kejian Xu, Zhaopeng Dai and Zongduo Dai The formulas of coefficients of sum and product of p-adic integers with applications to Witt vectors. Acta Arithmetica. 150 (2011). 361-384.
O. Billet. H. Gilbert, G. Ech-Chatbi, Cryptanalysis of a White Box AES Implementation, Proceedings of SAC 2004 Conference on Selected Areas in Cryptography, Aug. 2004, revised papers. Springer (LNCS 3357).
Stanley Chow, Yuan X. Gu, Harold Johnson, and Vladimir A. Zakharov, An Approach to the Obfuscation of Control-Flow of Sequential Computer Programs, Proceedings of ISC 2001 Information Security, 4th International Conference (LNCS 2200), Springer, Oct. 2001 , pp. 144-155.
S. Chow, P. Eisen, H. Johnson, P.C. van Oorschot. White-Box Cryptography and an AES Implementation Proceedings of SAC 2002 Conference on Selected Areas in Cryptography, Mar. 2002 (LNCS 2595), Springer, 2003.
S. Chow, P. Eisen, H. Johnson, P.C. van Oorschot, A White-Box DES Implementation for DRM Applications, Proceedings of DRM 2002 2nd ACM Workshop on Digital Rights Management. Nov. 18, 2002 (LNCS 2696). Springer, 2003.
G. Mullen and H. Stevens. Polynomial functions (mod m). Acta Mathematica Hungarica 44(3-4) , 1984. pp. 237 -241.
T. Sander, C.F. Tschudin, Protecting Mobile Agents Against Malicious Hosts. pp. 44-60, Vigna, Mobile Agent Security (LNCS 1419), Springer. 1998.
Y. Zhou. A. Main. Y. Gu and H. Johnson, Information Hiding in Software with Mixed Boolean-Arithmetic Transforms, Information Security Applications, 8th International Workshop. WISA 2007. LNCS 4867.2008.
Ron Cytron, Jean Ferrante. Barry K. Rosen, and Mark N. Wegman, Efficiently Computing Static Single Assignment Form and the

(56) References Cited

OTHER PUBLICATIONS

Control Dependence Graph. ACM Transactions on Programming Languages and Systems 13(4), Oct. 1991. pp. 451-490.
T. Sander, C.F. Tschudin. Towards Mobile Cryptography, pp. 215-224, Proceedings of the 1998 IEEE Symposium on Security and Privacy.
G. H. Hardy and E. M. Wright, "An Introduction to the Theory of Numbers", Oxford Press.
A. Menexes, P. Oorschot. S. Vanstone, "Handbook of Applied cryptography" ,CRC Press. 1996.
Henry S. Warren. Jr., "Hacker's Delight", Addison-Wesley. Boston, 2002.
D. E. Knuth. The art of computer programming, vol. 2: semi-numerical algorithms, 3rd edition, ISBN 0-201-89684-2, Addison-Wesley, Reading. Massachusetts, 1997.
Communication pursuant to Article 94(3) EPC issued in EP Patent Application No. 13767519.5, dated Nov. 13, 2017, 5 pages.

* cited by examiner

| opcode | L1 | L2 | L3 |
|---|---|---|---|
| operand 1 | | | |
| operand 2 | | | |
| operand 3 | | | |

FIGURE 2

| $k$ | opcode | 0 | 0 | 0 |
|---|---|---|---|---|
| register 1 | | | | |
| ⋮ | ⋮ | | | ⋮ |
| register $k$ | | | | |

FIGURE 3

ORIGINAL COPY

SECURING ACCESSIBLE SYSTEMS USING VARIABLE DEPENDENT CODING

The present application is the United States national stage of International Application No. PCT/CA2013/000304, filed Mar. 28, 2013, and which claims benefit of U.S. Provisional Application Nos. 61/617,991 filed Mar. 30, 2012 and 61/618,010 filed Mar. 30, 2012, the entire contents of which are incorporated herein by reference.

TECHNICAL FIELD

The present invention relates generally to electronic computing devices and computer systems, and more specifically, to securing software and firmware on devices and systems which are accessible to attack.

BACKGROUND

The use of computers, electronic computing devices and computer software in all of their various forms is recognized to be very common and is growing every day. As well, with the pervasiveness of powerful communication networks, the ease with which computer software programs and data files may be accessed, exchanged, copied and distributed is also growing daily. In order to take advantage of these computer and communication systems and the efficiencies that they offer, there is a need for a method of storing and exchanging computer software and data securely.

One method of maintaining confidentiality or privacy that has demonstrated widespread use and acceptance is encryption of data using secret cryptographic keys. Existing encryption systems are designed to protect their secret keys or other secret data against a "black box attack". This is a situation where an attacker has knowledge of the algorithm and may examine various inputs to and outputs from the algorithm, but has no visibility into the execution of the algorithm itself (such as an adaptive chosen input/output attack).

While cryptographic systems relying on the black box model are very common, it has been shown that this model does not reflect reality. Often, the attacker is in a position to observe at least some aspect of the execution of the algorithm, and has sufficient access to the targeted algorithm to mount a successful attack (i.e. side-channel attacks such as timing analysis, power analysis, cache attacks, fault injection, etc.) Such attacks are often referred to as "grey-box" attacks, the assumption being that the attacker is able to observe at least part of the system execution.

Recognizing this, an effort has been made to design encryption algorithms and data channels which are resistant to a more powerful attack model—the "white box attack". A white box attack is an attack on a software algorithm in which it is assumed that the attacker has full visibility into the execution of the algorithm. To date, such protection systems have met with reasonable success, but as such protection systems have become more and more sophisticated, so has the sophistication of the attacking techniques (such as encoding reduction attacks, statistical bucketing attacks and homomorphic mapping attacks). Thus, many existing white box protection systems are being shown to be ineffective against concerted attacks.

Obfuscation of software by means of simple encodings has been in use for some time. In order to be useful, applications of such encodings in software obfuscation must not increase the time and space consumption of the software unduly, so such encodings are typically relatively simple. Hence, while they can protect software in bulk, they do not provide a high degree of security. There are many communication boundaries in software which represent particular vulnerabilities: passage of data in unprotected form into or out of an obfuscated program, passage of data into or out of a cipher implementation in software or hardware, and the like. The strength of prior encoding strategies typically is sharply limited by the data sizes which they protect. For conventional encodings, such protected items are on the order of 32 bits, sometimes 64 bits, and sometimes smaller pieces of data such as characters or bytes. Given the limitations of encodings and the operand sizes, fairly swift brute-force cracking of such encodings cannot be prevented in general.

There is therefore a need for more effective secret-hiding and tamper-resistance techniques, providing protection of software code and data in general, as well as protection of secret cryptographic keys, biometric data, encrypted data and the like. It also is desirable to provide a much stronger form of protection for software boundaries than conventional simple encodings.

SUMMARY

Embodiments of the present invention aim generally at providing more effective secret-hiding and tamper-resistance techniques, providing protection of software code and data without fear that security will be breached.

The methods and systems disclosed herein are not limited to any particular underlying program. They may be applied to cryptographic systems, but equally, may be applied to non-cryptographic systems. As well, the software code that is being protected does not dictate what is done to protect it, so the protection techniques are not constrained by the underlying code. This may provide an advantage over other protection techniques which can leave or create patterns that are based on the underlying code. Such patterns may provide weaknesses that can be exploited by attackers.

Some embodiments disclosed herein provide "profound data dependence", which can make it difficult or impossible to unentangle or distinguish the protected code and the code which is providing protection. For example, AES algorithms typically execute the same way all the time, no matter what the input data is. This makes it straightforward for an attacker to know what he is looking for and where to find it. Most white box protection systems have a rigid equation structure which does not address this type of problem. That is, an attacker may know what types of operations or effects to look for, and where in code or execution to look to find those operations or effects. In contrast, embodiments disclosed herein may provide coding which is not rigid, such as where each iteration of a protection algorithm results in a different encoding. Thus, the system is extremely non-repeatable. Among other things, this may make embodiments disclosed herein more resistant to a "compare" type attack, in which an attacker changes 1 bit and observes how the targeted program changes. In some embodiments disclosed herein, if an attacker changes 1 bit, then the protected code will look completely different.

As a matter of overview, the embodiments of tools, families of tools, and techniques described herein may generally be grouped as follows:

1) Systems and techniques for blurring boundaries between modules of targeted code, and between the targeted code and the protection code. This may be accomplished, for example, by blending code together with surrounding code, and interleaving ciphers with other code, which is usually not done in other protective systems.

2) Systems and techniques for ensuring that a crack requires human intervention. Humans look for patterns that they have seen before. By introducing random functions according to embodiments disclosed herein, repetitive and/or common patterns can be removed so that automated attacks are largely ineffective.

3) Systems and techniques for protecting against "compare attacks". As noted above, a compare attack is an attack where two iterations of code execution are compared to see the difference, such as changing a single input bit to see how the operation and output change. Protection algorithms as disclosed herein may result in dramatically different functions with each iteration of the protected code, so a compare attack does not provide any useful information.

The obfuscation techniques described herein may be implemented wherever the overhead can be accommodated. White box protection systems typically have larger overheads than the techniques described herein, and are therefore at a disadvantage.

Some embodiments include systems and techniques for software protection that operate by applying bijective "base" functions to the targeted code. These base functions are pairs of mutually-inverse functions $f_K$, $f_K^{-1}$ which are used, for example, to encode an operation, and then un-encode the operation at a later point in a software application. The encoding obscures the original function and the data which it generates. There is no loss of information, as the unencoding operation accommodates for the encoding operation, "undoing" or "reversing" its effect later in the encoded application. Base function pairs may be chosen such that an attacker cannot easily find or determine the inverse function. That is, given a function $f_K$, the inverse $f_K^{-1}$ may not be found easily without the key K. The key K may be used at code generation time, but then discarded once the functions $f_K$, $f_K^{-1}$ have been generated and applied to the targeted code. These base function pairs are also lossless, i.e. mathematically invertible. The protected software application does not need to decode a function or process completely to use it elsewhere in the targeted code, as the encoding and unencoding changes are included within the encoded application. In some embodiments it may be preferred that the base functions are "deeply non-linear", thus making homomorphic attacks more difficult. In some embodiments, base function pairs may include permutation polynomial encodings. A permutation polynomial is a polynomial which is invertible (a polynomial bijection).

Some embodiments may generate or use base function pairs in such a manner that they generate "instance diversity" and "dynamic diversity". To achieve "instance diversity", each base function pair may create a secure "communication channel", such as between portions of a software application, between two software applications or platforms, or the like. Dynamic diversity may be created by linking operation of the software to the input data. Each time an encoding is performed, such as for communication between two encoded applications, instance and dynamic diversity may be generated between the two applications. The base functions may be highly "text dependent" so they offer good resistance to plaintext and perturbation attacks. If an attacker changes anything, even making a very small change such as the value of 1 bit, the change will result in a very large behavioural change. This feature is a significant contrast to conventional cipher code, which typically results in the same patterns and structure with each iteration of the code, regardless of the changes that an attacker makes. By making small changes and observing the impact, the attacker is able to gather information about the operation of cipher code, but he is not able to do the same with software encoded using systems and techniques disclosed herein. The diversity provided by embodiments disclosed herein also provides resistance to a "class crack". That is, it is not possible to provide an attack methodology which can systematically and automatically crack each embodiment of the invention in all cases. Note also, that conventional white box implementations and code optimizers will not provide sufficient diversity to gain any effective protection.

The diversity and non-invertibility of the inventive base functions increase the complexity of the attack problem immensely. In contrast to conventional software code or code protection systems, when attempting to defeat the systems and techniques disclosed herein, an attacker must first figure out what function, code portion, application, or the like he is attacking, then how to invert it, and then how to exploit it.

The diversity provided by embodiments disclosed herein may provide a variable, randomly-chosen structure to protected code. An engine which generates the base function pairs and encodings may rely on a random or pseudo-random key to choose the underlying function and/or the key. However, a key according to embodiments disclosed herein may not be as small as the keys of many conventional security systems (i.e. 64 or 128 bits); rather, it may be thousands or tens of thousands of bits. For example, a prototype was developed which uses 2,000 bits.

The base functions disclosed herein may include bijections used to encode, decode, or recode data. Such bijections may include the following characteristics:

1) Encoding wide data elements (typically four or more host computer words wide), unlike typical scalar encodings (see [5, 7] listed in the Appendix), but like block ciphers.

2) Encoding data only: unlike typical scalar encodings, but like ciphers, they are not required to protect computations other than those involved in their own recoding of data elements.

3) Concealing blocks or streams of data, and/or producing fixed-length hashes of blocks or streams of data for authentication purposes, similar to block ciphers, but unlike scalar encodings.

4) Employing forms of operations purposely chosen from the operation repertoire of the software in which they will reside and with which they will be interlocked; i.e., they are designed to resemble the code in the context of which they are embedded, unlike ciphers.

5) Unlike both ciphers and scalar encodings, employing massive multicoding. A scalar encoding generally employs one or at most a few mathematical constructions. A cipher typically employs a slightly larger number, but the number is still small. In some embodiments of the invention, a variety of encodings are applied to an entire function, creating an intricately interlaced structure resulting from the interaction of many forms of protection with one another.

6) Unlike both ciphers and scalar encodings providing massively diverse algorithmic architecture. Embodiments may have no fixed number of rounds, no fixed widths for operands of various substeps, no fixed interconnection of the various substeps, and no predetermined number of iterations of any kind.

7) Unlike both ciphers and scalar encodings, providing massive dynamic diversity by means of highly data-dependent algorithms: i.e., for any particular employment of a base function bijection, the path through its substeps, its iteration counts, and the like, depend intensely on the actual data input to be encoded, decoded, or recoded.

8) Unlike both ciphers and scalar encodings, providing massive interdependence with their embedding context; i.e., their behavior may depend strongly on the software in which they are embedded, and the software in which they are embedded can be made to depend strongly on them.

Some embodiments may use a large quantity of real entropy (i.e., a large truly random input). However, if an engine which generates the base function pairs is not itself exposed to attackers, it may be safe to employ significantly smaller keys which then generate much larger pseudo-random keys by means of a pseudo-random number generator, since in that case, the attacker must contend with both the real key entropy (that for the seed to the pseudo-random number generator) and the randomness inevitably resulting from the programming of the generator.

In some embodiments, biased permutations may also be used. If internal data is used to generate base function pairs or other encoding data/functions rather than random numbers, then the resulting encoding will contain bias. If code is introduced to create unbiased permutations that coding may be readily apparent, resulting in a weakness in the system. In contrast, embodiments disclosed herein may generate biased permutations, but then use various tools to make them less biased. This approach has been shown to be much less apparent than known techniques.

Some embodiments may include techniques for binding pipe-starts and pipe-ends, so that the targeted software code is tied to applications or platforms at both ends. This may be useful, for example, in a peer-to-peer data transfer environment or a digital rights management (DRM) environment. Systems and techniques disclosed herein also may be used to tie ciphers to other software applications or platforms, which is generally difficult to do using conventional techniques.

Some embodiments may use "function-indexed interleaving". This technique provides deep nonlinearity from linear components, and nonlinear equation solving. It can be used in many ways, such as boundary protection, dynamic constant generation (e.g. key-to-code), providing dynamic diversity (data-dependent functionality), self-combining ciphers, cipher mixing and combining ciphers and non-ciphers. For example, it may be used to mix black box ciphers with the other protection code disclosed herein, providing the long term security of a black box cipher, with the other benefits of white box security. As noted above, the encoding of the embodiments disclosed herein may be highly dependent on run-time data. With function index interleaving, two kinds of information are used: a key, K, which determines the base functions and structure, and R, which determines which obfuscations are to be applied to the "defining implementations". Typically the client does not see R. The key, K, may be augmented from the context, though in some examples described herein, only R is augmented in this way. Optionally, semi-consistent information or data from a user or his device (such as a smart phone, tablet computer, PDA, server or desktop computer system, or the like) such as an IP address, could be used to encode and decode as a runtime key.

Recursive function-indexed interleaving also may be used. Function-indexed interleaving typically interleaves arbitrary functions. If some of these functions are themselves functions obtained by function-indexed interleaving, then that is a recursive use of function-indexed interleaving.

Some embodiments may include random cross-linking, cross-trapping, dataflow duplication, random cross-connection, and random checks, combined with code-reordering, create omni-directional cross-dependencies and variable-dependent coding.

Some embodiments may use memory-shuffling with fractured transforms (dynamic data mangling) to hide dataflow may also be employed. In dynamic data mangling, an array A of memory cells may be used which can be viewed as having virtual indices 0, 1, 2, . . . , M−1 where M is the size of the array and the modulus of a permutation polynomial p on the finite ring Z/(M) (i.e., the integers modulo M), as in a C program array. However, for any given index i, there is no fixed position in the array to which it corresponds, since it is addressed as p(i), and p employs coefficients determined from the inputs to the program. The locations A[p(0)], A[p(1)], . . . , A[p(M−1)] may be considered "pseudo-registers" $R_1$, . . . , $R_{M-1}$ extending those of the host machine. By moving data in and out of these registers, recoding the moved data at every move, and by re-using these "pseudo-registers" for many different values (e.g., by employing graph-coloring register allocation), the difficulty for an attacker to follow the data-flow of the program may be greatly increased.

Some embodiments may use "spread and blend" encoding. This is another way of describing the use of base functions plus code interleaving, which "smears out" the boundaries of the base functions to make them more difficult for an attacker to discern. General data blending may have portions of base functions that are mixed with other code, making it more difficult to identify and lift the code.

Some embodiments provide security lifecycle management. Black box security provides good long-term protection, but is not very useful in today's applications. Embodiments disclosed herein may refresh implementations faster than they can be cracked on unprotected devices. Different devices and applications have different needs. For example, a pay-per-view television broadcast such as a sporting event, may have very little value several days after the event, so it may only be necessary to provide sufficient security to protect the broadcast data for a day or so. Similarly, the market for computer games may tail off very quickly after several weeks, so it may be critical only to protect the game for the first few weeks or months. Embodiments disclosed herein may allow a user to apply the level of security that is required, trading off the security against performance. Literally, an adjustable "obfuscation dial" can be placed on the control console. Although the specific defined level of security achieved may be unknown, the intensity with which obfuscating methods are applied may be controlled. Generally, these settings may be adjusted when the application is created with its embedded base function, as part of a software development process. Security analysis may provide an estimate of how difficult the application will be to crack given a specific level of obfuscation. Based on the estimate, an engineering decision may be made of how to balance performance needs against the need for security, and "obfuscation dial" may be set accordingly. This kind of flexibility is not available with other protection systems. With AES, for example, a fixed key length and fixed code is used, which cannot be adjusted.

Some embodiments may provide a flexible security refresh rate, allowing for a trade-off of complexity for the "moving target" of refreshing code. In many cases, the need is to refresh fast enough to stay ahead of potential attackers.

Some embodiments may not have a primary aim of providing long-term data security in hacker-exposed environments. For that, the solution is not to expose the data to hackers, but only to expose means of access to the data by, e.g., providing a web presence for credential-protected (SecureID(TM), pass-phrases, etc.) clients which access the data via protected conversations which can expose, at most, a small portion of the data. In a hacker-exposed environment, it may be expected that a process of refreshing the exposed software in some fashion will be deployed. For example, in satellite TV conditional access systems, cryptographic keys embedded in the software in the set-top boxes (STBs) are refreshed on a regular basis, so that any compromise of the keys has value for only a limited period of time. Currently, such cryptographic keys may be protected over this limited exposure period by means of software obfuscation and/or white-box cryptography.

However, white-box cryptography has proven to be vulnerable to attacks which can be executed very swiftly by cryptographically-sophisticated attackers with expert knowledge of the analysis of executable programs, since the cryptographic algorithms employed are amongst the most thoroughly examined algorithms in existence, and the tools for analysing programs have become very sophisticated of late as well. Moreover, ciphers have peculiar computational properties in that they are often defined over arithmetic domains not normally used in computation: for example, AES is defined over a Galois field, RSA public-key cryptosystems are defined by modular arithmetic over extremely large moduli, 3DES over bit operations, table lookups, and bit-permutations extended with duplicated bits.

In fact, the sophisticated analysis of programs has created a method of attack which sometimes can bypass the need for cryptanalysis altogether: the code-lifting attack, whereby the attacker simply extracts the cryptographic algorithm and employs it with no further analysis (since it is, after all, an operational piece of software, however obfuscated it may be) to crack a software application's functionality.

Some embodiments may provide much stronger short-term resistance to attack. Such protection may be suitable for systems where the time over which resistance is needed is relatively short, because longer term security is addressed by means of refreshing the software which resides on the exposed platforms. This addresses a specific unfilled need which focusses at the point of tension created by highly sophisticated cryptanalytic tools and knowledge, extremely well studied ciphers, limited protections affordable via software obfuscation, highly sophisticated tools for the analysis of executable programs, and the limited exposure times for software in typical commercial content distribution environments. The goal is to prevent the kinds of attacks which experience with white-box cryptography has shown to be within the state of the art: swift cryptanalytic attacks and/or code-lifting attacks so swift that they have value even given the limited lifespans of validity between refreshes of the exposed programs (such as STB programs).

In many cases, it is only necessary to resist analysis for the duration of a refresh cycle, and to tie cipher-replacement so tightly to the application in which it resides that code-lifting attacks are also infeasible for the duration of a refresh cycle. The refresh cycle rate is determined by engineering and cost considerations: how much bandwidth can be allocated to refreshes, how smoothly we can integrate refreshes with ongoing service without loss of quality-of-service, and so on: these are all problems very well understood in the art of providing conditional access systems. These considerations indicate roughly how long our protections must stand up to analytic and lifting attacks.

Some embodiments may provide significantly larger encodings which can resist attacks for longer periods of time, by abandoning the notion of computing with encoded operands—as is done with the simpler encodings above—and replacing it with something more like a cipher. Ciphers themselves can be, and are, used for this purpose, but often they cannot easily be interlocked with ordinary software because (1) their algorithms are rigidly fixed by cipher standards, and (2) their computations are typically very different from ordinary software and therefore are neither readily concealed within it, nor readily interlocked with it. The base-functions described herein provide an alternative which permits concealment and interlocking: they make use of conventional operations, and their algorithms are enormously more flexible than is the case with ciphers. They can be combined with ciphers to combine a level of black-box security as strong as conventional cryptography with a level of white-box security significantly superior to both simple encodings as above and known white-box cryptography.

In some embodiments, a base function may be created by selecting a word size w and a vector length N, and generating an invertible state-vector function configured to operate on an N-vector of w-element words, which includes a combination of multiple invertible operations. The state-vector function may receive an input of at least 64 bits and provides an output of at least 64 bits. A first portion of steps in the state-vector function may perform linear or affine computations over $Z/(2^w)$. Portions of steps in the state-vector function may be indexed using first and second indexing techniques. At least one operation in an existing computer program may then be modified to execute the state-vector function instead of the selected operation. Each of the indexing techniques may control a different indexing operation, such as if-then-else constructs, switches, element-permutation selections, iteration counts, element rotation counts, function-indexed key indexes, or the like. Some of the steps in the state-vector function may be non-T-function operations. Generally, each step in the state-vector function may be invertible, such that the entire state-vector function is invertible by inverting each step. In some configurations the state-vector function may be keyed using, for example, a run-time key, a generation-time key, or a function-indexed key. The state-vector function may be implemented by various operation types, such as linear operations, matrix operations, random swaps, or the like. Various encoding schemes also may be applied to inputs and/or outputs of the state-vector function, and/or operations within the state-vector function. In some configurations, different encodings may be applied to as to produce fractures at various points associated with the state-vector function.

In some embodiments, base functions as disclosed herein may be executed by, for example, receiving an input having a word size w, applying an invertible state-vector function configured to operate on N-vectors of w-element words to the input, where the state-vector function includes multiple invertible operations, and a first portion of steps in the state-vector function perform linear or affine computations over $Z/(2^w)$. Additional operations may be applied to the output of the invertible state-vector function, where each is selected based upon a different indexing technique. Generally, the state-vector function may have any of the properties disclosed herein with respect to the state-vector function and base functions.

In some embodiments, a first operation may be executed by performing a second operation, for example, by receiving an input X encoded as A(X) with a first encoding A, performing a first plurality of computer-executable operations on the input using the value of $B^{-1}(X)$, where $B^{-1}$ is the inverse of a second encoding mechanism B, the second encoding B being different from the first encoding A, providing an output based upon $B^{-1}(X)$. Such operation may be considered a "fracture", and may allow for an operation to be performed without being accessible or visible to an external user, or to a potential attacker. In some configurations, the output of the first operation may not be provided external to executable code with which the first operation is integrated.

In some embodiments, for a matrix operation configured to receive an input and provide an output, prior to performing the operation, the input may be permuted according to a sorting-network topology. The matrix operation may be executed using the permuted input to generate the output, and the output permuted according to the sorting-network topology. The permuted output then may be provided as the output of the matrix operation.

In some embodiments, a first input may be received, and a function-indexed interleaved first function applied to the first input to generate a first output having a left portion and a right portion. A function-index interleaved second function may be applied to the first output to generate a second output, where the left portion of the first output is used as a right input to the second function, and the right portion of the first output is used as a left input to the second function. The second output may then be provided as an encoding of the first input.

In some embodiments, a key K may be generated, and a pair of base functions $f_K$, $f_K^{-1}$ generated based upon the key K and a randomization information R. The base function $f_K$ may be applied to a first end of a communication pipe, and the inverse $f_K^{-1}$ to a second end of the communication pipe, after which the key K may be discarded. The communication pipe may span applications on a single platform, or on separate platforms.

In some embodiments, one or more operations to be executed by a computer system during execution of a program may be duplicated to create a first copy of the operation or operations. The program may then be modified to execute the first operation copy instead of the first operation. Each operation and the corresponding copy may be encoded using a different encoding. Pairs of operations also may be used to create a check value, such as where the difference between execution of an operation result and execution of the copy is added to the result of the operation or the result of the operation copy. This may allow for detection of a modification made by an attacker during execution of the program.

In some embodiments, during execution of a program that includes multiple operations and a copy of each operation, upon reaching an execution point at which an operation of the plurality of operations should be performed, either a copy or the original operation may be selected randomly and executed by the program. The result of the randomly-selected operations may be equivalent to a result that would have been obtained had only a single copy of the operations been performed.

In some embodiments, an input may be received from an application. An array of size M may be defined with a number of M-register locations $c_1, \ldots, c_n$, with n≤M. A permutation polynomial p, an input-based 1×n vector mapping matrix A yielding z from the input, and a series of constants $c_i = p(z+i)$ also may be defined. A series of operations may then be performed, with each operation providing an intermediate result that is stored in an M-register selected randomly from the M-registers. A final result may then be provided to the application based upon the series of intermediate results from a final M-register storing the final result. Each intermediate result stored in an M-register, may have a separate encoding applied to the intermediate result prior to storing the intermediate result in the corresponding M-register. The different encodings applied to intermediate results may be randomly chosen from among multiple different encodings. Similarly, different decodings, which may or may not correspond to the encodings used to store intermediate results in the M-registers, may be applied to intermediate results stored in M-registers. New M-registers may be allocated as needed, for example, only when required according to a graph-coloring allocation algorithm.

In some embodiments, a first operation g(y) that produces at least a first value a as an output may be executed, and a first variable x encoded as aX+b, using a and a second value b. A second operation f(aX+b) may be executed using aX+b as an input, and a decoding operation using a and b may be performed, after which a and b may be discarded. The value b also may be the output of a third operation h(z). Different encodings may be used for multiple input values encoded as aX+b, using different execution instances of g(y) and/or h(z). The values may be selected from any values stored in a computer-readable memory, based upon the expected time that the constant(s) are stored in the memory. Similarly, existing computer-readable program code containing instructions to execute an operation f(aX+b) and g(y), and g(y) produces at least a first value c when executed; may be modified to encode x as cX+d. The operation f(cX+d) may be executed for at least one x, and c and d subsequently discarded.

In some embodiments, at least one base function may be blended with executable program code for an existing application. For example, the base function may be blended with the executable program code by replacing at least one operation in the existing program code with the base function. The base function also may be blended with the existing application by applying one, some, or all of the techniques disclosed herein, including fractures, variable dependent coding, dynamic data mangling, and/or cross-linking. The base functions and/or any blending techniques used may include, or may exclusively include, operations which are similar or indistinguishable from the operations present in the portion of the existing application program code with which they are blended. Thus, it may be difficult or impossible for an attacker to distinguish the base function and/or the blending technique operations from those that would be present in the existing executable program code in the absence of the base function.

In some embodiments, a computer system and/or computer program product may be provided that includes a processor and/or a computer-readable storage medium storing instructions which cause the processor to perform one or more of the techniques disclosed herein.

Moreover, because the algorithms used with base functions disclosed herein may be relatively flexible and open-ended, they permit highly flexible schemes of software diversity, and the varied instances can differ more deeply than is possible with white-box cryptography. Thus, they are far less vulnerable to automated attacks. Whenever attacks can be forced to require human participation, it is highly advantageous, because we can new instances of protected code and data may be automatically generated at computer speeds, but they can only be compromised at human speeds.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

In the appended drawings:

FIG. 2 shows a Virtual Machine General Instruction Format, in accordance with the present invention;

FIG. 3 shows a Virtual Machine Enter/Exit Instruction Format, in accordance with the present invention;

Figure 26:
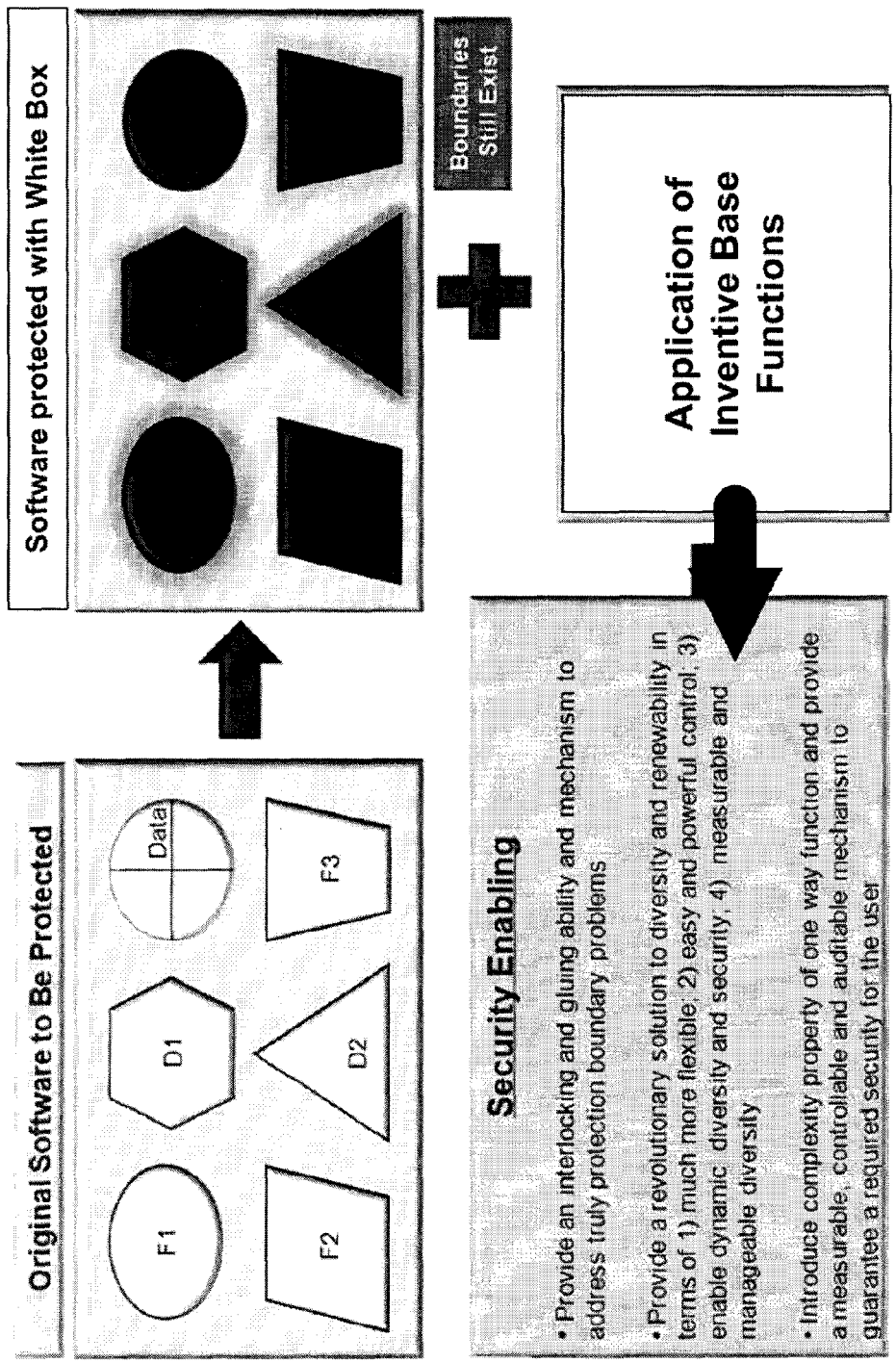
Figure 27:
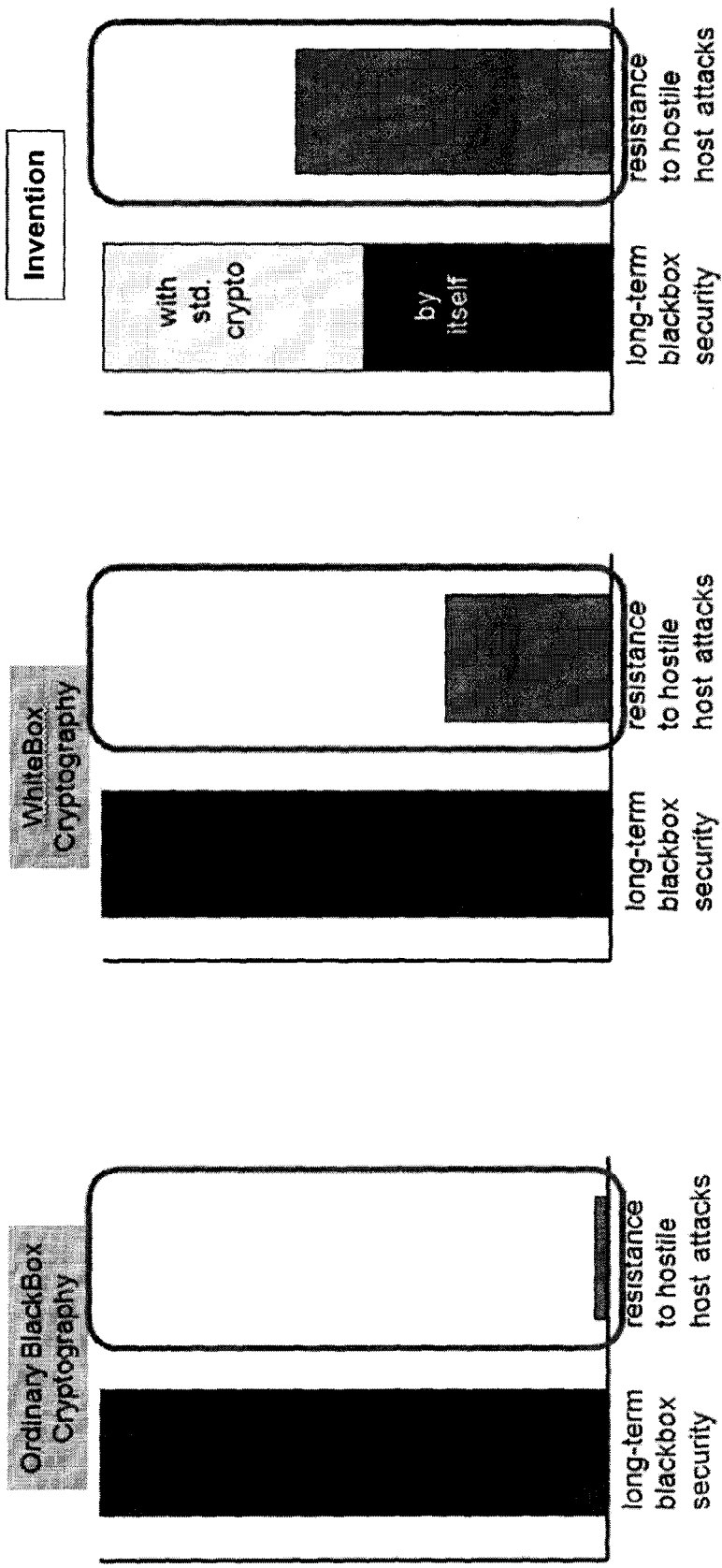
Figure 28:
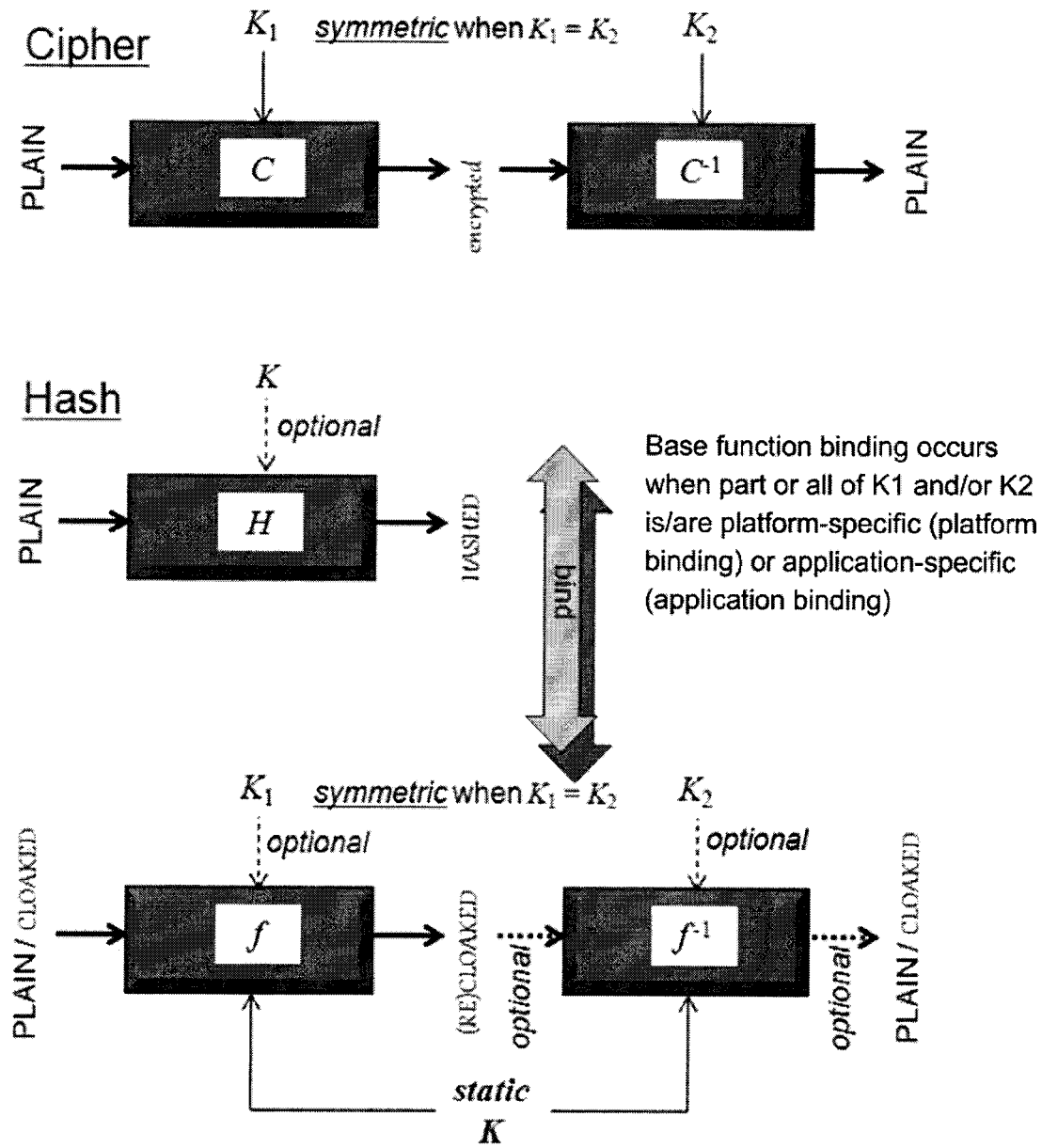
Figure 29:
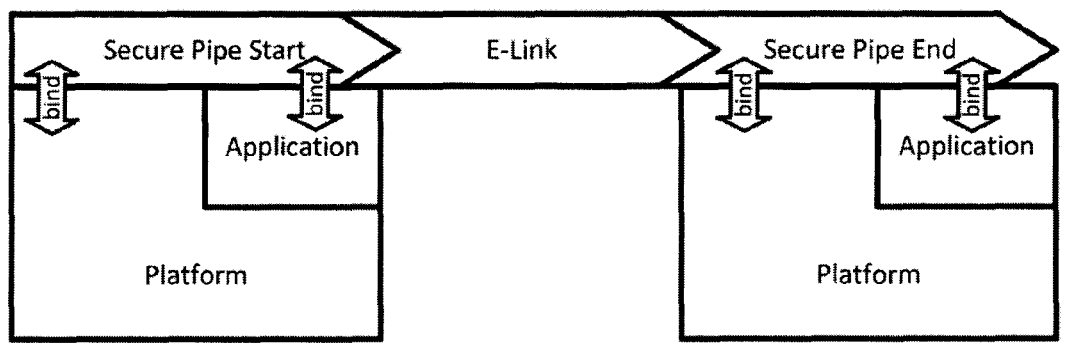
Figure 30:
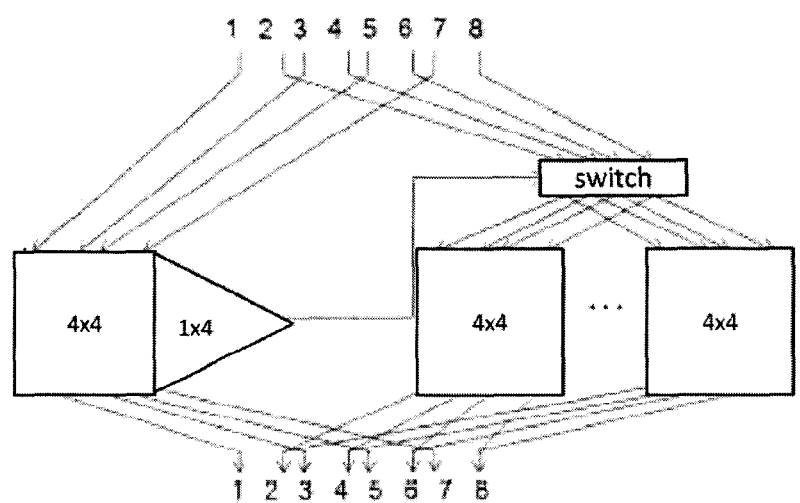
Figure 31:
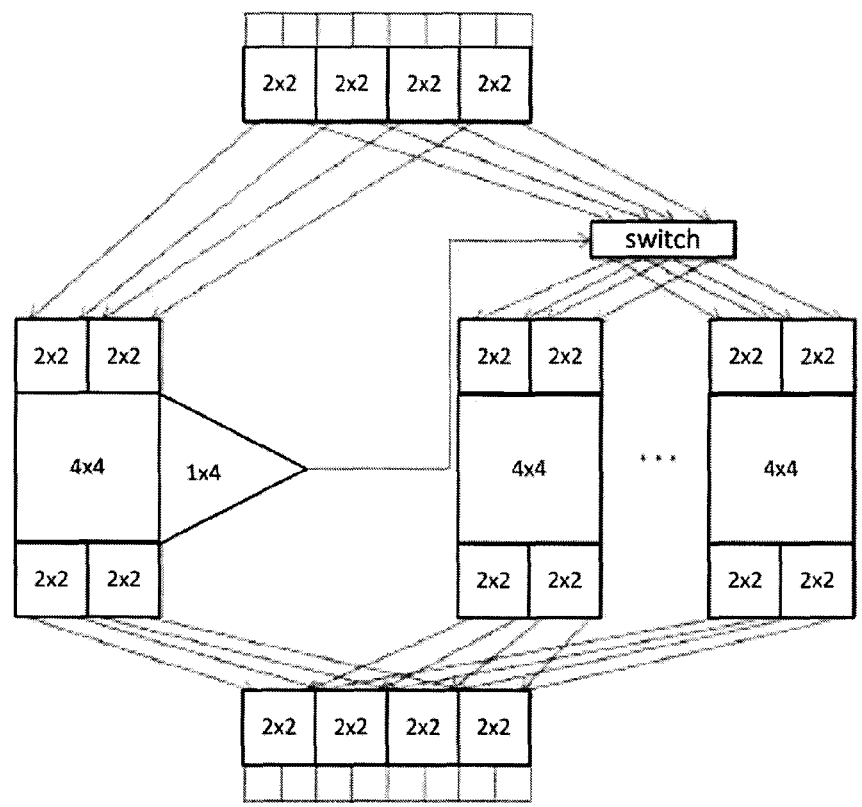

Table 25 presents a table which categorizes software boundary problems;

FIG. 26 shows a block diagram of an exemplary software system in unprotected form, under white box protection, and protected with the system of the invention;

FIG. 27 shows a bar diagram contrasting the levels of protection provided by black box, security, white box security and protection under an exemplary embodiment of the invention;

FIG. 28 shows a process flow diagram contrasting ciphers, hashes and exemplary base functions in accordance with the present invention;

FIG. 29 shows an exemplary block diagram of how base functions of the invention may be used to provide secure communication pipes;

FIG. 30 shows a process flow diagram for function-indexed interleaving in accordance with the present invention;

FIG. 31 presents a process flow diagram for implementation of the Mark I protection system of the invention;

DETAILED DESCRIPTION

Embodiments disclosed herein describe systems, techniques, and computer program products that may allow for securing aspects of computer systems that may be exposed to attackers. For example, software applications that have been distributed on commodity hardware for operation by end users may come under attack from entities that have access to the code during execution.

Generally, embodiments disclosed herein provide techniques to create a set of base functions, and integrate those functions with existing program code in ways that make it difficult or impossible for a potential attacker to isolate, distinguish, or closely examine the base functions and/or the existing program code. For example, processes disclosed herein may receive existing program code, and combine base functions with the existing code. The base functions and existing code also may be combined using various techniques such as fractures, dynamic data mangling, cross-linking, and/or variable dependent coding as disclosed herein, to further blend the base functions and existing code. The base functions and other techniques may use operations that are computationally similar, identical, or indistinguishable from those used by the existing program code, which can increase the difficulty for a potential attacker to distinguish the protected code from the protection techniques applied. As will be described herein, this can provide a final software product that is much more resilient to a variety of attacks than is possible using conventional protection techniques.

Figure 25:
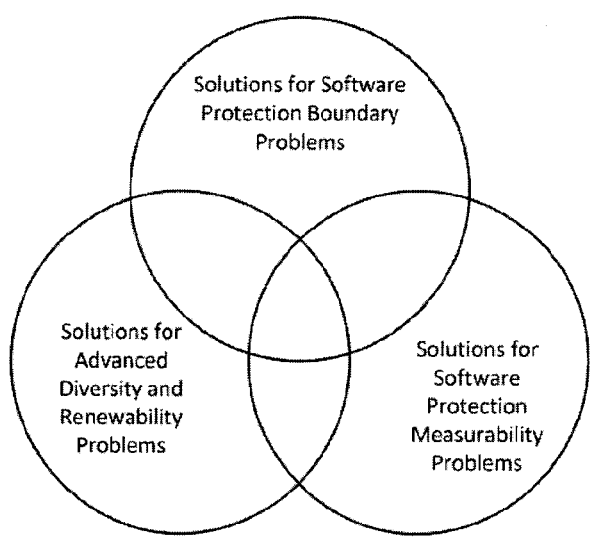
FIG. 25 shows an exemplary block diagram setting out the primary problems that the embodiments of the invention seek to address.

As shown in FIG. 25, embodiments disclosed herein may provide solutions for several fundamental problems that may arise when software is to be protected from attack, such as software boundary protection, advanced diversity and renewability problems and protection measurability problems.

Software boundary problems may be organized into five groups as shown in Table 1: skin problems, data boundaries, code boundaries, boundaries between protected data and protected code, and boundaries between protected software and secured hardware.

TABLE 1

| | Boundary Problem | Description |
|---|---|---|
| Skin Problem | Data flows from unprotected to protected domains<br>Data flows from protected to unprotected domains<br>Computation boundary between unprotected and protected domains | Attacks on unprotected data and computations can be starting points for compromising their data and computation counterparts in the protected domain. These problems typically are hard to solve without introducing a trusted enabling mechanism at the boundary. |
| Data Boundary | Data type boundary | Current data transformation techniques are limited to individual data types, not multiple data types or mass data. The boundaries among distinct protected data items stand out, permitting identification and partitioning. |
| | Data dependence boundary | Data diffusion via existing data flow protections is limited. Original data flow and computational logic is exposed. Most current whitebox cryptographic weaknesses are related to both data type and data dependency boundary problems. |
| | Data crossing functional boundaries | Data communications among functional components of an application system, whether running on the same or different devices, or as client and server, are made vulnerable because the communication boundaries are clearly evident. |
| Code Boundary | Functional boundaries among protected components | Boundaries among functional components are still visible after protecting those components. For example, whitebox cryptography components can be identified by their distinctive computations. In general, such protected computation segments can be easily partitioned, creating vulnerabilities to component-based attacks such as code lifting, code replacement, code cloning, replay, code sniffing, and code spoofing. |
| | Boundaries between injected code and the protected version of the original application code | Current individual protection techniques create secured code that is localized to particular computations. Code boundaries resulting from use of different protection techniques are not effectively glued and interlocked. |
| Boundary | between protected data and protected code | Protected data and protected code are not effectively locked together to prevent code or data lifting attacks. Current whitebox cryptographic implementations are vulnerable to such lifting attacks in the field. |
| Boundary | between protected software and secured hardware | We lack effective techniques to lock protected hardware and protected software to one another. The boundary between protected software and secure hardware is vulnerable, since data crossing the boundary is unprotected or weakly protected. |

There are three types of "skin problems" which may be addressed by embodiments disclosed herein: data flows from unprotected to protected domains, data flows from protected to unprotected domains, and computation boundaries between unprotected and protected domains. Ultimately, data and user interaction should be performed in an unencoded form, so that the user can understand the information. In each case, attacks on unprotected data and computations can be the starting point for compromising their data and computation counterparts in the protected domain. These problems conventionally are hard to solve without introducing a trusted enabling mechanism at the boundary. However, the diversity provided by embodiments disclosed herein, and encoding at the boundary itself, provides a degree of protection that is not provided by known systems.

Data Boundaries may be categorized as one of three types: data type boundaries, data dependency boundaries and data crossing functional component boundaries. With regard to data type boundaries, current data transformation techniques are limited to individual data types, not multiple data types or mass data. The boundaries among distinct protected data items stand out, permitting identification and partitioning. With regard to data dependency boundaries, data diffusion via existing data flow protections is limited: original data flow and computational logic is exposed. Most current white box cryptography weaknesses are related to both data type and data dependency boundary problems.

Finally, with regard to data crossing functional component boundaries, data communications among functional components of an application system, whether running on the same or different devices, or as client and server, are made vulnerable because the communication boundaries are clearly evident. The use of base function encodings and function-indexed interleaving by embodiments disclosed herein may address some or all of these data boundary issues because both the data and the boundaries themselves may be obscured.

Code Boundaries may be categorized into two types: functional boundaries among protected components, and boundaries between injected code and the protected version of the original application code. Functional boundaries among protected components are a weakness because boundaries among functional components are still visible after protecting those components. That is, with white box protection, the white box cryptographic components can generally be identified by their distinctive computations. In general, such protected computation segments can be easily partitioned, creating vulnerabilities to component-based attacks such as code lifting, code replacement, code cloning, replay, code sniffing, and code spoofing. Similarly, boundaries between injected protection code and the protected version of the original application code are also generally visible. Current individual protection techniques create secured code that is localized to particular computations.

Code boundaries resulting from use of different protection techniques are not effectively glued and interlocked. In contrast, the use of base function encodings and function-indexed interleaving by embodiments disclosed herein may address all of these code boundary issues, because code may be obscured and interleaved with the protection code itself. Because basic computer processing and arithmetic functions are used for the protection code, there is no distinctive code which the attacker will quickly identify.

The boundary between protected data and protected code presents another weakness which can be exploited by an attacker as current white box techniques do not secure the boundary between protected data and protected code. In contrast, embodiments disclosed herein may lock together the protected data and protected code, to prevent code or data lifting attacks. Current white box cryptography implementations are vulnerable to such lifting attacks in the field.

Similarly, the boundary between protected software and secured hardware presents a vulnerability as existing white box techniques do not protect the boundary between protected software and secure hardware—data crossing such a boundary is unprotected or weakly protected. In contrast, embodiments disclosed herein may lock protected hardware and protected software to one another.

There are also logistical issues associated with security, in particular, diversity and renewability problems. Current program diversity is limited by program constructs and structures, and by limitations of the individual protection techniques applied. As a result, diversified instances do not vary deeply (e.g., program structure variation is extremely limited), and instances may be sufficiently similar to permit attacks based on comparing diversified instances. Current protection techniques are limited to static diversity and fixed security. In contrast, embodiments as disclosed herein may provide dynamic diversity which may allow for intelligent control and management of the level of security provided by diversity and renewability. As disclosed in further detail herein, resolving advanced diversity and renewability problems may be fundamental to security lifecycle management.

FIG. 26 shows a block diagram of an example software system protected under a known white box model, and under an example embodiment as disclosed herein. The original code and data functions, modules and storage blocks to be protected are represented by the geometric shapes labeled F1, F2, F3, D1 and D2. Existing white box and similar protection techniques may be used to protect the various code and data functions, modules and storage blocks, but even in a protected form they will (at the very least) disclose unprotected data and other information at their boundaries. In contrast, embodiments of the present invention may resolve these boundary problems. In some cases, once an instance of an embodiment as disclosed herein has been executed, an observer cannot tell which parts are F1, F2, F3, D1, D2 and data from the original program, even though the observer has access to the program and can observe and alter its operation.

This may be accomplished, for example, by interleaving the code together between different code and data functions, modules and storage blocks, thus "gluing" these components together. With the code closely tied in this way, true boundary protection can be provided. As described above, diversity and renewability are provided in terms of 1) much greater flexibility being provided than past systems; 2) easy and powerful control; 3) enable dynamic diversity and security; and 4) measurable and manageable diversity. Embodiments disclosed herein also may provide a "complexity property" of one-way bijection functions, as well as a measurable, controllable and auditable mechanism to guarantee required security for the user. Bijections are described in greater detail hereinafter, but in short, they are lossless pairs of functions, $f_K$, $f_K^{-1}$, which perform a transposition of a function, which is undone later in the protected code. The transposition may be done in thousands or millions of different ways, each transposition generally being done in a completely different and non-repeatable manner. Various techniques may be used to conceal existing programs, achieving massive multicoding of bijective functions, which are not humanly programmed, but are generated by random computational processes. This includes bijective functions which can be used in cipher- and hash-like ways to solve boundary problems.

Embodiments disclosed herein may provide improved security and security guarantees (i.e. validated security and validated security metrics) relative to conventional techniques. Greater diversity in time and space than is provided by white box cryptography also may be achieved. The security metrics are based on computational complexity of known attacks, the basic primitive being the generation of mutually inverse function pairs. Other primitives can be constructed as described herein, with or without symmetric or asymmetric auxiliary keys.

FIG. 27 contrasts conventional black box and white box models with properties of the embodiments disclosed herein, in terms of the long-term security and resistance to hostile attacks. Cryptography is largely reliant on Ciphers and Hashes; Ciphers enable transfer of secrets over unsecured or public channels, while Hashes validate provenance. These capabilities have enormous numbers of uses. In a black-box environment, such cryptographic techniques may have very good long term security. However, in terms of resistance to attacks, such systems have a very short life. As explained above, Ciphers and Hashes have a rigid structure and very standardized equations which are straightforward to attack. White box protection may be used to improve the level of resistance to attacks, but even in such an environment the protected code will still reveal patterns and equations from the original Cipher-code and Hash-code, and boundaries will not be protected. As well, white box protection will not provide diversity which protects code against perturbation attacks.

In contrast, embodiments disclosed herein may incorporate Cipher-like and Hash-like encodings, which gives the protective encodings the security and strength of Ciphers and Hashes. In other words, the process of applying white box encodings to Ciphers and Hashes typically uses simple encodings in an attempt to protect and obscure very distinctive code. The techniques disclosed herein, however, may use strong, diverse encodings to protect any code. With the diverse encodings and interleaving as disclosed, distinctiveness in the targeted code will be removed. Thus, as shown, the disclosed techniques may provide a much stronger security profile than conventional black box and white box protection.

Figure 1:
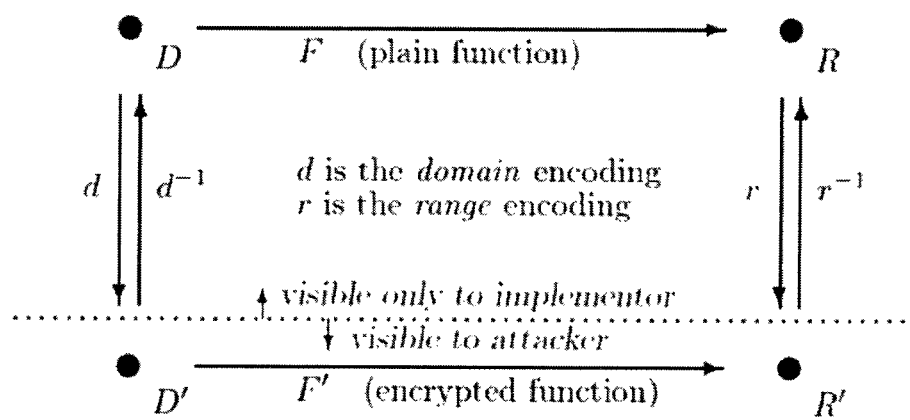
FIG. 1 shows a commutative diagram for an encrypted function, in accordance with the present invention.

FIG. 1 shows a commutative diagram for an encrypted function using encodings, in accordance with embodiments of the present invention. For a F where $F::D \rightarrow R$ is total, a bijection $d:D \rightarrow D'$ and a bijection $r:R \rightarrow R'$ may be selected. $F'=r \circ F \circ d^{-1}$ is an encoded version of F; d is an input encoding or a domain, encoding and r is an output encoding or a range encoding. A bijection such as d or r is simply called an encoding. In the particular case where F is a function, the diagram shown in FIG. 1 then commutes, and computation with F' is computation with an encrypted function. Additional details regarding the use of such encodings generally are provided in Section 2.3 of the Appendix.

FIG. 28 contrasts the properties of conventional Ciphers and Hashes with those of the bijective base functions disclosed herein. Ciphers are non-lossy functions; they preserve all of the information that they encode, so the information can be unencoded and used in the same manner as the original. Ciphers are invertible provided that one is given the key(s), but it is hard to determine the key or keys K1, K2 from instances of plain and encrypted information ("PLAIN" and "ENCRYPTED" in FIG. 28). Hashes are lossy above a certain length, but this typically is not a problem because hashes are generally used just for validation. With a hash it is hard to determine the optional key, K, from instances of the original data and the hash ("PLAIN" and "HASHED" in FIG. 28).

The base functions disclosed herein may serve in place of either ciphers or hashes, as it is hard to determine the key or keys from consideration of the encoding and unencoding functions $f_K$, $f_K^{-1}$. The advantage that the base functions provide over the use of Ciphers or Hashes, is that the computations used by the base functions are more similar to ordinary code, which makes it easier to blend the code of the base functions with the targeted code. As noted above, Ciphers and Hashes use very distinctive code and structure which is difficult to obscure or hide, resulting in vulnerability.

Mutually-inverse base function pairs as disclosed herein may employ random secret information (entropy) in two ways: as key information K which is used to determine the mutually inverse functions $f_K$, $f_K^{-1}$, and as randomization information R which determines how the $f_K$, $f_K^{-1}$ implementations are obscured.

For example, two mutually inverse base functions may be represented by subroutines G and H, written in C. The base functions may be constructed by an automated base function generator program or system, with G being an obfuscated implementation of the mathematical function $f_K$ and H being an obfuscated implementation of the mathematical function $f_K^{-1}$. Thus, G can be used to 'encrypt' data or code, which can then be 'decrypted' with H (or vice versa).

Optionally, run-time keys can be provided in additional to the build-time key K. For example, if the input of a given base function is wider than the output, the extra input vector elements can be used as a run-time key. This is much like the situation with a cipher such as AES-128. A typical run of AES-128 has two inputs: one is a 128-bit key, and one is a 128-bit text. The implementation performs encipherment or decipherment of the text under control of the key. Similarly, a base-function can be constructed to encrypt differently depending on the content of its extra inputs, so that the extra inputs in effect become a runtime key (as opposed to the software generation time key K controlling the static aspects of the base function). The building blocks of base functions disclosed herein make it relatively easy to dictate whether the runtime key is the same for the implementations of both $f_K$, $f_K^{-1}$ or is different for $f_K$ than for $f_K^{-1}$: if the runtime key is added to the selector vector, it is the same for $f_K$ and $f_K^{-1}$, and if it is added elsewhere, it differs between $f_K$ and $f_K^{-1}$.

Key information K can be used to select far more varied encoding functions than in known white box systems, permitting much stronger spatial and temporal diversity. Diversity is also provided with other techniques used in embodiments of the invention such as Function-Indexed Interleaving which provides dynamic diversity via text-dependence. Further diversity may also be provided by variants of Control-Flow Encoding and Mass-Data Encoding described hereinafter.

Base functions as disclosed herein may incorporate or make use of state vector functions. In general, as used herein a state-vector function is organized around a vector of N elements, each element of which is a w-bit quantity. The state vector function may be executed using a series of steps, in each of which a number between zero and N of the elements of the vector are modified. In a step in which zero elements are modified, the step essentially applies the identity function on the state-vector.

In some embodiments, one or more of the state-vector functions used in constructing a base function may be invertible. A state-vector function is invertible if, for each and every step in the state-vector function, a step-inverse exists such that that applying the step-algorithm and then applying the step-inverse algorithm has no net effect. Any finite sequence of invertible steps is invertible by performing the inverse-step algorithms in the reverse order of their originals.

Illustrative examples of invertible steps on a vector of w-bit elements include adding two elements, such as adding i to j to obtain i+j, multiplying an element by an odd constant over $Z/(2^w)$, mapping a contiguous or non-contiguous sub-vector of the elements to new values by taking the product with an invertible matrix over $Z/(2^w)$. The associated inverse steps for these examples are subtracting element i from element j, multiplying the element by the multiplicative inverse of the original constant multiplier over $Z/(2^w)$, and mapping the sub-vector back to its original values by multiplying by the inverse of that matrix, respectively.

Some embodiments may use one or more state-vector functions that have one or more indexed steps. A step is indexed if, in addition to its normal inputs, it takes an additional index input such that changing the index changes the computed function. For example, the step of adding a constant vector could be indexed by the constant vector, or the step of permuting a sub-vector could be indexed by the permutation applied. In each case, the specific function executed is determined at least in part by the index provided to the function.

Indexed steps also may be invertible. Generally, an indexed step is invertible if it computes an invertible step for each index, and the index used to compute the step, or information from which that index can be derived, is available when inverting the step. For example, $S_{17}$ is invertible if $S_{17}^{-1}$ is defined, and the index (17) is available at the appropriate time to ensure that it $S_{17}^{-1}$ is computed when inverting the state-vector function. As an example, a step may operate on some elements of the state. To index this step, other elements of the state may be used to compute the index. If invertible steps are then performed on the other elements, the index by may be retrieved by inverting those steps, as long as the two sets of elements do not overlap.

Function-Indexed Interleaving as disclosed herein is a specific example of the principle of the use of indexed steps within a base function. Other uses of indexed steps as disclosed herein may include: allowing the creation of keyed state-vector functions: the set of indexes used in some of the indexed steps can be used as a key. In that case, the index is not obtained from within the computation, but is provided by an additional input; i.e., the function takes the state-vector plus the key as an input. If the indexed steps are invertible, and the ordinary, non-indexed steps are invertible, then the whole state-vector function is invertible, rather like a keyed cipher.

In some embodiments, the index information may provide or may serve as a key for the generated base functions. If the state-vector function is partially evaluated with respect to the index information when the state-vector function is generated, so that the index does not appear in the execution of the generated function explicitly, it is a generation-time key. If code to handle the index information is generated during execution of the state-vector function, so that the index does appear in the execution of the generated function explicitly, it is a run-time key. If the code internally generates the index within the state-vector function, it is a function-indexed key.

In an embodiment, a base function may be constructed based upon an initial selected or identified word-size w. In some configurations, the default integer size of the host platform may be used as the word size w. For example, on modern personal computers the default integer size typically is 32 bits. As another example, the short integer length as used, for example, in C may be used, such as 16 bits. In other configurations, a 64-bit word size may be used. A vector length N is also selected for the base function, which represents the length of inputs and outputs in the w-sized words, typically encompassing four or more words internally. In some embodiments, such as where interleaving techniques as disclosed herein are used, it may be preferred for the word size w to be twice the internal word size of the N-vector. The state-vector function then may be created by concatenating a series of steps or combinations of steps, each of which performs invertible steps on N-vectors of w-element word. The inverse of the state-vector function may be generated by concatenating the inverses of the steps in the reverse order.

In some embodiments, one or more keys also may be incorporated into the state-vector function. Various types of keying may be applied to, or integrated with, the state-vector function, including run-time keying, generation-time keying, and function-indexed keying as previously described. To generate a run-time keyed state-vector function, the function may be modified to receive the key explicitly as an additional input to the function. To generate a generation-time keyed state-vector function, code in the state-vector function may be partially evaluated with respect to a provided key. For many types of operations, this alone or in conjunction with typical compiler optimizations may be sufficient to make the key unrecoverable or unapparent within the generated code. To generate a function-indexed keyed state-vector function, the state-vector function may be constructed such that appropriate keys for inverse operations are provided as needed within the state-vector function.

In some embodiments, it may be preferred to select an implementation for the state-vector function that accepts a relatively wide input and provides a relatively wide output, and which includes a complex set of invertible steps. Specifically, it may be preferred to construct an implementation that accepts at least a 64-bit wide input and output. It also may be preferred for a significant number of steps in the state-vector function, such as at least 50% or more, to be linear or affine operations over $Z/(2w)$. It also may be preferred to select steps for the state-vector function which have wide variety In some embodiments, it may be preferred to index a significant portion of the steps, such as at least 50% or more, using multiple forms of indexing. Suitable forms of indexing include if-then-else or switch constructs, element-permutation selection, iteration counts, element rotation counts, and the like. It also may be preferred for some or all of the indexes to be function-indexed keys as disclosed herein.

In some embodiments, it may be preferred for the initial and/or final steps of the state-vector function to be steps which mix input entropy across the entire state-vector, typically other than any separate key-input.

In some embodiments, it may be preferred to construct the state-vector function such that at least every few steps, a non-T-function step is performed. Referring to programming operations, examples of T-function steps include addition, subtraction, multiplication, bitwise AND|, bitwise XOR, bitwise NOT, and the like; examples of non-T-function steps include division, modulo assignment, bitwise right shift assignment, and the like. Other examples of non-T-function steps include function-indexed keyed element-wise rotations, sub-vector permutations, and the like. As previously disclosed, the inclusion of non-T-function steps can prevent or reduce the efficacy of certain types of attacks, such as bit-slice attacks.

As previously described, a state-vector function pair includes the state-vector function as described herein and the complete inverse of the state-vector function. In operation, construction of the state-vector function pair may, but need not be performed by, for example, combining a series of parameterized algorithms and/or inverse algorithms in the form of language source such as C++ code or the like. Similarly, substitution of generation-time keys may, but need not be performed by a combination of macro substitution in the macro preprocessor, function in-lining, and use of parameterized templates. Such combinations, substitutions, and other operations may be automated within a state-vector generating system as disclosed herein. Once the state-vector function pair has been generated, one or both may be protected using binary- and/or compiler-level tools to further modify the generated code. In some embodiments, the specific modifications made to one or both functions in the state-vector function pair may be selected based upon whether or not each member is expected to execute in an environment likely to be subject to attack.

For example, in some embodiments, the function or a part of the function that is expected to be in an exposed environment may be bound near a point at which an input vector is provided to the state-vector function, and/or near the point where an output vector is consumed by its invoking code. The code may be bound by, for example, the use of dynamic data mangling and/or fractures as disclosed herein. For example, the inputs provided may be from a mangled store, and outputs may be fetched by an invoker from the mangled store. Other techniques may be used to bind code at these points, such as data-flow duplication with cross-linking and cross-trapping as disclosed herein. Different combinations may be used, such as where dynamic data mangling, fractures, and data-flow duplication are all applied at the same point to bind the code at that point. The protections applied to code expected to be in an exposed environment may be applied within one or both of the state-vector function, with the portion of the code affected determined by the needed level of security. For example, applying multiple additional protection types at each possible point or almost each possible point may provide maximal security; applying a single protection at multiple points, or multiple protection types at only a single code point, may provide a lower level of security but improved performance during code generation and/or execution. In some embodiments, fractures may be applied at multiple points throughout the generation and binding process, because many opportunities for fracture creation may exist due to generation of many linear and affine operations among the steps of the state-vector function during its construction.

In some embodiments, it may be useful to make one member of a state-vector function pair more compact than the other. This may be done, for example, by making the other member of the pair more expensive to compute. As a specific example, when one member of a state-vector function pair is to be used on exposed and/or limited-power hardware such as a smart card or the like, it may be preferred for a hardware-resident member of the state-vector function pair to be significantly more compact than in other embodiments disclosed herein. To do so, a corresponding server-resident or other non-exposed member of the state-vector function pair may be made significantly more costly to compute. As a specific example, rather than using a relatively high number of coefficients as disclosed and as would be expected for a state-vector function generation technique as disclosed previously, a repetitious algorithm may be used. The repetitious algorithm may use coefficients supplied by a predictable stream generation process or similar source, such as a pseudo-random number generator that uses a seed which completely determines the generated sequence. A suitable example of such a generator is the a pseudo-random generator based on ARC4. In some embodiments, such as where the available RAM or similar memory is relatively limited, a variant that uses a smaller element size may be preferred. The pseudo-random number generator may be used to generate all matrix elements and displacement-vector elements. Appropriate constraints may be applied to ensure invertibility of the resulting function. To invert, the generated matrices can be reproduced by knowledge of the seed, at the cost of creating the complete stream used in the exposed pair member, reading it in reverse, multiplicatively inverting each matrix, and additively inverting each vector element in a displacement, over $Z/(2^w)$. Thus, a limited-resource device such as a smart card may be adapted to execute one of a state-vector function pair, while the system as a whole still receives at least some of the benefits of a complete state-vector function system as disclosed herein.

Securing Communication Pipes

As shown in the block diagram of FIG. 29, base functions as disclosed herein may be used to provide a secure communication pipe from one or more applications on one or more platforms, to one or more applications on one or more other platforms (i.e. an e-link). The same process may be used to protect communication from one sub-application to another sub-application on a single platform. In short, a base function pair $f_K$, $f_{K^{-1}}$ may be used to protect a pipe by performing a cipher-like encrypt and decrypt at respective ends of the pipe. In an embodiment, the base function pair $f_K$, $f_{K^{-1}}$ may be applied to the pipe start and pipe end, and also applied to the application and its platform, thus binding them together and binding them to the pipe. This secures (1) the application to the pipe-start, (2) the pipe-start to the pipe-end, and (3) the pipe-end to the application information flow.

An illustrative way of effecting such a process is as follows. Firstly, a key K is generated using a random or pseudo-random process. The base-functions $f_K$, $f_K^{-1}$ are then generated using the key K and randomization information R. The base functions are then applied to pipe-start and pipe-end so that at run time, the pipe-start computes $f_K$, and the pipe-end computes $f_K^{-1}$. The key K can then be discarded as it is not required to execute the protected code. In an application such as this, the base-function specifications will be cipher-based specifications for $f_K$, $f_K^{-1}$ (similar to FIPS-197 for AES encrypt and decrypt). Cloaked base-functions are specific implementations (pipe-start and pipe-end above) of the smooth base-functions designed to foil attempts by attackers to find K, invert a base-function (i.e., break encryption), or break any of the bindings shown above. That is, a smooth base function is one which implements $f_K$ or $f_K^{-1}$ straightforwardly, with no added obfuscation. A cloaked base function still computes $f_K$ or $f_K^{-1}$, but it does so in a far less straightforward manner. Its implementation makes use of the obfuscation entropy R to find randomly chosen, hard to follow techniques for implementing $f_K$ or $f_K^{-1}$. Further examples of techniques for creating and using cloaked base functions are provided in further detail herein.

Function-Indexed Interleaving

To guard against homomorphic mapping attacks, embodiments disclosed herein may use replace matrix functions with functions which are (1) wide-input; that is, the number of bits comprising a single input is large, so that the set of possible input values is extremely large, and (2) deeply nonlinear; that is, functions which cannot possibly be converted into linear functions by i/o encoding (i.e., by individually recoding individual inputs and individual outputs). Making the inputs wide makes brute force inversion by tabulating the function over all inputs consume infeasibly vast amounts of memory, and deep nonlinearity prevents homomorphic mapping attacks.

Some embodiments may use "Function-Indexed Interleaving", which may provide diffusion and/or confusion components which are deeply nonlinear. A function from vectors to vectors is deeply nonlinear if and only if it cannot be implemented by a matrix together with arbitrary individual input- and output-encodings. If it is not deeply nonlinear, then it is "linear up to I/O encoding" ("linearity up to I/O encoding" is a weakness exploited in the BGE attack on WhiteBox AES.)

Function-Indexed Interleaving allows conformant deeply nonlinear systems of equations to be solved by linear-like means. It can be used to foster data-dependent processing, a form of dynamic diversity, in which not only the result of a computation, but the nature of the computation itself, is dependent on the data. FIG. 30 shows a process flow diagram of an example Function-Indexed Interleaving process, which interleaves a single 4×4 function with a family of 4×4 functions. The 1×1 function with 1×1 function-family case permits combining of arbitrary kinds of functions, such as combining a cipher with itself (in the spirit of 3DES) to increase key-space; combining different ciphers with one another; combining standard ciphers with other functions; and combining hardware and software functions into a single function.

In the example implementation shown in FIG. 30, the square boxes represent bijective functions, typically but not necessarily implemented by matrices. The triangle has the same inputs as the square box it touches and is used to control a switch which selects among multiple right-side functions, with inputs and outputs interleaving left-side and right-side inputs and outputs as shown:
  if the left-side box and right-side boxes are 1-to-1, so is the whole function;
  if the left-side box and right-side boxes are bijective, so is the whole function;
  if the left-side box and right-side boxes are MDS (maximum distance separable), so is the whole function, whether bijective or not.

If the triangle and all boxes are linear and chosen at random, then (by observation) over 80% of the constructions are deeply nonlinear.

In an example embodiment disclosed herein, function-indexed interleaving appears four times in an $f_K$, $f_K^{-1}$ specification. Each time it includes three 4×4 linear mappings for some 4×4 matrix M. Each instance of function-indexed interleaving has a single left-side function and $2^4=16$ right-side functions.

Notably, function-indexed interleaving also may be nested, such that the left-function or right-function-family may themselves be instances of function-indexed interleaving. In such a configuration, the result is a recursive instance of function-indexed interleaving. In general, such instances typically are more difficult for an attacker to understand than non-recursive instances; that is, increasing the level of recursion in function-indexed interleaving should increase the level of obscurity.

Figure 8:
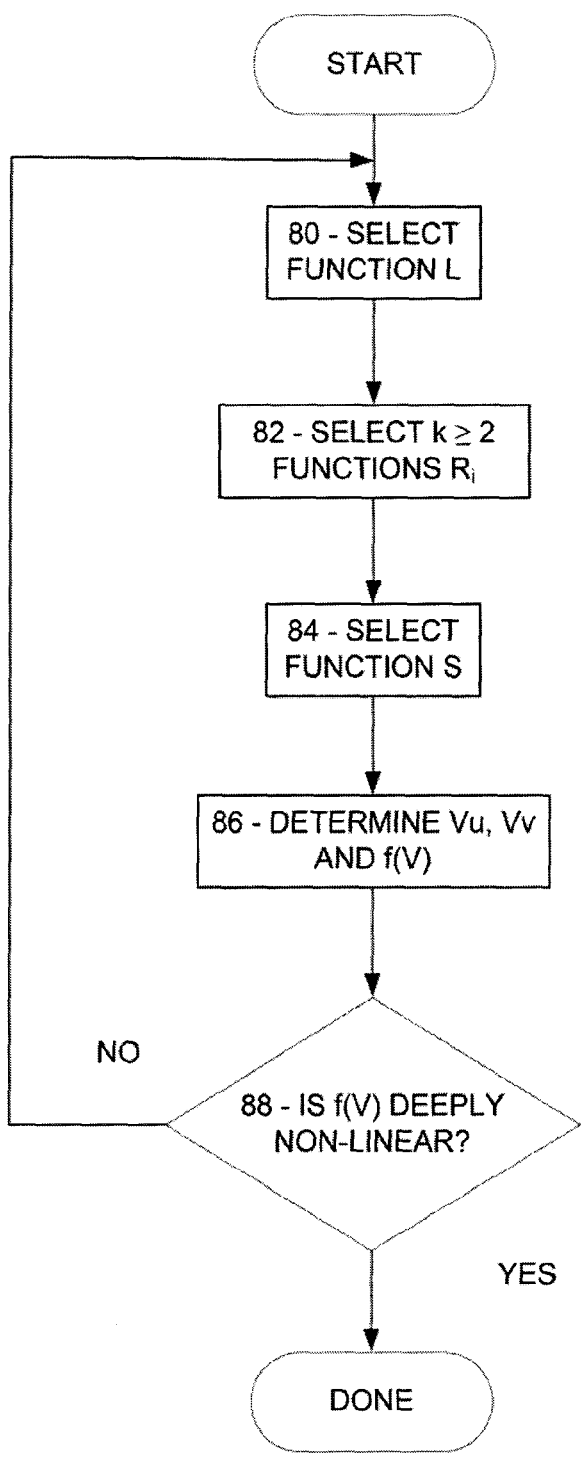
FIG. 8 shows a flow chart of method of performing function-indexed interleaving, in accordance with the present invention.

A further example embodiment and corresponding mathematical treatment of function-indexed interleaving is provided in Section 2.9, and specifically in Section 2.9.2, of the Appendix, and FIG. 8.

Mark I System

Three specific example embodiments are described in detail herein, referred to as the Mark I, II and III systems. An exemplary implementation of the Mark I system is presented in the process flow diagram of FIG. 31. In this example, the square boxes represent mixed Boolean arithmetic (MBA) polynomial encoded matrices. The ambiguity of MBA polynomial data- and operation-encodings is likely to be very high and to increase rapidly with the degree of the polynomial. Each matrix is encoded independently, and the interface encodings need not match. Thus, 2×2 recodings cannot be linearly merged with predecessors and successors. The central construction is function-indexed interleaving which causes the text processing to be text-dependent. Using simple variants with shifts, the number of interleaved functions can be very large with low overhead. For example, permuting rows and columns of 4×4 matrices gives 576 choices. As another example, XORing with initial and final constants gives a relatively very high number of choices. Initial and final recodings mix the entropy across corresponding inputs/outputs of the left fixed matrix and the right selectable matrices. Internal input/output recodings on each matrix raise the homomorphic mapping work factor from order $2^{3w/2}$ to order $2^{5w/2}$ allowing for full 'birthday paradox' vulnerability—the work factor may be higher, but is unlikely to be lower.

Figure 4:
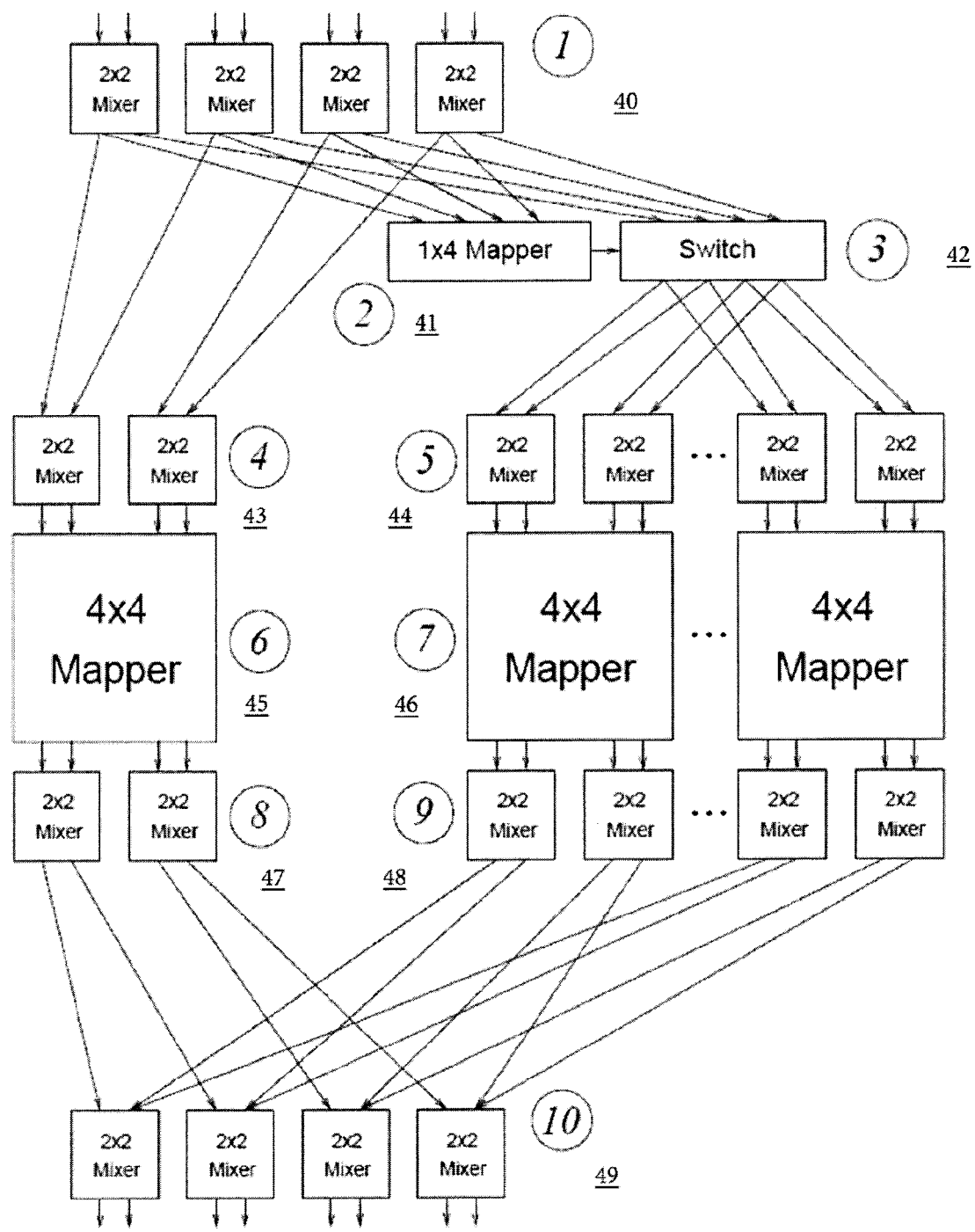
FIG. 4 shows a Mark I 'Woodenman' Construction, in accordance with the present invention.

An example embodiment of a Mark I system and corresponding mathematical treatment is provided in Sections 3.5 and 4 of the Appendix and in FIG. 4.

However, it has been found that a Mark I type implementation may have two weaknesses that can be exploited in some circumstances:

1) Static dependency analysis can be used to isolate the components.
2) Only shift operations and comparisons in the 'switch' are non-T-functions. All of the other components are T-functions and therefore may be recursively analysable using a bit-slice attack.

T-Functions

A function $f:(B^w)^k \to (B^w)^m$ mapping from a k-vector of w-bit words to an m-vector of w-bit words is a T-function if for every pair of vectors $x \in (B^w)^k$, $y \in (B^w)^m$:$-y=f(x)$, with $x' \neq x$ and $y'=f(x')$, and with bits numbered from 0 to w−1 in the w-bit words, the lowest numbered bit in an element word at which y and y' differ is not lower than the lowest numbered bit in an element word at which x and x' differ.

Thus, a function which is a T-function will have the property that a change to an input element's $2^i$ bit never affects an output element's $2^j$ bit when i>j. Typically, the bit-order numbering within words is considered to be from low-order ($2^0$) to high-order ($2^{w-1}$) bits, regarding words as representing binary magnitudes, so this may be restated as: an output bit can only depend on input bits of the same or lower order. So it may be possible to "slice off" or ignore higher bits and still get valid data. Some embodiments also may incorporate tens of millions of T-functions, in contrast to known implementations which only use hundreds of T-functions. As a result, embodiments disclosed herein may be more resistant to bit slicing attacks and statistical attacks.

Functions composable from $\wedge$, $\vee$, $\oplus$, $\neg$ computed over $B^w$ together with +, −, × over $Z/(2^w)$, so that all operations operate on w-bit words, are T-functions. Obscure constructions with the T-function property are vulnerable to bit-slice attacks, since it is possible to obtain, from any T-function, another legitimate T-function, by dropping high-order bits from all words in input and output vectors. The T-function property does not hold for right bit-shifts, bitwise rotations, division operations, or remainder/modulus operations based on a divisor/modulus which is not a power of two, nor does it hold for functions in which conditional branches make decisions in which higher-order condition bits affect the value of lower-order output bits. For conditional branches and comparison-based conditional execution, conditional execution on the basis of conditions formed using any one of the six standard comparisons =, ≠, <, >, ≤, ≥ all can easily violate the T-function condition, and indeed, in normal code using comparison-based branching logic, it is easier to violate the T-function condition than it is to conform to it.

External and Internal Vulnerabilities and Attack-Resistance

By repeatedly applying either of a pair of bijective functions $f_K$, $f_K^{-1}$ where $f_K$, $f_K^{-1}$ are T-functions, it may be possible to precisely characterize the computations using a bit-slice attack. In such an attack, the operation of these functions is considered ignoring all but the low-order bits, and then the low-order two bits, and so on. This provides information until the full word size (e.g., 32 bits) is reached, at which point complete information on how the function behaves may be available, which is tantamount to knowledge of the key K. This is an external vulnerability. While the attack gains knowledge of implementation details, it does so without any examination of the code implementing those details, and could be performed as an adaptive known plaintext attack on a black-box implementation.

A less severe external vulnerability may exist if the functions of the pair have the property that each acts as a specific T-function on specific domains, and the number of distinct T-functions is low. In this case, a statistical bucketing attack can characterize each T-function. Then if the domains can similarly be characterized, again, without any examination of the code, using an adaptive known plaintext attack, an attacker can fully characterize the functionality of a member of the pair, completely bypassing its protections, using only black-box methods. Plainly, it may be desirable to have an effective number of distinct T-functions to foil the above attack. In Mark III type implementations, for example, there are over $10^8$ distinct T-functions per segment and over $10^{40}$ T-functions over all. Mark III type implementations are described in further detail herein.

In some cases, the pair of implementations may include functions which achieve full cascade, that is, every output depends on every input, and on average, changing one input bit changes half of the output bits. An example of an internal vulnerability may occur in a Mark II type implementation where, by 'cutting' the implementation at certain points, it may be possible to find a sub-implementation (a component) corresponding to a matrix such that the level of dependency is exactly 2×2 (in which case the component is a mixer matrix) or 4×4 (in which case it is one of the L, S, or R matrices). Once these have been isolated, properties of linear functions allow very efficient characterization of these matrices. This is an internal attack because it requires non-black-box methods: it actually requires examination of internals of the implementations, whether static (to determine the dependencies) or dynamic (to characterize the matrices by linearity-based analyses).

As a general rule, the more external attacks are prevented, and a potential attacker is forced to rely on increasingly fine-grained internal attacks, the harder the attacker's job becomes, and most especially, the harder the attacks become to automate. Automated attacks are especially dangerous because they can effectively provide class cracks which allow all instances of a given technology to be broken by tools which can be widely distributed.

Thus embodiments disclosed herein may provide, by means of of variable and increasingly intricate internal structures and increasingly variegated defenses, an environment in which any full crack of an instance requires many sub-cracks, the needed sub-cracks vary from instance to instance, the structure and number of the attacked components varies from instance to instance, and the protection mechanisms employed vary from instance to instance. In this case, automating an attack becomes a sufficiently large task to discourage attackers from attempting it. In the substantial time it would take to build such an attack tool, the deployed protections may have been updated or otherwise may have moved on to a new technology for which the attack-tool's algorithm no longer suffices.

Mark II System

Figure 5:
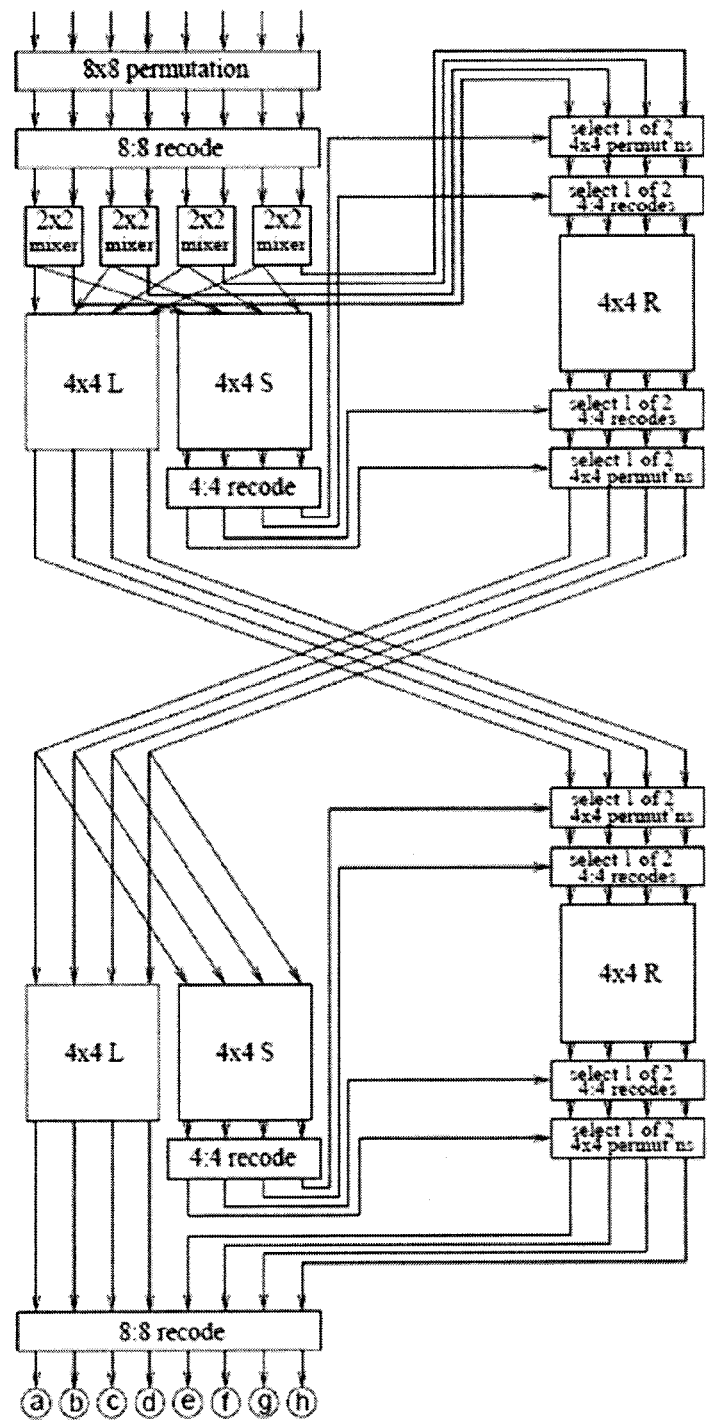
FIGS. 5 and 6 show the first and second half respectively, of a Mark II Construction, in accordance with the present invention.
Figure 6:
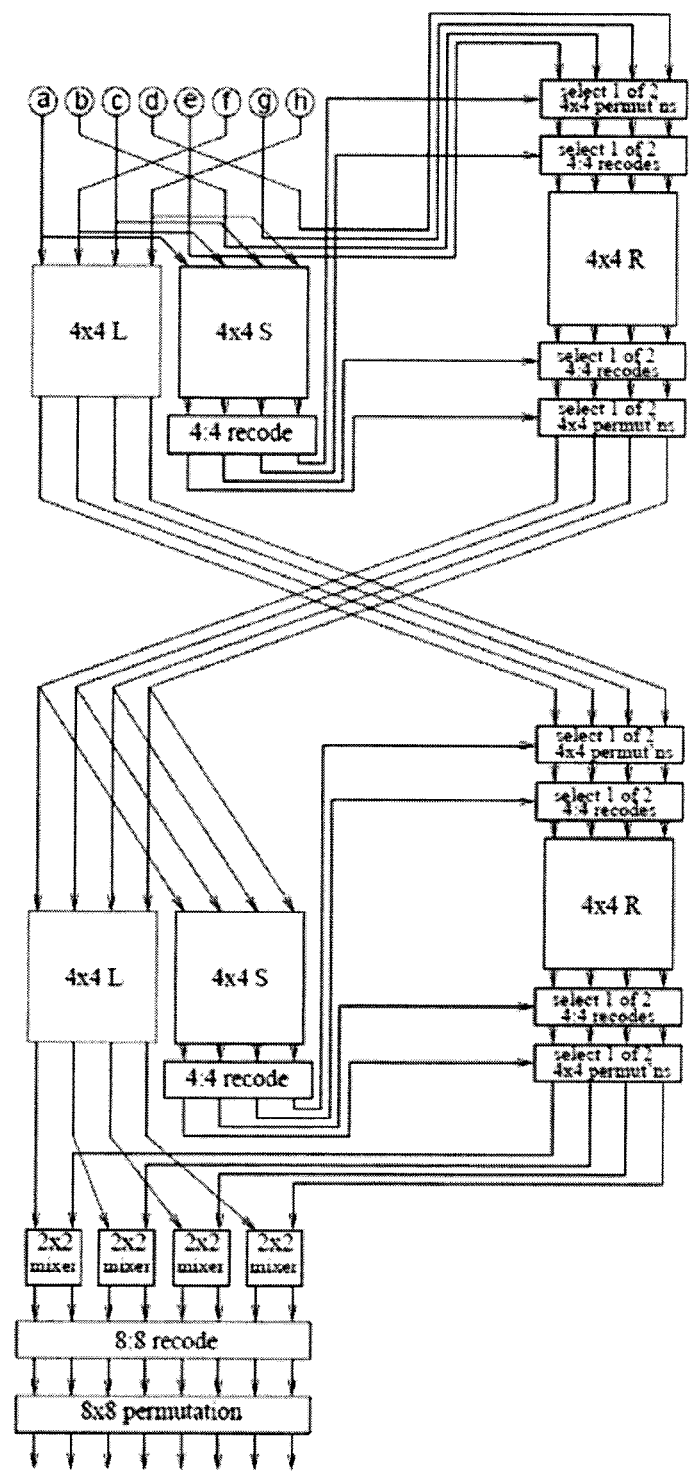
Figure 12:
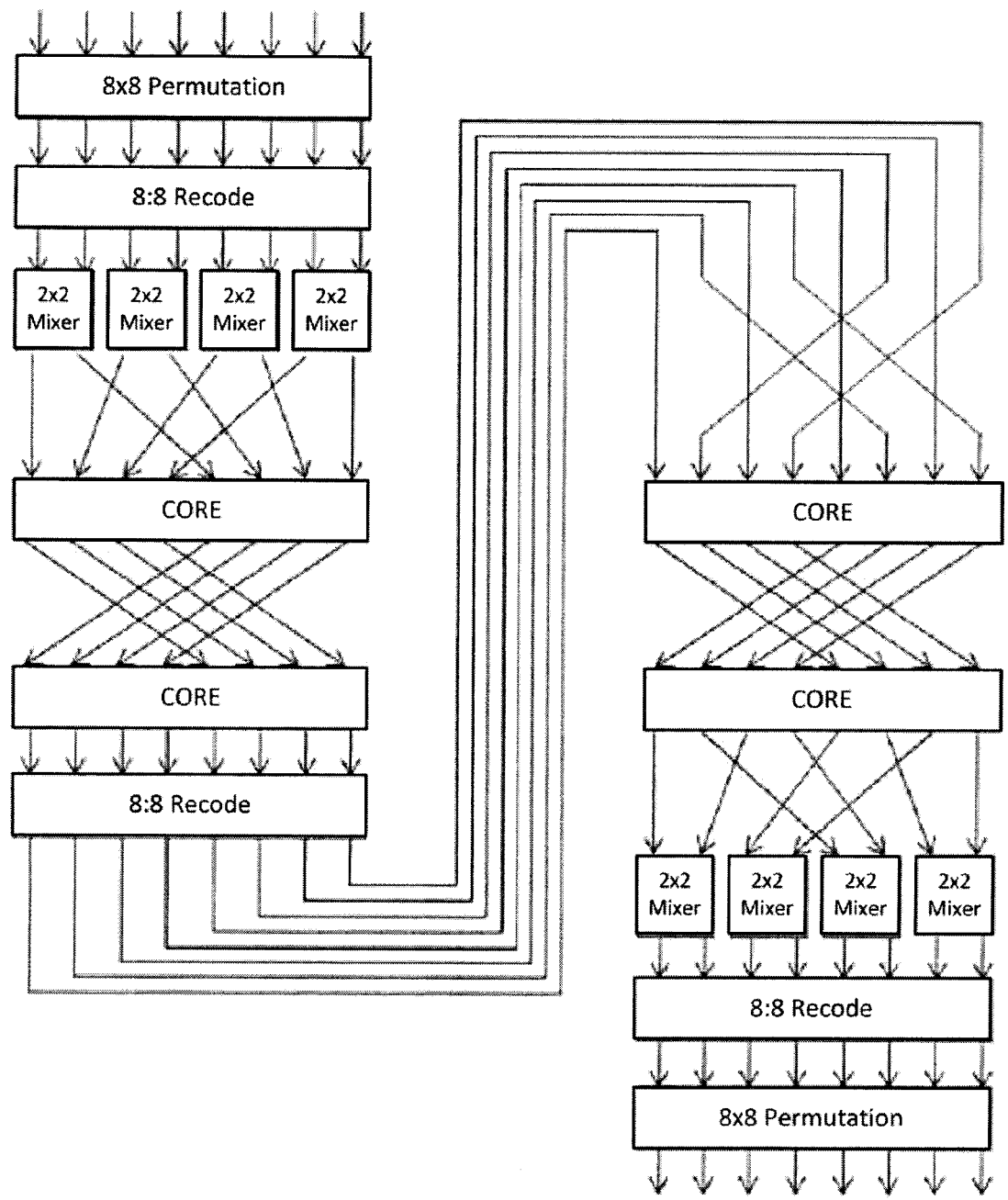
FIG. 12 presents a process flow diagram for implementation of the Mark II protection system of the invention.
Figure 23:
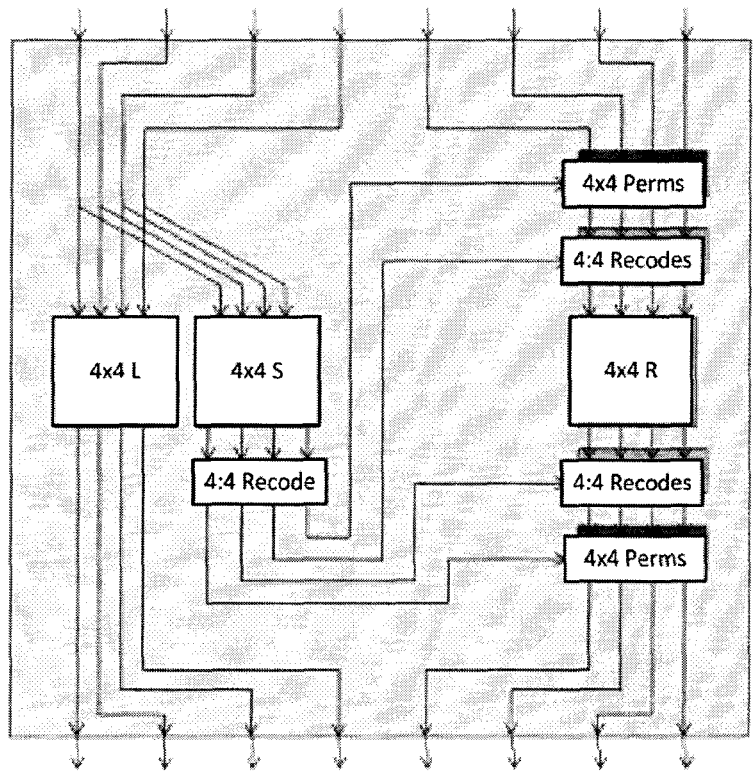
FIG. 23 presents a process flow diagram for implementation of the Mark II protection system of the invention.

A block diagram of an example Mark II type implementation according to an embodiment is presented in FIGS. 23 and 12. FIG. 23 presents the processing of a "base core function" which appears four times in FIG. 12. The complete execution flow for a Mark II type system is shown in FIGS. 5 and 6, and described in further detail with reference to FIGS. 5 and 6 in Section 5.1 of the Appendix.

In an implementation according to a Mark II type embodiment, explicit use of recoding is part of the functionality chosen by K. Right-side recodes and permutations are chosen text-dependently from pairs for a total of 16 configurations per core and 65,536 configurations over all. However, a T-function count of 65,536 over all may be much too low for many cases; even a blind bit-slice attack, which ignores the internal structure and uses statistical bucketing, might suffice to crack the Mark II implementation given sufficient attack time.

The balance of a Mark II type implementation is shown in FIG. 12. Initial and final permutations and recodes as shown are statically chosen at random. Swapping sides between cores 1 & 2 and between cores 3 & 4, and half-swapping between cores 2 & 3, ensure text dependence across the entire text width. However, the highly regular structure facilitates component-isolation by interior dependency analysis. Once the components are isolated, the T-functions can be analysed by bit-slice analysis. The non-T-function parts are simple and can be cracked using straightforward attacks. Thus, the Mark II implementation is effective and is useful in many applications, but could be compromised with sufficient access and effort.

The Mark II proposal is similar to Mark I in that it has a fixed internal structure, with only coefficient variations among the base function implementation pairs. Further description regarding the example embodiment of a Mark II implementation and a corresponding mathematical treatment is provided in Section 5.1 of the Appendix.

Mark III System

In contrast to the Mark I and Mark II implementations described above, a Mark III base function design according to an embodiment disclosed herein may include the following properties:
an irregular and key-determined structure, so that the attacker cannot know the details of the structure in advance;
highly data-dependent functionality: varying the data varies the processing of the data, making statistical bucketing attacks resource-intensive;
a relatively extremely high T-function count (the number of separate sub-functions susceptible to a recursive bit-slice attack), making a blind bit-slice attack on its T-functions infeasible;
redundant and implicitly cross-checked data-flow, making code-modification attacks highly resource-intensive; and
omni-directional obfuscation-induced dependencies, making dependency-based analysis resource-intensive.

Figure 13:
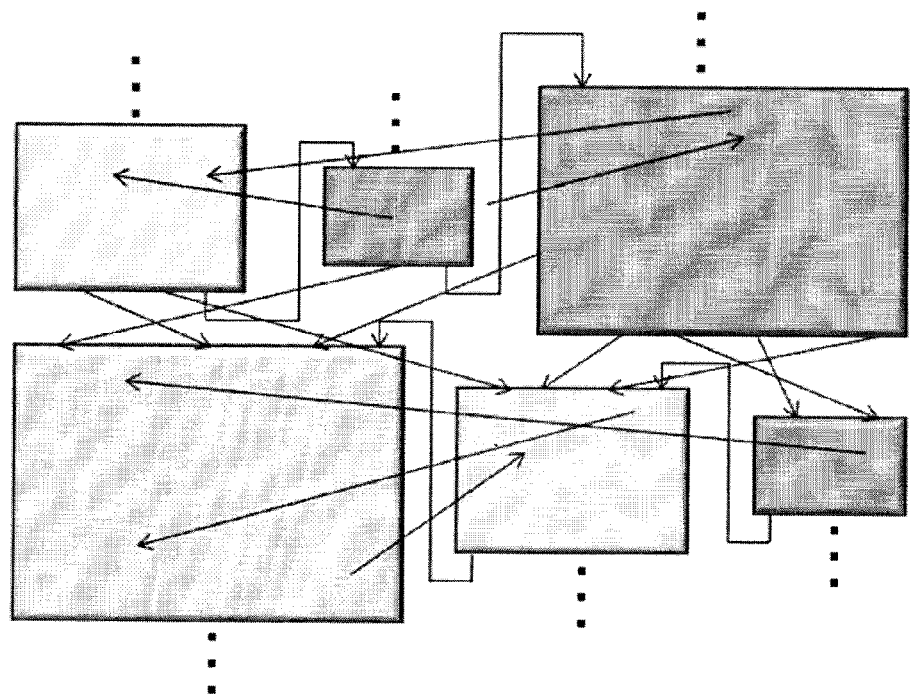
FIG. 13 shows a graphical representation of the irregular structure of segment design in a Mark III implementation of the invention.
Figure 14:
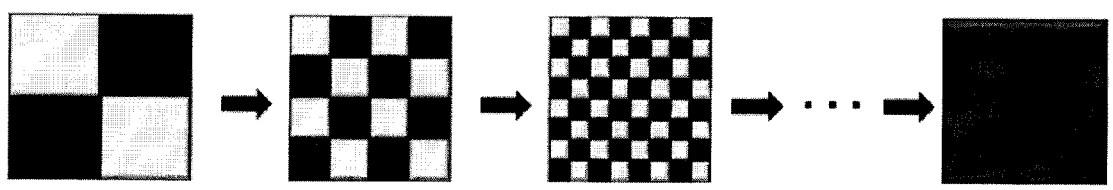
FIG. 14 shows a graphical representation of the granularity that may be achieved with T-function splitting in a Mark III implementation of the invention.

FIG. 13 shows a schematic representation of execution flow in a portion of an example Mark III type implementation. Similar to the example execution flows described with respect to the Mark I and Mark II type implementations, each component may represent a function, process, algorithm or the like, with arrows representing potential execution paths between them. Where different arrows lead to different points within the components, it will be understood that different portions of the component may be executed, or different execution paths within the component may be selected. As shown in FIG. 13, a Mark III type implementation may provide an irregular, key-dependent, data-dependent, dataflow-redundant, cross-linked, cross-checked, tamper-chaotic structure, containing a nested function-indexed-interleaving within a function-indexed interleaving. Cross-linking can be omnidirectional because right-side selection depends on the inputs, not the outputs, of the left-side in each interleaving, so that simple code reordering within each segment allows right-to-left cross connections as well as left-to-right ones. As shown in FIG. 14, Irregular Extremely fine-grained T-function splitting makes overall T-function partitioning attack ineffective.

Figure 15:
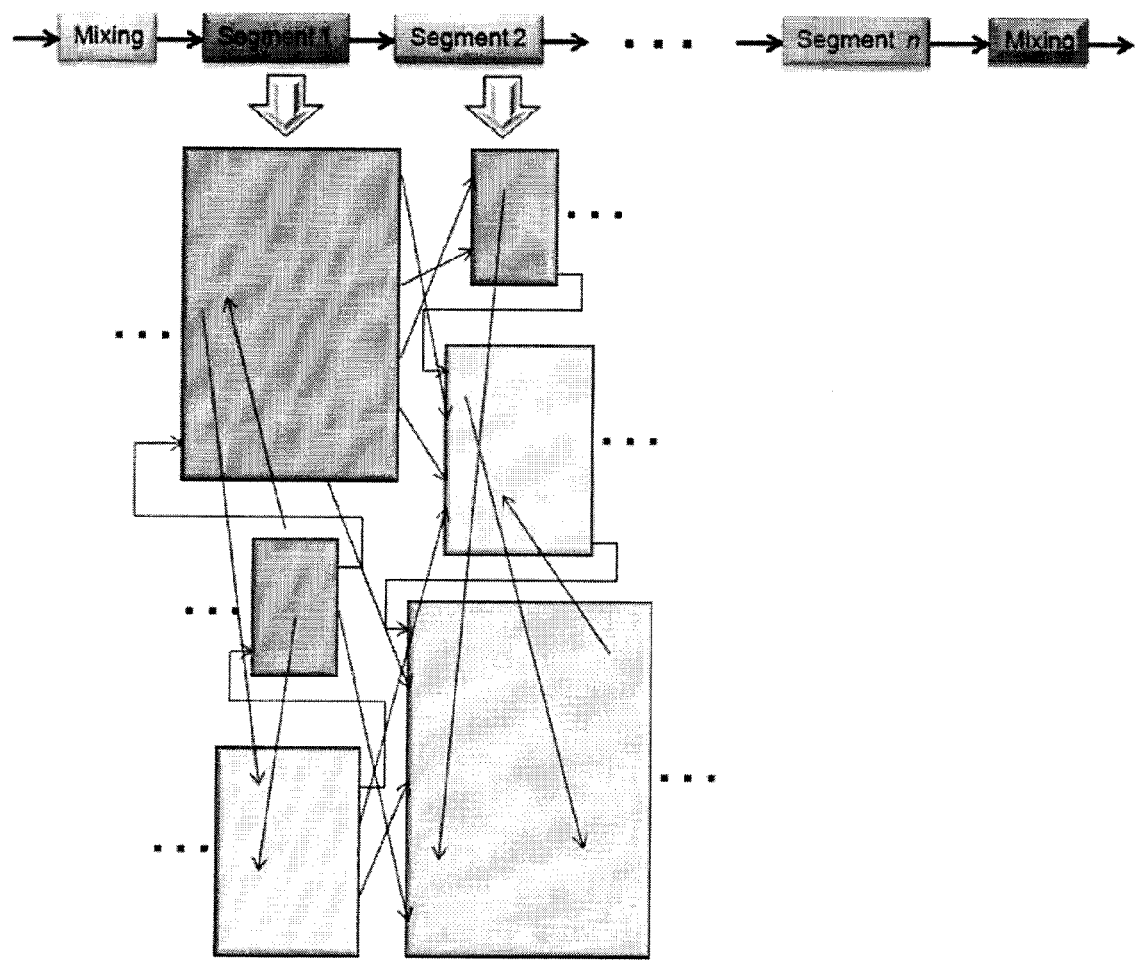
FIG. 15 shows a graphical representation of the overall structure of a Mark III implementation of the invention.

FIG. 15 shows another example schematic of a portion of a Mark III type implementation as disclosed herein. As shown in FIG. 15, the initial and final mixing may use linear transforms of 32-bit words having widths of 3 to 6. Five to seven segments may be are used, each of which contains a 3-band recursive instance of function-indexed interleaving. Each band is 3 to 6 elements wide, with a total of 12 elements for all three bands. Matrices are I/O permuted and I/O rotated, giving over 100 million T-subfunctions per segment: the whole base function has over $10^{40}$ T-subfunctions. Dataflow duplication, random cross-connection, and random checks, combined with code-reordering also may be used, creating omni-directional cross-dependencies.

Figure 16:
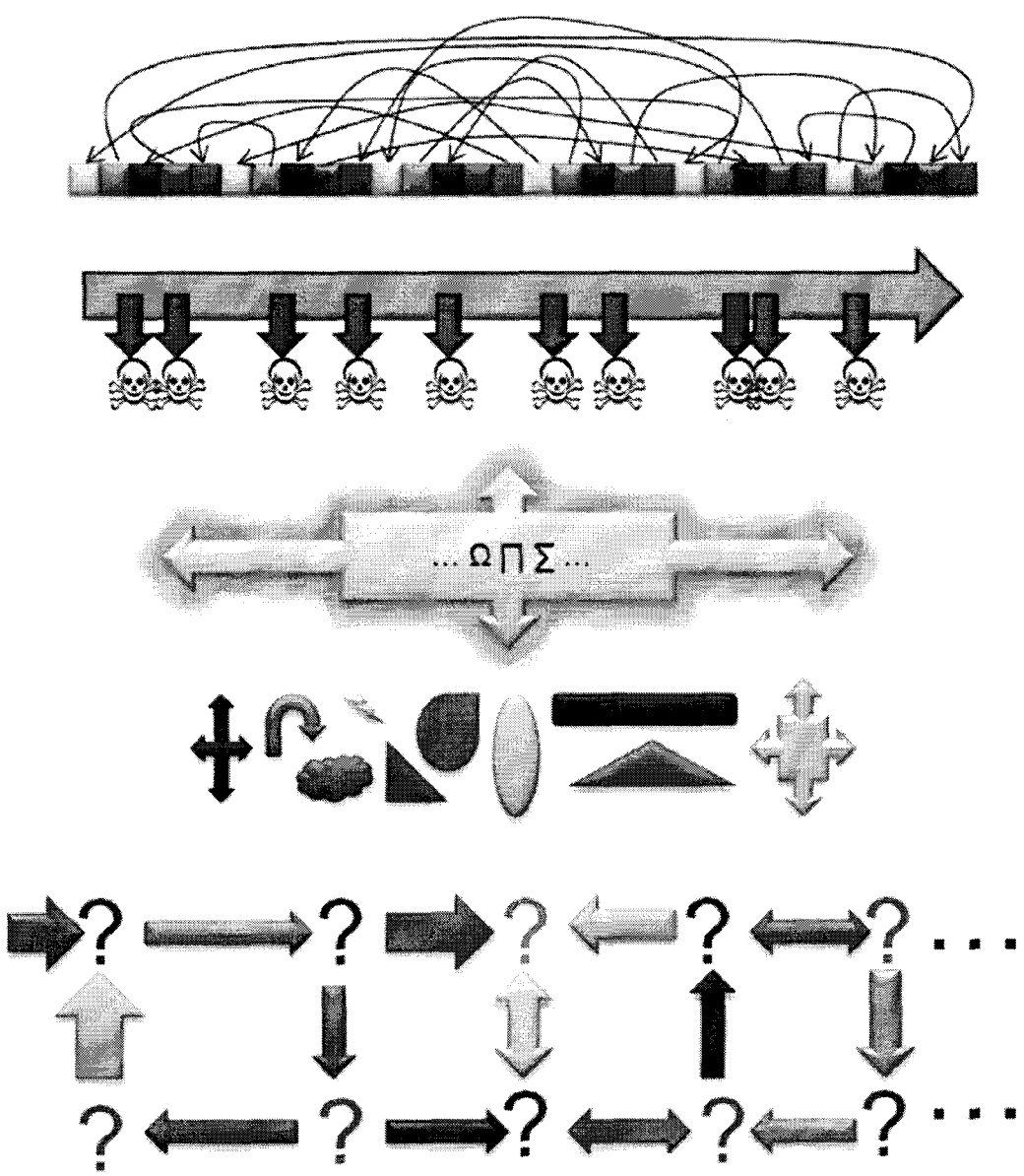
FIG. 16 shows a graphical representation of the defensive layers of a Mark III implementation of the invention.

A number of the different defenses that may be used in a Mark III type system are shown graphically in FIG. 16. They include features such as the following:
memory-shuffling with fractured transforms (dynamic data mangling) which hides dataflow;
random cross-linking, cross-trapping, and variable-dependent coding which causes pervasive inter-dependence and chaotic tamper response;
permutation polynomial encodings and function-indexed interleaving which hobble linear attacks;

variable, randomly-chosen structure which hobbles advance-knowledge attacks; and functionality is highly dependent on run-time data, reducing repeatability and hobbling statistical bucketing attacks.

Further details regarding a Mark III type implementation are provided in Section 6 of the Appendix. A related process for creating an invertible matrix over $Z/(2^w)$ is provided in Section 3.3 of the Appendix. As shown and described, initial and/or final mixing stelps also may be used, examples of which are provided in Section 2.8 of the Appendix.

Figure 11:
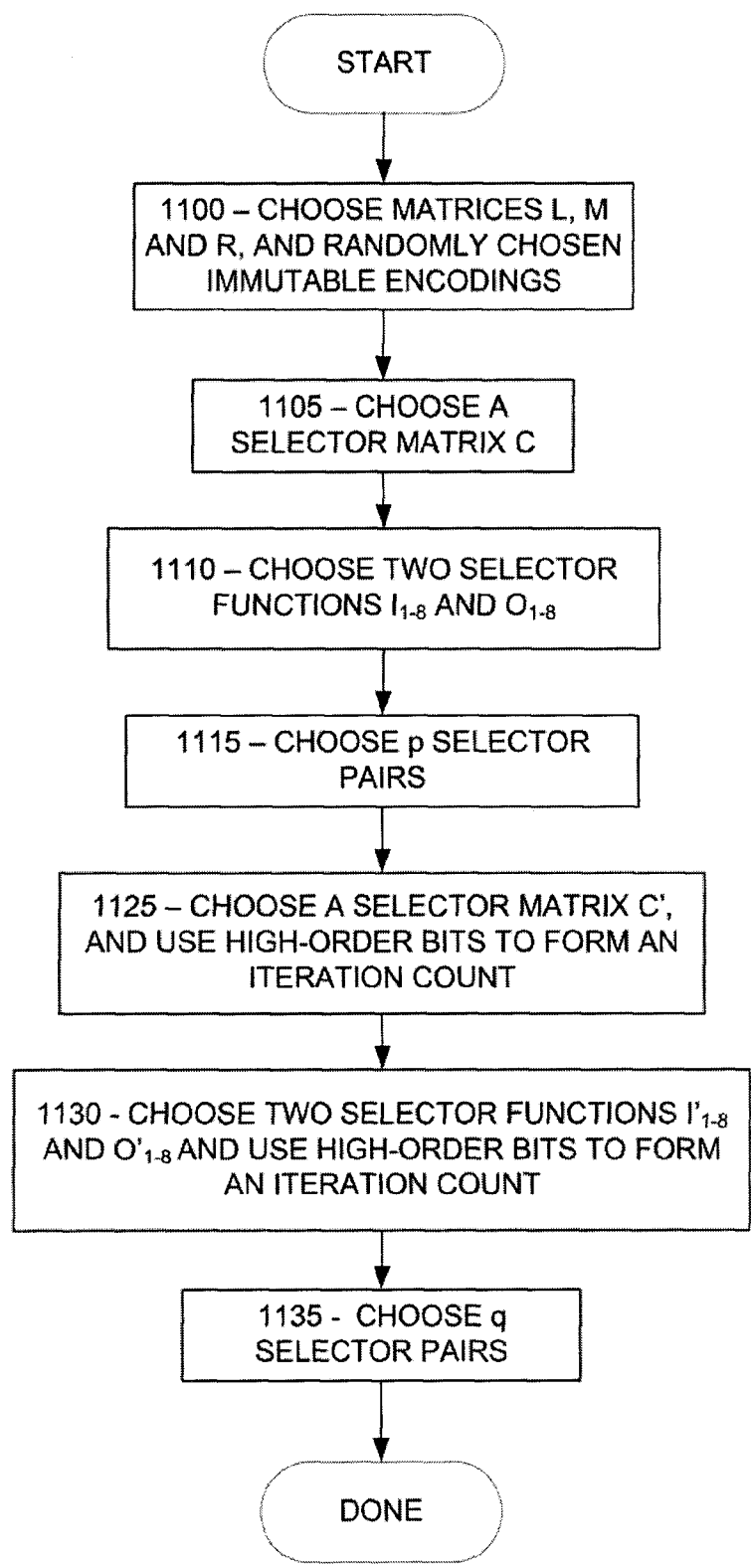
FIG. 11 shows a flow chart of method of creating $f_K$ segments, in accordance with the present invention.

By replacing conditional swaps with 2×2 bijective matrices mixing each input into each output, we can take precisely the same network topology and produce a mixing network which mixes every input of a base function with every other initially, and we can employ another such network finally to mix every output of the base function with every other. As noted above the mixing is not entirely even, and its bias can be reduced with conditional swaps replaced by mixing steps. A segment's input and output vectors also may be subdivided, for example as described in further detail in Sections 6.2.3-6.2.7 of the Appendix, and as illustrated in FIG. 11.

Data-Flow Duplication

Some embodiments may include data flow duplication techniques. For example, as described below, for every instruction which is not a JUMP . . . , ENTER, or EXIT, the instruction may copied so that an original instruction is immediately followed by its copy, and new registers may be chosen for all of the copied instructions such that, if x and y are instructions, with y being the copy of x, 1) if x inputs the output of an ENTER instruction, then the corresponding y input uses the same output;

2) if x inputs the output of an original instruction u with copy v, then the corresponding input of y inputs from the v output corresponding to the u output from which x inputs; and 3) if x outputs to an EXIT instruction, then the corresponding output of y outputs to a a special unused sink node indicating that its output is discarded.

Thus, all of the computations except for the branches have an original and a copy occurrence.

To accomplish this transformation, we proceed as follows.

We add a new instruction JUMPA ('jump arbitrarily'), which is an unconditional branch with two destinations in control-flow graph (cfg) form, just like a conditional branch, but with no input: instead, JUMPA chooses between its two destinations at random. JUMPA is not actually part of the VM instruction set, and no JUMPA will occur in the final obfuscated implementation of $f_K$ or $f_K^{-1}$.

We use JUMPA in the following transformation procedure:

1) If the implementation is not in SMA (static multi-assignment) form already, convert it to SMA form;

2) For each of BB $X_i$ of the BB's in the implementation $X_1, \ldots, X_k$, replace it with three BBs $C_i, X_i, X'_i$ by creating a new BB $X'_i$ which is identical to $X_i$, and adding a new BB $C_i$ which contains only a single JUMPA instruction targeting both $X_i$ and $X'_i$, making $X_i$ and $X'_i$ the two targets of $C_i$'s JUMPA, and making every non-JUMPA branch-target pointing to $X_i$ point to $C_i$ instead.

3) Convert the implementation to SSA form (static single assignment), isolating the local data-flow in each $X_i$ and $X'_i$, although corresponding instructions in $X_i$ and $X'_i$ still compute identical values.

4) Merge all of the code in each $X'_i$ back into its $X_i$, alternating instructions from $X_i$ and $X'_i$ in the merge so that corresponding pairs of instructions are successive: first the $X_i$ instruction, and then the corresponding $X'_i$ instruction.

5) Make each branch-target which is a $C_i$ point to the corresponding $X_i$ instead, and remove all of the $C_i$ and $X'_i$ BBs. At this point, the data-flow has been duplicated, the original shape of the CFG has been restored, and the implementation is free of JUMPA instructions. Remember which instructions correspond in each $X_i$ for future use.

Figure 9:
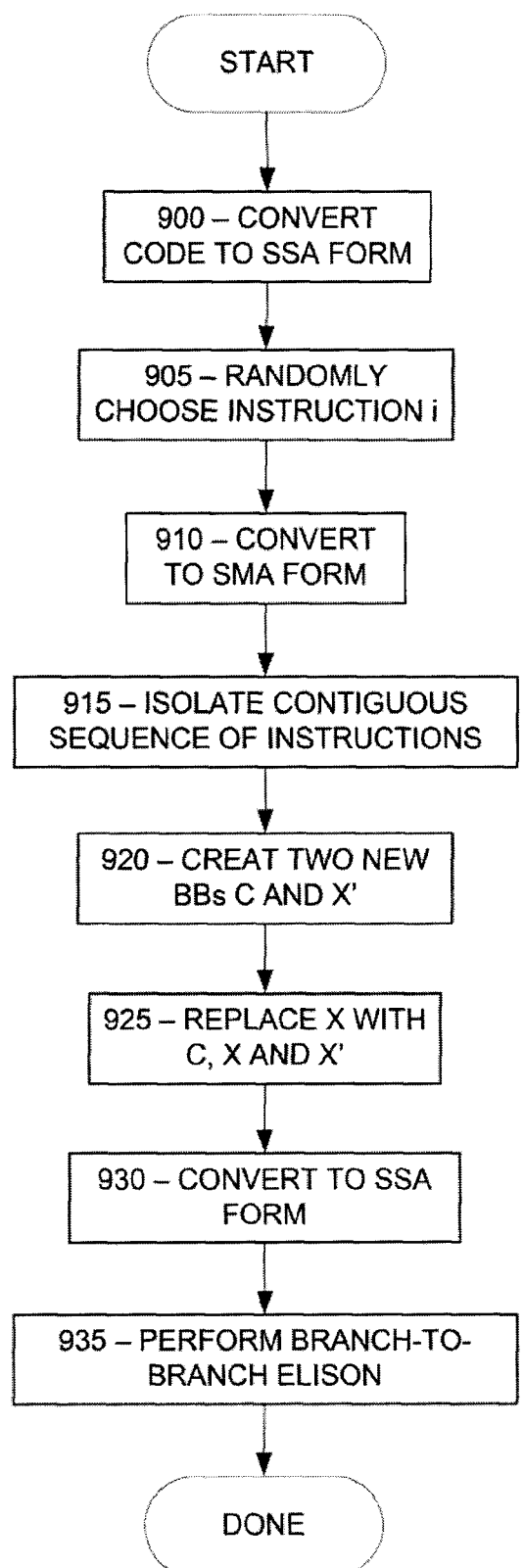
FIG. 9 shows a flow chart of method of performing control-flow duplication, in accordance with the present invention.

Further details regarding control flow duplication are provided in Section 5.2.6 of the Appendix, and described with respect to FIG. 9, which shows an example process for control flow duplication according to embodiments disclosed herein.

Fractures and Fracture Functions

Generally when an encoded output is produced, it is consumed with exactly the same encoding assumed, so that an encoded operation $z=f(x, y)$ becomes $z'=f'(x', y')$ where $(x', y', z')=(e_x(x), e_y(y), e_z(z))$, for encodings $e_x, e_y, e_z$, and where $f'=e_z \circ f \circ [e_x^{-1}, e_y^{-1}]$.

In some embodiments, it may be advantageous to output a value with one encoding, and subsequently input assuming some other encoding. If x is output as as $e_1(x)$, and later consumed assuming encoding $e_2$, in effect we have applied $e_2^{-1} \circ e_1$ to the unencoded value. Such an intentional mismatch between the encoding in which a value is produced and the encoding assumed when it is consumed is referred to herein as a "fracture." If the encodings are linear, so is the fracture function $e_2^{-1} \circ e_1$, and if they are permutation polynomials, so is the fracture function $e_2^{-1} \circ e_1$.

In some embodiments, fractures may be useful in obfuscation because the computation which they perform effectively does not appear in the encoded code—the amount and form of code to perform a normal networked encoding and one which adds an operation by means of a fracture is identical, and there appears to be no obvious way to disambiguate these cases, since encodings themselves tend to be somewhat ambiguous.

Note that the defining property of a fracture is the fracture function, for example $v^{-1} \circ u$. Generally, there are many different choices of consuming encoding v and producing encoding u which produce exactly the same fracture function. It is quite possible, for example, to have $u_1, \ldots, u_k, v_1, \ldots, v_k$ such that $v_i^{-1} \circ u_i$ is the same fracture function for $i=1, \ldots, k$. Thus, specifying the fracture function does not necessarily specify the producing and consuming encodings which imply it.

Data Scrambling via Mass Data Encoding

Mass Data Encoding (MDE) is described in U.S. Pat. No. 7,350,085, the contents of which are incorporated herein by reference. In short, MDE scrambles memory locations in a hash-like fashion, dynamically recoding memory cells on each store and dynamically recoding and relocating memory cells by background processing. By mismatching fetch and store recodings, a fetch or store can perform an add or multiply while continuing to look like a simple fetch or store. This makes it hard for an attacker to disambiguate between mere obfuscation and useful work.

Figure 17:
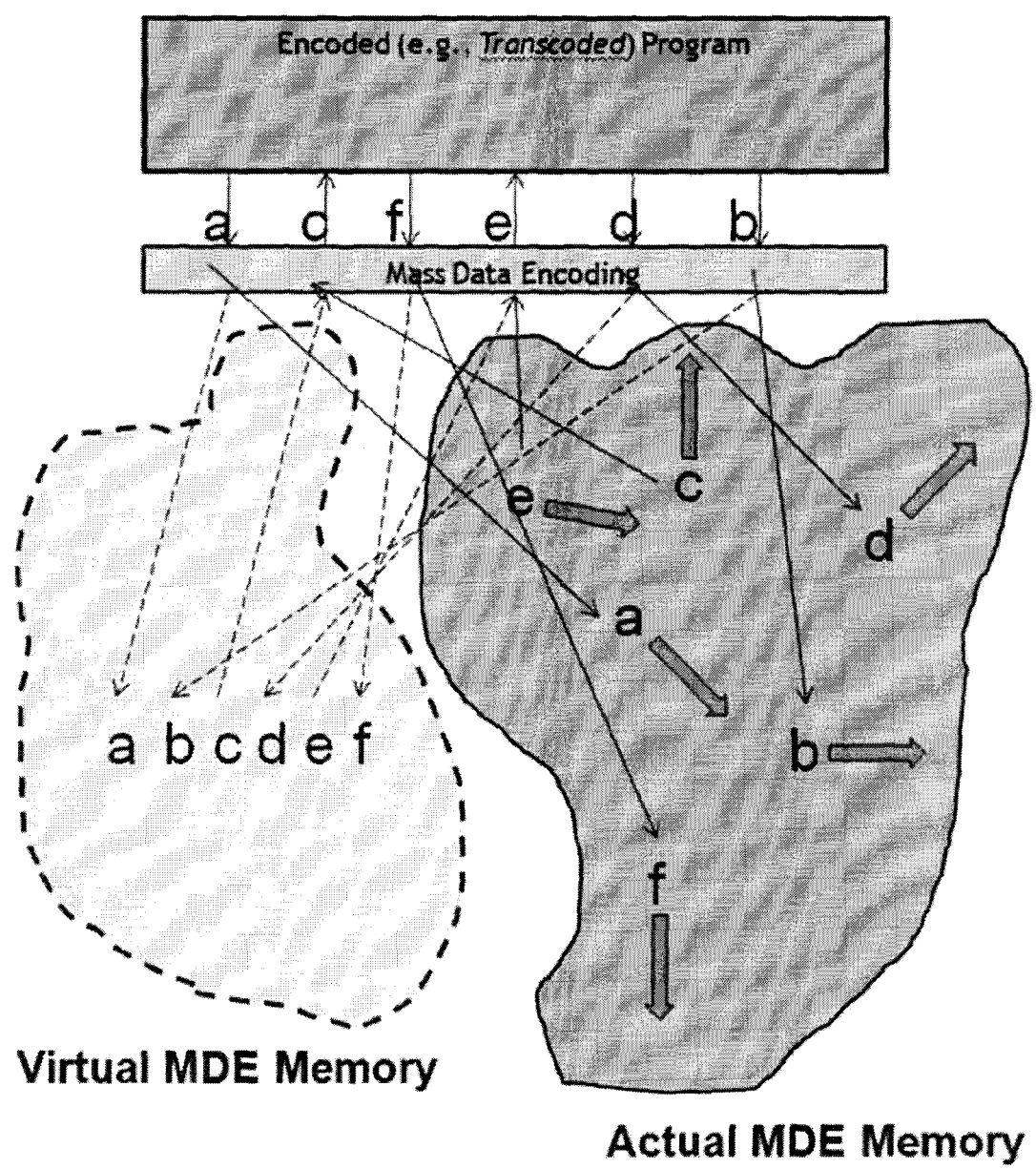
FIG. 17 shows a graphical representation of mass data encoding in an implementation of the invention.

MDE is compiled, not just interpreted, so supporting data structures are partially implicit and hence, well-obscured. Actual addresses are always scrambled and rescrambled by background activity. As shown in FIG. 17, the code accessing the Virtual MDE memory is initially written as if it were accessing an ordinary piece of memory. The code is then modified by the methods described in U.S. Pat. No. 7,350,085 to employ a mapping technique which encodes both the data and locations in the memory. Thus, the locations accessed move around over time, and the encodings applied to the data likewise change over time, under the feet of the running code. This technique of protection has substantial overhead, but its highly dynamic nature makes it arduous for an attacker to penetrate the meaning of software which uses it. Cells are recoded when stored, and are recoded periodically by background activity. Mismatching recode on store and corresponding recode on fetch can do a covert add or multiply (key-controllable). Fetched items are recoded, but not to smooth (i.e., not to unencoded). Stored items are not smooth prior to store, and are recoded on store to a dynamically chosen new cell encoding. Stored data are meaningless without the code which accesses them. One program can have any number of distinct, nonoverlapping MDE memories. An MDE memory can be moved as a block from one place to another or can be transmitted from one program to another via a transmission medium. That is, messages of sufficient bulk can be transmitted in MDE-memory form.

The initial state of the memory is not produced by hacker-visible activity, and hence conceals how its contents were derived. That is, the initial state is especially obscure.

Control Confusion via Control Flow

Control Flow Encoding (CFE) is described in U.S. Pat. No. 6,779,114, the contents of which are incorporated herein by reference. CFE combines code-fragments into multifunction lumps with functionality controlled by register-switching: many-to-many mapping of functionality to code locations; execution highly unrepeatable if external entropy available: the same original code turns into many alternative executions in CFE code. By modifying the register-switching and dispatch code, key information can control what is executed and therefore control the computation performed by embodiments of the invention.

Figures 18, 19:
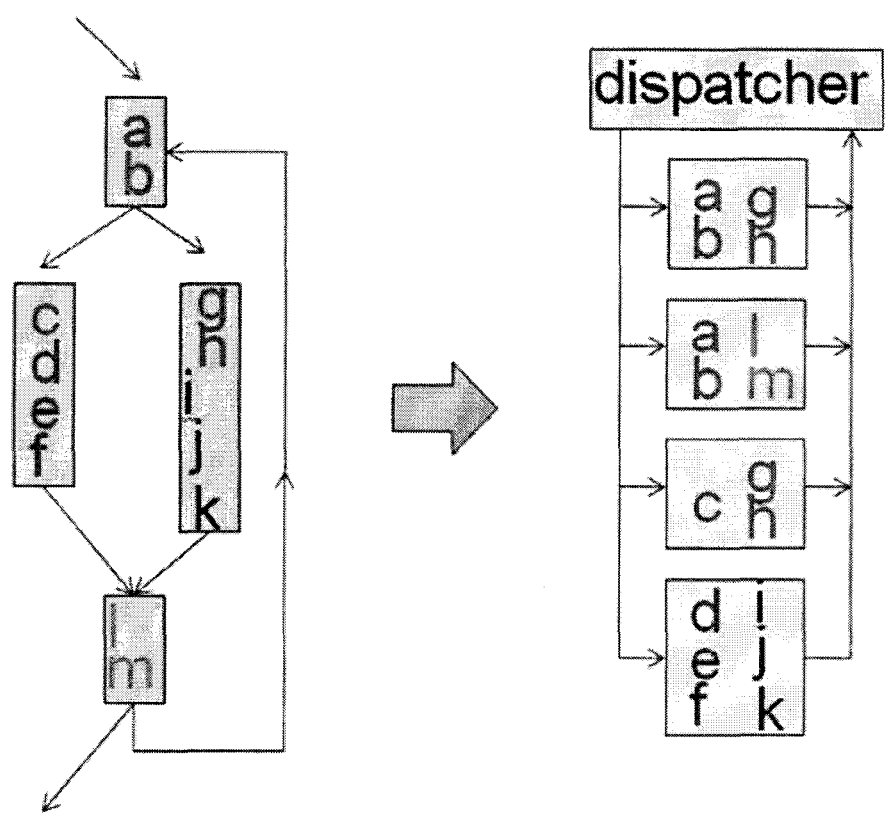
FIGS. 18 and 19 show graphical representations of control flow encoding in an implementation of the invention.

Code represented by the control-flow graph of FIG. 18, where the letters denote code fragments, can be encoded as shown in FIG. 19. The protected control-flow encoding shows lumps created by combining pieces, executed under the control of the dispatcher, with the 'active' piece(s) selected by register switching.

CFE is compiled, not just interpreted, so supporting data structures are partially implicit, and hence, well-obscured. Lumps combine multiple pieces; that is, they have multiple possible functionalities. When a lump is executed, which piece(s) is/are active is determined by which operate via registers pointing to real data, not dummy data. The same piece may occur in multiple lumps, with different data-encodings: mapping from functionalities to code-locations is many-to-many.

The dispatcher can be arranged to select pieces which embody a background process, making it hard to distinguish background and foreground activity. Available entropy is used to determine which alternative way of executing a sequence of pieces is employed, providing dynamic execution diversity (nonrepeating execution). As well, key information can be used to influence dispatch and hence vary the represented algorithm.

Dynamic Data Mangling

Figure 20:
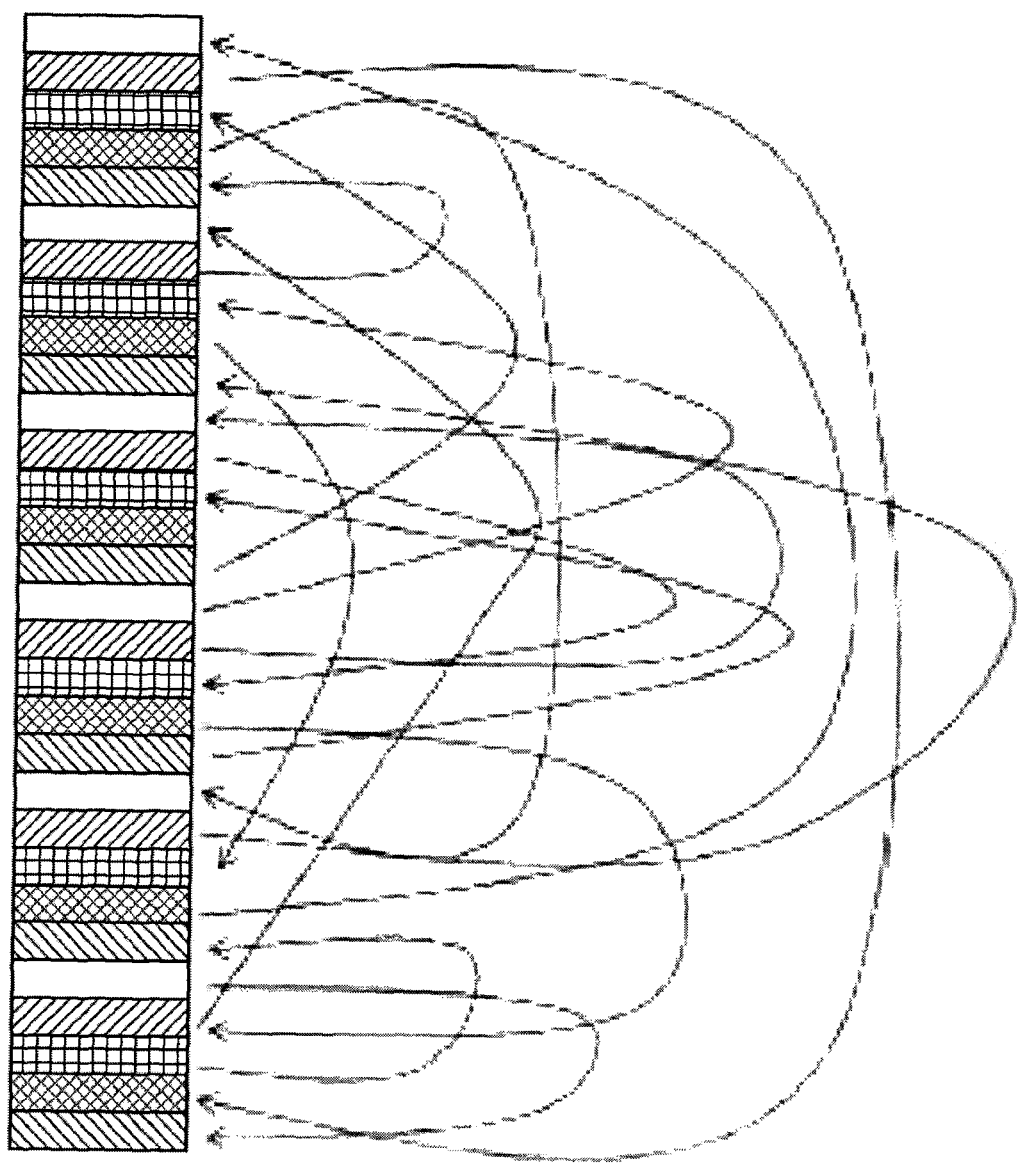
FIG. 20 shows a graphical representation of dynamic data mangling in an implementation of the invention.

As shown in FIG. 20 re-use of M-registers may be maximized, allocating separate M-registers only where required, using Chaitin's graph-coloring allocation algorithm. As a result, M-registers are re-used frequently, making data-flow harder for attackers to follow.

To do so, first a modulus M, a permutation polynomial p over the mod-M ring, an input-based 1×n vector mapping matrix A yielding z from the inputs, and a series of constant $c_i = p(z+i)$ for $1 \le i \le M$, may be selected, where the $c_i$ values are distinct since p is a mod-M perm-polynomial. Locations $c_1, \ldots, c_n$ (with $n \le M$) are treated in an array X of size M as 'M-registers'.

During computation, data may be moved randomly into and out of M-registers, and from M-register to M-register, changing encoding at each move. Some embodiments also may randomly cause either the encodings to form an unbroken sequence, or may inject fractures as disclosed herein where encodings do not match.

Given a fracture with data in encoding e1, the input is assumed to be in encoding e2, thus computing the fracture function e3=e2−1∘e1. If e1, e2 are linear, so is e3. If e1, e2 are permutation polynomials, so is e3. The code has identical form whether a fracture is present or not; i.e., it is ambiguous whether or not a fracture is present. Thus, as previously described, fractures may provide a means of injecting hidden computations such that the code looks much the same before and after it is added.

Additional details and mathematical treatment of the use of dynamic data mangling is provided in Section 7.8.14 of the Appendix.

Cross-Linking and Cross-Trapping

Figure 21:
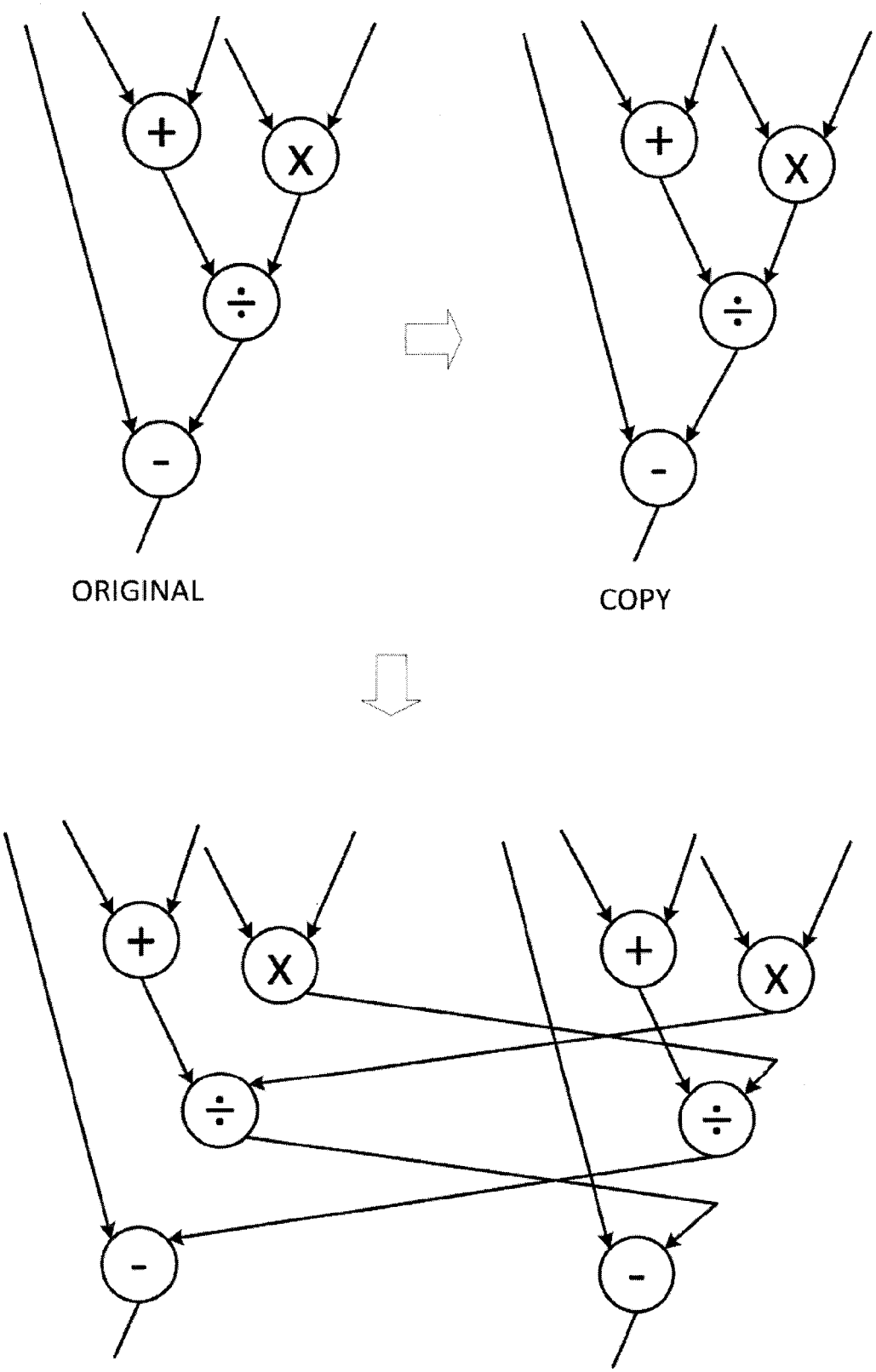
FIG. 21 shows a graphical representation of cross-linking and cross-trapping in an implementation of the invention.

The generous application of cross-linking and cross-trapping can provide aggressive chaotic response to tampering and perturbation attacks, with much stronger transcoding and massive static analysis resistance. In an embodiment, cross-linking and cross-trapping may be effected as follows, as illustrated in FIG. 21:

1) copy computations at least once;
2) randomly swap connections between the original and the copy. Because they are duplicates, the results will not change;
3) encode all of the resulting computations so that duplicates are independently encoded;
4) randomly take duplicate results and inject computations adding their difference (=0) or multiplying one by the ring inverse of the other (=1) and then adding the 0 or multiplying by the 1 (in encoded form). The injected encoded 0-adds and 1-multiplies have no functional effect unless tampering occurs, in which case the code behaves chaotically.

An added benefit is that the static dependency graph becomes much denser than that for the original program, making static analysis attacks difficult. Thus, effective tampering requires that the (differently encoded) duplicates be correctly identified and the correct duplicates be changed in effectively the same way under different encodings. This is much harder to accomplish than ordinary tampering without cross-linking and cross-trapping.

Figure 10:
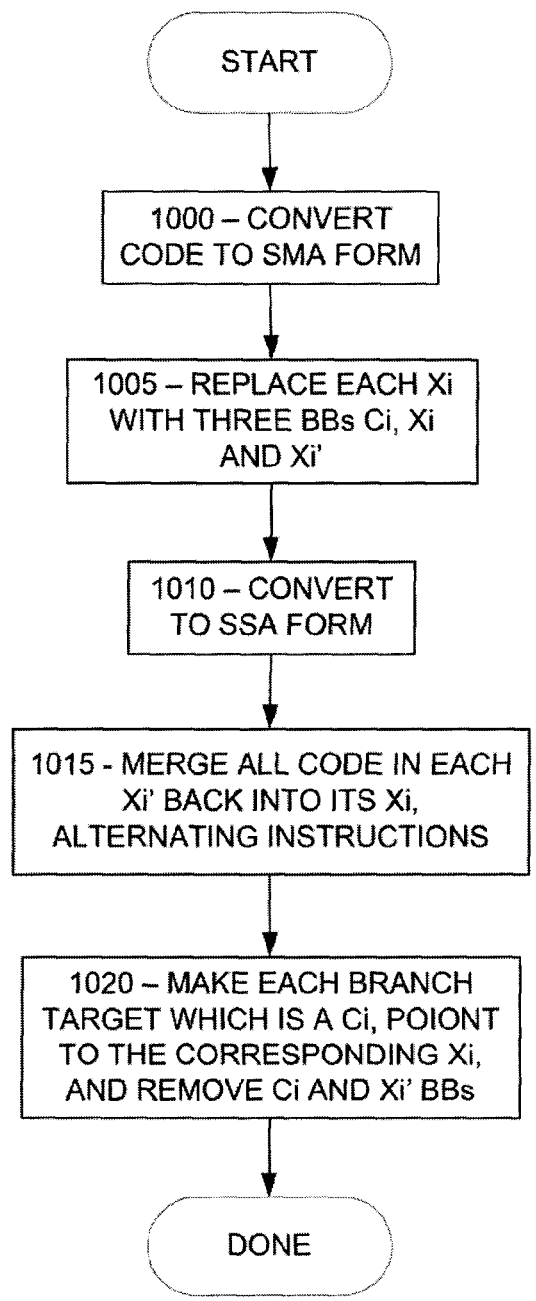
FIG. 10 shows a flow chart of method of performing data-flow duplication, in accordance with the present invention.

An example implementation of data-flow duplication is provided in Section 5.2.8-5.2.10 of the Appendix, and illustrated in FIG. 10. In addition to its normal use within the entry and exit base-functions, data flow duplication and cross-checking or trapping also may be performed using these transformations for the data-flow within the decision-block including the transfer of information from the outputs of the entry base-function to inputs of the decision-block and the transfer of information from the outputs of the decision-block to the inputs of the exit base-function.

Context-Dependent Coding

In some embodiments, the context in which base function pairs are implemented may be an integral part of the operation of the base-function. Context includes information from the application, hardware, and/or communication. Context of one base-function component can also include information from other components, which are part of the application in which it resides.

Figure 22:
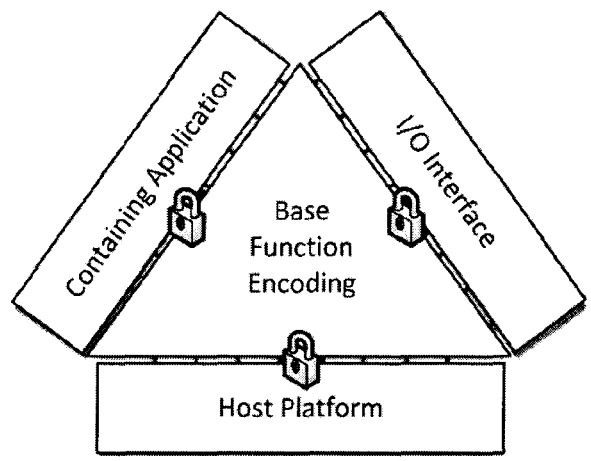
FIG. 22 shows a graphical representation of context dependent coding in an implementation of the invention.

Referring to FIG. 22, an implementation of a base-function pair or a similar construct may be hosted on a platform from which hardware or other platform signature constants can be derived and on which the implementation can be made to depend. It may be preferred for the implementation to reside in a containing application from which an application signature or other application constants can be derived and on which the implementation can be made to depend.

The implementation may also take inputs from which further constant signature information can be derived and on which the implementation can be made to depend.

Biased Permutations via Sorting Networks

Permutations may provide a basis for storing enormous numbers of alternatives in limited space. For example, row/column permutations may be used to turn a non-repeating 4×4 matrix into 576 non-repeating 4×4 matrices. In some embodiments, the order of computations may be permuted, deep dependence of computations on run-time data may be generated, and the like.

Figure 7:
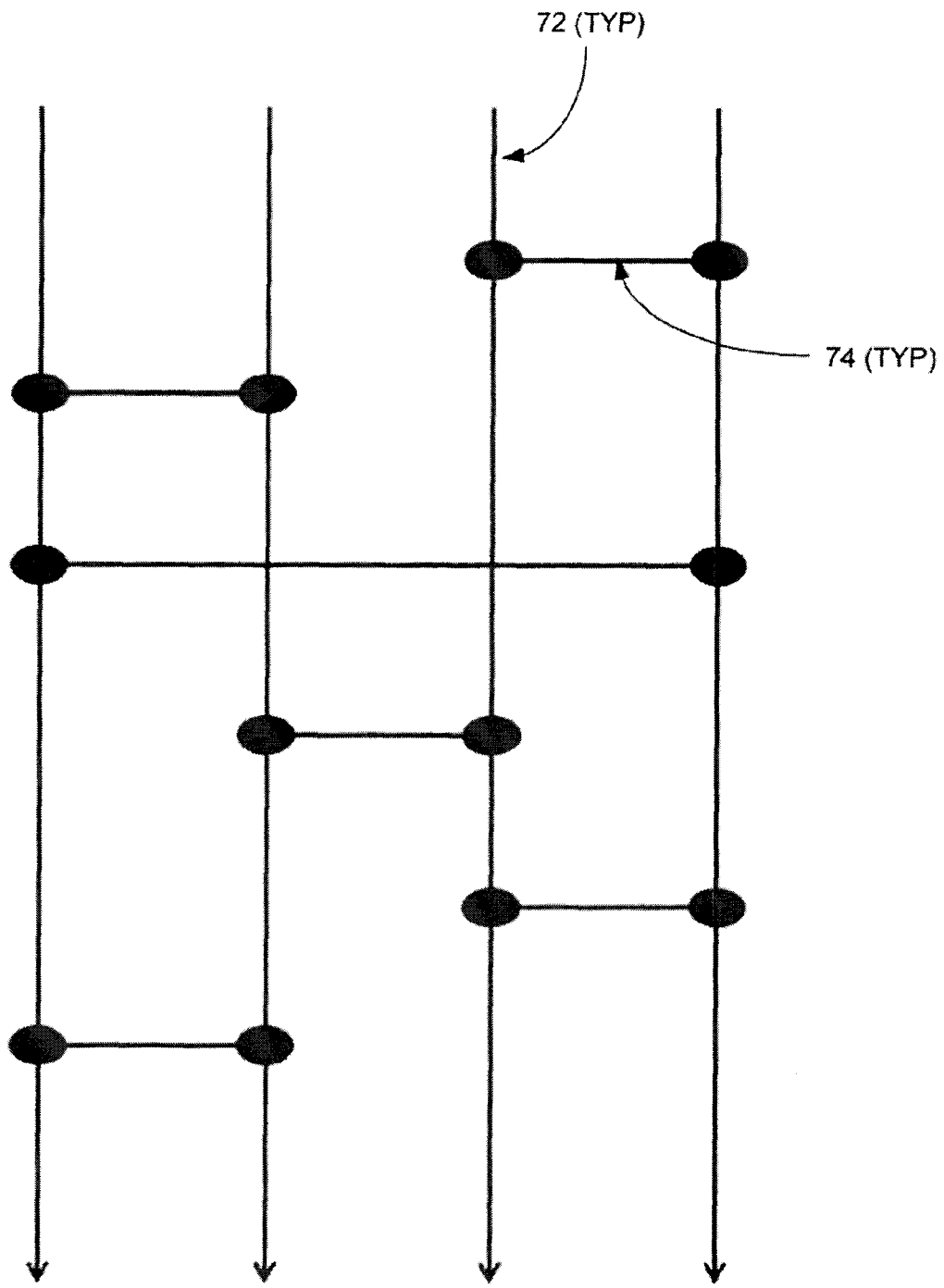
FIG. 7 shows a graphical representation of a sorting network, in accordance with the present invention.

Referring to FIG. 7, some embodiments may first sort, at each cross-link, compare, and swap on greater-than. To permute, swaps are performed with probability ½. It is easy to show that if the network sorts correctly with a compare-swap, then it permutes with random swap with the full range of permutations as possible outputs. Some embodiments may use a recommended probability ½ Boolean generator to compare two text-based full-range permutation polynomial encoded values.

Such sorting networks permute in a biased fashion, that is, some permutations are more probable than others, since the number of swap configurations is $2^{number\ of\ stages}$. However, the permutation count is equal to the number of elements to permute, which does not evenly divide the number of swap-configurations. In spite of the biased output, the advantage is simplicity and high dependency count with non-T functionality.

Unbiased Permutations via Simple Selection

In some embodiments, unbiased permutations can also be generated by selecting a $1^{st}$ element at random by taking the $r_1$ mod n element among the elements (zero origin), selecting $2^{nd}$ element at random by taking the $r_2$ mod (n−1) element at random from the remaining elements, and the like. With this process each $r_i$ is a full range text-based perm-poly value. This may provide almost perfectly bias-free and non-T-function. However, operations may be harder to hide in or interleave with ordinary code than for sorting-network-based permutation.

Hobbling Bit-Slice Analysis

As explained above, bit-slice attacks are a common attack tool: repeatedly executing a function and ignoring all but the lowest-order bit, and then the lowest-order two bits, the three lowest-order bits, etc. This allows the attacker to gain information until the full word size (say 32 bits) is reached, at which point complete information has been obtained on how the function behaves.

A function constructed using T-function and non-T-function components has subdomains over which it is a T-function embedded in an entire domain in which the function is not. In some embodiment it may be advantageous to make the number of such subdomains very large (for example, in a Mark III type system as described herein, there may be over $10^{40}$ such subdomains) to make bucketing attacks on the subdomains highly resource-intensive. In some embodiments, liberal use also may be made of non-T-function computations at other points, such as at decision points, in permutations, in recodings, and the like.

An Example General Data Blending Mechanism

Figure 24:
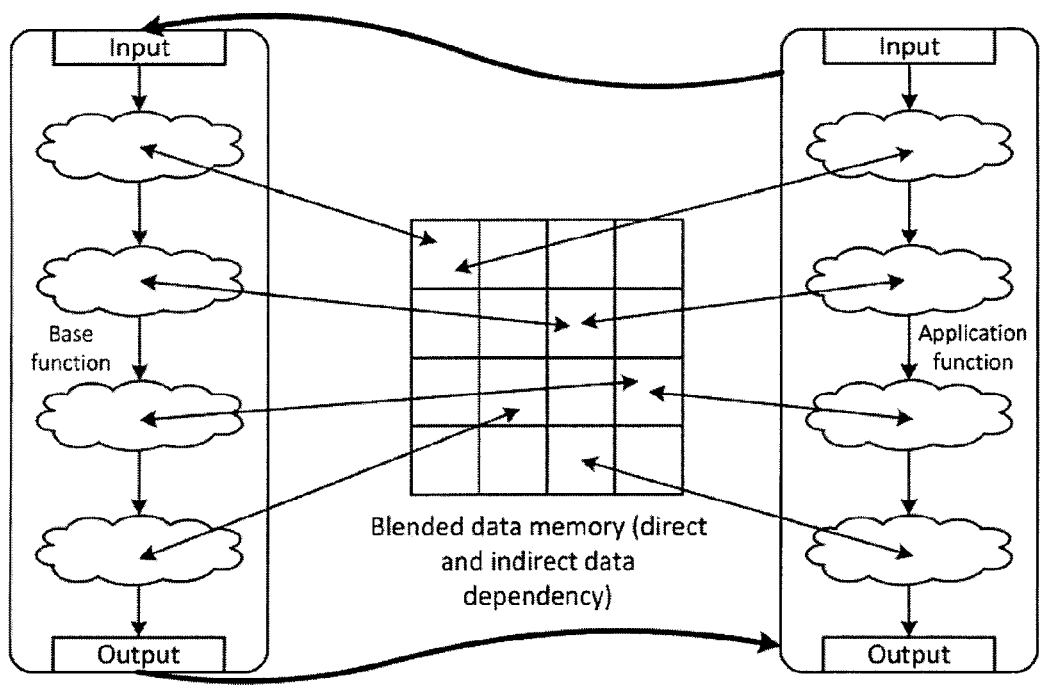
FIG. 24 shows a graphical representation of a typical usage of Mass Data Encoding or Dynamic Data Mangling in an implementation of the invention.

FIG. 24 shows a graphical representation of a typical usage of Mass Data Encoding or Dynamic Data Mangling as described above. If inputs to a base function are provided by such an obscured memory array, by either of these two techniques, and the results are also obtained by the application from the obscured memory array, it becomes difficult for an attacker to analyse the data-flow of information entering or leaving the base function, making attacks on the base function more arduous.

Security-Refresh Rate

For effective application security lifecycle management, applications typically must be capable of resisting attacks on an ongoing basis. As part of this resistance, such applications may be configured to self-upgrade in response to security-refresh messages containing security renewal information. Such upgrades may involve patch files, table replacements, new cryptographic keys, and other security-related information.

A viable level of security is one in which application security is refreshed frequently enough so that the time taken to compromise an instance's security is longer than the time to the security-refresh which invalidates the compromise; i.e., instances are refreshed faster than they can typically be broken. This is certainly achievable at very high security-refresh rates. However, such frequent refresh actions consume bandwidth, and as we raise the refresh rate, the proportion of bandwidth allocated to security-refresh messages increases, and available non-security payload bandwidth decreases.

Plainly, then, engineering the appropriate security-refresh rate is required for each kind of application, since the tolerable overheads vary greatly depending on context. For example, if we expect only gray-box attacks (neighbor side-channel attacks) in a cloud application, we would use a lower refresh rate than if we expected white-box attacks (insider attacks by malicious cloud-provider staff).

Authentication of Equality with Chaotic Failure

Suppose we have an application in which authentication is password-like: authentication succeeds where G, the supplied value, matches a reference value Γ; i.e., when G=Γ. Further suppose that we care about what happens when G=Γ, but if not, we only insist that whatever the authentication authorized is no longer feasible. That is, we succeed when G=Γ, but if G≠Γ, further computation may simply fail.

The authenticating equality is not affected by applying any non-lossy function to both sides: for any bijection φ, we can equivalently test whether φ(φ)=φ(Γ). The authenticating equality may remain valid with high probability even if φ is lossy, if φ is carefully chosen so that the probability that φ(G)=φ(Γ) when G≠Γ is sufficiently low (as it is in Unix password authentication, for example). Based on technology previously described herein, we can easily perform such a test. We previously described a method for foiling tampering by duplicating data-flow, randomly cross connecting the data-flow between duplicate instances, and performing encoded checking to ensure that the equalities have not been compromised. We can adapt this approach to test whether G=Γ, or in encoded form, whether φ(G)=φ(Γ).

We note that a data-flow yielding φ(G) already duplicates a dataflow yielding φ(Γ)along the success path where G=Γ. We therefore omit, for this comparison, the data-flow duplication step. Then we simply cross-connect as described above and insert checks. By using these computations as coefficients for future encoded computations, we ensure that, if φ(G)=φ(Γ), all will proceed normally, but if φ(G)≠φ(Γ), while further computation will proceed, the results will be chaotic and its functionality will fail. Moreover, since φ is a function, if φ(G)≠φ(Γ), we can be sure that G≠Γ.

Variable-Dependent Coding

In some embodiments that incorporate operations which make use of one or more variables which need not have a specific value during their use in the operation, variable-dependent coding may be used to further obscure the operation of related code. One way of doing so is to use values that are used or generated by other operations in nearby or related sections of code. Thus, such values may be used repeatedly for different purposes within a region of code, which may make it more difficult for an attacker to discern any individual use, or to extract information about the specific operations being performed in relation to those values. For example, if a value x is encoded as aX+b, there may be a great deal of leeway in the specific values used for the constants a and b. In this example, if there are values available within the executing code that remain constant over the life of x, they may be used as one or more of the constants a and/or b.

Further, for a single defined operation, different values may be used during each execution of the operation, such that the specific values used may change each time the operation is executed. This may act as an additional barrier to a potential attacker, who may not be able to track values from one execution to another as might be expected for other types of clear, encrypted, or obfuscated code. Continuing the example above, a first operation ƒ(Y) may return values a and b and a second operation g(Z) may return values c and d, each of which is stored in memory for a period of time. The variable x may be encoded during the time that a and b are stored in memory as aX+b, and as cX+d during the time that c and d are stored in memory. Thus, the appropriate constants will be available via the memory to allow for decoding or otherwise manipulating x in the appropriate encoding. The values may be overwritten or discarded after that time, since the encoding constants need only be available during the time that x is used by operations within the executing program.

Similarly, variable values generated during execution of code may be used for other purposes in addition to or as an alternative to the finite encoding example provided. For example, variable values may be used to select a random item from a list or index, as a seed for a pseudo-random number generator, as an additive, multiplicative, or other scaling factor, or the like. More generally, variable values generated by one portion of executed code may be used in any place where a constant value is needed at another portion of executed code, for a duration not more than the generated variable values are expected to be available.

Example Advantages

Embodiments of the invention described herein may be used to provide the following, where a "sufficient period of time" may be selected based on, or otherwise determined by, the needs of security lifecycle management:

1) Black-Box Security: security as a keyed black-box cipher against attacks up to adaptive known plaintext for a sufficient period of time;
2) Secure Boundary: securely pass information in and out to/from surrounding code in encoded form for a sufficient period of time;
3) Key-Hiding: prevent key-extraction from implementations for a sufficient period of time;
4) Secure Weakest-Path: cryptographically secure even on weakest data path for a sufficient period of time;
5) Anti-Partitioning: partition implementation into its construction blocks for a sufficient period of time;
6) Application-Locking: cannot extract implementation from its containing application for a sufficient period of time; and
7) Node-Locking: cannot extract implementation from its host platform for a sufficient period of time.

Generally, embodiments disclosed herein relate to base-function encoding, using various techniques and systems as disclosed. Specific embodiments also may be referred to herein, such as in the Appendix, as "ClearBox" implementations.

The various techniques as disclosed herein may use operations that are similar in nature to those used in an application that is being protected by the disclosed techniques, as previously described. That is, the protection techniques such as base functions, fractures, dynamic data mangling, cross-linking, and variable dependent coding may use operations that are similar to those used by the original application code, such that it may be difficult or impossible for a potential attacker to distinguish between the original application code and the protective measures disclosed herein. As a specific example, base functions may be constructed using operations that are the same as, or computationally similar to, the operations performed by the original application code with which the base functions are integrated, in contrast to the distinctive functions typically employed by, for example, known encryption techniques. Such operations and techniques that are difficult or impossible to distinguish may be described herein as "computationally similar."

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

Figure 32:
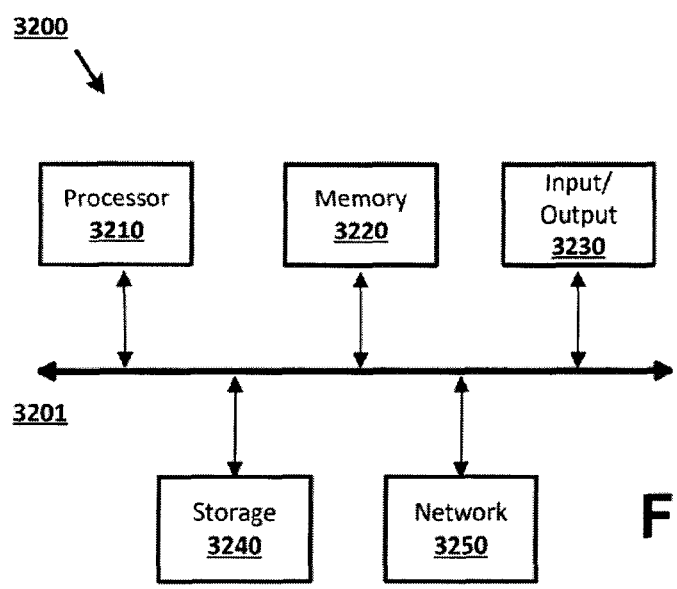

Embodiments disclosed herein may be implemented in and used with a variety of computer systems and architectures. FIG. 32 is an example computer system 3200 suitable for implementing embodiments disclosed herein. The computer 3200 may include a communication bus 3201 which interconnects major components of the system, such as a central processor 3210; a fixed storage 3240, such as a hard drive, flash storage, SAN device, or the like; a memory 3220; an input/output module 3230, such as a display screen connected via a display adapter, and/or one or more controllers and associated user input devices such as a keyboard, mouse, and the like; and a network interface 3250, such as an Ethernet or similar interface to allow communication with one or more other computer systems.

As will be readily understood by one of skill in the art, the bus 3201 allows data communication between the central processor 3210 other components. Applications resident with the computer 3200 generally may be stored on and accessed via a computer readable medium, such as the storage 3240 or other local or remote storage device. Generally, each module shown may be integral with the computer or may be separate and accessed through other interfaces. For example, the storage 3240 may be local storage such as a hard drive, or remote storage such as a network-attached storage device.

Many other devices or components may be connected in a similar manner. Conversely, all of the components shown need not be present to practice embodiments disclosed herein. The components can be interconnected in different ways from that shown. The operation of a computer such as that shown is readily known in the art and is not discussed in detail in this application. Code to implement embodiments of the present disclosure may be stored in a computer-readable storage medium such as one or more of the memory 3220, the storage 3240, or combinations thereof.

More generally, various embodiments disclosed herein may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium. When such computer program code is loaded into and executed by a computer, the computer may become an apparatus for practicing embodiments disclosed herein. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments disclosed herein. When implemented on a general-purpose processor, the computer program code may configure the processor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware.

In some embodiments, the various features and functions disclosed herein may be implemented by one or more modules within a computer system, and/or within software executed by the computer system. For example, a computer system according to some embodiments disclosed herein may include one or more modules configured to receive existing computer executable code, to modify the code as disclosed herein, and to output the modified code. Each module may include one or more sub-modules, such as where a module configured to modify existing computer executable code includes one or more modules to generate base functions, blend the base functions with the code, and output the blended code. Similarly, other modules may be used to implement other functions disclosed herein. Each module may be configured to perform a single function, or a module may perform multiple functions. Similarly, each function may be implemented by one or more modules operating individually or in coordination.

One or more currently preferred embodiments have been described by way of example. It will be apparent to persons skilled in the art that a number of variations and modifications can be made without departing from the scope of the invention as defined in the claims.

1. Introduction

This document addresses the problem of creating pairs of programmatic implementations, F, G, for pairs of bijective functions $f$, $f^{-1}$, respectively, such that (1) given white-box access to F and a value y, it is 'hard' to find x for which $y=f(x)$;

(2) given white-box access to G and a value x, it is 'hard' to find y for which $x=f^{-1}(y)$;

(3) given white-box access to F, it is 'hard' to find an implementation Q for $f^{-1}$; and (4) given white-box access to G, it is 'hard' to find an implementation P for $f$.

We note that information K sufficient to readily determine $f$, $f^{-1}$ can be regarded as a key for a symmetric cipher, with F and G being encryption and decryption according to key K.

We have not specified what we mean by 'hard'. At a minimum, we want it to be significantly less effortful to choose K and generate such F, G than it is to solve any of problems (1)-(4) above.

TABLE 1

Notations

| Notation | Meaning |
|---|---|
| B | the set of bits = {0,1} |
| N | the set of natural numbers = {1, 2, 3, ...} |
| $N_0$ | the set of finite cardinal numbers = {0, 1, 2, ...} |
| Z | the set of integers = {..., −1, 0, 1, ...} |
| x :− y | x such that y |
| x ← y | set x to y |
| x iff y | x if and only if y |
| [A] | 1 if assertion A is true; 0 otherwise |
| x∥y | concatenation of tuples or vectors x and y |
| x ∧ y | logical or bitwise and of x and y |
| x ∨ y | logical or bitwise inclusive- or of x and y |
| x ⊕ y | logical or bitwise exclusive- or of x and y |
| ¬ x or $\bar{x}$ | logical or bitwise not of x |
| $x^{-1}$ | inverse of x |
| ⌈x⌉ | smallest integer k such that x ≤ k |
| ⌊x⌋ | largest integer k such that k ≤ x |
| f{S} | image of set S under MF f |
| f(x) = y | applying MF f to x yields y and only y |
| f(x) → y | applying MF f to x may yield y |
| f(x) ↛ y | applying MF f to x cannot yield y |
| f(x) = ⊥ | the result of applying MF f to x is undefined |
| $M^T$ | transpose of matrix M |
| \|S\| | cardinality of set S |
| \|V\| | length of tuple or vector V |
| \|n\| | absolute value of number n |
| $(x_1, \ldots, x_k)$ | k-tuple or k-vect or with elements $x_1, \ldots, x_k$ |
| $[m_1, \ldots, m_k]$ | k-aggregation of MFs $m_1, \ldots, m_k$ |
| $\langle m_1, \ldots, m_k \rangle$ | k-conglomeration of MFs $m_1, \ldots, m_k$ |
| $\{x_1, \ldots, x_k\}$ | set of $x_1, \ldots, x_k$ |
| {x\|C} | set of x such that C |
| {x ∈ S\|C} | set of members x of set S such that C |
| Δ(x,y) | Hamming distance (= number of changed element positions) from x to y |
| $S_1 \times \ldots \times S_k$ | Cartesian product of sets $S_1, \ldots, S_k$ |
| $m_1 \circ \ldots \circ m_k$ | composition of MFs $m_1, \ldots, m_k$ |
| x ∈ S | x is a member of set S |

TABLE 1-continued

Notations

| Notation | Meaning |
|---|---|
| $S \subseteq T$ | set S is contained in or equal to set T |
| $S \subsetneq T$ | set S is properly contained in set T |
| $\Sigma_{i=1}^{k} x_i$ | sum of $x_1, \ldots, x_k$ |
| GF(n) | Galois field (= finite field) with n elements |
| Z/(k) | finite ring of the integers modulo k |
| $id_S$ | identity function on set S |
| rand(n) | uniform random variate over $\{0, 1, \ldots, n-1\}$ |
| extract[a,b](x) | bit-field in positions a to b of bit-string x |
| extract[a,b](v) | (extract [a,b]($v_1$), ..., extract[a, b]($v_k$)), where $v = (v_1, \ldots, v_k)$ |
| interleave (u,v) | $(u_1\|v_1, \ldots, u_k\|v_k)$, where $u = (u_1, \ldots, u_k)$ and $v = (v_1, \ldots, v_k)$ |

TABLE 2

Abbreviations

| Abbreviation | Expansion |
|---|---|
| AES | Advanced Encryption Standard |
| agg | aggregation |
| API | application procedural interface |
| BA | Boolean-arithmetic |
| BB | basic block |
| CFG | control-flow graph |
| DES | Data Encryption Standard |
| DG | directed graph |
| dll | dynamically linked library |
| GF | Galois field (= finite field) |
| IA | intervening aggregation |
| iff | if and only if |
| MBA | mixed Boolean-arithmetic |
| MDS | maximum distance separable |
| MF | multi-function |
| OE | output extension |
| PE | partial evaluation |
| PLPB | point-wise linear partitioned bijection |
| RSA | Rivest-Shamir-Adleman |
| RNS | residual number system |
| RPE | reverse partial evaluation |
| TR | tamper resistance |
| SB | substitution box |
| SBE | software-based entity |
| so | shared object |
| VHDL | very high speed integrated circuit hardware description language |

2. Terminology and Notation

We write ":-" to denote "such that" and we write "iff" to denote "*if* and only *if*". Table 1 summarizes many of the notations, and Table 2 summarizes many of the abbreviations, employed herein.

2.1. Sets, Tuples, Relations, and Functions. For a set S, we write |S| to denote the cardinality of S (i.e., the number of members in set S). We also use |n| to denote the absolute value of a number n.

We write $\{m_1, m_2, \ldots, m_k\}$ to denote the set whose members are $m_1, m_2, \ldots, m_k$. (Hence if $m_1, m_2, \ldots, m_k$ are all distinct, $|\{m_1, m_2, \ldots, m_k\}|=k$). We also write $\{x|C\}$ to denote the set of all entities of the form x such that the condition C holds, where C is normally a condition depending on x.

2.1.1. Cartesian Products, Tuples, and Vectors. Where A and B are sets, A×B is the Cartesian product of A and B; i.e., the set of all pairs (a, b) where a∈A (i.e., a is a member of A) and b∈B (i.e., b is a member of B). Thus we have (a, b)∈A×B. In general, for sets $S_1, S_2, \ldots, S_k$, a member of $S_1 \times S_2 \times \ldots \times S_k$ is a k-tuple of the form $(s_1, s_2, \ldots, s_k)$ where $s_i \in S_i$ for $i=1, 2, \ldots, k$. If $t=(s_1, \ldots, s_k)$ is a tuple, we write |t| to denote the length of t (in this case, |t|=k; i.e., the tuple has k element positions). For any x, we consider x to be the same as (x)—a tuple of length one whose sole element is x. If all of the elements of a tuple belong to the same set, we call it a vector over that set.

If u and v are two tuples, then u∥v is their concatenation: the tuple of length |u|+|v| obtained by creating a tuple containing the elements of u in order and then the elements of v in order: e.g., (a, b, c, d)∥(x, y, z)=(a, b, c, d, x, y, z).

We consider parentheses to be significant in Cartesian products: for sets A, B, C, members of (A×B)×C look like ((a, b), c) whereas members of A×(B×C) look like (a, (b, c)), where a∈A, b∈B, and c∈C. Similarly, members of A×(B× B)×C look like (a, ($b_1$, $b_2$), c) where a∈A, $b_1$, $b_2$∈B, and c∈C.

2.1.2. Relations, Multi-functions (MFs), and Functions. A k-ary relation on a Cartesian product $S_1 \times \ldots \times S_k$ of k sets (where we must have k≥2) is any set $R \subseteq S_1 \times \ldots \times S_k$. Usually, we will be interested in binary relations; i.e., relations R⊆A×B for two sets A, B (not necessarily distinct). For such a binary relation, we write a R b to indicate that (a, b)∈R. For example, where R is the set of real numbers, the binary relation <⊆R×R on pairs of real numbers is the set of all pairs of real numbers (x, y) such that x is smaller than y, and when we write x<y it means that (x, y)∈<.

The notation R:: A↦B indicates that R⊆A×B; i.e., that R is a binary relation on A×B. This notation is similar to that used for functions below. Its intent is to indicate that the binary relation is interpreted as a multi-function (MF), the relational abstraction of a computation—not necessarily deterministic—which takes an input from set A and returns an output in set B. In the case of a function, this computation must be deterministic, whereas in the case of an MF, the computation need not be deterministic, and so it is a better mathematical model for much software in which external events may effect the progress of execution within a given process. A is the domain of MF R, and B is the codomain of MF R. For any set X⊆A, we define R{X}={y∈B|∃x∈X:— (x, y)∈R}. R{X} is the image of X under R. For a MF R:: A↦B and a∈A, we write R(a)=b to mean R{{a}}={b}, we write R(a)→b to mean that b∈R{{a}}, we write R(a)↛b to mean that b∉R{{a}}, and we write R(a)=⊥ (read "R(a) is undefined" to mean that there is no b∈B:—(a, b)∈R.

For a binary relation R:: A↦B, we define $$R^{-1} = \{(b,a) | (a,b) \in R\}.$$

$R^{-1}$ is the inverse of R.

For binary relations R:: A↦B and S:: B↦C, we define S∘R:: A↦C by $$S \circ R = \{(a,c) | \exists b \in B: — a \ R \ b \text{ and } b \ S \ c\}.$$

S∘R is the composition of S with R. Composition of binary relations is associative; i.e., for binary relations, Q, R, S, (S∘R)∘Q=S∘(R∘Q). Hence for binary relations $R_1$, $R_2, \ldots, R_k$, we may freely write $R_k \circ \ldots \circ R_2 \circ R_1$ without parentheses because the expression has the same meaning no matter where we put them. Note that $$(R_k \circ \ldots \circ R_2 \circ R_1)\{X\} = R_k\{\ldots \{R_2\{R_1\{X\}\}\} \ldots \}$$

in which we first take the image of X under $R_1$, and then that image's image under $R_2$ and so on up to the penultimate image's image under $R_k$, which is the reason that the $R_i$'s in the composition on the left are written in the reverse order of the imaging operations, just like the $R_i$'s in the imaging expression on the right.

Where $R_i :: A_i \mapsto B_i$ for $i=1, \ldots, k$, $R=[R_1, \ldots, R_k]$ is that binary relation:—

$$R :: A_1 \times \ldots \times A_k \mapsto B_1 \times \ldots \times B_k$$

and $$R(x_1, \ldots, x_k) \to (y_1, \ldots, y_k) \text{ iff } R_i(x_i) \to y_i \text{ for } i=1, \ldots, k.$$

$[R_1, \ldots, R_k]$ is the aggregation of $R_1, \ldots, R_k$.

Where $R_i :: A_1 \times \ldots \times A_m \mapsto B_i$ for $i=1, \ldots, n$, $R = \langle R_1, \ldots, R_n \rangle$ is that binary relation:—

$$R :: A_1 \times \ldots \times A_m \mapsto B_1 \times \ldots \times B_n$$

and $$R(x_1, \ldots, x_m) \to (y_1, \ldots, y_n) \text{ iff } R_i(x_1, \ldots, x_m) \to y_i$$
for $i=1, \ldots, n$.

$\langle R_1, \ldots, R_k \rangle$ is the conglomeration of $R_1, \ldots, R_k$.

We write $f: A \mapsto B$ to indicate that $f$ is a function from $A$ to $B$; i.e., that $f :: A \mapsto B$:—for any $a \in A$ and $b \in B$, if $f(a) \to b$, then $f(a)=b$. For any set $S$, $id_S$ is the function for which $id_S(x)=x$ for every $x \in S$.

2.1.3. Directed Graphs, Control-Flow Graphs, and Dominators. A directed graph (DG) is an ordered pair $G=(N, A)$ where set $N$ is the node-set and binary relation $A \subseteq N \times N$ is the arc-relation or edge-relation. $(x, y) \in A$ is an arc or edge of $G$.

A path in a DG $G=(N, A)$ is a sequence of nodes $(n_1, \ldots, n_k)$ where $n_i \in N$ for $i=1, \ldots, k$ and $(n_i, n_{i+1}) \in A$ for $i=1, \ldots, k-1$. $k-1 \geq 0$ is the length of the path. The shortest possible path has the form $(n_1)$ with length zero. A path $(n_1, \ldots, n_k)$ is acyclic iff no node appears twice in it; i.e., iff there are no indices $i, j$ with $1 \leq i < j \leq k$ for which $n_i = n_j$. For a set $S$, we define $S^r = S \times \ldots \times S$ where $S$ appears $r$ times and $\times$ appears $r-1$ times (so that $S^1 = S$), and we define $S^+ = S^1 \cup S^2 \cup S^3 \cup \ldots$ —the infinite union of all Cartesian products for $S$ of all possible lengths. Then every path in $C$ is an element of $N^+$.

In a directed graph (DG) $G=(N, A)$, a node $y \in N$ is reachable from a node $x \in N$ if there is a path in $G$ which begins with $x$ and ends with $y$. (Hence every node is reachable from itself.) The reach of $x \in N$ is $\{y \in N | y \text{ is reachable from } x\}$. Two nodes $x, y$ are connected in $G$ iff one of the two following conditions hold recursively:
 (1) there is a path of $G$ in which both $x$ and $y$ appear, or
 (2) there is a node $z \in N$ in $G$ such that $x$ and $z$ are connected and $y$ and $z$ are connected.
(If $x=y$, then the singleton (i.e., length one) path $(x)$ is a path from $x$ to $y$, so every node $n \in N$ of $G$ is connected to itself.) A DG $G=(N, A)$ is a connected DG iff every pair of nodes $x, y \in N$ of $G$ is connected.

For every node $x \in N$, $|\{y | (x, y) \in A\}|$, the number of arcs in $A$ which start at $x$ and end at some other node, is the out-degree of node $x$, and for every node $y \in N$, $|\{x | (x, y) \in A\}|$, the number of arcs in $A$ which start at some node and end at $y$, is the in-degree of node $y$. The degree of a node $n \in N$ is the sum of $n$'s in- and out-degrees.

A source node in a DG $G=(N, A)$ is a node whose in-degree is zero, and a sink node in a DG $G=(N, A)$ is a node whose out-degree is zero.

A DG $G=(N, A)$ is a control-flow graph (CFG) iff it has a distinguished source node $n_0 \in N$ from which every node $n \in N$ is reachable.

Let $G=(N, A)$ be a CFG with source node $n_0$. A node $x \in N$ dominates a node $y \in N$ iff every path beginning with $n_0$ and ending with $y$ contains $x$. (Note that, by this definition and the remarks above, every node dominates itself.) A set of nodes $X$ dominates a set of nodes $Y$ in a CFG iff every path beginning with a start node and ending with an element of $Y$ contains an element of $X$.

With $G=(N, A)$ and $s$ as above, a nonempty node set $X \subseteq N$ dominates a nonempty node set $Y \subseteq N$ iff every path starting with $n_0$ and ending with an element of $Y$ contains an element of $X$. (Note that the case of a single node dominating another single node is the special case of this definition where $|X|=|Y|=1$.)

2.2. Algebraic Structures. $Z$ denotes the set of all integers and $N$ denotes the set of all integers greater than zero (the natural numbers). $Z/(m)$ denotes the ring of the integers modulo $m$, for some integer $m>0$. Whenever $m$ is a prime number, $Z/(m)=GF(m)$, the Galois field of the integers modulo $m$. $B$ denotes the set $\{0,1\}$ of bits, which may be identified with the two elements of the ring $Z/(2)=GF(2)$.

2.2.1. Identities. Identities (i.e., equations) play a crucial role in obfuscation: if for two expressions $X, Y$, we know that $X=Y$, then we can substitute the value of $Y$ for the value of $X$, and we can substitute the computation of $Y$ for the computation of $X$, and vice versa.

That such substitutions based on algebraic identities is crucial to obfuscation is easily seen by the fact that their use is found to varying extents in every one of [5, 7, 8, 10, 11, 12, 21, 22, 23, 24, 28, 29, 30].

Sometimes we wish to identify (equate) Boolean expressions, which may themselves involve equations. For example, in typical computer arithmetic, $$x=0 \text{ iff } (-(x \vee (-x))-1) \leq 0$$

(using signed comparison). Thus "iff" equates conditions, and so expressions containing "iff" are also identities—specifically, condition identities or Boolean identities.

2.2.2. Matrices. We denote an $r \times c$ ($r$ rows, $c$ columns) matrix $M$ by $$M = \begin{bmatrix} m_{1,1} & m_{1,2} & \ldots & m_{1,c} \\ m_{2,1} & m_{2,2} & \ldots & m_{2,c} \\ \vdots & \vdots & \ddots & \vdots \\ m_{r,1} & m_{r,2} & \ldots & m_{r,c} \end{bmatrix},$$

where its transpose is denoted by $M^T$ where $$M^T = \begin{bmatrix} m_{1,1} & m_{2,1} & \ldots & m_{r,1} \\ m_{1,2} & m_{2,2} & \ldots & m_{r,2} \\ \vdots & \vdots & \ddots & \vdots \\ m_{1,c} & m_{2,c} & \ldots & m_{r,c} \end{bmatrix},$$

so that, for example, $$\begin{bmatrix} a & b \\ c & d \\ e & f \end{bmatrix}^T = \begin{bmatrix} a & c & e \\ b & d & f \end{bmatrix}.$$

2.2.3. Relationship of $Z/(2^n)$ to Computer Arithmetic. On $B^n$, the set of all length-$n$ bit-vectors, define addition (+) and multiplication ($\cdot$) as usual for computers with 2's complement fixed point arithmetic (see [25]). Then $(B^n, +, \cdot)$ is the finite two's complement ring of order $2^n$. The modular integer ring $Z/(2^n)$ is isomorphic to $(B^n, +, \cdot)$, which is the basis of typical computer fixed-point computations (addition, subtraction, multiplication, division, and remainder) on computers with an n-bit word length.

(For convenience, we may write x·y (x multiplied by y) by xy; i.e., we may represent multiplication by juxtaposition, a common convention in algebra.)

In view of this isomorphism, we use these two rings interchangeably, even though we can view $(B^n, +, \cdot)$ as containing signed numbers in the range $-2^{n-1}$ to $2^{n-1}-1$ inclusive. The reason that we can get away with ignoring the issue of whether the elements of $(B^n, +, \cdot)$ occupy the signed range above or the range of magnitudes from 0 to $2^n-1$ inclusive, is that the effect of the arithmetic operations "+" and "·" on bit-vectors in $B^n$ is identical whether we interpret the numbers as two's complement signed numbers or binary magnitude unsigned numbers.

The issue of whether we interpret the numbers as signed arises only for the inequality operators $<, >, \leq, \geq$, which means that we should decide in advance how particular numbers are to be treated: inconsistent interpretations will produce anomalous results, just as incorrect use of signed and unsigned comparison instructions by a C or C++ compiler will produce anomalous code.

2.2.4. Bitwise Computer Instructions and $(B^n, \vee, \wedge, \neg)$. On $B^n$, the set of all length-n bit-vectors, a computer with n-bit words typically provides bitwise and ($\wedge$), inclusive or ($\vee$) and not ($\neg$). Then $(B^n, \vee, \wedge, \neg)$ is a Boolean algebra. In $(B, \vee, \wedge, \neg)$, in which the vector-length is one, 0 is false and 1 is true.

For any two vectors $u, v \in B^n$, we define the bitwise exclusive or ($\oplus$) of u and v, by $u \oplus v = (u \wedge (\neg v)) \vee ((\neg u) \wedge v)$. For convenience, we typically represent $\neg x$ by $\bar{x}$. For example, we can also express this identity as $u \oplus v = (u \wedge \bar{v}) \vee (\bar{u} \wedge v)$.

Since vector multiplication—bitwise and ($\wedge$)—in a Boolean algebra is associative, $(B^n, \oplus, \wedge)$ is a ring (called a Boolean ring).

2.2.5. T-Functions and Non-T-Functions. A function $f: (B^w)^k \mapsto (B^w)^m$ mapping from a k-vector of w-bit words to an m-vector of w-bit words is a T-function if for every pair of vectors $x \in (B^w)^k$, $y \in (B^w m)^m$: $y = f(x)$, with $x' \neq x$ and $y' = f(x')$, and with bits numbered from 0 to w-1 in the w-bit words, the lowest numbered bit in an element word at which y and y' differ is not lower than the lowest numbered bit in an element word at which x and x' differ. Typically we consider this numbering within words to be from low-order ($2^0$) to high-order ($2^{w-1}$) bits, regarding words as representing binary magnitudes, so we can re-state this as: an output bit can only depend on input bits of the same or lower order.

Functions composable from $\wedge, \vee, \oplus, \neg$ computed over $B^w$ together with $+, -, \times$ over $Z/(2^w)$, so that all operations operate on w-bit words, are T-functions. Obscure constructions with the T-function property are vulnerable to bit-slice attacks, since we can obtain from any T-function another legitimate T-function by dropping high-order bits from all words in input and output vectors.

The T-function property does not hold for right bit-shifts, bitwise rotations, division operations, or remainder/modulus operations based on a divisor/modulus which is not a power of two, nor does it hold for functions in which conditional branches make decisions in which higher-order condition bits affect the value of lower-order output bits.

For conditional branches and comparison-based conditional execution, note that conditional execution on the basis of conditions formed using any one of the six standard comparisons $=, \neq, <, >, \leq, \geq$ all can easily violate the T-function condition, and indeed, in normal code using comparison based branching logic, it is easier to violate the T-function condition than it is to conform to it.

2.2.6. Polynomials. A polynomial is an expression of the form $f(x) = \sum_{i=0}^{d} a_i x^i = a_d^d + \ldots + a_2 x^2 + a_1 x + a_0$ (where $x^0 = 1$ for any x). If $a_d \neq 0$, then d is the degree of the polynomial. Polynomials can be added, subtracted, multiplied, and divided, and the result of such operations are themselves polynomials. If d=0, the polynomial is constant; i.e., it consists simply of the scalar constant $a_0$. If d>0, the polynomial is non-constant. We can have polynomials over finite and infinite rings and fields.

A non-constant polynomial is irreducible if it cannot be written as the product of two or more non-constant polynomials. Irreducible polynomials play a role for polynomials similar to that played by primes for the integers.

The variable x has no special significance: as regards a particular polynomial, it is just a place-holder. Of course, we may substitute a value for x to evaluate the polynomial—that is, variable x is only significant when we substitute something for it.

We may identify a polynomial with its coëfficient (d+1)-vector $(a_d, \ldots, a_1, a_0)$.

Polynomials over $GF(2) = Z/(2)$ have special significance in cryptography, since the (d+1)-vector of coëfficients is simply a bit-string and can efficiently be represented on a computer (e.g., polynomials of degrees up to 7 can be represented as 8-bit bytes); addition and subtraction are identical; and the sum of two such polynomials in bit-string representation is computed using bitwise $\oplus$ (exclusive or).

2.3. Encodings. We formally introduce encodings here.

Let $F:: D \mapsto R$ be total. Choose a bijection d: $D \mapsto D'$ and a bijection r: $R \mapsto R'$. We call $F' = r \circ F \circ d^{-1}$ an encoded version of F. d is an input encoding or a domain encoding and r is an output encoding or a range encoding. A bijection such as d or r is simply called an encoding. In the particular case where F is a function, the diagram shown in FIG. 1 then commutes, and computation with F' is simply computation with an encrypted function [28, 29]. As shown in FIG. 1, only D', F' (the encrypted function) and R' are visible to the attacker. None of the original information is visible to the attacker (D, F, R), nor is the information used to perform the encoding.

Let $B_i:: S_i^{m_i} \mapsto S_i^{m_i}$, where $m_i, n_i \in N$, for $i = 1, 2, \ldots, k$. Then the relation concatenation $\vec{B_1} \| \vec{B_2} \| \ldots \| \vec{B_k}$ is that relation $B: \forall v_i \in S_i^{m_i}, v'_i \in S_i^{m_i}$, with i ranging over $\{1, 2, \ldots, k\}$, $(v_i, v'_i) \in B_i$, $i = 1, 2, \ldots, k$ iff $(v_1 \| \ldots \| v_k, v'_1 \| \ldots \| v'_k) \in B$. Plainly $B^{-1} = \vec{B_1^{-1}} \| \vec{B_2^{-1}} \| \ldots \| \vec{B_k^{-1}}$. If $B_1, \ldots, B_n$ are bijections, and therefore are encodings, then B is also a bijection and an encoding. B is then called a concatenated encoding, and $B_i$ is the ith component of B.

(We might view the following as a special case of the above where the $m_i$'s and $n_i$'s all have the value 1.) Let $B_i:: S_i \mapsto S'_i$ for $i = 1, 2, \ldots, k$. Then the relation aggregation $[B_1, B_2, \ldots, B_k]$ is that relation $B: \forall x_i \in S_i, x'_i \in S'_i$, with i ranging over $\{1, 2, \ldots, k\}$, $(x_i, x'_i) \in B_i$, $i = 1, 2, \ldots, k$ iff $(\langle x_1, \ldots, x_k \rangle, \langle x'_1, \ldots, x'_k \rangle) \in B$.[1]

[1] The $[f_1, \ldots, f_k]$ notation was introduced for function aggregation by John Backus in his ACM Turing Award lecture. I have taken it to apply to binary relations in general.

Plainly $B^{-1} = [B_1^{-1}, \ldots, B_k^{-1}]$. If $B_1, \ldots, B_n$ are bijections, and therefore are encodings, then B is also a bijection and an encoding. B is then called an aggregated encoding, and $B_i$ is the ith component of B.

Let $B_i:: S \mapsto S'_i$ for $i = 1, 2, \ldots, k$. Then the relation conglomeration $$\langle B_i; B_2; \ldots; B_k \rangle$$

is that relation B:—$\forall x'_i \in S'_i$, $\forall x \in S$, $(x, \langle x'_1, \ldots, x'_k \rangle) \in B$ iff $((x, \ldots, x),$
$(x'_1, \ldots, x'_k)) \in \langle B_1, \ldots, B_k \rangle$.

2.3.1. Network Encoded Computations. Generally, output of a transformation will become the input to another subsequent transformation, which means the output encoding of the first must match the input encoding of the second as follows.

A networked encoding for computing $Y \circ X$ (i.e. transformation X followed by transformation Y) is an encoding of the form $Y' \circ X' = (H \circ Y \circ G^{-1}) \circ (G \circ X \circ F^{-1}) = H \circ (Y \circ X) \circ F^{-1}$.

In the general case, we have encoded networks, which are data-flow networks in which the node functions are encoded functions.

Encoding may be derived from algebraic structures (see § 2.2)

For example, finite ring encoding (FR) is based on the fact that affine functions $x' = e_x(x) = sx + b$ over $Z/(2^w)$, where w is the word width, which can be implemented by ignoring overflow so that the modulus is the natural machine integer modulus, are lossless whenever s is odd.

We note from FIG. 1 that the key to encoded computation is that inputs, outputs, and computation are all encoded. For example, consider elements of $Z/(2^w)$, the ring of the integers modulo $2^w$, where w is the preferred word-width for some computer (typically 8, 16, 32, or 64), with a trend over time towards the higher widths). The units of $Z/(2^w)$ (i.e., those with a multiplicative inverse) are the odd elements 1, 3, 5, ..., $2^w - 1$.

Suppose we want to encode additions, subtractions, and multiplications on a binary computer with word-width w so that the unencoded computations are performed over $Z/(2^w)$. We could use affine encodings over $Z/(2^w)$. With unencoded variables x, y, z and corresponding encoded variables x', y', z' where $$x' = e_x(x) = s_x x + b_x \; y' = e_y(y) = s_y y + b_y \; z' = e_z(z) = s_z z + b_z,$$

We want to determine how to compute $$z' = x' +' y' \; z' = x' -' y' \; z' = x' \times' y';$$

i.e., we need representations for +', −', ×'. (Over a network of such operations, we would have many different, encodings +', −', ×', with the requirement being that the result of an operation employs the same encoding as the corresponding input encoding of the consuming operation.)

Where juxtaposition represents × over $Z/(2^w)$, −x in 2's complement is −x in $Z/(2^w)$, and xy in 2's complement is xy in $Z/(2^w)$. Thus if $e_v$ is the encoding of v and $e_v^{-1}$ its inverse, $v' = e_v(v) = s_v v + b_v$ and $e_v^{-1}(v') = (v' - b_v)s_v^{-1} = s_v^{-1} v' + (-b_v s_v^{-1})$ (another affine encoding over $Z/(2^w)$). Then $$z' = x' +' y' = e_z(e_x^{-1}(x') + e_y^{-1}(y')) = (s_x^{-1} s_z)x' + (s_y^{-1} s_z)y' + (b_z - s_x^{-1} s_z b_x - s_y^{-1} s_z b_y)$$

which has the general form $z' = c_1 x' + c_2 y' + c_3$ with constants $c_1$, $c_2$, $c_3$: the original data and encoding coëfficients have vanished. If y is a positive or negative constant k, we may choose $e_y = id$ (i.e., $s_y = 1$ and $b_y = 0$), and the above reduces to $$z' = x' +' k = e_z(e_x^{-1}(x') + k) = (s_x^{-1} s_z)x' + (b_z - s_x^{-1} s_z b_x + s_z k)$$

which has the general form $z' = c_1 x' + c_2$ for constants $c_1$, $c_2$. Alternatively, we can compute $z' = x' +' k$ as $z' = x'$ where we define $s_z = s_x$ and $b_z = b_x - s_x k$ so that we can compute $z' = x' +' k$ with no computation at all. To make $z' = -' x'$ without computation, we simply define $s_z = -s_x$ and $b_z = -b_x$ and set $z' = x'$. Similarly, for subtraction $$z' = x' -' y' = e_z(e_x^{-1}(x') - e_y^{-1}(y')) = (s_x^{-1} s_z)x' + (-s_y^{-1} s_z)y' + (b_z - s_x^{-1} s_z b_x + s_y^{-1} s_z b_y)$$

which again has the general form $z' = c_1 x' + c_2 y' + c_3$ with constants $c_1$, $c_2$, $c_3$: the original data and encoding coëfficients have vanished. If y' is a constant c, we proceed as above for addition, setting k=−c. To subtract $z' = k -' x'$, we can compute it without computation by negating x' without computation, and then adding k as described above. For multiplication, $$z' = x' \times' y' = e_z(e_x^{-1}(x') \times e_y^{-1}(y')) = (s_x^{-1} s_y^{-1} s_z) x' y' + (-s_x^{-1} s_y^{-1} s_z b_y)x' + (-s_x^{-1} s_y^{-1} s_z b_x)y' + (b_z + s_x^{-1} s_y^{-1} s_z b_x b_y)$$

which has the general form $z' = c_1 x' y' + c_2 x' + c_3 y' + c_4$ for constants $c_1$, $c_2$, $c_3$, $c_4$. Finally, if x is a constant k, we may choose $e_x = id$ (i.e., we may choose $s_x = 1$ and $b_x = 0$) in which case the above multiplication formula reduces to $$z' = k \times' y' = e_z(k \times e_y^{-1}(y')) = (s_y^{-1} s_z k)y' + (b_z - s_y^{-1} s_z k b_y)$$

which has the general form $z' = c_1 y' + c_2$ for constants $c_1$, $c_2$. Alternatively, if k is invertible (i.e., odd) in $Z/(2^w)$, we can compute $z' = k \times' y'$ as $z' = y'$ by defining $s_z = k^{-1} s_y$ and $b_z = b_y$, which has the standard affine form for FR encoding, and allows us to take y', but with encoding $e_z$ rather than its own encoding $e_y$, to be z', so that we can compute $z' = k \times' y'$ with no computation at all.

Polynomials of higher order may also be used: in general [27], for $1 < w \in N$, over $Z/(2^w)$, $$P(x) = a_0 \diamond_1 a_1 x \diamond_2 a_2 x^2 \diamond_3 \ldots \diamond_d a_d x^d$$

is a permutation polynomial (i.e., bijective or lossless polynomial) iff
 (1) $\diamond_i$ is + (modulo $2^w$) for i=1, ..., d,
 (2) $a_1$ is odd,
 (3) $a_2 + a_4 + \ldots$ is even, and
 (4) $a_3 + a_5 + a_7 + \ldots$ is even;
a characterization due to Rivest. (Only a subset of the bijections on $Z[0 \ldots 2^w - 1]$ can be written as such a permutation polynomial over $Z/(2^w)$.) The higher the degree, the more entropy contained in a choice of polynomial, but time and space complexity rise correspondingly.

Permutation polynomials exist over many rings and fields. Klimov [17] extended this characterization to what he called generalized permutation polynomials, which are like those described above except that any given $\diamond_i$ may be + or − (modulo $2^w$) or bitwise exclusive-or ($\oplus$) on $B^w$ and the $\diamond$ operations can be applied in any fixed order.

While we can write polynomials of arbitrary degree, every polynomial over $Z/(2^w)$ is equivalent to a polynomial of very limited degree. In fact, it has been known that, for $w \in Nm$ every permutation polynomial P over $Z/(2^w)$ has an equivalent permutation polynomial Q over $Z/(2^w)$ of degree $\leq w+1$.

A difficulty with permutation polynomials, whether generalized or not, is that they only become truly useful when their inverses are known and computationally convenient. It is known that most permutation polynomials have inverses of high degree (close to $2^w$ for permutation polynomials over $Z/(2^w)$). However, using Rivest's (non-generalized) characterization above, if $a_i^2 = 0$ for i=2, ..., d, then the degree of the inverse is the same as the degree of the polynomial to be inverted. Formulas for inverses for permutation polynomials as follows (see section C for a more rigorous treatment):

2.3.2. Quadratic Polynomials and Inverses. If $P(x)=ax^2+bx+c$ where $a^2=0$ and b is odd, then P is invertible, and $$P^{-1}(x)=dx^2+ex+f,$$

where the constant coëfficients are defined by $$d = -\frac{a}{b^3},$$

$$e = e\frac{ac}{b^3} + \frac{1}{b}, \text{ and}$$

$$f = -\frac{c}{b} - \frac{ac^2}{b^3}.$$

2.3.3. Cubic Polynomials and Inverses. If $P(x)=ax^3+bx^2+cx+d$ where $a^2=b^2=0$ and c is odd, then P is invertible, and $$P^{-1}(x)=ex^3+fx^2+gx+h,$$

where the constant coëfficients are defined by $$e = -\frac{a}{c^4},$$

$$f = 3\frac{ad}{c^4} - \frac{b}{c^3},$$

$$g = \frac{1}{c} - 6\frac{ad^2}{c^4} + 3\frac{ad^2}{c^4} + 2\frac{bd}{c^3}, \text{ and}$$

$$h = -ed^3 - \left(3\frac{ad}{c^4} - \frac{b}{c^3}\right)d^2 - \left(\frac{1}{c} - 6\frac{ad^2}{c^4} - 3d^2e + 2\frac{bd}{c^3}\right)d.$$

2.3.4. Quartic Polynomials and Inverses. If $P(x)=ax^4+bx^3+cx^2+dx+e$ where $a^2=b^2=c^2=0$ and d is odd, then P is invertible, and $$P^{-1}(x)=fx^4+gx^3+hx^2+ix+j,$$

where the constant coëfficients are defined by $$f = -\frac{a}{d^5},$$

$$g = \frac{4ae}{d^5} - \frac{b}{d^4},$$

$$h = -6\frac{ae^2}{d^5} + 3\frac{be}{d^4} - \frac{c}{d^3},$$

$$i = \frac{4ae^3}{d^5} - 3\frac{be^2}{d^4} + 2\frac{ec}{d^3} + \frac{1}{d}, \text{ and}$$

$$j = -\frac{ae^4}{d^5} + \frac{be^3}{d^4} - \frac{ce^2}{d^3} - \frac{e}{d}.$$

2.3.5. Notes on Permutation Polynomials Over $Z/(p^w)$. Let p be a prime and $w \in \mathbb{N}$. The properties permutation polynomials over $Z/(p^w)$ are explored in a 1984 paper by Mullen and Stevens [19], which teaches us the following.

(1) With $\tau(m)$ being the number of PPS over $Z/(m)$, for arbitrary $m \in \mathbb{N}$ with $m>0$, where $m=\Pi_{i=1}^{k} p_i^{n_i}$ with $p_1, \ldots, p_k$ distinct primes and $n_1, \ldots, n_k \in \mathbb{N}$, we have $\tau(m)=\Pi_{i=1}^{k}\tau(p_i^{n_i})$.

(2) The number of functionally distinct PPS over $Z/(p^n)$ is $$\tau(p^n)=p^{n(\mathcal{N}_p(n)+1)-S_p(n)},$$

where $S_p(n)=\Sigma_{i=0} \mathcal{N}^{p(n)} v_p(i)$, $\mathcal{N}_p(n)$ is the greatest integer $\rho:—v_p(\rho)<n$, and $$v_p(s) = \sum_{i=1}^{\infty} \left\lfloor \frac{s}{p^i} \right\rfloor.$$

Note that $\mathcal{N}_p(n)$ is that integer $\kappa:—p^n|(\kappa+1)!$ but $p^n \nmid \kappa!$, and we have $\mathcal{N}_p(n) \equiv -1 \pmod{p}$.

(3) Every polynomial function $f(x)=\Sigma_{i=1}^{n} a_i x^i$ can be expressed in the falling factorial form $$f(x) = \sum_{i=0}^{N(n)} c_i x^{(i)}$$

where $x^{(t)} = \Pi_{i=0}^{t-1}(x-i)$ with $x^{(0)}=1$. $x^{(t)}$ is a falling factorial.

2.3.6. Notes on Permutation Polynomials Over $Z/(2^w)$. For a computer with w-bit words, PPS over $Z/(2^w)$ are especially convenient, since addition, multiplication, and subtraction mod $2^w$ can be performed by simply ignoring overflows, underflows, and the distinction between magnitude and 2's complement computations, and taking the ordinary uncorrected hardware result for such machines. Moreover, this is also the default behavior of computations on operands of type int, signed int, or unsigned int in programs written in C, C++, or Java™.

Adjusting the results from [19] above, the number of functionally distinct PPS over $Z/(2^w)$ is $$\tau(2^w)=2^{w(\mathcal{N}_2(w)+1)-S_2(w)},$$

where $S_2(w)=\Sigma_{i=0} \mathcal{N}^{2(w)} v_2(i)$, $\mathcal{N}_2(w)$ is the greatest integer $\rho:—v_2(\rho)<w$, and $$v_2(s) = \sum_{i=1}^{\infty} \left\lfloor \frac{s}{2^i} \right\rfloor.$$

Note that $\mathcal{N}_2(n)$ is that integer $\kappa:—2^n|(\kappa+1)!$ but $2^n \nmid \kappa!$, and we have $\mathcal{N}_2(n) \equiv -1 \equiv 1 \pmod{2}$.

2.3.7. General Notes on Encodings. P' denotes an encoded implementation derived from function P. To emphasize that P maps m-vectors to n-vectors, we write $_m{}^nP$. P is then called an n×m function or an n×m transformation. For a matrix M, $_m{}^nM$ indicates that M has m columns and n rows. (These notations naturally correspond, taking application of M to a vector as function application.)

$_m{}^nE$ (mnemonic: entropy-transfer function) is any function from m-vectors over B to n-vectors over B which loses no bits of information for m≤n and at most m−bits for m>n. A function $_n{}^nf$ which is not an instance of $^nE$ is lossy. Multiple occurrences of $_m{}^nE$ in a given formula or equation denote the same function.

$_ne$ (mnemonic: entropy vector) is an arbitrary vector selected from $B^n$. Multiple occurrences of $_ne$ in a given formula or equation denote the same vector.

An affine function or affine transformation (AT) is a vector-to-vector function V defined for all vectors $_m v \in S^m$ for some set S by $_m{}^n V(_m v)=_m{}^n M_m v +_n d$ (concisely: $V(x)=Mx+d$), where M is a constant matrix, and d a constant displacement vector. If A and B are ATs, then so are $\overrightarrow{A \| B}$, [A, B], and $A \circ B$ where defined. An AT $V(x)=Mx+d$ is a linear function or linear transformation (LT) iff $d=\langle 0 \rangle^n$.

A function $f: F^k \mapsto F^m$ from k-vectors to m-vectors over $\langle F, +, \cdot \rangle \in \text{GF}(\xi)$ for some prime power $\xi$ is deeply nonlinear iff ∃linear function g: $F^k \mapsto F^m$ and encodings $d_1, \ldots, d_k$, $r_1, \ldots, r_m$: $F \mapsto F$:—$f=[r_1, \ldots, r_m] \circ g \circ [d_1^{-1}, \ldots, d_k^{-1}]$.

(Note that if ∃g':—$f=[r'_1, \ldots, r'_m] \circ g' \circ [d_1^{-1}, \ldots, d_k^{-1}]$ where g' is affine, then certainly ∃ linear g, $r_1, \ldots, r_m$:—$f=[r_1, \ldots, r_m] \circ g \circ [d_1^{-1}, \ldots, d_k^{-1}]$, since we can choose $r_1, \ldots, r_m$ to perform the element-wise addition of the vector displacement of g'.)

If g: $A^k \mapsto A^m$ is not deeply nonlinear for a prime power $|A|>1$, we say that g is linear up to I/O encoding.

We have proven the following regarding linearity and identity up to I/O encoding.

(1) If a function is linear up to I/O encoding, then so are all of its projections.

(2) Two matrices are identical up to I/O encoding iff one can be converted into the other by a sequence of multiplications of a row or a column by a nonzero scalar.

(3) If two functions are linear up to I/O encoding and identical up to I/O encoding, then they are I/O encodings of matrices which are also identical up to I/O encoding.

(4) If two matrices are identical up to I/O encoding, then so are their corresponding submatrices.

(5) If M is a nonzero matrix over GF(n), there is a matrix M' over GF(n) so that M, M' are identical up to I/O encoding, where M' (the I/O-canonical form of M) has a leading row and column which contain only 0's and 1's.

2.3.8. *Fractures and Fracture Functions. As noted in § 2.3.1, generally when an encoded output is produced, it is consumed with exactly the same encoding assumed, so that an encoded operation $z=f(x,y)$ becomes $z'=f'(x', y')$ where $(x', y', z')=(e_x(x), e_y(y), e_z(z))$, $e_x, e_y, e_z$ are the encodings, and $f'=e_z \circ f \circ [e_x^{-1}, e_y^{-1}]$.

It is sometimes advantageous to output a value with one encoding, and subsequently input assuming some other encoding. If we output x as $e_1(x)$, and later consume it assuming encoding $e_2$, in effect we have applied $e_2^{-1} \circ e_1$ to the unencoded value. We call such an intentional mismatch between the encoding in which a value is produced and the encoding assumed when it is consumed a fracture. If the encodings are linear, so is the fracture function $e_2^{-1} \circ e_1$, and if they are permutation polynomials, so is the fracture function $e_2^{-1} \circ e_1$.

Fractures are potentially useful in obfuscation because the computation which they perform effectively does not appear in the code—the amount and form of code to perform a normal networked encoding and one which adds an operation by means of a fracture is identical, and there appears to be no obvious way to disambiguate these cases, since encodings themselves tend to be somewhat ambiguous.

Note that the defining property of a fracture is the fracture function $v^{-1} \circ u$, say. Generally, there are many different choices of consuming encoding v and producing encoding u which produce exactly the same fracture function: it is quite possible, for example, to have $u_1, \ldots, u_k, v_1, \ldots, v_k$ such that $v_i^{-1} \circ u_i$ is the same fracture function for $i=1, \ldots, k$. Thus specifying the fracture function does not nail down the producing and consuming encodings which imply it.

2.4. Partial Evaluation (PE). A partial evaluation (PE) of an MF is the generation of a MF by freezing some of the inputs of some other MF (or the MF so generated). More formally, let $f$:: $X \times Y \mapsto Z$ be an MF. The partial evaluation (PE) of $f$ for constant $c \in Y$ is the derivation of that MF g:: $X \mapsto Z$ such that, for any $x \in X$ and $z \in Z$, $g(x) \to z$ iff $f(x, c) \to z$ To indicate this PE relationship, we may also write $g(\cdot) \equiv f(\cdot, c)$. We may also refer to the MF g derived by PE of $f$ as a partial evaluation (PE) of $f$. That is, the term partial evaluation may be used to refer to either the derivation process or its result.

To provide a specific example, let us consider the case of compilation.

Without PE, for a compiler program p, we may have p: $S \mapsto E$ where S is the set of all source code files and E is the set of object code files. Then $e=p(s)$ would denote an application of the compiler program p to the source code file s, yielding the object code file e. (We take p to be a function, and not just a multi-function, because we typically want compilers to be deterministic.)

Now suppose we have a very general compiler q, which inputs a source program s, together with a pair of semantic descriptions: a source language semantic description d and a description of the semantics of executable code on the desired target platform t. It compiles the source program according to the source language semantic description into executable code for the desired target platform. We then have q: $S \times (D \times T) \mapsto E$ where S is the set of source code files, D is the set of source semantic descriptions, T is the set of platform executable code semantic descriptions, and E is the set of object code files for any platform. Then a specific compiler is a PE p of q with respect to a constant tuple (d, t)∈D×T, i.e., a pair consisting of a specific source language semantic description and a specific target platform semantic description: that is, $p(s)=q(s, (d, t))$ for some specific, constant (d, t)∈D×T. In this case, X (the input set which the PE retains) is S (the set of source code files), Y (the input set which the PE removes by choosing a specific member of it) is D×T (the Cartesian product of the set D of source semantic descriptions and the set T of target platform semantic descriptions), and Z (the output set) is E (the set of object code files).

PE is used in [10, 11]: the AES-128 cipher [16] and the DES cipher [18] are partially evaluated with respect to the key in order to hide the key from attackers. A more detailed description of the underlying methods and system is given in [21, 22].

Optimizing compilers perform PE when they replace general computations with more specific ones by determining where operands will be constant at run-time, and then replacing their operations with constants or with more specific operations which no longer need to input the (effectively constant) operands.

2.5. Output Extension (OE). Suppose we have a function $f$: $U \mapsto V$. Function g: $U \mapsto V \times W$ is an output extension (OE) of $f$ iff for every $u \in U$ we have $g(u)=(f(u), w)$ for some $w \in W$. That is, g gives us everything that $f$ does, and in addition produces extra output information.

We may also use the term output extension (OE) to refer to the process of finding such a function g given such a function $f$.

Where function $f$ is implemented as a routine or other program fragment, it is generally straightforward to determine a routine or program fragment implementing a function g which is an OE of function $f$, since the problem of finding such a function g is very loosely constrained.

2.6. Reverse Partial Evaluation (RPE). To create general, low-overhead, effective interlocks for binding protections to SBES, we will employ a novel method based on reverse partial evaluation (RPE).

Plainly, for almost any MF or program g:: X↦Z, there is an extremely large set of programs or MFs $f$, sets Y, and constants c∈Y, for which, for any arbitrary x∈X, we always have g(x)=$f$(x, c).

We call the process of finding such a tuple ($f$, c, Y) (or the tuple which we find by this process) a reverse partial evaluation (RPE) of g.

Notice that PE tends to be specific and deterministic, whereas RPE offers an indefinitely large number of alternatives: for a given g, there can be any number of different tuples ($f$, c, Y) every one of which qualifies as an RPE of g.

Finding an efficient program which is the PE of a more general program may be very difficult—that is, the problem is very tightly constrained. Finding an efficient RPE of a given specific program is normally quite easy because we have so many legitimate choices—that is, the problem is very loosely constrained.

2.7. Control Flow Graphs (CFGs) in Code Compilation. In compilers, we typically represent the possible flow of control through a program by a control flow graph (CFG; see the definition in § 2.1.3), where a basic block (BB) of executable code (a 'straight line' code sequence which has a single start point, a single end point, and is executed sequentially from its start point to its end point) is represented by a graph node, and an arc connects the node corresponding to a BB U to the node corresponding to a BB V if, during the execution of the containing program, control either would always, or could possibly, flow from the end of BB U to the start of BB V. This can happen in multiple ways:

(1) Control flow may naturally fall through from BB U to BB V.

For example, in the C code fragment below, control flow naturally falls through from U to V:

```
switch(radix) {
    case HEX:
        U
    case OCT:
        V
    ...
}
```

(2) Control flow may be directed from U to V by an intra-procedural control construct such as a while-loop, an if-statement, or a goto-statement.

For example, in the C code fragment below, control is directed from A to Z by the break-statement:

```
switch(radix) {
    case HEX:
        A
        break;
    case OCT:
        B
    ...
}
Z
```

(3) Control flow may be directed from U to V by a call or a return.

For example, in the C code fragment below, control is directed from B to A by the call to f( ) in the body of g( ), and from A to C by the return from the call to f( ):

```
void f(void) {
    A
    return;
}
int g(int a, float x) {
    B
    f( );
    C
}
```

(4) Control flow may be directed from U to V by an exceptional control-flow event.

For example, in the C++ code fragment below, control is potentially directed from U to V by a failure of the dynamic_cast of, say, a reference y to a reference to an object in class A:

```
#include<typeinfo>
...
int g(int a, float x) {
    ...
    try {
        ...
        U
        A& x = dynamic_cast<A&>(y);
        ...
    catch(bad_cast c) {
        V
    }
    ...
}
```

For each node n∈N in a CFG C=(N, T)—C for control, T for transfer—node n is taken to denote a specific BB, and that BB computes an MF determined by the code which BB n contains: some function $f$:: X↦Y, where X represents the set of all possible values read and used by the code of n (and hence the inputs to function $f$), and Y represents the set of all possible values written out by the code of n (and hence the outputs from function $f$). Typically $f$ is a function, but if $f$ makes use of nondeterministic inputs such as the current reading of a high-resolution hardware clock, $f$ is an MF but not a function. Moreover, some computer hardware includes instructions which may produce nondeterministic results, which, again, may cause $f$ to be an MF, but not a function.

For an entire program having a CFG C=(N, T) and start node $n_0$, we identify N with the set of BBs of the program, we identify $n_0$ with the BB appearing at the starting point of the program (typically the beginning BB of the routine main( ) for a C or C++ program), and we identify T with every feasible transfer of control from one BB of the program to another.

Sometimes, instead of a CFG for an entire program, we may have a CFG for a single routine. In that case, we identify N with the set of BBs of the routine, we identify $n_0$ with the BB appearing at the beginning of the routine, and we identify T with every possible transfer of control from one BB of the routine to another.

2.8. *Permuting by Pair-Swapping. Here we consider how to produce permutations of n elements using only random 2×2 switch elements which compute either $y_1, y_2 \leftarrow x_1, x_2$ (no swap) or $y_2, y_1 \leftarrow x_1, x_2$ (swap), each with probability ½.

2.8.1. *Permuting by Blind Pair-Swapping. A sorting network may be represented as shown in FIG. 7, by a series of parallel wires 72 in which, at certain points, at right angles to these wires, one wire is connected to another wire by a cross-connection 74 (representing a compare-and-swap-if-greater operation on the data being elements carried by the two connected wires. If, irrespective of the inputs, the output emerges in sorted order, the resulting network is a sorting network. The comparisons in a sorting network are data-independent: correct sorting results in at the right ends of the wires irrespective of the data introduced at the left ends of the wires. Compare-and-swap-if-greater operations can be recorded so long as the relative order of the comparisons sharing an end-point are preserved.

An efficient way of constructing such a sorting network for n nodes is given by Batcher's Odd-Even Mergesort [2], which is a data-independent sort: exactly the same compare-and-swap-if-greater operations are performed irrespective of the data to be sorted. The algorithm performs $O(n(\log n)^2)$ comparisons in sorting a set of n elements. Details of the algorithm can be found at these URLs: [3].

If such a network will sort arbitrary data into order, it follows that, if the compare-and-swap-if-greater operations are replaced with operations which swap with probability ½, the same network configuration will permute a sequence of n distinct elements into a random order, probably a biased one. This is the basis of the mechanism we will use to implement permutations, using pseudo-random true/false variates created using computations.

Note that the number of permutations of n elements is n!, whereas the number of swap-configurations, using one bit in position $2^i$ to indicate whether the ith swap was done or not done, is $2^{b(n)}$ where b(n) is the number of stages in a Batcher network sorting n elements.

For example, for n=3, n!=6, b(n)=3, and $2^{b(n)}$=8, so there must be permutations which can be selected more than one way, but some of them cannot. Similarly, for n=5, n!=120, b(n)=9, and $2^{b(n)}$=512, so there must be permutations which can be selected more than one way, but the number of swap configurations which select a given permutation cannot always be the same because 120∤512.

Reducing bias requires that we ensure that the number of ways of reaching any permutation is roughly the same for each permutation. Since $2^{b(n)}$ is a power of two for any n, this cannot be done simply by adding extra stages. It is necessary in some cases to use other methods for reducing bias.

2.8.2. *Permuting by Controlled Pair-Swapping. The method described in § 2.8.1 suffers from significant bias (the bias can easily exceed two to one). The problem was that the number of random swap/no-swap decisions is always a power of 2, whereas the number of permutations is always a factorial, and for element counts above 2, the number of permutations never evenly divides the number of swap/no-swap lineups which form a number between 0 and $2^k-1$ inclusive which can be viewed as a string of k bits: one bit per swap/no-swap decision.

There are several different mechanisms which we can deploy to obtain results from the same kinds of decision elements (comparing two pseudo-random numbers). We begin with a straight selection problem: to generate a permutation, we choose one of n elements for a given position, and then choose one of n−1 remaining elements for another, and so on, until we are forced to choose the remaining element for the remaining position.

The first method of removing bias might be called attenuation. Suppose, for example, that we need to choose one of 12 elements. We could create a binary tree of decisions with 16 leaf nodes, and map the leaf nodes onto the 12 elements, with 8 being reachable via one leaf and 4 being reachable by two leaf nodes each. (We simply wrap the 16 leaf nodes around the 12 choices until all leaf nodes have been used; i.e., we create a sequence of 16 elements by repeating the element numbers from 1 to 12 until we have an element number for each of the 16 leaf nodes: ⟨1, 2, 3, 4, 5, 6, 7, 8, 9, 10, 11, 12, 1, 2, 3, 4⟩.) At this point, we have a maximum 2:1 bias in our selection. If we use a tree with 32 leaf nodes, we will have 4 elements reachable from two leaf nodes and 8 reachable from 3, and our maximum bias is reduced to 3:2. If we use a tree with 64 leaf nodes, we will have 8 elements reachable from 5 leaf nodes and 4 reachable from 6, and our maximum bias is reduced to 5:4. Attenuation produces fast but bulky code.

The second method of removing bias might be called reselection. Suppose, as above, that we need to choose one of 12 elements. We could create a binary tree of decisions with 16 leaf nodes, and map 12 leaf nodes to the 12 choices. The other four choices map to looping back and performing the whole selection over again. With probability ¾, we succeed on the first try. With probability ¹⁵⁄₁₆, we succeed in the first two tries. With probability ⁶³⁄₆₄, we succeed in the first three. Reselection has the advantage that it can almost completely eliminate bias. It has the disadvantage that, while spatially compact, it involves redoing some steps. Also, since we would want to limit the number of iterations, it involves counting the repetitions and defaulting to a (slightly) biased choice on those rare cases where the count is exceeded. Reselection is more compact, slower, and eliminates more of the bias than attenuation.

The third method of removing bias might be called reconfiguration. Suppose, as above, that we need to choose one of 12 elements. We note that using 16 leaf nodes, we have a bias of 2:1 with 8 nodes reachable 1 way and 4 reachable 2 ways. Suppose we set up three ways to identify the mapping of leaf nodes to elements. For each of the 12 elements, it appears in the "1 way" set in two configurations and in the "2 ways" set in one configuration. We then (using reselection) choose one of the three configurations, and then select using the tree of 16 resulting in an almost perfectly unbiased selection, and we only had to apply reselection on 3 elements, not 12. At the cost of a little extra data, this method provides the best combination of compactness and speed when the number of configurations needed to eliminate bias is small. (The maximum possible number of configurations is bounded above by the number of elements from which to choose, but at that number of configurations, using reconfiguration is pointless because choosing the configuration is simply another of instance of the problem whose bias we are trying to reduce.)

As it turns out, probably the optimal method of removing bias, for good performance, reduced bias, and simplicity, is a variant of attenuation. We repeatedly permute the elements using the original biased permutation method but with independent choices, in effect composing multiple biased permutations. Experimentation with a J program indicates that simply permuting twice is reduces bias to a low level (ratio close to 1.0): there is little point in iterating more times.

2.9. Deep Nonlinearity: Function-Indexed Interleaving. The AES-128 implementation described in [10], built using the methods of [21], has been penetrated using the attack in [4]. While this attack succeeded, the attack is quite complex, and would require significant human labor to apply to any particular software implementation, so even without modifications, the methods of [21] are useful. It would be extremely difficult to make the attack of [4] succeed against, an attack on an implementation according to [21] fortified according to [22]. However, we now seek stronger protection, and so it behooves us to find ways to further bulwark the methods of [21,22] in order to render attacks such as those in [4] infeasible.

2.9.1. Shallow Nonlinearity and Homomorphic Mapping Attacks.

Much use is made in implementations according to [21,22] of wide-input linear transformations (§ 4.0 in [21]) and the matrix blocking method described in § 4.1 on pp. 9-10 (paragraphs [0195]-[0209] in [21]). It is true that the methods of [21] produce non-linear encoded implementations of such linear transformation matrices. However, the implementations are shallowly nonlinear. That is, such a matrix is converted into a network of substitution boxes (lookup tables) which necessarily have a limited number of elements due to space limitations. The nonlinear encodings (arbitrary 1-to-1 functions, themselves representable as substitution boxes; i.e., as lookup tables) on values used to index such boxes and on element values retrieved from such boxes are likewise restricted to limited ranges due to space limitations.

Thus any data transformation computed by an input-output-encoded implementation of such a blocked matrix representation, which is implemented as a network of substitution boxes, or a similar devices for representing essentially arbitrary random functions, is linear up to I/O encoding; that is, any such transformation can be converted to a linear function by individually recoding each input vector element and individually recoding each output vector element.

The attack method in [4] is a particular instance of a class of attacks based on homomorphic mapping. The attack takes advantage of the known properties of linear functions, in this case over $GF(2^8)$ since that is the algebraic basis of the computations in the AES. In particular, addition in $GF(2^n)$ is performed using bitwise $\oplus$ (exclusive or), and this function defines a Latin square of precisely known form. Thus it is possible to search for a homomorphism from an encoded table-lookup version of $\oplus$ to an unencoded one, and it is possible in the case of any function $f = Q \circ \oplus \circ Q^{-1}$ where $\oplus$ is bitwise, to find an approximate solution $\hat{Q} = Q \circ A$ for a particular affine A (i.e., an approximation $\hat{Q}$ which is within an affine mapping A of the real Q) with reasonable efficiency. These facts are exploited in the attack of [4], and there are other attacks which could similarly exploit the fact that the blocked matrix function implementations of [21, 22] are linear up to I/O encoding. While such attacks yield only partial information, they may narrow the search for exact information to the point where the remaining possibilities can be explored by exhaustive search. For example, a white-box implementation of encryption or decryption using the building blocks provided by [21,22] may be vulnerable to key-extraction attacks such as that in [4], or related attacks based on homomorphic mapping.

2.9.2. Foiling Homomorphic Mapping: Deeply Nonlinear Functions.

The solution to homomorphic mapping attacks is to replace such matrix functions with functions which are (1) wide-input; that is, the number of bits comprising a single input is large, so that the set of possible input values is extremely large, and (2) deeply nonlinear; that is, functions which cannot possibly be converted into linear functions by I/O encoding (i.e., by individually recoding individual inputs and individual outputs).

Making the inputs wide makes brute force inversion by tabulating the function over all inputs consume infeasibly vast amounts of memory, and deep nonlinearity prevents homomorphic mapping attacks such as that in [4].

For example, we could replace the MixColumns and InvMixColumns transformations in AES, which input and output 32-bit (4-byte) values, with deeply nonlinear MDS transforms which input and output 64-bit (8-byte) values, rendering brute-force inversion of either of these impossible. Call these variants $MixColumns_{64}$ and $InvMixColumns_{64}$. (Since encryption of a message is done at the sender and decryption at the recipient, these would not normally be present on the same network node, so an attacker normally has access only to one of them.)

Suppose, for example, that we want to construct such a deeply non-linear vector-to-vector function over $GF(2^n)$ (where n is the polynomial—i.e., the bit-string—size for the implementation) or, respectively, over $Z/(2^n)$ (where n is the desired element width). Let $u+v=n$, where u and v are positive nonzero integers. Let G=our chosen representation of $GF(2^n)$ (respectively, of $Z/(2^n)$), $G_u$=our chosen representation of $GF(2^u)$ (respectively, of $Z/(2^u)$), and $G_v$=our chosen representation of $GF(2^v)$ (respectively, of $Z/(2^v)$).

Suppose we need to implement a deeply nonlinear function $f: G^p \mapsto G^q$, with $p \geq 3$ and $q \geq 2$; i.e., one mapping p-vectors to q-vectors over our chosen representation G of $GF(2^n)$.

If we wanted a linear function, we could construct one using a q×p matrix over G, and if we wanted one which was nonlinear, but linear up to I/O encoding, we could use a blocked encoded implementation of such a matrix according to [21, 22]. These methods do not suffice to obtain deep nonlinearity, however.

We note that elements of G, $G_u$, $G_v$ are all bit-strings (of lengths n, u, v, respectively). E.g., if n=8 and u=v=4, then elements of G are 8-bit bytes and elements of $G_u$ and $G_v$ are 4-bit nybbles (half-bytes).

The following construction is called function-indexed interleaving. We introduce operations $\text{extract}[r, s](\bullet)$ and $\text{interleave}(\bullet, \bullet)$ which are readily implementable on virtually any modern computer, as would be evident to those versed in code generation by compiler. For a bit-string $$S = (b_0, b_1, \ldots, b_t),$$

we define $$\text{extract}[r, s](S) = (b_r, b_{r+1}, \ldots, b_s);$$

i.e., extract[r, s] returns bits r to s, inclusive. For a vector of bit-strings $$V = (S_1, S_2, \ldots, S_z),$$

we define $$\text{extract}[r, s](V) = (\text{extract}[r, s](S_1), \text{extract}[r, s](S_2), \ldots, \text{extract}[r, s](S_z)).$$

i.e., extract[r, s] returns a new vector containing bits r to s, inclusive, of each of the old vector elements. For two vectors of bit-strings of the same length, say $V = (S_1, \ldots, S_z)$ and $W = (T_1, \ldots, T_z)$, we define $$\text{interleave}(V, W) = (S_1 \| T_1, S_2 \| T_2, \ldots, S_z \| T_z);$$

i.e., each element of interleave(V, W) is the concatenation of the corresponding element of V with the corresponding element of W.

To obtain our deeply nonlinear function $f: G^p \mapsto G^q$ above, we proceed as follows per the flow chart of FIG. 8.

(80) Select a function $L: G_u^p \mapsto G_u^q$, or alternatively, select a q×p matrix over $G_u$. (Since singular square submatrices can create vulnerabilities to homomorphic mapping, it is preferred that most square submatrices of the matrix representation of L be nonsingular. If L is MDS, no square sub-matrix of L is singular, so this preference is certainly satisfied.)

(82) Select k≥2 functions $R_i: G_v^p \mapsto G_v^q$, for i=0, ..., k-1, or alternatively, select k≥2q×p matrices over $G_v$. (Since singular square submatrices can create vulnerabilities to homomorphic mapping, it is preferred that most square submatrices of the matrix representation of $R_0, ..., R_{k-1}$ be nonsingular. If $R_0, ..., R_{k-1}$ are MDS, no square sub-matrix of any $R_i$ is singular, so this preference is certainly satisfied.)

(84) Select a function s: $G_u^p \mapsto \{0, 1, ..., k-1\}$ for which $$s\{G_u^p\} = \{0, 1, ..., k-1\}$$

(i.e., choose and s that is 'onto' or 'subjective').

Other than they requirement that s be onto, we could choose s at random. However, even simple constructions suffice for obtaining s. As an example, we give our preferred construction for s, as follows.

If k≤u, we choose a linear function $s_1: G_u^p \mapsto G_u$ (or equivalently, a 1×p matrix over $G_u$) and a function $$s_2: G_u \mapsto \{0, 1, ..., k-1\}.$$

Similarly, if u<k≤2u, we can choose a linear function $s_1: G_u^p \mapsto G_u^2$ and a function $s_2: G_u^2 \mapsto \{0, 1, ..., k-1\}$, and so on. Then let $s = s_2 \circ s_1$. In the preferred embodiment, k is 2, 4, 8, or some other power of two. Suppose k=2. Then $s_2$ could return the low-order bit of the bit-string representation of an element of $G_u$; if k=4, $s_2$ could return the low-order 2 bits, and in general if k≤u, $s_2$ could return the value of the bit-string modulo k, which for our preferred choice of k 32 $2^m$, say, is obtained by extracting the m low-order bits of the $s_1$ output.

The above preferred method permits us to use a blocked matrix implementation for $s_1$, so that the methods of [21, 22] apply to it. Moreover, we can straightforwardly obtain an implementation of $f^{-1}$ when $f$ is invertible, using this preferred construction, by the method disclosed below, which generates an $f^{-1}$ function whose construction is similar to that of $f$.

(86) For any $V \in G^p$, let $$V_u = \text{extract}[0, u-1](V),$$

$$V_v = \text{extract}[u, n-1](V), \text{ and}$$

$$f(V) = \text{interleave}(L(V_u), R_j(V_v)) \text{ where } j = s(V_u).$$

(88) The function $f$ defined in step (2.9.2) above may or may not be deeply nonlinear. The next step, then, is to check for deep nonlinearity. We determine this using the following test.

If $f$ is deeply nonlinear, then if we freeze all of its inputs but one to constant values, and ignore all of its outputs but one, we obtain a 1×1 projection $f'$. If we choose different values for the frozen inputs, we may obtain different $f'$ functions. For a linear function, or a function linear up to I/O encoding, the number of distinct $f'$ functions obtainable by choosing different values for the frozen inputs is easily computed. For example, if p=q and $f$ is 1-to-1 (i.e., if L, $R_0, ..., R_{k-1}$ are 1-to-1) then there are exactly |G| such functions. $f$ can only be 1-to-1 in this construction if q≥p.

We simply count such $f'$ functions, represented as |G|-vectors over G (e.g., by using a hash table to store the number of occurrences of each vector as the p-1 frozen-input constants are varied over all possibilities). If the number of distinct $f'$ functions could not be obtained by replacing $f$ with a p×q matrix, then $f$ is deeply nonlinear.

We can accelerate this test by noticing that we may perform the above test, not on $f$, but on arbitrary 1×3 projections g of $f$, where g is obtained by freezing all but three of the inputs to constant values and ignoring all but one of the outputs. This reduces the number of function instances to count for a given unfrozen input and a given unignored output from $|G|^{p-1}$ to $|G|^2$, which may provide a substantial speedup. Moreover, if $f$ is deeply nonlinear, we generally discover this fairly soon during testing: the very first time we find a projection function count not obtainable from a matrix, we know that g is deeply nonlinear, and therefore $f$ is deeply nonlinear.

If we use the acceleration using g with a random selection of three inputs and one output, and we do not succeed in demonstrating deep nonlinearity of $f$, then $f$ is probably linear up to I/O encoding.

(Note that it is possible that the projection instance counts are obtainable by matrix but that $f$ is still deeply nonlinear. However, this is unlikely to occur by chance and we may ignore it. In any case, if the above test indicates that $f$ is deeply nonlinear, then it certainly is deeply nonlinear. That is, in testing for deep nonlinearity, the above test may generate a false negative, but never a false positive.)

If the test in step 88 does not show that $f$ is deeply nonlinear (or, for the variant immediately following this list, sufficiently deeply nonlinear), we return to step (80) and try again.

Otherwise, we terminate the construction, having obtained the desired deeply nonlinear function $f$.

As a variant of the above, we may wish to obtain a function $f$ which is deeply nonlinear, and not only that, but that its projections are also deeply nonlinear. In that case, in step (88) above, we may increase the number of g functions with randomly selected distinct groups of three inputs and one output, for which we must show that the $f'$ instance count is not obtainable by matrix. The more of these we test, the more we ensure that $f$ is not only deeply nonlinear, but is deeply nonlinear over all parts of its domain. We must balance the cast of such testing against the importance of obtaining a deeply nonlinear function which is guaranteed to be deeply nonlinear over more and more of its domain.

2.9.3. Experimental Verification. 1 000 pseudo-random trials of the preferred embodiment of the method for constructing deeply nonlinear functions $f$ were tried with pseudo-randomly generated MDS matrices L and $R_0, R_1$ (k=2) where $fG^3 \mapsto G^3$, $G=\text{GF}(2^8)$, and $G_u=G_v=\text{GF}(2^4)$. The MDS matrices were generated using the Vandermonde matrix method with pseudo-randomly selected distinct coëfficients. Of the resulting 1 000 functions, 804 were deeply nonlinear; i.e., in 804 of the executions of the construction method, step (88) indicated that the method had produced a deeply nonlinear function on its first try.

A similar experiment was performed in which, instead of using the selector function $s = s_2 \circ s_1$ according to the preferred embodiment, function $s_2$ was implemented as a table of 16 1-bit elements with each element chosen pseudo-randomly from the set $\{0, 1\}$. Of 1 000 such functions, 784 were deeply nonlinear; i.e., in 784 of the constructions, step (88) indicated that the construction method's first try had produced a deeply nonlinear function.

Finally, a similar experiment was performed in which s was created as a table mapping from $G_u^3$ to pseudo-randomly selected elements of $\{0, 1\}$. In 1 000 pseudo-random trials, this produced 997 deeply nonlinear functions. Thus this method produces the highest proportion of deeply nonlinear functions. However, it requires a sizable table (512 bytes for this small experiment, and 2 048 bytes for a similar function $f: G^4 \mapsto G^4$ with the same I/O dimensions as the MixColumns matrix of AES) to store s.

We see, then, that the construction method give in above for creating deeply nonlinear functions over finite fields and rings, and in particular, its preferred embodiment, are quite efficient. Moreover, creating inverses of the generated deeply nonlinear functions is straightforward, as we will see below.

2.9.4. Properties of the Above Construction. A function $f: G^p \mapsto G^q$ constructed as described above has the following properties:

(1) if L and $R_1, \ldots, R_k$ are 1-to-1, then $f$ is 1-to-1;
(2) if L and $R_1, \ldots, R_k$ are bijective (i.e., if they are 1-to-1 and onto, so that p=q), then $f$ is bijective; and
(3) if L and $R_1, \ldots, R_k$ are all maximum distance separable (MDS; see below), then $f$ is MDS.

The Hamming distance between two k-vectors, say $u=(u_1, \ldots, u_k)$ and $v=(v_1, \ldots, v_k)$, is the number of element positions at which u and v differ; i.e., it is $$\Delta(u\ v) = |\{i \in \mathbb{N} \mid i \leq k \text{ and } u_i \neq v_i\}|.$$

A maximum distance separable (MDS) function $f: S^p \mapsto S^q$ where S is a finite set and $|S| \geq 2$, is a function for which for any $x, y \in S^p$, if $\Delta(x,y)=d>0$, then $\Delta(f(x), f(y)) \geq q-d+1$. If p=q, such an MDS function is always bijective. Any projection $f'$ of an MDS function $f: S^p \mapsto S^q$ obtained by freezing m<p of the inputs to constant values and ignoring all but n<q of the outputs, with n≥1 (so that $f': S^m \mapsto S^n$) is also an MDS function. If S is a finite field or finite ring and $f$ is a function computed by a q×p matrix (an MDS matrix, since the vector transform it computes is MDS), say M, then any z×z matrix M' obtained by deleting all but z of the rows of M and then deleting all but z of the columns (where z≥1), is nonsingular; i.e., every square sub-matrix of M is nonsingular.

Such MDS functions are important in cryptography: they are used to perform a kind of 'ideal mixing'. For example, the AES cipher [16] employs an MDS function as one of the two state-element mixing functions in each of its rounds except the last.

2.9.5. Inverting the Constructed Function. When we employ a 1-to-1 (usually deeply nonlinear) function $f: G^p \mapsto G^q$ for some finite field or finite ring G, we often need an inverse, or at least a relative inverse, of $f$ as well. (In terms of [21, 22], the corresponding situation is that we have a 1-to-1 linear function $f: G^p \mapsto G^q$, which will be shallowly nonlinear after I/O encoding, whose inverse or relative inverse we require. However, we can strengthen [21, 22] significantly by using deeply nonlinear functions and (relative) inverses instead.)

We now give a method by means of which such an inverse (if p=q) or relative inverse (if p<q) is obtained for a 1-to-1 function $f$ (deeply nonlinear or otherwise) created according to our method.

For any bijective function $f: S^n \mapsto S^n$, there is a unique function $f^{-1}: S^n \mapsto S^n$: $f \circ f^{-1} = f^{-1} \circ f = \mathrm{id}_{S^n}$. If $f: S^m \mapsto S^n$ and m<n, $f$ cannot be bijective. However, $f$ may still be 1-to-1, in which case there is a unique relative inverse $f^{-1}: f\{S^m\} \mapsto f^{-1} \circ f = \mathrm{id}_{S^m}$. That is, if we ignore vectors in $S^n$ which cannot be produced by calling $f$, then $f^{-1}$ acts like an inverse for vectors which can be produced by calling $f$.

We now disclose a method for constructing such a relative inverse for the functions $f$ which we construct, whenever L and all of $R_0, \ldots, R_{k-1}$ are 1-to-1 (in which case q≥p). If p=q, then L and all of $R_0, \ldots, R_{k-1}$ are bijective, and such a relative inverse of $f$ is also the (ordinary) inverse of $f$.

This method can be employed when function s (se step 84 of FIG. 8) is constructed from a linear function $s_1$ and a final function $s_2$ is employed to map the output of $s_1$ onto $\{0, \ldots, k-1\}$, where $s_2$ is computed as the remainder from dividing the $s_1$ result by k. (If k is a power of two, we may compute $s_2$ by taking the $\log_2 k$ low-order bits of the $s_1$ result, which is a convenience, but is not actually required for our current purpose).

We define linear functions $L^{-1}$ and $R_0^{-1}, \ldots, R_{k-1}^{-1}$ to be the relative inverses of L and $R_0, \ldots, R_{k-1}$, respectively. (Since these functions are computed by a matrices, their relative inverses can be obtained easily and efficiently by solving simultaneous linear equations by Gaussian elimination or the like—i.e., by methods well known in the art of linear algebra over finite fields and finite rings.)

We have $s = s_2 \circ s_1$ from the construction of $f$. We define $s'_1 = s_1 \circ L^{-1}$, where $L^{-1}$ is the relative inverse of L. (Thus $s'_1$ is computed by a 1×q matrix over $G_u$ easily discovered by methods well known in the art of linear algebra over finite fields and finite rings.) We define $s' = s_2 \circ s'_1$. We now have an onto function $s': G_u^q \mapsto \{0, \ldots, k-1\}$.

The desired relative inverse—or ordinary inverse if p=q—is the function $f^{-1}: G^q \mapsto G^p$ defined as follows.

For any $W \in G^q$, let $$W_u = \mathrm{extract}[0, u-1](W),$$

$$W_v = \mathrm{extract}[u, n-1](W), \text{ and}$$

$$f^{-1}(W) = \mathrm{interleave}(L^{-1}(W_u), R_j^{-1}(W_v)) \text{ where } j = s'(W_u).$$

When p=q, this is just the ordinary inverse of $f$. When p<q, the function behaves like an inverse only for vectors in $f\{G^p\} \subseteq G^q$.

If we have an unrestricted form for s, i.e., if it is not constructed as in the preferred embodiment above, we can still invert or relatively invert a bijective or 1-to-1 $f$. For example, if s is simply a table over elements of $G_u^p$, then if we define a new table $s' = s \circ L^{-1}$, then the formula above for $f^{-1}$, but using this different $s'$, remains correct. This new table $s'$ can be obtained by traversing all elements e of $G_u^p$, determining L(e), and filling in element L(e) element of $s'$ with the contents of element e of s.

2.10. Static Single Assignment (SSA) Form. Suppose we write a program in a language such as C. Data will comprise scalar variables, arrays, and structures.

The routines (functions in C terminology) typically act as MFS. Each routine can be represented by a control flow graph (CFG; see § 2.1.3) in which the nodes denote basic blocks (BBS; straight-line code segments ending in a transfer of control).

A routine is in static single assignment (SSA) form with respect to its scalar variables if and only if every scalar variable has exactly one dominating assignment. Otherwise, it is in static multi-assignment (SMA) form.

We note that it is not possible, in general, to convert an arbitrary C code routine to SSA form with respect to its scalar variables within the C language itself. The reason is that there can be locations in the code, such as following an if-construct with both a then-alternative and an else-alternative where two different data-flow paths merge—i.e., where a variable, say x, is assigned in both the then-path and the else-path. A similar problem arises with respect to loops, which can be entered from the top or reëntered from the bottom.

To handle this problem, a special form of assignment is added: a φ-assignment. E.g., in the case of the then-path and else-path assignments to x, we could rename the assigned variables $x_1$ and $x_2$, respectively, and then, immediately after the merging of those paths at the bottom of the if-construct, insert the φ-assignment $x_3 = \phi(x_1, x_2);$ With the extension of φ-assignments, it is now possible to convert an arbitrary C routine into SSA form as long as every variable is initialized at the start. (If not, a further refinement, mentioned below, suffices to make the method completely general.) Using the convention in [14], we need not perform the conversion with C extended with φ-assignments (and ω-assignments; see below), but can rather perform it in a further extension in which variables can be subscripted as shown below, so that, the corresponding original variable can always be found by removing the subscript.

2.10.1. Conversion from SMA Form to SSA Form. Conversion to SSA form involves
(1) computation of dominators in the CFG, best achieved using the dominance algorithm in [13];
(2) computation of the dominance frontier for assignments in the CFG, which determine optimal placements for φ-assignments, best achieved using the dominance frontier algorithm in [13]; and
(3) conversion of the code to SSA form, best achieved using the algorithm in [14] (minus its dominators and dominance frontier parts, which are replaced by algorithms from [13]), noting that the conversion method in the paper fails unless every variable in the original C routine is defined (i.e., assigned a value) in a position dominating all other uses. If this is not the case for any variable v, we can address it by adding an initial ω-assignment of the form $v = \omega;$ (denoting initialization to an undefined value) at the beginning of the routine, immediately following the ENTER instruction, prior to the conversion of the routine from SMA to SSA form.

2.10.2. Conversion from SSA Form to SMA Form. The reverse conversion from SSA form to SMA form is trivial.
(1) Each φ-assignment takes its inputs from various basic blocks (BBS) which can easily be identified in SSA form since there is only one static location at which any scalar variable is set to a value. When the output of an instruction other than an ω-assignment computes a variable which is an input to a φ-assignment, insert a MOVE instruction immediately after the instruction which copies the output of the instruction to the variable which is the output of the φ-assignment.
(2) Remove all φ-assignments and ω-assignments.

Note that the reverse conversion does not recover the original program. It does, however, yield a semantically equivalent program which is in SMA (i.e., executable) form. That is, if we convert an original routine, which is always in SMA form when written in a language such as C, to SSA form, and then to SMA form, the final SMA-form of program is unlikely to be identical to the SMA-original, although it is functionally equivalent to it.

3. Base Function Pairs and Their Implementation

In this section, we propose a method for generating pairs of white-box trapdoor one-way functions, and especially for generating white-box trapdoor one-way bijections in mutually inverse pairs, such that an attacker, provided with the implementation of one member of such a pair, cannot readily find an implementation for its inverse (the other member of the pair), nor can the attacker readily find point inversions for the provided implementation.

3.1. White-Box Trapdoor One-Way Functions: Definitions. We define what a trapdoor one-way function is in general, then deal with the white-box case, and finish with separation of the entropy in implementations into key and randomization entropy.

3.1.1. Trapdoor One-Way Functions. We start with the following definitions taken from [31].

Total $f: X \mapsto Y$ is a one-way function iff $f(x)$ is 'easily' computed $\forall x \in X$, but it is 'computationally infeasible' to compute $x: \!\!-\!\! f(x) = y$ for 'almost all' $y \in f\{X\}$.

$f$ above is a trapdoor one-way function iff $f$ is a one-way function and $\exists s: \!\!-\!\! $it is, given s, computationally feasible for any $y \in f\{X\}$ to find $x: \!\!-\!\! f(x) = y$. (If $f$ is a bijection, $f^{-1}$ is such an s.)

3.1.2. White-Box Trapdoor One-Way Functions. To the above standard definitions from [31], we add the following non-standard definitions for the white-box attack context.

$f$ above is a white-box one-way function iff $f$ is designed to be implementable so as to have the one-way function property under white-box attack. Similarly, $f$ is a white-box trapdoor one-way function iff $f$ is designed to be implementable so as to have the trapdoor one-way function property under white-box attack.

Bijection $f: X \mapsto Y$ is a one-way bijection iff $f(x)$ is is 'easily' computed $\forall x \in X$, but it is 'computationally infeasible' to find $x: \!\!-\!\! x = f^{-1}(y)$ for 'almost all' $y \in Y$.

Bijection $f$ above is a trapdoor one-way bijection iff $f: X \mapsto Y$ is a one-way bijection and $\exists s: \!\!-\!\! $it is, given s, computationally feasible for any $y \in Y$ to find $x: \!\!-\!\! x = f^{-1}(y)$. (For example, a symmetric cipher $f$ which has been partially evaluated with respect to a key s, is a trapdoor one-way bijection: the secret information is the key s.)

Bijection $f$ above is a white-box one-way bijection iff $f$ is designed to be implementable so as to have the one-way bijection property under white-box attack. Similarly, $f$ is a white-box trapdoor one-way bijection iff $f$ is designed to be implementable so as to have the trapdoor one-way bijection property under white-box attack. (For example, an effective white-box fixed-key implementation of a symmetric cipher $f$ is a white-box one-way trapdoor bijection: the secret information s is the key.)

N.B.: A white-box trapdoor one-way bijection implementation is an implementation of a bijection $f$ such that, given that implementation of $f$, without secret information, it is hard to find a computationally feasible implementation of $f^{-1}$. (The specific secret information could itself be a computationally feasible implementation of $f^{-1}$.)

3.1.3. Key-Entropy and Randomization-Entropy. We find two functions $f_K$, $f_K^{-1}$ such that, given a particular construction algorithm, a definition of $f_K$ and $f_K^{-1}$ can be found given only K. K is the key-entropy.

We then find two implementations $p_{R_1}$ and $q_{R_2}$ where $p_{R_1}$ implements $f_K$ and $q_{R_2}$ implements $f_K^{-1}$. $R_1$ and $R_2$ provide randomization-entropy which does not affect functionality: it is only used to determine how the functionality is represented in hopes of obscuring the implementation sufficiently to prevent cracking of the implementations for a period of time.

$p_{R_1}$ and $q_{R_2}$ comprise our mutually-inverse base function implementation pair.

3.2. Security: History, Theory, and Proposed Approach.

Our initial attempts to build white-box trapdoor one-way function implementations in mutually inverse pairs were based on the expectation of the intractability of disambiguation of high-order polynomial encodings (see § 2.3) of linear functions and deeply nonlinear function-indexed interleavings (see § 2.9.2) of linear functions, plus a few other operations to eliminate the T-function property of such implementations over computer arithmetic (i.e., over $Z/(2^w)$ with typical w=32).

It has been demonstrated conclusively that this expectation is false: any such attempt to produce an intractable disambiguation problem by means of encoding alone fails because encodings simple enough to use are also simple enough to analyse efficiently.

This led us to seek programmatic defenses, in which encodings indeed play a part, but in which they work in concert with dynamic programmatic mechanisms (control-flow, routine calls, broader data organization, etc.). Many problems related to programs are difficult. We have proven, for example, that redundancy and reachability problems for control-flow flattening in the presence of encoding are worst-case PSPACE-hard [9].

More generally, we have Rice's Theorem, which states that, for any non-trivial property of partial functions, there is no general and effective method to decide whether a given algorithm computes a function with that property. ('Trivial' means that the property either holds either for all partial functions or for no partial functions.) The theorem is named after Henry Gordon Rice, and is also known as the "Rice-Myhill-Shapiro Theorem" after Rice, John Myhill, and Norman Shapiro.

An alternative statement of Rice's Theorem is the following. Let S be a set of languages[2] that is non-trivial, meaning that:

[2] A language is a set of strings over an alphabet. An alphabet is a finite, non-empty set.

(1) there is a Turing machine (TM) which recognizes a language in S, and (2) there is a TM which recognizes a language not in S.

Then it is undecidable whether the language decided by an arbitrary TM lies in S.

Rice's theorem applies only to linguistic properties, not operational ones. E.g. it is decidable whether a TM halts on a given input in ≤k steps, it is decidable whether a TM halts on every input in ≤k steps, and it is decidable whether a TM ever halts in ≤k steps. However, the general impossibility of virus recognition is linguistic and Rice's Theorem implies that a perfectly general virus recognizer is impossible.

Patents in Irdeto's patent portfolio include software obfuscation and tamper-resistance implemented by means of data-flow encoding [5, 7, 8] (the encoding of scalars and vectors and operations upon them), control-flow encoding [6] (modification of control-flow in a program to make it input-dependent with a many-to-many mapping from functions computed and chunks of code to compute them), and mass-data encoding [20] (software-based virtual memory or memories in which logical addresses are physically scattered and are also dynamically recoded and physically moved around over time by a background process).

Of the above methods for obfuscating software and rendering it tamper-resistant, data-flow encoding is primarily a static process (although variable-dependent coding, in which the coëfficients for the encoding of certain variables and vectors are provided by other variables and vectors, renders it potentially somewhat dynamic), whereas control-flow encoding and mass-data encoding are primarily dynamic: data structures are planned statically, but the actual operation of these software protections is largely a result of the dynamic operations performed on these data-structures at run-time.

The control-flow encoding was primarily aimed at (1) reducing repeatability to foil dynamic attacks, and (2) protecting disambiguation of control-flow by burying the normal control-flow of a program in considerable extra control-flow. The mass-data encoding was originally aimed at finding an encoding which would work correctly in the presence of a high degree of dynamic aliasing: e.g., in C programs making aggressive use of pointers.

A difficulty with the above forms of dynamic encoding is that the support data structures (dispatch and register-mapping tables for control-flow encoding, virtual-memory en/de-code tables and address-mapping tables for mass-data encoding) themselves leak information.

We propose to use protections similar to a combination of control-flow encoding and mass-data encoding, but with a sharp reduction in specialized data-structures, by moving most of the specialized processing which they support from run-time to compile-time. Let us call this new form of protection, with much of the dynamic variability of control-flow encoding and mass-data encoding, but with specialized data-structures moved from run-time to compile time, dynamic data mangling.

A benefit of eliminating most of the specialized data-structures at run-time is that the operations which support dynamic data mangling become harder to distinguish from the code to which it is applied.

3.3. Choosing Invertible Matrices over $Z/(2^w)$.

To create an invertible matrix M over $Z/(2^w)$ and its inverse $M^{-1}$, we proceed as follows.

Choose upper-triangular invertible matrices with nonzero elements on and above the diagonal, where an n×n upper-triangular invertible matrix $U=[u_{i,j}]_{n \times n}$ is chosen so that if i<j, $u_{i,j} \leftarrow 1+\text{rand}(2^w-1)$, if i=j, $u_{i,j} \leftarrow 1+2 \times \text{rand}(2^{w-1})$, and if i>j, $u_{i,j} \leftarrow 0$.

Since all diagonal elements are odd, U is certainly invertible.

Independently choose two such random upper triangular matrices X, Y. Then $M \leftarrow XY^T$ and $M^{-1} \leftarrow (Y^T)^{-1}X^{-1}$.

This approach ensures that the computation of inverses is very easy since all inversions are computed on upper triangular matrices, which are already in row-echelon form where all leading row elements are units of $Z/(2^w)$.

3.4. Virtual Machine and Instruction Set.

The proposed form of implementations is programmatic and operational. We therefore define it from the ground up in terms of a virtual machine (VM) with a single thread of control (no parallelism, no time-slicing) with an instruction set based on the operations in the language C as implemented by modern compilers (gcc for GNU/Linux, CL.EXE for MS Windows) for both Intel IA32 and Intel IA64 instruction-set architectures, where the default size of a (signed) int or unsigned int is 32-bits. The VM instruction set operates without overflow checking, interpreting 32-bit words as unsigned quantities except where otherwise stated.

3.4.1. Root Instructions.
Root instructions comprise seven fields: a 29-bit opcode, three 1-bit literal flags L1, L2, L3, and three 32-bit operands operand 1, operand 2, operand 3, each of which is literal if the corresponding literal flag is set and a register number otherwise (see The root instruction set is shown in Table 3.

3.4.2. Implied Instructions and the Basic Instruction Set.
Implied instructions, each based on special use of a basic instruction, are shown in Table 4.

The set comprising the root and implied instructions comprises the VM's basic instruction set.

3.4.3. Correspondence with C Language Operators.
The basic instructions closely correspond to operators in the language C.

The Boolean comparisons EQ, NE, ULT, ULE, SLT, SLE, and their implied counterparts UGE, UGT, SGT, SGE, produce 1 if the comparison is true and 0 otherwise. All arithmetic is 32-bit arithmetic with no overflow checking, as is typical of C language implementations, and all arithmetic is unsigned except where otherwise noted.

Note that ADD, SUB, MUL, DIV, REM, AND, OR, XOR, EQ, NE, ULT, ULE, UGT, UGE, LLSH, and LRSH correspond to C binary operations +, -, *, /, %, &, |, ^, ==, !=, <, <=, >, >=, <<, >>, respectively, with unsigned int operands assuming 32-bit unsigned ints. Similarly,

TABLE 3

Virtual Machine Root Instruction Set

| Opcode | Mnemonic | Operands | Effect |
| --- | --- | --- | --- |
| 0 | HALT | (ignored) | halt execution |
| 1 | ADD | $d_1 \leftarrow i_2, i_3$ | $d_1 \leftarrow i_2 + i_3$ in $Z/(2^{32})$ |
| 2 | SUB | $d_1 \leftarrow i_2, i_3$ | $d_1 \leftarrow i_2 - i_3$ in $Z/(2^{32})$ |
| 3 | MUL | $d_1 \leftarrow i_2, i_3$ | $d_1 \leftarrow i_2 \times i_3$ in $Z/(2^{32})$ |
| 4 | DIV | $d_1 \leftarrow i_2, i_3$ | $d_1 \leftarrow \lfloor i_2/i_3 \rfloor$ in $N_0$ |
| 5 | REM | $d_1 \leftarrow i_2, i_3$ | $d_1 \leftarrow i_2 \bmod i_3$ in $N_0$ |
| 6 | AND | $d_1 \leftarrow i_2, i_3$ | $d_1 \leftarrow i_2 \wedge i_3$ bitwise |
| 7 | OR | $d_1 \leftarrow i_2, i_3$ | $d_1 \leftarrow i_2 \vee i_3$ bitwise |
| 8 | XOR | $d_1 \leftarrow i_2, i_3$ | $d_1 \leftarrow i_2 \oplus i_3$ bitwise |
| 9 | EQ | $d_1 \leftarrow i_2, i_3$ | $d_1 \leftarrow [i_1 = i_2]$ |
| 10 | NE | $d_1 \leftarrow i_2, i_3$ | $d_1 \leftarrow [i_1 \neq i_2]$ |
| 11 | ULT | $d_1 \leftarrow i_2, i_3$ | $d_1 \leftarrow [i_1 < i_2 \text{ unsigned}]$ |
| 12 | ULE | $d_1 \leftarrow i_2, i_3$ | $d_1 \leftarrow [i_1 \leq i_2 \text{ unsigned}]$ |
| 13 | SLT | $d_1 \leftarrow i_2, i_3$ | $d_1 \leftarrow [i_1 < i_2 \text{ signed}]$ |
| 14 | SLE | $d_1 \leftarrow i_2, i_3$ | $d_1 \leftarrow [i_1 \leq i_2 \text{ signed}]$ |
| 15 | LLSH | $d_1 \leftarrow i_2, i_3$ | $d_1 \leftarrow (i_2 \times 2^{i_3}) \bmod 2^{32}$ in $N_0$ |
| 16 | LRSH | $d_1 \leftarrow i_2, i_3$ | $d_1 \leftarrow \lfloor i_2/2^{i_3} \rfloor$ in $N_0$ |
| 17 | ARSH | $d_1 \leftarrow i_2, i_3$ | $d_1 \leftarrow \lfloor i_2/2^{i_3} \rfloor$ in $N_0$; then set ($i_3 \bmod 32$) high-order $d_1$ bits $\leftarrow \lfloor d_1/2^{31} \rfloor$ |
| 18 | LOAD | $d_1 \leftarrow i_2, i_3$ | $d_1 \leftarrow M[(i_2 + i_3) \bmod 2^{32}$ in $N_0]$ |
| 19 | STORE | $s_1 \rightarrow i_2, i_3$ | $M[(i_2 + i_3) \bmod 2^{32}$ in $N_0] \leftarrow s_1$ |
| 20 | JUMPZ | $i_1? i_2, i_3$ | PC $\leftarrow i_2 + i_3$ in $Z/(2^{32})$ if $i_1 = 0$ |
| 21 | JUMPNZ | $i_1? i_2, i_3$ | PC $\leftarrow i_2 + i_3$ in $Z/(2^{32})$ if $i_1 \neq 0$ |
| 22 | JUMPSUB | $d \leftarrow i_2, i_3$ | $d \leftarrow$ PC + 4; PC $\leftarrow i_2 + i_3$ |
| 23 | ENTER | $\rightarrow d_1, \ldots, d_k$ | enter routine, setting registers $d_1, \ldots, d_k$ to the routine inputs |
| 24 | EXIT | $\leftarrow s_1, \ldots, s_k$ | exit routine, taking the routine outputs from registers $s_1, \ldots, s_k$ | legend:
$s_1, \ldots, s_k$ source operands: registers; can't be literal
$d_1, \ldots, d_k$ destination operands: registers: can't be literal
$i_1, i_2, i_3$ input operands: register contents or literal
M[a] source/dest memory location, address = a
x ← v replace contents of x with value v
PC program counter (address of next instruction)

TABLE 4

Implied Virtual Machine Instructions

| Implied Instruction | Translation |
| --- | --- |
| MOVE $d_1 \leftarrow i_2$ | OR $d_1 \leftarrow i_2, 0$ |
| NEG $d_1 \leftarrow i_3$ | SUB $d_1 \leftarrow 0, i_3$ |
| NOT $d_1 \leftarrow i_2$ | XOR $d_1 \leftarrow i_2, (-1$ in $Z/(2^{32}))$ |
| UGT $d_1 \leftarrow i_3, i_2$ | ULT $d_1 \leftarrow i_2, i_3$ |
| UGE $d_1 \leftarrow i_3, i_2$ | ULE $d_1 \leftarrow i_2, i_3$ |
| SGT $d_1 \leftarrow i_3, i_2$ | SLT $d_1 \leftarrow i_2, i_3$ |
| SGE $d_1 \leftarrow i_3, i_2$ | SLE $d_1 \leftarrow i_2, i_3$ |
| JUMP $i_2, i_3$ | JUNIPZ 0? $i_2, i_3$ |

NEG, NOT correspond to unary C operators -, , respectively, with 32-bit unsigned int operands. Finally, SLT, SLE, SGT, SGE correspond to <, <=, >, >= with 32-bit int operands, llsh, arsh correspond to C<<, >>, respectively, with 32-bit int operands and a positive shift-count, and the capabilities of LOAD, STORE, JUMP, JUMPZ, JUMPNZ correspond to the memory access and control capabilities of C omitting bit-fields, function pointers, and function calls.

The above behavior on 32-bit ints and unsigned ints is not part of the ISO/IEC C standards, but it is the default behavior provided by both gcc on GNU Linux and CL.EXE on Windows for Intel IA32 and IA64 architectures.

Thus there is a close correspondence between the above VM instruction set semantics and the de facto standard for C implementations.

3.4.4. Macro Instructions.
Macro instructions represent idioms used in the implementation of base function pairs. Each macro instruction can very easily be expanded into a body of code which contains only basic instructions (see § 3.4.2), possibly with the use of some extra temporary registers. Reasonable expansions are obvious and therefore omitted.

The general form for a macro instruction is roughly $$\text{mnemonic[parameters] } d_1, \ldots, d_n \leftarrow s_1, \ldots, s_m$$

denoting a mapping taking an input vector comprising register values $(s_1, \ldots, s_m)$ and producing an output vector comprising register values $(d_1, \ldots, d_n)$.

The (one or more) parameters may be values, or one or more source registers (typically only one: $s_0$), or sequences of one or more instructions, in which case this inner sequence is modified by the outer macro instruction of which the sequence is a parameter.

The macro instructions comprise the following:

SAVEREGS☐ $s_1, \ldots, s_n \rightarrow r$

Store $s_i$ in M[d+i-1] for i=1, ..., n; then set r←r+n. Typically, r would specify the stack pointer register.

RESTOREREGS☐ $d_1, \ldots, d_n \leftarrow r$

Set r←r-n; then load $d_i$ from M[d+i-1] for i=1, ..., n. Typically, r would specify the stack pointer register.

LINEARMAP$[_m{}^nM]$ $d_1, \ldots, d_n \leftarrow s_1, \ldots, s_m$ where $_m{}^nM$ is an m×n matrix over $Z/(2^{32})$, which, where $s=(s_1, \ldots, s_m)$ and $d=(d_1, \ldots, d_n)$, computes d=Ms, with d, s treated as column vectors during the computation:

SHORTROTATE☐ $d_1, \ldots, d_n \leftarrow i_0: s_1, \ldots, s_n$ where, using register or literal $i_0$ and letting $$k \leftarrow (-1)^{i_0 \bmod 2}(\lfloor i_0/2 \rfloor \wedge 31),$$

with $\wedge$ computed bitwise over $B^{32}$, which computes, over $Z/(2^{32})$, $$d_i \leftarrow 2^k s_i + \lfloor 2^{k-32} s_i \rfloor$$

for i=1, ..., n when k≥0, and computes $$d_i \leftarrow 2^{32+k}s_i + \lfloor 2^k s_i \rfloor$$

for i=1, ..., n when k<0;

LONGROTATE□ $d_1, \ldots, d_n \leftarrow i_0: s_1, \ldots, s_n$ where, using register or literal $i_0$ and letting $$k \leftarrow (-1)^{k \bmod 2}\left(\left\lfloor \frac{i_0}{2} \right\rfloor \wedge 31\right),$$

with $\wedge$ computed bitwise over $B^{32}$, which, letting $$S = \sum_{i=1}^{n} 2^{32(n-i)}s_i \text{ and } D = \sum_{i=1}^{n} 2^{32(n-i)}d_i$$

over $\mathbf{N}_0$, computes, over $Z/(2^{32n})$, $$D \leftarrow 2^k S + \lfloor 2^{k-32n} S \rfloor$$

for i=1, ..., n when k≥0, and computes $$D \leftarrow 2^{32n+k}S + \lfloor 2^k S \rfloor$$

for i=1, ..., n when k<0;

SEQUENCE[$i_1, \ldots, i_k$] $d_1, \ldots, d_n \leftarrow s_1, \ldots, s_m$ where $i_1, \ldots, i_k$ are instructions, which computes the instructions sequentially, where $s_1, \ldots, s_m$ are the registers from which the sequence inputs and $d_1, \ldots, d_m$ are the registers to which it outputs;

SPLIT[$c_1, \ldots, c_k$] $d_1, \ldots, d_k \leftarrow s_1$ where $2 \le c_i \le 2^{32}-1$ for i=1, ..., k and $1 < \Pi_{i=1}^{k} c_i \le 2^{32}-1$, assigns $$d_i \leftarrow \left\lfloor \frac{s_1}{\prod_{j=1}^{i-1} c_j} \right\rfloor \bmod c_i,$$

for i=1, ..., k, where we assume $\Pi_{j=1}^{0} e(j)=1$ where e is an arbitrary function; i.e., the product of no elements at all is always 1;

CHOOSE[$i_1, \ldots, i_k$] $d_1, \ldots, d_n \leftarrow s_0: s_1, \ldots, s_m$ where $i_1, \ldots, i_k$ are instructions, which computes the single instruction $i_{\lfloor 2^{-32}s_0 k \rfloor + 1}$, where $s_1, \ldots, s_m$ are all the registers which are used as inputs by any of $i_1, \ldots, i_k$, $d_1, \ldots, d_m$ are all the register which are used as outputs by any of $i_1, \ldots, i_k$, and any register which may or may not be used as an input or output by the CHOOSE instruction must appear as both an input in $s_1, \ldots, s_m$ and an output in $d_1, \ldots, d_m$; where the expansion of a CHOOSE macro instruction into basic VM instructions uses a binary tree of comparisons as close to balanced as possible: for example, if k=16, there are 15 branches in a balanced binary tree, each having the form UGE d←s, n JUMPNZ d? T where T is the label to which control transfers when register s≥n, and the value of n at the tree root is $2^{31}$ (splitting the upper and lower half of the values), at its left descendant is $2^{30}$ (splitting the first and second quarter of the values), and at its right descendant is $2^{31}+2^{30}$ (splitting the third and fourth quarter of the values), and so on;

REPEAT[a,b,i] $d_1, \ldots, d_n \leftarrow i_0: s_1, \ldots, s_m$ where $i_0$ is either a literal or a register, executes i $d_1, \ldots, d_n \leftarrow s_1, \ldots, s_m$ $a + \lfloor 2^{32}(b-a+1)i_0 \rfloor$ times;

PERMUTE[$p_1, \ldots, p_k$] $d_1, \ldots, d_n \leftarrow s_0: s_1, \ldots, s_n$ where each of $p_1, \ldots, p_a$ is a permutation of (1, ..., n), which performs $d_i \leftarrow s_{pt(i)}$ for i=1, ..., n, where $t \leftarrow \lfloor 2^{-32}s_0 k \rfloor + 1$ (i.e., it places in $s_1, \ldots, s_n$ the permutation of $d_1, \ldots, d_n$ selected by $s_0$), with an expansion into basic VM instructions using the same as nearly as possibly balanced binary tree of comparisons and branches which was described for the CHOOSE macro instruction;

RECODE[$e_1, \ldots, e_n$] $d_1, \ldots, d_n \leftarrow s_1, \ldots, s_n$ computes $d_i \leftarrow e_i(s_i)$ for i=1, ..., n, which may be implemented either explicitly by straightforward code or implicitly by fracture:

ENCODE[$e_1, \ldots, e_n$] $d_1, \ldots, d_n \leftarrow s_1, \ldots, s_n$ computes $d_i \leftarrow e_i(s_i)$ for i=1, ..., n, with the implementation preference being an explicit application of the $e_i$'s, rather than an implicit (i.e., fracture) application of the $e_i$'s;

FRACTURE[$e_1, \ldots, e_n$] $d_1, \ldots, d_n \leftarrow s_1, \ldots, s_n$ computes $d_i \leftarrow e_i(s_i)$ for i=1, ..., n, with the implementation preference being an implicit (i.e., fracture) application of the $e_i$'s, rather than an explicit application of the $e_i$'s; and FUNIXINT[$m_{left}, n_{left}, m_{right}, n_{right}, i_{left}, i_{sel}, i_{right}$]
$d_1, \ldots, d_n \leftarrow s_1, \ldots, s_m$ where $m = m_{left} + m_{right}$ and $n = n_{left} + n_{right}$, computes $i_{left}$ $d_1, \ldots, d_{n_{left}} \leftarrow s_1, \ldots, s_{m_{left}}$ to obtain the left result, $i_{sel}$ $\sigma \leftarrow s_1, \ldots, s_{m_{left}}$ to obtain the selector, $\sigma$, and $i_{right}$ $d_{n_{left}+1}, \ldots, d_n \leftarrow \sigma, s_{m_{left}+1}, \ldots, s_m$ to obtain the right result, by a simplified variant of function-indexed interleaving which is not necessarily bijective, but plainly is bijective (i.e., total, 1-to-1, and onto) whenever $m_x = n_x$ for $x \in \{\text{left, right}\}$ with $i_{left}$ computing a bijective function and with any projection of $i_{right}$ obtained by arbitrarily fixing $\sigma$ computing a bijective function.

3.5. Modelling Program Structure. We use a model from the so-called red dragon book [1].

For every basic VM instruction other than the branch instructions JUMP, JUMPZ and JUMPNZ, the next instruction executed is the one immediately following the current instruction. Thus, in terms of control-flow, the program forms a graph in which the straight-line chunks of code which are only entered at the beginning and only left at the end, correspond to nodes in a graph.

Accordingly, during construction, we view our function routine implementations as control-flow graphs (CFGS: see § 2.1.3). Each node is identified with a basic block (BB): a sequence of VM instructions in which the first instruction is either the first instruction in the routine (always an ENTER instruction) or is the destination of a branch instruction, no other instruction in the basic block is the destination of a branch instruction, and the last instruction of the basic block is always a branch of an EXIT instruction.

We restrict the control-flow graph to have a single sink node, and only this sink node's BB ends in an EXIT instruction, so that there is exactly one ENTER instruction and one EXIT instruction in the routine.

Within a node of the CFG, except for any ENTER, EXIT, or branch instruction, the instructions can be viewed as a data-flow graph in which the ordering of the instructions is limited only by the dependencies among them. These are of three kinds:

(1) An instruction y is input-output-dependent on an instruction x iff y takes as an input a value produced as an output by x or y is input-output dependent on an instruction which is input-output dependent on x.
(2) A LOAD instruction y is load-store-dependent on STORE instruction x iff y loads a value from a location into which previously x stored that value, or if y is load-store dependent on an instruction which is load-store-dependent on x.
(3) A STORE instruction y is store-store-dependent on a STORE instruction x iff x stores into a location into which y subsequently stores, or if y is store-store-dependent on an instruction which is store-store-dependent on x.

These dependencies require that y be executed after x. The ordering of a basic block is then constrained to an ordering consistent with a topological sort of the instructions it contains using these dependencies as the partial order.

4. Mark I: 'Woodenman' Proposal

We include here our original proposal of a method for building white-box trapdoor one-way functions in mutually inverse pairs.

The proposal makes use of the following.

(1) Permutation polynomials over $Z/(2^w)$ with moduli $\geq 2^{32}$, used as encodings for integral values, addition, and multiplication-by-a-constant in $Z/(2^w)$.

We expect this to be practical due to the known limitation that every perm-poly over $Z/(2^w)$ is equivalent to one of degree$\leq w+1$. We expect such encodings to have high ambiguity due to the very large number of choices of numbers to add or multiply and encodings to employ: every perm-poly has many equivalent perm-polys.

(2) The function and function-inverse constructions of § 2.9 with a very large number of right-side function indices (i.e., a large limit n for the selector).

This will make the deep nonlinearity of the mutually inverse function pair fine-grained, making direct attacks on the underlying matrices more difficult.

(3) Use of fractures (see "encoding fracture" in the index) interfaces in the construction, including fractures among $g_i$ functions for i=1, . . . , n (since the $g_i$'s need not employ the same encodings, so long as they are all 1-to-1).

The effect of fractures is to further deepen the nonlinearity of the construction.

(4) Pairwise mixing of initial inputs and final outputs to spread the deep nonlinearity resulting from the construction evenly over the input and output spaces, and pairwise mixing of $f$ inputs and outputs, and pairwise mixing of $g_i$ inputs and outputs for i=1, . . . , n to foil homomorphic mapping attacks.

The construction is shown in FIG. 4 for the case where the mutually inverse functions map 8-vectors to 8-vectors, so that the interleaving of the BVM document's theorem on function-indexed interleaving, and its inversion corollary, employ an $f$ mapping 4-vectors to 4-vectors and $g_i$ functions mapping 4-vectors to 4-vectors for i=1, . . . , n. We will discuss final adjustments after the description of the initial construction per se.

(40) The eight input vector elements are mixed in pairs by 2×2 mixing operations, winch could be performed by encoded matrix mappings, where the matrices are over a ring such as $Z/(2^{32})$ or $Z/(2^{64})$. The matrix operations are expanded into encoded operations where the encodings are ring-based permutation polynomials. Only three kinds of operations need to be encoded so long as the mapping performed by the mixers is linear or affine: addition of two variables (addvar), addition of a constant to a variable (addcon), and multiplication of a variable by a constant (mulcon).

The purpose of the 2×2 mixing is this. If function-indexed interleaving is applied naïvely, the projection from inputs 1,3,5,7 to outputs 1,3,5,7 is linear up to I/O encoding, though the projection from inputs 2,4,6,8 to outputs 2,4,6,8 is not. By mixing inputs 1-2, 3-4, 5-6, 7-8, and, in (4) below) mixing outputs 1-2, 3-4, 5-6, 7-8, we ensure that such projections from inputs to outputs and linear up to I/O encoding do not exist.

(41) After step (40) above, we have eight intermediates, of which 1,3,5,7 will be directed to the left side and 2,4,6,8 will be directed to one of the $g_i$ functions according to the choice made by the function-indexed interleaving selector.

The selection function, which chooses which of the right-side functions will be used, is computed by the 1×4 mapper, another polynomially encoded affine operation over the ring. This mapper takes exactly the same input as the left-side function, to ensure that the inversion method of § 2.9.5 works.

(42) The Switch performs the actual selection of $g_o\langle\ \_\ \rangle$ by directing intermediates 2,4,6,8 from step (4) to the appropriate $g_i$ implementation.

Although this is shown in FIG. 4 as a simple switching of intermediates to the chosen $g_i$ implementation, in practice, the operation can be much more than this. In particular, it is highly desirable that the number of choices n be extremely large, so that our mutually bijective whitebox trapdoor one-way function implementations exhibit fine-grained deep nonlinearity. In order to achieve this, we must represent a huge number of $g_i$ implementations in limited space. As a starter, consider any nonsingular 4×4 matrix over $Z/(2^w)$ where w is expected to be 32, 64, or even larger. Assuming each row and column is unique, by permuting the rows and columns, we can obtain 576 distinct matrices. We can also vary the encodings at the boundaries (i.e., at the points where arrows communicate from one box to another in FIG. 4), and many other methods of variation exist. Thus we can fairly readily achieve a vast supply of $g_i$'s in a limited amount of space by properly implementing this 'Switch'.

(43) On the left side of FIG. 4, we mix the inputs to $f$ in pairs. This is done to foil homomorphic mapping attacks. In such an attack, we have a known kind of operation $z=x \diamond y$, and for any given unencoded operation $\diamond$, there are three slots to fill. Thus the number of possible guesses is bounded above by $r^3$ where r is the number of elements of the ring; i.e., by $2^{3w}$. Now suppose that the attacker enjoys the maximal expected 'birthday paradox' advantage. We then expect an attack complexity of $2^{3w/2}$, which for w=32 is $2^{48}$ tries and for w=64 is $2^{96}$ tries.

Now suppose that we can mix inputs in pairs. There are now five slots to guess, and the above attack complexity, again granting the attacker the maximal expected 'birthday paradox' advantage, is an attack complexity of $2^{5w/2}$, which for w=32 is $2^{80}$ tries and for w=64 is $2^{160}$ tries. Plainly, then, it is highly advantageous if we can inextricably mix inputs (and, for symmetry, outputs)—hence we have 2×2 mixings on entry to $f$.

(44) On the right side of FIG. 4, we mix time inputs to the $g_i$'s in pairs. This is done to foil homomorphic mapping attacks as noted in (4) above, and has the same advantages.

(45) The 4×4 mapper on the left side is a polynomially encoded linear or affine transformation.

(46) The 4×4 mappers on the right side are polynomially encoded linear or affine transformations.

(47) The implementation of $f$ ends by mixing outputs in pairs. Partly this is done to make homomorphic mapping attacks more difficult directly; partly it is done to ensure that the inputs are mixed in pairs in the inverse function for the reasons given in (4) above, since the $f^{-1}$ implementation involves the reverse composition of that shown in FIG. 1, so that inputs become outputs and vice versa.

(48) Similarly, the implementation of each $g_i$ (in terms of the BVM document's theorem on function-indexed interleaving) ends by mixing outputs in pairs, both to make homomorphic mappings attacks more costly and to ensure that the inputs are mixed in pairs in each $g_i^{-1}$, since the $g_i^{-1}$ implementations involve the reverse composition of that shown in FIG. 4, so that inputs become outputs and vice versa.

(49) Finally. the final outputs are mixed in pairs, perhaps by polynomially encoded 2×2 matrix operations, just as the initial inputs were in (40), in order to ensure that no projections of numbers of inputs to numbers of outputs exist which are linear up to I/O encoding, but rather that all such projections are deeply nonlinear.

The final adjustments modify the structure found in FIG. 4 as follows.

By using identities, including MBA identities, the boundaries (represented in FIG. 4 by arrows denoting data-flow) are blurred, in order to mix computations denoted by blocks in the figure with computations in successor blocks. Since we have complete control over the encodings used in the blocks, we are well positioned to achieve such blurring.

We make liberal use of the fractures noted in item (84, item 3) to help ensure that the implementation is nonlinear at every level.

We optimize the implementation to ensure adequate performance. For example, when many polynomials are employed, the powers of an input are computed once for all uses of that input.

5. Mark II

The Mark II proposal is similar to Mark I (see § 4) in that it had a fixed internal structure, with only coefficient variations among base function implementation pairs.

5.1. Initial Structure: Choosing $f_K$ and $f_K^{-1}$. The initial program does not employ internal arrays. Except for the initial accessing of the input and the final delivery of the output (i.e., except for the implementation of the VM instructions ENTER and EXIT), all operations in the program are scalar and do not make use of LOAD or STORE instructions, which are only strictly needed for indexed memory access.

All computations operate on $B^{32}$ and produce results from $B^{32}$, but for ADD, SUB, MUL, such values are interpreted as elements of $Z/(2^{32})$ and the results are the appropriate +, −, × results for that modular ring. That is, C computer operations +, −, *, &, |, ^, and , are those appropriate for unsigned int operands in a typical 32-bit machine implementation with no overflow checking.

We consume K (key) entropy in the construction of $f_K$, and the specification of $f_K$ then admits of only one specification of $f_K^{-1}$ with exactly the same structure (but with different coëfficients, of course).

The basic structure of either $f_K$ or $f_K^{-1}$ is shown in FIG. 5 (the first half) and FIG. 6 (the second half), where circled a, b, c, d, e, f, g, h denote off-page connectors.

5.1.1. Data-Flow. The data-flow along the arrows in FIGS. 5 and 6 is always an element of $B^{32}$ (a 32-bit word) travelling from the beginning of the arrow to the arrowhead. When an arrow splits in two directions, the word is carried to the point denoted by both of the arrowheads.

5.1.2. Independent, Random Choice of Similar Components. For the $f_K$ specification, where two components in FIGS. 5 and 6 have the same label, they are chosen independently of one another; indeed, every component is chosen randomly and independently, uninfluenced by any other component. For the $f_K^{-1}$ specification, of course, all components are chosen so as to specify the functional inverse of the $f_K$ defined by the $f_K$ specification, so that once the $f_K$ specification has been chosen, the $f_K^{-1}$ specification is nailed: no further K entropy is consumed to construct it.

5.1.3. n×n Versus n:n. Some component labels in FIGS. 5 and 6 use an n×n label, such as 4×4 L or 8×8 permutation, whereas others use an n:n label, such as 8:8 recode or 4:4 recode.

The n×n indicates that the component has n inputs and n outputs, and executing the component can move entropy from an input to a non-corresponding output (as in mapping a vector through a matrix).

The n:n indicates that the component has n inputs and n outputs, and executing the component can only move entropy front an input to a corresponding output; i.e., in effect, such a component consists of n side-by-side scalar operations, so that a 4:4 recode takes four scalar values, and recodes each one separately with no interaction with any of the others.

5.1.4. Selection Components. The selection components in FIGS. 5 and 6 are labelled select 1 of 2 4×4 permut'ns or select 1 of 2 4:4 recodes.

Those labelled select 1 of 2 4×4 permut'ns have the form

PERMUTE[$p_1$, $p_2$] $d_1$, $d_2$, $d_3$, $d_4$←$s_0$:$s_1$, $s_2$, $s_3$, $s_4$ where $p_1$, $p_2$ are randomly chosen 4×4 permutations, with $s_0$ coming from a 4×4 S via a 4:4 recode.

Those labelled select 1 of 2 4:4 recodes have the form

CHOOSE[$r_i$, $r_2$] $d_1$, $d_2$, $d_3$, $d_4$←$s_0$:$s_1$, $s_2$, $s_3$, $s_4$ with $s_0$ coming from a 4×4 S via a 4:4 recode, where each $r_i$ is a VM macro instruction of the form RECODE[$e_1$, $e_2$, $e_3$, $e_4$] $d_1$, $d_2$, $d_3$, $d_4$←$s_1$, $s_2$, $s_3$, $s_4$ with all $e_i$ encodings in the RECODES chosen randomly for $f_K$.

5.1.5. Four Occurences of Function-Indexed Interleaving. Function-indexed interleaving, described in § 2.9.2, appears four times in an $f_K$ or $f_K^{-1}$ specification. Each time it comprises three 4×4 linear mappings (VM macro instruction LINEARMAP[$_4^4$M] . . . for some 4×4 matrix M), labelled 4×4 L, 4×4 S, and 4×4 R in FIGS. 5 and 6, whose 4×4 matrices are chosen independently using the method in § 3.3; together with one 4:4 recode (VM macro instruction RECODE[$e_1$, $e_2$, $e_3$, $e_4$] . . . , with the four $e_i$ encodings chosen randomly from the available permutation polynomial encodings), two occurrences of select 1 of 2 4×4 permut'ns, and two occurrences of select 1 of 2 4:4 recodes (see § 5.1.4).

Each instance of function-indexed interleaving has a single left-side function and $2^4=16$ right-side functions.

5.1.6. Other Components. The remaining components are not within instances of function-indexed interleaving, comprising three occurences of an 8:8 recode, each of the form $$\text{RECODE } [e_1, \ldots, e_8] \; d_1, \ldots, d_8 \leftarrow s_1, \ldots, s_8$$

and two occurences of an 8×8 PERMUTATION, each of the form $$\text{PERMUTE } [p] \; d_1, \ldots, d_8 \leftarrow 0: s_1, \ldots, s_8$$

with (for $f_K$) a single, randomly chosen permutation, and eight occurences of a 2×2 mixer, each of the form $$\text{LINEARMAP}[_2{}^2M] \; d_1, d_2 \leftarrow s_1, s_2$$

where M is a 2×2 matrix chosen, for $f_K$, by the method given in § 3.3.

5.2. Obfuscating $f_K$ or $f_K^{-1}$ Implementations. The following methods are employed to obscure a program implementing $f_K$ or $f_K^{-1}$, where implementations have the common structure detailed in § 5.1 and diagrammed in FIG. 5 and FIG. 6.

The transformations in the following performed one after are the other except where otherwise noted in the body of the sections.

5.2.1. Copy Elision. Naïve code for $f_K$ or $f_K^{-1}$ implementations contains many MOVE instructions. When a value is transferred from one register to another via MOVES through intermediate registers, it is often possible to eliminate the intermediate steps and transfer the result directly to the final destination.

This is especially effective in the case of PERMUTEs, which are naïvely implemented using sequences of MOVES. E.g., simplification of the initial and final 8×8 permutation means that the randomly chosen permutation only means that which data-flow source are first receives a particular input is chosen at random, and which data-flow sink arc finally delivers a particular output is chosen at random.

The rule is that any MOVE which can be eliminated by ordinary levels of optimization, must be eliminated; i.e., the final version of and obfuscated $f_K$ or $f_K^{-1}$ implementation must contain the smallest number of MOVE instructions achievable using ordinary (i.e., non-heroic) levels of optimization.

More specifically, assuming that we can readily associated a value producer with its value consumers in SSA form, those MOVES which must be elided are those which can be removed in SSA by renumbering outputs and reconverting to SSA until no further copy elisions occur.

A MOVE can be elided when it forms an arc in a tree of operations in which MOVES form the arcs, the original value producer (possibly ϕ-assignment) is the root, the root dominates the MOVE arcs and the consumers, and no consumer is itself a ϕ-assignment.

Copy elision can be performed at various points in the following process, and is certainly done as a final step to remove redundant MOVE instructions.

5.2.2. Branch-to-Branch Elision. A related form of elision can be performed on branches. If a basic block (BB) contains only an unconditional branch instruction (i.e., an unconditional JUMP basic instruction), then the target of any branch which branches to that BB can be modified to branch directly to the target of the JUMP to which it branches, eliminating a branch to an unconditional branch. This can repeated until no such branch-to-branch occurences remain, and any unreachable BB s which contain only an unconditional JUMP can then be removed.

Branch-to-branch elision can be performed at various points in the following process, and is certainly done as a final step to eliminate branch-to-unconditional-branch sequences.

5.2.3. Unused Code Elimination. When code is in SSA form, if any register is the output of an instruction x, but never the input of an instruction y, instruction x is unused code. We can repeatedly remove all such instructions until no unused code remains.

This can be done at various times during obfuscation, and is certainly done as a final step to eliminate unused code.

5.2.4. *Hash Insertion and Generation of Distinct Dynamic Values. Choose a 1×8 hash matrix of randomly chosen distinct odd elements over $Z/(2^{32})$ and generate code which maps the original inputs through this matrix yielding a single output. Place the code for the hash-matrix computation (initially a LINEARMAP macro-instruction) immediately following the initial ENTER instruction. The single output is a 'hash' of the inputs, and will be used to generate distinct dynamic values $\mathcal{C}_1, \mathcal{C}_2, \mathcal{C}_3, \ldots$ for memory shuffling (see § 5.2.13 on p. 46).

Next, choose a permutation polynomial (PP) $\mathcal{P}$, and, where z is the output register containing the output from the above matrix computation, insert code to generate $\mathcal{N}$ values $\mathcal{C}_i \leftarrow \mathcal{P}(z+i)$ over $Z/(2^\rho)$ where $\rho = \lceil \log_2 \mathcal{N} \rceil$ and $\mathcal{N}$'s derivation will be described later. Initially, the PP computations are inserted as a RECODE macro-instruction in which all the encodings are identically $\mathcal{P}$.

5.2.5. Macro-Instruction Expansion. All macro-instructions are expanded to sequences of basic instructions. The expansions are trivial and therefore omitted here.

After expansion. only basic instructions remain.

5.2.6. *Control-Flow Duplication. One matrix is added in § 5.2.4, mapping all eight inputs to one output, and there are 20 matrices shown in FIGS. 5 and 6, each denoting the mapping of two or four inputs to to or four outputs, respectively, each of the 21 matrix-mappings expanding into a contiguous sequence X of basic instructions with no internal branch (i.e., JUMP . . . ) instructions.

The hash matrix-computation is initially the first matrix-mapping computation. We take the code for matrices in a horizontal row, such as the 2×2 mixer row near the beginning and end of the CB structure in FIGS. 5 and 6, or the 4×4 L, 4×4 S sequence in each 'round', to be computed sequentially; i.e., first the code for the leftmost matrix, then the code for the one to its right, and so on. Moreover, in each 'round', we note that the code for the computation of the 4×4 L and 4×4 S matrix mappings necessarily precedes the code for the computation of the select 1 of 2 4×4 permut'ns, followed by the select 1 of 2 4:4 recodes, followed by the 4×4 R code, followed by the select 1 of 2 4×4 recodes, followed by the select 1 of 2 4×4 permut'ns at the right side of the figure.

In terms of the representation noted in § 3.5, depending on which of the 20 matrices we are dealing with, the code for computing the effect of the matrix on the 2- or 4-vector to which it is applied appears in the representation as a straight-line sequence of instructions which (1) occupies an entire basic block (BB) except for a final conditional branch sequence (a comparison followed by a conditional branch, taking the form of an ULT, JUMPNZ instruction pair, immediately following the matrix computation: e.g., this is initially the case for the matrices labelled 4×4 R in FIGS. 5 and 6, since they immediately follow the point at which the if-then-else structure, which contains a then-BB and an else-BB each ending with a JUMP to the BB containing the code for the 4×4 R matrix mapping followed by the conditional sequence (an ULT followed by the JUMPNZ ending the BB) selects one of two recodes as indicated in the diagram by a select 1 of 2 4:4 recodes following the 4×4 R; or (2) occurs in a BB with computational instructions both preceding and following it in the straight-line code of the BB; e.g., this is initially the case for each of the matrices labelled 4×4 L and 4×4 S in FIGS. 5 and 6, and for all of the matrices labelled 2×2 mixer in FIG. 5 and all but the leftmost matrix labelled 2×2 mixer in FIG. 6; or (3) occurs at the beginning of a BB and is followed by further computational instructions: this is the case for the leftmost matrix labelled 2×2 mixer in FIG. 6.

(4) occurs at the beginning of a BB and is followed by a branch instruction (JUMP . . . ) or a conditional branch instruction sequence (ULT, JUMPNZ): this does not initially occur in FIGS. 5 and 6, but might after processing described below.

In a manner described below, we replace each such block of matrix code with a branch to one of two copies of the block of code, terminated by a branch to a common point: i.e., in effect, replace the code

X with the code if $r<2^{31}$ then $X_1$ else $X_2$ where r is an output of an instruction dominating X (and hence the above if-construct) and the dominating instruction is chosen uniformly at random from the possible predecessors. $X_1$, $X_2$ are the then- and else-instances, respectively, of the block X of straight-line code.

To accomplish the above transformation, we proceed as follows per FIG. 9.

(900) If the implementation is not currently in SSA form, convert it to SSA form as described in § 2.10.1.

(905) Choose an instruction i uniformly at random from all of the instructions which have a single output and dominate the first instruction of the code for the subject matrix mapping.

(910) Convert the implementation to SMA form as described in § 2.10.2.

(915) Isolate the contiguous sequence of instructions comprising the matrix mapping code for the subject matrix. That is, if the first matrix-mapping instruction for the subject matrix does not begin a BB, place an unconditional JUMP instruction immediately before said first instruction, splitting the BB into two at that point, and if the last matrix-mapping instruction for the subject matrix does not immediately precede a JUMP . . . or EXIT instruction, insert an unconditional JUMP instruction immediately after said last instruction, splitting its BB into two at that point. At this point, the original BB has been longitudinally cut into multiple BBs zero, one, or two times, and the code for the subject matrix mapping is isolated in its own BB containing only that mapping code followed by a single unconditional JUMP instruction.

(920) Create two new BBS. The first, C (for 'choose'), contains only an ULT, JUMPNZ sequence implementing an if $r<2^{31}$ then . . . else . . .

decision. For register r, we use the output of our selected instruction i above. Letting X be our isolated BB above, the second is X', an exact copy of X in every respect except that it is a distinct, and initially isolated, graph node in what was originally a control-flow graph (CFG), but currently is not since CFGs do not have isolated nodes.

(925) Replace the original X in the CFG with C, X, X' as follows. Cause all branch-targets which originally pointed to X to point to C. Cause C's final branch to branch to X on the $<2^{31}$ and to X' on the $\geq 2^{31}$ alternative, respectively.

(930) Convert the implementation to SSA form, isolating the computations in X and X' from one another: at this point, they are distinct, but compute identical results.

(935) Perform branch-to-branch elision (see § 5.2.2).

Note that, while this replicates computations, it does not produce distinct copies for comparison, because, on each execution, only one of the two paths performing the matrix-mapping for a given matrix is executed.

5.2.7. Come-From Insertion. If the implementation is not currently in SMA form, convert it to SMA form (see § 2.10.2).

Then, for each Boolean comparison ULT instruction computing $r_B<2^{31}$ yielding 1 (if true) or 0 (if false) and providing its input to a JUMPNZ ('jump if true') instruction, randomly choose two constants $c_i \leftarrow \text{rand}(2^{32})$ and $c_2 \leftarrow \text{rand}(2^{32})$, and insert code after the comparison ULT but before the JUMPNZ instruction taking its input, where the inserted code computes $r_c \leftarrow c_2 + (c_1 - c_2)r_B$.

At the true destination of the JUMPNZ, insert $r_d \leftarrow c_1$, and at the false destination of the JUMPNZ, insert $r_d \leftarrow c_2$. (Recall that, when the code is in CFG form, each conditional branch has two targets.)

Remember that the outputs of the instructions computing $r_c$ and $r_d$ should be identical, for future use.

5.2.8. *Data-Flow Duplication. In a manner described below, for every instruction which is not a JUMP . . . , ENTER, or EXIT, the instruction is copied (so that an original instruction is immediately followed by its copy), and new registers are chosen for all of the copied instructions such that, if x and y are instructions, with y being the copy of x, (1) if x inputs the output of an ENTER instruction, then the corresponding y input uses the same output;

(2) if x inputs the output of an original instruction u with copy v, then the corresponding input of y inputs from the v output corresponding to the u output from which x inputs; and (3) if x outputs to an EXIT instruction, then the corresponding output of y outputs to a a special unused sink node indicating that its output is discarded.

Thus all of the computations except for the branches have an original and a copy occurence.

To accomplish this transformation, we proceed as follows, as shown in FIG. 10.

We add a new instruction JUMPA ('jump aribtrarily'), which is an unconditional branch with two destinations in control-flow graph (CFG) form, just like a conditional branch ( see § 3.5), but with no input: instead, JUMPA chooses between its two destinations at random. JUMPA is not actually part of the VM instruction set, and no JUMPA will occur in the final obfuscated implementation of $f_K$ or $f_K^{-1}$.

We use JUMPA in the following transformation procedure.

(1000) If the implementation is not in SMA form already, convert it to SMA form (see § 2.10.2).

(1005) For each of BB $X_i$ of the BBs in the implementation $X_1, \ldots, X_k$, replace it with three BBs $C_i$, $X_i$, $X'_i$ by creating a new BB $X'_i$ which is identical to $X_i$, and adding a now BB $C_i$ which contains only a single JUMPA instruction targetting both $X_i$ and $X'_i$, making $X_i$ and $X'_i$ the two targets of $C_i$'s JUMPA, and making every non-JUMPA branch-target pointing to $X_i$ point to $C_i$ instead.

(1010) Convert the implementation to SSA form (see § 2.10.1), isolating the local data-flow in each $X_i$ and $X'_i$, although corresponding instructions in $X_i$ and $X'_i$ still compute identical values.

(1015) Merge all of the code in each $X'_i$ back into its $X_i$, alternating instructions from $X_i$ and $X'_i$ in the merge so that corresponding pairs of instructions are successive: first the $X_i$ instruction, and then time corresponding $X'_i$ instruction.

(1020) Make each branch-target which is a $C_i$ point to the corresponding $X_i$ instead, and remove all of the $C_i$ and $X'_i$ BBS. At this point, the data-flow has been duplicated, the original shape of the CFG has been restored, and the implementation is free of JUMPA instructions. Remember which instructions correspond in each $X_i$ for future use.

5.2.9. *Random Cross-Connection. If the implementation is not currently in SSA form, convert the code to SSA form (see § 2.10.1). Due to the use of SSA form, some of the instructions $p_i$ below known to produce identical outputs may be $\phi$-assignments taking their inputs from non-$\phi$-assignment instructions known to produce identical outputs.

Due to transformations applied in § 5.2.6, § 5.2.8, and § 5.2.7, many instructions belong to pairs which are statically known to produce identical outputs. Such cases were noted in these sections, with the added remark that the information on such identical outputs should be retained for future use. We now make use of this saved information. The number of copies is always two: two for data-flow duplication, two for exported control-flow duplication (since both control- and data-flow duplication have been applied to them, but only one instance of a control-flow duplicated computation occurs in an execution of the implementation), and two for 'come-from' insertion.

There are two ways in which a pair of instructions in SSA form in the implementation can be known to have identical results as a result of the actions in § 5.2.6, § 5.2.8, and § 5.2.7. Two instructions can be data-flow duplicates of one another, or two $\phi$-assignments can have inputs known to be data-flow duplicates of one another due to control-flow duplication of matrix-mapping computations.

Let $u_1$, $u_2$ be a pair instructions which are known on the basis of such saved information to have identical outputs, each $u_i$ taking k inputs, where k is either one or two if the instruction is a basic instruction (e.g., NEG or MUL) and is two for a $\phi$-assignment following a control-flow duplicated matrix-mapping.

With probability ½, we flip use of the $u_1$, $u_2$ outputs as follows: for every instruction consuming the $u_1$ output (if any), we modify it to take the $u_2$ output instead, and vice versa.

We repeat this for every possible such pair $u_1$, $u_2$ until no such pairs remain to be considered for flipping.

The effect of this transformation is as follows. As a result of data-flow duplication, except for the very beginning and end of the implementation, data-flow is split into two distinct subgraphs which never overlap. After random cross-connection, these two data-flow graphs have been thoroughly merged into a single data-flow graph.

5.2.10. *Check Insertion. If the implementation is not currently in SSA form, convert it to SSA form (see § 2.10.1 on p. 26).

As in random cross-connection in § 5.2.9, we proceed through the pairs $u_1$, $u_2$, say, of instructions known to have identical outputs as a result of value duplication due to the processing in § 5.2.6, § 5.2.8, and § 5.2.7.

As in § 5.2.9, such instructions may either be basic instructions or $\phi$-assignments, and we use exactly the same criterion for identifying such pairs as in § 5.2.9.

Successively choose such pairs of instructions with known identical outputs due to duplication resulting from steps § 5.2.6, § 5.2.8, and § 5.2.7, until each pair has been chosen.

For each such instruction pair $u_a$, $u_b$, say, select, uniformly at random from all choices of $u_c$ not previously used as a $u_c$ in such processing, or if no such choice exists, from all choices of $u_c$ including those previously used as a $u_c$ in such processing, a single instruction $u_c$ such that $u_c$ is dominated by both of $u_a$, $u_b$. (If no such $u_c$ exists at all, do not further process the $u_a$, $u_b$ pair: simply proceed to the next pair, or if none remains, terminate the processing according to this section.)

Let $o_a$, $o_b$, $o_c$ be the outputs of $u_a$, $u_b$, $u_c$, respectively. Immediately following $u_c$, place code to compute $o_d \leftarrow o_c + o_a - o_b$, and cause all inputters of $o_c$ to input $o_d$ instead. (Since $o_a = o_b$, we should have $o_d = o_c$, so this should have no net effect unless an attacker tampers with the code.)

Continue such processing until all such pairs $u_a$, $u_b$ have been selected.

(The $r_c$, $r_d$ checks in connection with § 5.2.7 help prevent branch jamming; the others help to foil purturbation attacks by causing downstream computations to malfunction if one member of a pair is modified without modifying the other.)

5.2.11. Transcoding. If the implementation is not currently in SMA form, convert it to SMA form (see § 2.10.2).

Take each binary operation computing $$z \leftarrow f(x, y)$$

where $f$ is one of +, −, or *, and replace it with a computation which is the algebraic simplification of $$e_3(z) \leftarrow f(e_1^{-1}(x), e_2^{-1}(y))$$

or equivalently, replace the operation $f$ with an algebraic simplification of $$e_3 \circ f \circ [e_1^{-1}, e_2^{-1}]$$

such that for each arc connecting a producer to a consumer, the encoding (the $e_i$ function) of the produced value matches the encoding assumed by the consumer (where the inverse of the encoding is applied). That is, perform network encoding (see § 2.3.1).

When the output z above is used as the input of a comparison EQ, NE, ULT, UGT, ULE, UGE, SLT, SGT, SLE, SGE, or a conditional branch JUMPZ or JUMPNZ, $e_3$ must be the identity encoding. Moreover, any output derived as the final output of a RECODE macro-instruction, or the expansion of a RECODE macro-instruction, in the original program, cannot be further modified; i.e., the RECODE is taken to do a plain computation whose output cannot be encoded. Initial inputs and final outputs also use the identity encoding. That is, any output whose transcoding would change the function computed by the program is left it unencoded.

Where an input is a constant c, replace it with some constant $e_c(c)$, and treat it as if it came from a producer which produced it with encoding $e_c$.

Sometimes it is not possible to make all the producer and consumer encodings match everywhere they should. Where this occurs, produce with an output encoding $e_a$ and an input encoding $e_b$ and insert $e_b \circ e_a^{-1}$ on the arc to resolve the conflict.

Each $e_i$ is a bijective quadratic permutation polynomial (PP) function over $Z/(2^{32})$, or the inverse of such a PP, according to the scheme chosen for this purpose as described in Section C. Let us simply refer to them as PPS. Since PPS involve only multiplications and additions, a PP scan be computed as a sequence of affine steps, which we now assume to be the case.

5.2.12. Register Minimization. If the implementation is not in SMA form, convert it to SMA form (see § 2.10.2).

We now derive a conflict graph for the lifespans in registers. A lifespan begins when a value is produced (i.e., is output to the register by an instruction) and ends at the point where no further uses of the value are made (i.e., after the last time the value output by an instruction is used as an input with no intermediate changes to the register in between placing the value in the register and using it): that is, after the last consumer connected by a data-flow arc to the consumer has completed execution. Two lifespans conflict (i.e., overlap) if they begin at different producers and there is a point in execution at which both are both have been started and neither of them has ended.

We can view this as a graph where the lifespans are the nodes and an arc connects two nodes if and only if the lifespans conflict. The significance of the graph is that, if two lifespans conflict, their produced values must be stored in different registers, whereas if they do not, their produced values may be stored in the same register.

The VM permits an indefinite number of registers (well, $2^{32}$ of them, at any rate), but our purpose is to minimize the number of registers to increase the obscurity of shuffling values through memory by potentially making many different operations use the same location.

Starting with the nodes of minimal degree in the graph, we remove nodes one at a time with their incident arcs, until all nodes have been removed. We then reinsert them in reverse order, with any arcs which were removed with them, choosing registers for them as we reinsert them. This is a variant on Chaitin's algorithm, and tends to produce efficient graph colorings (i.e., register allocations) in the sense that the number of distinct colors (registers) tends towards the minimal number.

Retain lifespan information and the conflict graph for further use in § 5.2.13.

5.2.13. *Memory Shuffling. If the implementation is not in SSA form, convert it to SSA form (see § 2.10.1).

Include in the implementation a memory array A containing $2^\rho$ binary words, where $\rho = \lceil \log_2 \mathcal{N} \rceil$ (see § 5.2.4).

Identify in the code all instances of a contiguous pair of instructions (MUL,ADD) or (MUL,SUB) implementing an affine mapping $y \leftarrow sx+b$ or $y \leftarrow s(x+b/s)$ (depending on which instruction precedes the other), where s, b, and b/s are constant inputs and x is a non-consant input, and in which either the MUL is the only instruction which inputs the output of the ADD or SUB, or vice versa, and in which the affine output value y is subsequently used as an input by some other instruction. Once such a pair has been found, remove it from further consideration, but continue until all such pairs have been found. Call these pairs $P_1, \ldots, P_N$. Note each such pair has only a single non-constant input x.

Associate with $P_1, \ldots, P_N$ values $K_1, \ldots, K_N$, initially all equal to 1.

Traverse $K_1, \ldots, K_N$. At each $K_i$, probability ½ changing each traversee's value to 2. Traverse the $K_i$'s of value 2, with probability ½ changing each traversee's value to 3. Traverse the $K_i$'s of value 3, with probability ½ changing each traversee's value to 4.

At this point, for each pair $P_i$, there is a value $K_i$ with a value belonging to the set $\{1, 2, 3, 4\}$.

Define $R_1, \ldots, R_N$ as follows. Let $R_i$ be the number of points in the live range of the pair's output (the y computed by the affine mapping above) at which a non-branch basic instruction can be inserted which would lie in the live range if it were inserted. $R_i$ is a measure of the size of the live range.

Define $W_1, \ldots, W_N$ as follows. Let $W_i$ be the cardinality of the largest set of instructions overlapping the live range (i.e., either in the live range, or starting the live range by outputting its value, or terminating a path in the live range by consuming its value) such that no member of the set dominates any of the others. This estimates the 'width' or path-multiplicity of the live range.

For each such live range of a y winch is the output of a pair $P_i$, with a probability which is the smaller of 1 and $K_i W_i/R_i$, select each point at which an instruction can be inserted into the range as noted above, so that, in the fairly common case where $W_i=1$, there is an expected number $K_i$ of such selected points in the live range for the y output of $P_i$. Let the set of selected points for a given live range be $S_i$ so that the expected value of $|S_i|=K_i$ where $W_i=1$. (Of course, the actual value of $|S_i|$ may differ.)

Define $F_1, \ldots, F_N$ as follows. In the live range of the y-output of pair $P_i$, plainly each instruction, say w, inputting this y-output is dominated by the pair-member producing the y-output: call it m. If for each such w, there is an s∈S so that m dominates s which in turn dominates w, $F_i=1$. Otherwise, $F_i=0$.

We now restrict our attention to those pairs $P_i$ for which $F_i=1$. For each such pair $P_i$, we allocate a new set of $|S_i|+1$ indexes in A, $\mathcal{C}_j, \ldots, \mathcal{C}_{j+|S_i|}$ (see § 5.2.4), so that $P_i$, and each member of $S_i$, has its own assigned index. We reüse indices as much as possible among $P_i$, $S_i$ pairs under the constraint that the set of indices for a given $P_i$, $S_i$ pair can overlap with the set of indices for another only if their corresponding $P_i$ y-outputs are not connected by an arc in the conflict graph (i.e., if their live ranges to not overlap: see § 5.2.12).

Remove the pair $P_i$—a (MUL,ADD) or (MUL,SUB)—replacing it with a RECODE, STORE, LOAD, RECODE sequence. Each RECODE maps one input to one output, so we recode a value on each store and load. There is then a sequence $s_1, \ldots, s_k$, w such that the final RECODE above dominates $s_1, \ldots, s_k$, w, where $s_1, \ldots, s_k \in S_i$, w is an instruction inputting the y-output of the removed $P_i$, and each element of the sequence $s_1, \ldots, s_k$, w dominates its successors. As a result, we take the x-input of the removed sequence, map it through 2(k+1) RECODEs, and then pass it to w. We modify the final RECODE so that the net effect of the series of recodings is to provide y to w with the input-encoding expected by w; i.e., we introduce a fracture which computes $y \leftarrow sx+b$ by modifying the last encoding in the sequence. We repeat this for all instructions w, never changing an intermediate encoding once it has been chosen (since some $s_i$'s may appear on paths to multiple y-consumers w); i.e., if recodings have been chosen for one path, don't change them for another overlapping path.

We proceed as above for every pair $P_i$ for which $F_i=1$. We then convert the implementation to SMA form (see § 2.10.2) and expand all of the RECODE macro-instructions.

5.2.14. Random Instructions Reördering. If the implementation is not in SSA form, convert it to SSA form (see § 2.10.1).

Ensuring that redundant MOVE instructions are first elided (see § 5.2.1), reörder the instructions in each BB as a topological sort of its instructions using the dependency-based partial order in § 3.5. Among the candidate successors of an instruction during the sort, the successor is chosen uniformly at random.

5.2.15. Final Cleanups and Code Emission. Perform copy elision (see § 5.2.1), branch-to-branch elision (see § 5.2.2), and unused code elimination (see § 5.2.3).

Perform register minimization (see § 5.2.12) to minimize the number of registers (temporary variables), but making no attempt to change the number of locations used in the shuffling array A (see § 5.2.13). When minimization completes, the code is in SMA form.

Emit the code.

6. ClearBox Mark III

The Mark III proposal differs from that for Mark I (see § 4) and Mark II (see § 5) in that it has a variable internal structure in which both coëfficients and structure vary among Base function implementation pairs.

As previously, the primary vehicle is a mutually inverse pair of cipher- or hash-like function implementations formed in mutually inverse pairs according to an algorithm, belonging to a very large family of such pairs, with the precise pair determined both by the algorithm and a (typically large) key K. In addition to the key information K, the algorithm which forms the pairs consumes randomization information R, which is used to specify those obfuscational aspects of the implementation which do not affect the external behavior of the pair, but only the internal processing by which this external behavior is achieved.

6.1. Design Principles. We expect Mark III to be used in environments in which the implementation is exposed to white- and/or grey-box attacks, and in which the operation of the applications making use of Mark III involve communication across a network.

6.1.1. Security-Refresh Rate. For effective applications security lifecycle management, applications must resist attacks on an ongoing basis. As part of this resistance, we expect such applications to self-upgrade in response to security-refresh messages containing security renewal information. Such upgrades may involve patch files, table replacements, new cryptographic keys, and other security-related information.

A viable level of security is one in application security is refreshed frequently enough so that the time taken to compromise an instance's security is longer than the time to the security-refresh which invalidates the compromise; i.e., instances are refreshed faster than they can typically be broken.

This is certainly achievable at very high security-refresh rates. However, such frequent refresh actions consume bandwidth, and as we raise the refresh rate, the proportion of bandwidth allocated to security-refresh messages increases, and available non-security payload bandwidth decreases.

Plainly, then, engineering the appropriate security-refresh rate is required for each kind of application, since the tolerable overheads vary greatly depending on context. For example, if we expect only gray-box attacks (neighbor side-channel attacks) in a cloud application, we would use a lower refresh rate than if we expected white-box attacks (insider attacks by malicious cloud-provider staff).

6.1.2. External and Internal Vulnerabilities and Attack-Resistance. Suppose that our pair of implementations implement functions $f_K$, $f_K^{-1}$ where $f_K$, $f_K^{-1}$ are T-functions. Then by repeatedly applying either of these functions, we can precisely characterize its computations using a bit-slice attack in which we first consider the operation of these functions ignoring all but the low-order bits, and then the low-order two bits, and so on, gaining information until the full word size (say 32 bits) is reached, at which point we have complete information on how the function behaves, which is tantamount to knowledge of the key K.

This is an external vulnerability. While the attack gains knowledge of implementation details, it does so without any examination of the code implementing those details, and could be performed as an a adaptive known plaintext attack on a black-box implementation.

A less severe external vulnerability exists if the functions of the pair have the property that each acts as a specific T-function on specific domains, and the number of distinct T-functions is low. In this case, a statistical bucketing attack can characterize each T-function. Then if the domains can similarly be characterized, again, without any examination of the code, using an adaptive known plaintext attack, an attacker can fully characterize the functionality of a member of the pair, completely bypassing its protections, using only black-box methods.

Plainly, we must ensure that the effective number of distinct T-functions is sufficient to foil the above attack. (In Mark III implementations, there are over $10^8$ distinct T-functions per segment and over $10^{40}$ T-functions over all.)

Now, suppose that the pair of implementations comprises functions which achieve full cascade (every output depends on every input, and on average, changing one input bit changes half of the output bits). An example of an internal vulnerability occurs in the Mark II implementation where, by 'cutting' the implementation at certain points, we can find a sub-implementation (a component) corresponding to a matrix such that the level of dependency is exactly 2×2 (in which case the component is a matrix) or 4×4 (in which case it is one of the L, S, or R matrices. Once these have been isolated, properties of linear functions allow very efficient characterization of these matrices.

This is an internal attack because it requires non-black-box methods: it actually requires examination of internals of the implementations, whether static (to determine the dependencies) or dynamic (to characterize the matrices by linearity-based analyses).

As a general rule, the more we can completely foil external attacks, and force the attacker into increasingly fine-grained internal attacks, the harder the attacker's job becomes, and most especially, the harder the attacks become to automate.

Automated attacks are especially dangerous because they can effectively provide class cracks which allow all instances of a given techology to be broken by tools which can be widely distributed.

Thus, we seek, by using variable and increasingly intricate internal structures and increasingly variegated defenses, to create an environment in which
 (1) any full crack of an instance requires many sub-cracks;
 (2) the needed sub-cracks vary from instance to instance;
 (3) the structure and number of the attacked components varies from instance to instance; and
 (4) the protection mechanisms employed vary from instance to instance;

so that automating the attach becomes a sufficiently large task to discourage attackers from attempting it (since, in the substantial time it would take to build such an attack tool, the deployed protections would have moved on to a new technology where the attack-tool's algorithm no longer suffices).

6.2. Initial Structure: Choosing $f_K$ and $f_K^{-1}$. Mark III functions have an input and output width of 12 32-bit words for a total width of 384 bits. The implementation consists primarily of a series of segments, in which each segment is an instance of function-indexed interleaving (FII). The series of segments is preceded and followed by initial and final mixing steps intended to foil blind dependency-analysis attacks (ones performed starting at the inputs, used to derive dependency relations without considering the structural details of the implementation under attack).

We will mainly deal with $f_K$. The segment inverses are fairly obvious given our well-known FII methods, and the over-all $f_K^{-1}$ is found by concatenating the inverses of the $f_K$ segments in reverse order, sandwiched between the initial and final mixing steps in reverse order.

Each such segment has a left-function, a selector computation which uses the same inputs as the left-function, and a right-function. The right-function is a nested instance of FII. Hence each segment divides the input- and output-vectors into three subvectors: the portion which enters and exits the outer left-function, the portion which enters and exits the inner left-function, and the portion which enters and exits the inner right-function. We will call these the left, middle, and right subvectors.

6.2.1. Selecting Matrices Over $Z/(2^{32})$. We select matrices in two different ways:
general: select an m×m matrix over $Z/(2^{32})$ at random under the constraints that no element is a 0 or 1 and all elements are distinct; or
invertible: select an n×n matrix over $Z/(2^{32})$ according to the method given in § 3.3, but with the additional constraints that the resulting matrix contains no elements with value 0 or 1 and all elements are distinct.

6.2.2. *Initial and Final Mixing Steps. In § 2.8, we give techniques for permuting a sequence of elements or other forms of choices using decisions having a sorting-network topology. By replacing conditional swaps with 2×2 bijective matrices mixing each input into each output, we can take precisely the same network topology and produce a mixing network which mixes every input of the CB function with every other initially, and we can employ another such network finally to mix every output of the CB function with every other. As was the case with permutations, the mixing is not entirely even, and its bias can be reduced using the techniques in § 2.8.2, but again, with conditional swaps replaced by mixing steps.

6.2.3. *Subdividing a Segment's Input and Output Vectors. The following choices are an example only: many other choices are possible with different widths and wider choices of division-sizes.

If input subvectors for a segment are statically divided in a particular way, say 3-5-4 for left, middle, and right, respectively, then so are its outputs.

The permitted subvector lengths for the above are three, four, five, and six 32-bit words. Since each input and output vector has length twelve 32-bit words (384 bits), it follows that the ten permitted configurations, in lexicographic order from left to right and then down, are 3-3-6 3-4-5 3-5-4 3-6-3 4-3-5

4-4-4 4-5-3 5-3-4 5-4-3 6-3-3

If we number the above ten configurations in order from 0 to 9, then the number of the configuration chosen for each segment we generate is chosen statically by rand(10)l; i.e., we choose from the ten possibilities above uniformly at random at construction time.

6.2.4. *Selecting the Ordering for a Segment's Inputs and Outputs.

The first segment inputs the initial inputs to $f_K$ or $f_K^{-1}$, and hence is input-unconstrained. Similarly the last segment outputs to $f_K$ or $f_K^{-1}$, and hence is output-unconstrained. Thus the inputs of the first segment, or outputs of the last, are attached to the initial inputs or final outputs, respectively, uniformly at random.

In all other cases, we select the ordering of inputs and outputs of segments as follows.

We note that, for any segment, the outputs of its left output-subvector depends only on the inputs of its left input-subvector, the outputs of its middle output-subvector depends only on the inputs of its left and middle input-subvectors, and the outputs of its right output-subvector depend on the inputs of the left, middle, and right subvectors.

We therefore statically link the inputs of a segment Y to the outputs of its preceding segment X uniformly at random under the following constraints.

(1) Segment X's right output-vector outputs must have the maximal number of links to segment Y's left input-vector inputs. For example, if X is a 6-3-3 segment and Y is a 3-4-5 segment, then three of X's right output-subvector outputs are linked to three of Y's left input-subvector inputs.

(2) Any of segment X's right output-vector outputs which are not linked to segment Y's left input-vector inputs under constraint (1) above must be linked to segment Y's middle input-vector inputs. For example, in the 6-3-3 X, 3-4-5 Y case above, the remaining three of X's right output-vector outputs are linked to three of Y's middle input-vector inputs.

(3) After satisfaction of constraints (1) and (2) above, segment X's middle output-vector outputs are linked into the leftmost possible of Y's input-subvectors, where those in Y's left input-subvector are leftmost, those in Y's middle input-subvector are intermediate between leftmost and rightmost, and those in Y's right input-subvector are rightmost.

A summary of the above is that we statically attempt to maximize dependencies on inputs as we transfer information from one segment to the next. We are always guaranteed to achieve 'full cascade' after two segments (so that every output depends on every input), and we also try to maximize the width of the dataflow carrying these dependencies (hence constraints (2) and (3) above).

6.2.5. *A Concatenation of Segments. $f_K$ (and hence $f_K^{-1}$) is a sequence of segments. Each segment's basic configuration r-s-t is chosen statically according to § 6.2.3, and each is statically linked from the original inputs or from its predecessor according to § 6.2.4. The number of successive segments making up an $f_K$ (and hence $f_K^{-1}$) implementation is uniformly randomly chosen from the set $\{5, 6, 7\}$.

6.2.6. *Immutable Encodings. At certain points in the code, we use immutable encodings. The significance of an immutable encoding, whether it is the identity encoding, a linear encoding, or a permutation polynomial encoding, is that it cannot be changed when obfuscation is applied to the $f_K$ or $f_K^{-1}$ implementation: its presence is part of the semantics and therefore cannot be modified.

If immutable encodings are mentioned without specification of the encoding, a permutation polynomial is assumed.

6.2.7. *Creating a Segment. Given a configuration r-s-t (for example), we create an $f_K$ segment as follows, per FIG. 11.

(1100) Using the invertible method of § 6.2.1, choose an r×r matrix L, an s×s matrix M, and a t×t matrix R, and 24 uniformly randomly chosen immutable encodings: 12 applied to the inputs to these matrices and 12 applied to their outputs (viewing the matrices as vector-mapping functions). Let us refer to these three matrices with their input and output immutable encodings as functions $\mathcal{L}$, $\mathcal{M}$, $\mathcal{R}$. Then $\mathcal{L} = L_{out} \circ L \circ L_{in}$, $\mathcal{M} = M_{out} \circ M \circ M_{in}$, and $\mathcal{R} = R_{out} \circ R \circ R_{in}$, where $X_{out}$ performs the immutable output encodings, and $X_{in}$ performs the immutable input encodings, attached to matrix X, for X∈{L, M, R}.

(1105) Using the general method of § 6.2.1 on p. 50, choose a 1×r selector matrix C with corresponding function $\mathcal{C}$ which takes the same inputs as $\mathcal{R}$ and has input encodings $L_{in}$ and output encoding $C_{out}$; i.e., $\mathcal{L} = C_{out} \circ C \circ L_{in}$. (The corresponding $f_K^{-1}$ segment will have a selector of the form $C_{out} \circ C \circ L^{-1} \circ L_{out}^{-1}$—which will be simplified, of course.)

Take the two high-order bits of $\mathcal{C}$'s output and add 2 to form an iteration count in the range 2 to 5. One less than this iteration count is a number in the range 1 to 4 which is the number of times the outputs of the entire right side function (taking the s-t inputs and producing the s-t outputs) has its inputs fed directly back into its inputs and is executed all over again, before its outputs are passed on to a succeeding segment.

(1110) Choose 2s selector functions $\mathcal{I}_1, \ldots, \mathcal{I}_s$ and $\mathcal{O}_1, \ldots, \mathcal{O}_s$, each similar to $\mathcal{C}$ above. The high-order four bits of these provide numbers in the range 0 to 15, which added to 8, provide rotation counts in the range 8 to 23. The $\mathcal{I}_i$ rotation counts are applied to the inputs to $\mathcal{M}$ and the $\mathcal{O}_i$ rotation counts are applied to the outputs from $\mathcal{M}$.

These rotations are not permuted when the inputs and outputs of $\mathcal{M}$ are permuted in the next step.

(1115) Choose p≈s(log₂ s)² selector pairs $\mathcal{A}_1, \ldots, \mathcal{A}_p$, $\mathcal{B}_1, \ldots, \mathcal{B}_p$, $\mathcal{U}_1, \ldots, \mathcal{U}_p$, $\mathcal{V}_1, \ldots, \mathcal{V}_p$, each similar to $\mathcal{C}$ above, which provide just sufficient $\mathcal{A}_i$-to-$\mathcal{B}_i$ comparisons and sufficient $\mathcal{U}_i$-to-$\mathcal{V}_i$ comparisons to control our random permutation of the inputs to and outputs from $\mathcal{M}$, respectively, by the method of § 2.8 by controlling its random swaps. Each comparison generates a Boolean decision (swap or don't swap) with a swap probability of about ½.

The logical ordering of selected functionality around the s inputs and outputs for $\mathcal{M}$ is: initial rotations, then initial permutation, then input encodings, then matrix mapping, then t-input-output functionality (the $\mathcal{R}$-part functionality), then output encodings, then output permutation, then final rotations. When a selector uses $\mathcal{M}$ inputs, it uses them with the same encoding as $\mathcal{M}$ does (namely, the $M_{in}$ encodings), so irrespective of any permutations, a selector always sees exactly the same inputs in exactly the same order as $\mathcal{M}$ does.

Note that all of the above steps are the loop for the $\mathcal{M}$ functionality; i.e., everything from initial rotations to final rotations is performed on each iteration.

As a result, simplifications are possible: for example, the input encodings need not be done separately for $\mathcal{M}$ and the selectors which use $\mathcal{M}$'s inputs: they can share the same encoded values.

(1125) We now proceed with the inner FII implementation composed of the s-input-output part and the t-input-output part (the $\mathcal{M}$-functionality part and the $\mathcal{R}$-functionality part).

Using the general method of § 6.2.1, choose a 1×s selector matrix C' with corresponding function $\mathcal{C}'$ which takes the same inputs as $\mathcal{M}$ and has input encodings $L'_{in}$ and output encoding $C'_{out}$; i.e., $\mathcal{C}' = C'_{out} \circ C' \circ M_{in}$. (The corresponding $f_K^{-1}$ segment will have a selector of the form $C'_{out} \circ C' \circ L'^{-1} \circ L'_{out}^{-1}$—which will be simplified, of course.)

Take the two high-order bits of $\mathcal{C}'$'s output and add 2 to form an iteration count in the range 2 to 5. One less than this iteration count is a number in the range 1 to 4 which is the number of times the outputs of the $\mathcal{R}$ functionality (taking the t inputs and producing the t outputs) has its inputs fed directly back into its inputs and is executed all over again, during one iteration of the s-inputs-outputs, $\mathcal{M}$-part loop. I.e., in one iteration for the middle s-inputs-outputs part, all iterations for the t-inputs-outputs are performed, so if the s-part iterates four times and the t-part iteration count is three, the t-part is repeated 12 times: three times for each s-part iteration.

(1130) Choose 2t selector functions $\mathcal{I}'_1, \ldots, \mathcal{I}'_t$ and $\mathcal{O}'_1, \ldots, \mathcal{O}'_t$, each similar to $\mathcal{C}'$ above. The high-order four bits of these provide numbers in the range 0 to 15, which added to 8, provide rotation counts in the range 8 to 23. The $\mathcal{I}'_i$ rotation counts are applied to the inputs to $\mathcal{R}$ and the $\mathcal{O}'_i$ rotation counts are applied to the outputs from $\mathcal{R}$.

These rotations are not permuted when the inputs and outputs of $\mathcal{R}$ are permuted in the next step.

(1135) Choose, q≈t(log₂ t)² selector pairs $\mathcal{A}'_1, \ldots, \mathcal{A}'_q$, $\mathcal{B}'_1, \ldots, \mathcal{B}'_q$, $\mathcal{U}'_1, \ldots, \mathcal{U}'_q$, $\mathcal{V}'_1, \ldots, \mathcal{V}'_q$, each similar to $\mathcal{C}'$ above, which provide just sufficient $\mathcal{A}'_i$-to-$\mathcal{B}'_i$ comparisons and sufficient $\mathcal{U}'_i$-to-$\mathcal{V}'_i$ comparisons to control our random permutation of the inputs to and outputs from $\mathcal{R}$, respectively, by the method of § 2.8 by controlling its random swaps. Each comparison generates a Boolean decision (swap or don't swap) with a swap probability of about ½.

The logical ordering of selected functionality around the t inputs and outputs for $\mathcal{R}$ is: initial rotations, then initial permutation, then input encodings, then matrix mapping, then output encodings, then output permutation, then final rotations. When a selector uses $\mathcal{R}$ inputs, it uses them with the same encoding as $\mathcal{R}$ does (namely, the $R_{in}$ encodings), so irrespective of any permutations, a selector always sees exactly the same inputs in exactly the same order as $\mathcal{R}$ does.

Note that all of the above steps are inside the loop for the t-inputs-outputs ($\mathcal{R}$-part) functionality; i.e., everything from initial rotations to final rotations is performed on each iteration.

As a result, simplifications are possible: for example, the input encodings need not be done separately for $\mathcal{R}$ and the selectors winch use $\mathcal{R}$'s inputs: they can share the same encoded values.

6.3. Obfuscating $f_K$ or $f_K^{-1}$ Implementations. The following methods are employed to obscure a program implementing $f_K$ or $f_K^{-1}$, where implementations have the structure given in § 6. above.

The transformations in the following sections are performed one after the other except where otherwise noted in the body of the sections.

6.3.1. Cleanups. The cleanups listed in § 5.2.1, § 5.2.2, and § 5.2.3 are performed as needed, as in the Mark II implementation.

6.3.2. *Hash Insertion and Generation of Distinct Dynamic Values. The transform of § 5.2.4 is performed, but using a 1×12 matrix taking all of the inputs. Otherwise, this is very similar to the corresponding Mark II step.

6.3.3. Macro Instruction Expansion. This is done as in the Mark II implementation.

6.3.4. Come-From Insertion. This is done as in the Mark II implementation. Note that, in Mark III, all of the control-flow exists to create the nested per-segment loops.

6.3.5. Random Instruction Reordering. We note that, in function-indexed interleaving (FII) as employed in the generation of segments of the implementation, we have divided inputs and outputs into possibly irregular groups of widths r-s-t, respectively. In $f_K$ and $f_K^{-1}$, the r outputs depend only on the r inputs;
the s outputs depend on the r and s inputs; and
the t outputs depend on the r, s, and t inputs;

where the selector computation for the FII between r and s is considered part of the s computation, and the selector computation for the FII between s and t is considered part of t computation. Note that, with this understanding, the s outputs do not depend on the r outputs, and the t outputs do not depend on the r and s outputs.

If the implementation is not in SSA form, convert it to SSA form (see § 2.10.1) and remove redundant MOVE instructions (see § 5.2.1).

We now topologically sort each segment by itself, thereby mixing the r, s, and t instruction sequences randomly.

We similarly topologically sort the initial mixing by itself, and the final mixing by itself.

We concatenate the sorted orderings: initial mixing, segment 1, segment 2, . . . , segment k, final mixing. Create a new relation R representing the 'precedes' relationship in this concatenated ordering. Create a new relation R' by removing one in every two arcs (x, y)∈R uniformly at random, and, uniting R' with the execution constraints to form the over all 'precedes' relation, topologically sort the entire sequence again.

Instruction reördering is now complete.

6.3.6. *Data-Flow Duplication. This is performed as in the Mark II implementation (see § 5.2.8).

6.3.7. *Random Cross-Connection. This is done as in the Mark II implementation (see § 5.2.9).

6.3.8. *Check Insertion. This is done as in the Mark II implementation (see § 5.2.10 on p. 44), with the following change: among the candidate placements for a check, with probability ½, a candidate within the current segment is chosen (where such a candidate exists), and with probability ½, a candidate in a later segment is chosen (where such a candidate exists). As a result of this change, and of the modified reördering scheme in § 6.3.5, with high probability all of r, s, t segments are cross-connected and made dependent on one another by the inserted checks.

6.3.9. Transcoding. This is done as in the Mark II implementation (see § 5.2.11).

6.3.10. Register Minimization. This is performed as in the Mark II implementation (see § 5.2.12).

6.3.11. *Memory Shuffling. This is performed as in the Mark II implementation (see § 5.2.13). Note that, since we have loops but no if-then-else, the $W_i$'s are generally minimal, which eliminates some anomalies which could arise in the Mark II implementation.

6.3.12. Final Cleanups and Code Emission. These are performed as in the Mark II implementation (see § 5.2.15).

7. Blending and Anchoring Techniques

The value of a member of a pair of mutually inverse base functions is greatly increased if it can be anchored to the application which employs it and the platform on which that application resides, and if its data and code can be blended with the data and code of the application of which it forms a part, in the sense that the boundary between different kinds of data or code becomes blurred.

The effect of such anchoring and blending is to
(1) foil code- and data-lifting attacks,
(2) foil input-point, output-point, and other boundary attacks by obfuscating the exact position of the boundary, and
(3) increase dependencies between the protective code and data and their surrounding contextual code and data, thereby increasing tamper-resistance by increased fragility under tampering.

The kinds of data and code boundaries to be addressed are:
(1) input boundaries, where unencoded data must be encoded and brought from its unprotected domain into the protected domain (see § 7.3),
(2) output boundaries, where protected data must be decoded and brought from the protected domain into the unprotected domain (see § 7.3),
(3) entry boundaries, where control passes from unprotected code into protected and obfuscated code (see § 7.4),
(4) exit boundaries, where control passes from protected and obfuscated code into unprotected code (see § 7.4),
(5) separating boundaries, where data changes from a form in which entropy from multiple variables is evenly mixed across a sizable bit-vector to a form in which entropy from individual variables is more isolated, although still encoded, and computations are performed on these more isolated variables, and
(6) mixing boundaries, where data changes from a form in which entropy from individual variables is encoded but relatively isolated, generally containing the results of computations on such variables, to a form in which entropy from multiple variables is evenly mixed across a sizable bit-vector.

The challenge for protecting separating and mixing boundaries is that frequently, the data on which computations are performed after a separation or before a mixing come from other sites where the data were also separated into relatively few variables. This permits an attack in which isolated variables are perturbed, with the result that, after mixing and reseparation, isolated variables respond to the perturbation, revealing the connection of the values at the perturbing site to those at the responding site.

In addition to the above forms of blending, we seek to anchor code and data to their context by means of interlocking techniques including
(1) data-dependent coëfficients, where data-flow at some code sites in the code provides variables used to compute coëfficients which control encodings at subsequently executed code sites in the code (see § 7.1 below), and
(2) data-flow duplication with cross-checking and cross-trapping, where certain parts of the data-flow are replicated (but with different encodings), data-flow links are swapped among duplicates, and computations are injected which, if the duplicates match with respect to their unencoded values, have no net effect, but if the duplicates fail to match with respect to their unencoded values, cause computation to subtly fail or degrade, (3) data-flow corruption and repair, where errors are injected into data-flow at certain code sites, and these errors are corrected at subsequently executed code sites, (4) control-flow corruption and repair, where only executing code needs to be in a correctly executable state, so long as, as part of its execution, it ensures the correct executability of the subsequent state—in effect, there is a moving window of correctness including the currently executing code, and code is corrupted when left but corrected before entry—via changes to data such as routine-variables, case-indices, and the like, to avoid problems inherent in self-modifying code, i.e., all such corruption should affect data used in control, not the actual code itself, (5) shared blackboards, where multiple pieces of code make use of an instance of dynamic data mangling, where a dynamically addressed store with ongoing data-shuffling and recoding is shared among multiple pieces of code, making it harder for attackers to separate the data-flow of one of the pieces of code from that belonging to other pieces of code, (6) parallel functions, where code for performing some function is interleaved with that performing one or more others so that the two or more functions are executed in parallel by a single thread of control, which (combined with other techniques above) makes separating the code for the two functions difficult, and (7) subset lumps-and pieces, where we deploy subsets of the functionality of the lumps-and-pieces control-flow protection patent (U.S. Pat. No. 6,779,114), including switchable very large routines which combine multiple routines into a single routine.

7.1. Data-Dependent Coefficients. Examining the formulas for permutation-polynomial inverses (see § 2.3.2, § 2.3.3, and § 2.3.4), we note that multiplicative ring inverses over the word ring's (typically $2^{32}$ or $2^{64}$ on current computers) are used extensively. (They are the denominators in the fractions in the formulas: e.g., $a/c^4$ means $ac^{-4}$ which means $a(c^{-1})^4$ where $c^{-1}$ is the multiplicative ring inverse of c.)

For a machine with a w-bit word, c and $c^{-1}$ are two numbers such that $c \cdot c^{-1} = 1$, where $\cdot$ is the multiplication operation operation within the ring, i.e., it is multiplication of two w-bit binary words with overflow ignored as in C and C++.

While we can easily find such inverses computationally by employing the Extended Euclidean Algorithm [15, 26], this is undesirable because the algorithm is easily recognizable. Thus we need another means of converting some of the entropy provided by input data into a choice of random coëfficients for permutation polynomials.

We recommend an approach along these lines: in advance, randomly choose numbers $$a_0, a_1, a_2, \ldots, a_{w-1}$$

in which each $a_i$ is an odd number in the range 3 to $2^w - 1$ inclusive, all $a_i$'s are pairwise distinct, and there is no pair $a_p$, $a_q$ in the list such that $a_p \cdot a_q = 1$. We will also employ their multiplicative inverses $$a_0^{-1}, a_1^{-1}, a_2^{-1}, \ldots, a_{w-1}^{-1}$$

found in advance using the Extended Euclidean Algorithm noted above.

Then for any random nonzero word value v chosen from the early computations within a CB function, we choose a product c using the bits of v: if bit $2^i$ is set in v, then $a_i$ is in the product. This gives a product of from one to w factors whose inverse is found by using v again: if bit $2^i$ is set in v, then $a_i^{-1}$ is in the product giving the inverse, $c^{-1}$.

If w=32, this gives us a very large number of potential coëfficients and inverse coëfficients. In fact, the number is so large that we may choose to use only part of v—i.e., replace w by some smaller number and have a smaller number of $a_i$'s and their inverses—which is probably still adequate: 18 bits instead of 32 still would permit a selection of over 200,000 coëfficient+inverse coëfficient pairs.

Note that we have only provided a means for generating odd coëfficients. Other kinds of coëfficient are easier to generate, since either we only require their additive inverses (even elements don't have multiplicative inverses). In order to generate a coëfficient which is even, we simply double a generated value v. In order to create on whose square is 0, we simply logically left shift v by $\lceil w/2 \rceil$ positions (i.e., we multiply it by $2^{\lceil w/2 \rceil}$ with overflow ignored).

7.2. Fine Control for Encoding Intensity. In the current Transcoder, there are settings called data-flow level and control-flow level which nominally run from 0 to 100 indicating how strongly encoded the data- or control-flow should be.

Traditionally, the mechanisms used to effect this ostensibly fine-grained control are of two varieties:

(1) sudden differences in behavior which occur at certain specific numeric thresholds in the data- or control-flows-level, so that, below the threshold, a certain transformation is not applied, and above the threshold, it is, and (2) fine-gained differences in the probability-threshold for performing a certain transformation on a certain code fragment, so that at a lower data-flow level, a pseudo-random variate might have to fall above 0.8 in order to cause it to be transformed, whereas at a higher one, it might only have to fall above 0.2 in order to cause the transformation.

We have no problem with method (1), but we can improve on (2). The problem with method (2) is that, simply by chance, the actual level achieved may not fall near the intended level. We therefore recommend the following improvement.

We keep a running tally of total sites to be covered, sites covered so far, and how many received the probability-controlled transform (the included sites) and how many did not (the excluded sites). When the ratio of included sites is below the desired ration, we increase the probability of performing the transform above its nominal value, and when it is above the desired ration, we decrease the probability of performing the transform below its nominal value. A proper setting for the degree of increase and decrease can be gauged by experimentation. This can effectively cause the actual ratio for an affected region of code to be protected to closely track the desired ratio, instead of wandering away from that ratio due to chance effects.

This will have its best effect when the total number of potential sites is large. Little fine-grained control can be exercised if only a few sites exist, short of massive code duplication to increase the effective number of sites.

This readily extends to cases with more than two choices. Consider for example the use of permutation polynomial encodings over $Z/(2^{32})$ (or over $Z/(2^{64})$ for recent, more powerful platforms). If we vary among no encoding or encodings of degrees 1 through 6, then there are seven possible choices to be covered, amongst which we apportion the probabilities according to the desired ratios. The same principle applies: if we are getting too little of something, we push its probability up; if we are getting too much, we lower its probability down.

7.3. Input and Output Boundaries. At an input boundary, unencoded data must be encoded and brought from its unprotected domain into the protected domain. An an output boundary, protected data must be decoded and brought from the protecded domain into its unprotected domain.

This is an appropriate place to deploy fine control of encoding intensity (see § 7.2) for data-flow. Measuring data-flow distance in number of graph arcs in the data-flow graph, where an arc connects a value-producing operation to the operation which consumes it, we proceed as follows.

(1) Protect the implementation at its chosen intensity (normally fairly high.
(2) Protect operations which are 1, 2, 3, . . . , k arcs away from operations inside the implementation with diminishing intensities until the normal transcoded intensity of surrounding code is reached, for both the input boundary and the output boundary.

This requires that we be able to gauge such distances, which requires some extra support from the Transcoder to add such selective distance information and to respond to it by controlling encoding intensity as outlined in § 7.2.

Additional protections which apply to input/output boundaries are data-dependent coëfficients to increase the dependency of the computations at the entry of the base function on the code which provides the inputs and to increase the dependency of the computations receiving the base function outputs on the code within the implementation which provides those outputs, and shared blackboards (if data can enter and leave by via a shared blackboard—an instance of dynamic data mangling—then it is much harder for an attacker to follow the data-flow for that data).

7.4. Entry and Exit Boundaries. Typically, the point at which an implementation receives its inputs immediately follows the point at which control enters the implementation, and the point at which an implementation provides its outputs immediately precedes the point at which control leaves the implementation.

As a result, all of the protections in § 7.3 typically also protect the entry and exit boundaries. However, the implementation will typically have stronger control-flow protections than regular transcoded code.

Therefore we need to perform fine-grained stepwise increment on entry and stepwise diminishment on exit of the control-flow level. Our metric for distance here is the estimated number of FABRIC or machine-code instructions to be executed along the shortest path leading to the entry-point (for entry) or departing from the exit-point (for exit), with blending for a distance of, say, one or two hundred instruction units for each of entry and exit.

This would be an excellent place to deploy control-flow corruption and repair to tie together the code nearing the entry and the protective entry code, and the protective exit code and the code moving away from the exit, to increase the level of protection in the vicinity of the protective entry and exit.

7.5. Separating and Mixing Boundaries. The general situation in which we encounter separating and mixing boundaries is one in which structured data is output in lightly encoded or unencoded form from an implementation, or lightly encoded or unencoded structured data enters an implementation, or a pair of implementations of the invention are used to sandwich a decision-making computation which we wish to hide.

The effect of separating and/or mixing is that we have potentially exposed data after the separation or prior to the mixing, creating an attack point. Thus, in addition to the relevant protections for these situations already covered in § 7.3 and § 7.4, we need stronger protections for any computations which we need to sandwich between base functions used as separating or mixing functions.

If the decision is based on checking a password, or some similar equality comparison, we strongly recommend the method of § A as the best choice for its protection. However, we are rarely so fortunate.

The more common case is that we need to perform some arithmetic, some comparisons, some bitwise Boolean operations, and so on. For these, we recommend the following protections (see § 7):

(1) first and most important, data-flow duplication with cross-checking and cross-trapping to massively increase the data-dependencies between the initial base-function and the decision code and the decision code and the final base-function;
(2) liberal use of data-flow-dependent coefficients; with coefficients in the decision block set by the preceding base-function and coefficients in the following base-function set by the code in the decision block;
(3) use of shared blackboards (dynamic data mangling arrays) as sites used to communicate from the initial base function to the decision code and from the decision code to the final base function; and
(4) if possible, parallel functions, so that the decision code is mixed with other irrelevant code, making it hard for the attacker to analyse and distinguish from the code with which it is computed in parallel by interleaving their computations.

7.6. General Protections. Certain protections can be applied at every boundary, and between boundaries, in order to further protect code in contexts where base-functions are deployed, namely control- and data-flow corruption and repair, parallel functions, and subset lumps and pieces. Where feasible, these added protections will increase the analytical difficulties faced by the attacker: in particular, they will render static analysis infeasible and dynamic analysis costly.

7.7. Exemplary Protection Scenario. Data is provided in a form encoded via a base function, so that information is smeared across its entire state-vector. The data thus encoded comprises (1) a 128-bit key
(2) a 128-bit data structure with a variety of fields, some only a few bits wide, one 32 bits wide, and some up to 16 bits wide A computation is to be performed on the fields of the data structure and information on the current platform, as a result of which either the key will be delivered in a form ready for use (indicating that the current platform information plus the delivered data structure lead to a decision to release the key), or a nonsense string of the same size as the key will be delivered in a form winch appears to be ready for use but in fact will fail (indicating that the current platform information plus the delivered data structure lead to a decision not to release the key).

The attacker's goal is to obtain the 128-bit key irrespective of the content of the fields and the information on the current platform. The defender's goal is to ensure that the key is correctly delivered on a 'yes' decision unless the defender's implementation is tampered with, but is not obtainable by the attacker in situations where the decision would be 'no' in the absence of tampering.

This captures the primary blending needs of the protective system: there are input, output, entry, exit, separation, and mixing boundaries to protect.

7.8. Implementing the Protections with Blending. Here we describe the implementation of the protections from data-flow-dependent coëfficients through subset lumps-and-pieces listed starting in § 7 for the protection scenario described in § 7.7 as proposed in § 7.2 through § 7.6.

7.8.1. Starting Configuration. Our starting configuration comprises the Transcoder intermediate representation of the protective system core, a 128-bit×256-bit function, into which the containing application inputs a 256-bit value containing in encoded form a 128-bit encoded key and a 128-bit data structure and from which the application receives a 128-bit differently encoded key ready for use.

The core comprises
(1) an entry 256-bit×256-bit base-function accepting 256 bits in which entropy is mixed across the entire 256 bits, decoding this to a structure with a 128-bit encoded key (encoded by some other 128-bit×128-bit base-function beforehand) and a 128-bit data structure with separated fields in smooth (unencoded) form;
(2) a decision-block accepting the 128-bit data structure and the 128-bit key, performing computations on fields of the 128-bit data structure, deciding whether to release the key or not, and providing to a second base-function either the 128-bit encoded key itself (if the decision is 'proceed') or a value which uses the key and further information form the 128-bit data structure as an entropy source and provides to a second 128-bit× 128-bit base-function either the encoded ky or a nonsense value of the same width;
(3) an exit 128-bit×128-bit base-function and returns a differently encoded key ready for use in some whitebox cryptographic function (e.g., AES-128).

The entry and exit base-functions are constructed according to the Mark III design (see § 6). The core is inline code in its containing routine; i.e., it is not entered by a routine call nor exited by a routine return: rather, surrounding functionality is included within a routine containing but the surrounding functionality and the core.

The combination of the core and the application is called the program.

7.8.2. *Subdividing Segment Input and Output Vectors. The following material is exemplary: far wider choices exist. Here we choose doubly recursive function-indexed interleaving, yielding three-part division of segments. It could also be singly recursive (two-part division), triply recursive (four-part division), or order n recursive ((n+1)-part division).

In § 6.2.3 a division was given for I/O vectors in the 12-words-wide (384-bit I/O) Mark III implementation. According to the above, we have an 8-words-wide entry base-function and a 4-words-wide exit base-function. We subdivide entry segments as follows:

2-2-4 2-3-3 3-2-4 3-3-2 4-2-2

If we number the above four configurations in order from 0 to 3, then the number of the configuration chosen for each segment we generate is chosen statically by rand(4); i.e., we choose from the four possibilities above uniformly at random at construction time.

For the exit base-function, the segments are subdivided as follows:

1-1-2 1-2-1 2-1-1

If we number the above three configurations in order from 0 to 2, then the number of the configuration chosen for each segment we generate is chosen statically by rand(3); i.e., we choose from the three possibilities above uniformly at random at construction time.

7.8.3. *Distance Metrics. We make use of measures of distance from an operation to a core input and from a core output to an operation. There are four metrics: two for data-flow distance and two for control-flow distance.

*Data-Flow Distances. We collect input-distances down to $-200$ and output-distance up to $+200$. Beyond that point, we can ignore greater distances, and apply heuristic methods to avoid computing them.

The distance of every computational instruction in the core from the core is zero. (A computational instruction is one which either inputs one or more values or outputs one or more values.)

The distance of every other computational instruction (CI) from the core is either negative (if it provides values which affect values which are consumed by the core) or positive (if it consumes values affected by values which are produced by the core).

We assume that, for the most part, both are not true; i.e., that either the core is not in the body of a loop in which the core is repeatedly employed, or it is in a loop, but that the loop is sufficiently extensive that we can ignore any information fed into the core which is affected by outputs from previous core executions. However, instructions may reside in routines which may be called both before and after the execution of the core, in which case the data-flow distance is a pair comprising input-distance and its output distance. Input-distance is determined as follows.

If a CI outputs a value which is a direct input to the core, or loads a value which is a direct input to the core which the core accepts as a data-flow edge (i.e, as a 'virtual register') or stores an input which the core loads from memory, its input-distance is $-1$. Otherwise, if a CI x outputs a value which is a direct input to a y CI which has an input-distance of $-k$ (and possibly an output-distance of $+k'$ as well due to instructions in routines called both before and after the core, as noted above) or x loads a value which is input by such a y, or stores an input which such a y loads from memory, its input-distance is $-k-1$.

When the above considerations give an instruction multiple distinct input-distances, the one closest to zero is correct. Output-distance is determined as follows.

If the core outputs a value which is a direct input to a CI, or loads a value which is a direct input to the CI which the CI accepts as a data-flow edge (i.e, as a 'virtual register') or stores an input which the CI loads from memory, its output-distance is $+1$. Otherwise, if a CI x with output-distance $+k$ (and possibly an input-distance of $-k'$ as well due to instructions in routines called both before and after the core, as noted above) outputs a value which is a direct input to a CI y or such a CI x loads a value which is input by such a y, or stores an input which such a y loads from memory, y has output-distance $+k+1$.

When the above considerations give an instruction multiple distinct output-distances, the one closest to zero is correct.

This metric completely ignores control-flow. A return-with-value instruction is treaded as a load for this purpose. A routine-entry instruction inputting values to variables within a routine is considered to be a store-instruction for this purpose.

*Control-Flow Distance. We collect entry-distances down to −200 and exit-distances up to 200. Beyond that point, we can ignore greater distances, and apply heuristic methods to void computing them.

We view instructions as connected by directed arcs in the control-flow graph of the program, conditional branches having two outgoing arcs (leading to the successor if the tested condition is true or false) and indexed branches (case- or switch-statement branches) having multiple successors chosen by a controlling index which is tested against the case-labels of the control-structure. For a routine return-instruction, its successors are determined by the sites from which the routine is called; i.e., they are all of the instructions which may be executed immediately after return from the routine, and the return instruction is considered to be an indexed branch to those post-return instructions.

Any instruction within the core has a control-flow distance of zero from the core. As above, we assume a non-looping scenario in which any looping involving the core is sufficiently large-scale and infrequent to permit us to ignore it. However, in the case of control-flow distance, instructions may reside in routines which may be called both before and after the execution of the core, in which case the control-flow distance is a pair comprising its entry-distance and its exit-distance.

Entry-distance is determined as follows.
If an instruction has a successor instruction in the core or is a branch with a destination in the core, its entry control-flow distance is −1. Otherwise,
if an instruction x has an immediate successor instruction y which has an entry control-flow distance of −k (and possibly an exit control-flow distance of −k' as well due to instructions in routines called both before and after the core, as noted above), or x is a branch one of whose destination instruction is such a y, its entry control-flow distance is −k−1.

When the above considerations give an instruction multiple distinct entry-distances, the one closest to zero is correct.

Exit-distance is determined as follows.
If a core instruction has a successor instruction outside the core or is a branch with a destination instruction outside the core, that instruction outside the core has an exit control-flow distance of +1. Otherwise,
if an instruction x which has an exit control-flow distance of +k (and possibly an entry control-flow distance of −k' as well due to instructions in routines called both before and after the core, as noted above) has an immediate successor instruction y, or if such an x branches to an instruction y, then y has an exit control-flow distance of +k+1.

When the above considerations give an instruction multiple distinct exit-distances, the one closest to zero is correct.

7.8.4. Cleanups. The cleanups listed in § 5.2.1, § 5.2.2, and § 5.2.3 are performed as needed, as in the Mark II implementation, not only for the entry and exit base-function implementations, but for the decision-block and the application as well.

7.8.5. *Hash Insertion and Generation of Distinct Dynamic Values.

Instead of performing the transform of § 5.2.4 once per base-function (i.e., performing it for the entry function, and performing it separately for the exit function), we perform this transform within the application using a 1×16 matrix whose inputs are selected from data available in the application some time before the entry base-function is computed. We use it to create an array for dynyamic data mangling which will serve the application, both the entry and exit base-functions, and the decision-block, so that they all use one shared blackboard.

7.8.6. Macro Instruction Expansion. This is done as in the Mark II and Mark III implementations.

7.8.7. Come-From Insertion. This is done as in the Mark III implementation, but extends to every branch with an entry-distance or exit-distance from the core which has an absolute value of 100 or less; i.e., it extends well beyond the limits of the implementations in the core.

7.8.8. *Control-Flow Corruption and Repair. As part of processing the code, the code is flattened: the branch labels are made destination points in a switch-statement-like construct, and destinations are reached by branching to this switch, passing it an index which corresponds to the switch case-label which leads to the desired destination.

This must be done for all code which is in the core or which is in a basic block with any instructions having a an entry-distance or exit-distance from the core with an absolute value of 100 or less.

We consider the destinations' corresponding indices to be stored in variables $v_1, \ldots v_n$, corresponding to nodes in the control-flow graph which represent basic blocks $B_1, \ldots, B_n$ (entered via a label and exited via a final branch, return, or call).

Prior to flattening, we randomly label each basic block in the corruption region with a total bijective function $L_i$: $\{1, \ldots, n\} \mapsto \{1, \ldots, n\}$, for $i=1, \ldots, n$, tinder the following constraints.

(1) If a basic block $B_i$ can exit to blocks $B_{j_1}, \ldots, B_{j_m}$, then its labelling $L_i$ function has the property that $L_i(j_k)=j_k$, for $k=1, \ldots, m$.
(2) If two distinct basic blocks $B_i, B_j$ can both exit to block $B_k$, then $L_i=L_j$.
(3) If a basic block $B_i$ can exit to a block $B_j$, then the number of points k at which $L_i(k) \neq L_j(k)$ is bounded above by four times the number of destination basic blocks possessed by any basic block which can exit to $B_j$.

After flattening, every basic block $B_m$ is entered with the variables $v_1, \ldots, v_n$ in a state such that for its predecessor's $L_i$'s, $L_i(j)=v_j$ for $j-1, \ldots, n$. (This does not mean that the variables' states are correct, but only that they agree with the predecessors' $L_i$'s.) It then proceeds to swap variables so that for each variable, $L_m(j)=v_j$—this almost certainly is a different state of $v_1, \ldots, v_n$ than the one with which it was entered, although in view of the constraints, the number of changes has a reasonable bound.

Thus, by the time the end of a basic block is reached, the variables correspond to destinations in such a way that current destinations are correct, but most others are usually incorrect.

7.8.9. Random Instruction Reördering. We note that, in function-indexed interleaving (FII) as employed in the generation of segments of the implementation, we have divided inputs and outputs into possibly irregular groups of widths r-s-t, respectively. In $f_K$ and $f_K^{-1}$ for each of the entry and exit base-functions, the r outputs depend only on the r inputs;

the s outputs depend on the r and s inputs; and the t outputs depend on the r, s, and t inputs;

where the selector computation for the FII between r and s is considered part of the s computation, and the selector computation for the FII between s and t is considered part of t computation. Note that, with this understanding, the s outputs do not depend on the r outputs, and the t outputs do not depend on the r and s outputs.

If the program is not in SSA form, convert it to SSA form (see § 2.10.1) and remove redundant MOVE instructions (see § 5.2.1).

We now topologically sort each segment in each of the entry and exit base-functions by itself, thereby mixing the r, s, and t instruction sequences randomly. We similarly topologically sort the initial mixing by itself, and the final mixing by itself in each base-function. We likewise topologically sort every basic block (every straight-line stretch of code without any branches or routine calls or returns) in the application and the decision-block.

For each of: the entry and exit base-functions, we concatenate the sorted orderings: initial mixing, segment 1, segment 2, . . . , segment k, final mixing. Create a new relation R representing the 'precedes' relationship in this concatenated ordering. Create a new relation R' by removing one in every two arcs (x, y)∈R uniformly at random, and, uniting R' with the execution constraints to form the over all 'precedes' relation, topologically sort the entire sequence again.

Instruction reördering for the program is now complete.

7.8.10. *Data-Flow Duplication with Cross-Checking/Trapping. The method for these transformations is as in Mark II (see § 5.2.8, § 5.2.9, and § 5.2.10), with the modifications in Mark III (see § 6.3.8), but it is also done for additional pieces of code.

Specifically, in addition to its normal use within the entry and exit base-functions, we also perform these transformations for the data-flow within the decision-block including the transfer of information from the outputs of the entry base-function to inputs of the decision-block and take transfer of information from the outputs of the decision-block to the inputs of the exit base-function.

There are further changes to these steps for our blending scenario (see § 7.7), covered in the next section.

7.8.11. *Decision Hiding. In the decision-block, the fields of the 128-bit structure are examined, computations are performed upon them, and a pass-fail decision is reached and delivered as a value. We duplicate some of these computations so that the decision value, consisting of one of a pair of arbitrary constants $c_{pass}$ and $c_{fail}$, is generated at least eight times. Transcoding will make these values look distinct.

Since they are duplicates, cross-linking and cross-checking apply to them. In particular, we can assume that they will yield $c_{pass}$, and on that basis, perform operations on data-flow words in the key as it is input to the exit base-function which cancel on a pass but do not cancel on a fail. The cancelling values can make use of further values from the structure (if $c_1-c_2$ cancels, then so does $(c_1-c_2)c_3$). The combination of this with cross-linking and cross-checking as in § 7.8.10 will cause the key to vary chaotically in a data-dependent fashion, but will, with high probability, cause a nonsense value of the same size as the key to be delivered to the application code following the exit base-function whenever the decision-block's tests on the structure lead to a 'fail' decision. (This method is related to the password-checking technique in § A)

7.8.12. Transcoding. This is done as in the Mark II implementation (see § 5.2.11), but with the following changes.

We divide the protection level as follows:
(1) finite-ring protection using linear mappings.
(2) perm-poly protection using quadratic polynomials;
(3) 2-vector function-matrix protection using quadratic polynomial elements;

Code in the core is protected at the level 3 (strong). Code out to an input-distance or output-distance with an absolute value not exceeding 100 is protected at level 2 (intermediate), and the remainder of the application is protected at level 1 (weak).

In addition, transcoding makes use of data-dependent coëfficients as follows.
(1) constants derived in the application code leading up to the entry base-function set one eighth of the coëfficients in the entry base-function's transcoding.
(2) constants derived in the entry base-function set one quarter of the coëfficients in the transcoding of the decision-block.
(3) constants derived in the decision-block set one quarter of the coëfficients in the exit base-function.
(4) constants derived in the exit base-function set at least one eighth of the coëfficients in the application code receiving the outputs from the exit base-function.

7.8.13. Register Minimization. This is performed as in the Mark II implementation (see § 5.2.12), but for the whole program.

7.8.14. *Dynamic Data Mangling (Memory Shuffling). This is performed as in the Mark II implementation (see § 5.2.13), but affects code beyond the core. In particular, the shared blackboard provided by the shuffled memory is used to provide the inputs from the application to the entry base-function and the outputs from the entry base-function to the decision-block and the inputs from the decision-block to the exit base-function, and the outputs from the exit base-function to the application.

7.8.15. Final Cleanups and Code Emission. These are performed as in the Mark II implementation (see § 5.2.15), but for the entire program.

APPENDIX A

*Authentication by Equality with Chaotic Failure

Suppose we have an application in which authentication is password-like: authentication succeeds where G, the supplied value, matches a reference value Γ; i.e., when G=Γ.

Further suppose that we care about what happens when G=Γ, but if not, we only insist that whatever the authentication authorized is no longer feasible. That is, we succeed when G=Γ, but if G≠Γ, further computation may simply fail.

The authenticating equality is not affected by applying any non-lossy function to both sides: for any bijection φ, we can equivalently test whether φ(G)=φ(Γ). The authenticating equality may remain valid with high probability even if φ is lossy, if φ is carefully chosen so that the probability that φ(G)=φ(Γ) when G≠Γ is sufficiently low (as it is in Unix password authentication, for example).

Based on technology previously described herein, we can easily perform such a test. We previously described a method for foiling tampering by duplicating data-flow (see § 5.2.8), randomly cross connecting the data-flow between duplicate instances (see § 5.2.9), and performing encoded checking to ensure that the equalities have not been compromised (see § 5.2.10).

We can adapt this approach to test whether $G=\Gamma$—in encoded form, whether $\phi(G)=\phi(\Gamma)$. We note that a data-flow yielding $\phi(G)$ already duplicates a data-flow yielding $\phi(\Gamma)$ along the success path where $G=\Gamma$. We therefore omit, for this comparison, the data-flow duplication step. Then we simply cross-connect as in § 5.2.9 and insert checks as in § 5.2.10. By using these computations as coëfficients for future encoded computations, we ensure that, if $\phi(G)=\phi(\Gamma)$, all will proceed normally, but if $\phi(G)\neq\phi(\Gamma)$, while further computation will proceed, the results will be chaotic and its functionality will fail. Moreover, since $\phi$ is a function, if $\phi(G)\neq\phi(\Gamma)$, we can be sure that $G\neq\Gamma$.

REFERENCES

[1] Alfred V. Aho, Ravi Sethi, Jeffrey D. Ullman, Compilers: Principles, Techiques, and Tools, 1986, Addison-Wesley, ISBN 0-201-10088-6.

[2] K. E. Batcher, *Sorting Networks and their Applications*, Proc. AFIPS Spring Joint Comput. Conf., vol. 32, pp. 307-314, 1968.

[3] See en.wikipedia.org/wiki/Batcher_odd-even_mergesort and www.iti.fh-flensburg.de/lang/algorithmen/sortieren/networks/oemen.htm

[4] O. Billet, H. Gilbert, C. Ech-Chatbi, *Cryptanalysis of a White Box AES Implementation, Proceedings of* SAC 2004—Conference on Selected Areas in Cryptography, August, 2004, revised papers. Springer (LNCS 3357).

[5] Stanley T. Chow, Harold J. Johnson, and Yuan Gu. *Tamper Resistant Software Encoding*. U.S. Pat. No. 6,594,761.

[6] Stanley T. Chow, Harold J. Johnson, and Yuan Gu. *Tamper Resistant Software—Control low Encoding*. U.S. Pat. No. 6,779.114.

[7] Stanley T. Chow, Harold J. Johnson, and Yuan Gu. *Tamper Resistant Software Encoding*. U.S. Divisional Pat. No. 6,842,862.

[8] Stanley T. Chow, Harold J. Johnson, Alexander Shokurov. *Tamper Resistant Software Encoding and Analysis*. 2004. U.S. patent application Ser. No. 10/478,678, publication US 2004/0236955 A1.

[9] Stanley Chow, Yuan X, Gu, Harold Johnson, and Vladimir A. Zakharov, *An Approach to the Obfuscation of Control-Flow of Sequential Computer Programs*, Proceedings of ISC 2001—Information Security, 4th International Conference (LNCS 2200), Springer, October, 2001, pp. 144-155.

[10] S. Chow, P. Eisen, H. Johnson, P. C. van Oorschot, *White-Box Cryptography and an AES Implementation* Proceedings of sc SAC 2002—Conference on Selected Areas in Cryptography, March, 2002 (LNSC 2595), Springer, 2003.

[11] S. Chow, P. Eisen, H. Johnson, P. C. van Oorschot, *A White-Box DES Implementation for DRM Applications*, Proceedings of DRM 2002—2nd ACM Workshop on Digital Rights Management, Nov. 18, 2002 (LNCS 2696), Springer, 2003.

[12] Christian Sven Collberg, Clark David Thomborson, and Douglas Wai Kok Low. *Obfuscation Techniques for Enhancing Software Security*. U.S. Pat. No. 6,668,325.

[13] Keith Cooper, Timothy J. Harvey, and Ken Kennedy, *A Simple, Fast Dominance Algorithm*, Software Practice and Experience, 2001, no. 4, pp. 1-10.

[14] Ron Cytron, Jean Ferrante, Barry K. Rosen, and Mark N. Wegman, *Efficiently Computing Static Single Assignment Form and the Control Dependence Graph*, ACM Transactions on Programming Languages and Systems 13(4), October 1991, pp. 451-490.

[15] *Extended Euclidean Algorithm*, Algorithm 2.107 on p. 67 in A. J. Menezes, P. C. van Oorschot, S. A. Vanstone, *Handbook of Applied Cryptography*, CRC Press. 2001 (5th printing with corrections). Down-loadable from http://www.cacr.math.uwaterloo.ca/hac/

[16] National Institute of Standards and Technology (NIST), *Advanced Encryption Standard* (AES), FIPS Publication 197, 26 Nov. 2001. http://csrc.nist.gov/publications/fips/fips197/fips-197.pdf

[17] Alexander Klimov, *Applications of T-Functions in Cryptography*, PhD thesis under Adi Shamir, Weizmann Institute of Science, October, 2004, Theorem 5.3 p. 41.

[18] DES, § 7.4. pp. 250-259, in A. J. Menezes, P. C. van Oorschot, S. A. Vanstone, *Handbook of Applied Cryptography*, CRC Press, 2001 (5th printing with corrections). Down-loadable from http://www.cacr.math.uwaterloo.ca/hac/

[19] G. Mullen and H. Stevens, *Polynomial functions (mod m)*, Acta Mathematica Hungarica 44(3-4), 1981, pp. 237-241.

[20] Harold J. Johnson, Stanley T. Chow, Yuan X. Gu. *Tamper Resistant Software—Mass Data Encoding*. U.S. Pat. No. 7,350,085.

[21] Harold J. Johnson, Stanley T. Chow, Philip A. Eisen. *System and Method for Protecting Computer Software Against a While Box Attack*. U.S. patent application Ser. No. 10/433,966, publication US 2004/0139340 A1.

[22] Harold J. Johnson, Philip A. Eisen. *System and Method for Protecting Computer Software Against a White Box Attack*. U.S. patent application Ser. No. 11/020,313 (continuation in part of U.S. patent application Ser. No. 10/433,966—not yet found in USPTO publications database).

[23] Harold Joseph Johnson, Yuan Xiang Gu, Becky Laiping Chang, and Stanley Taihai Chow. *Encoding Technique for Software and Hardware*. U.S. Pat. No. 6,088,452.

[24] Arun Narayanan Kandanchatha, Yongxin Zhou. *System and Method for Obscuring Bit-Wise and Two's Complement Integer Computations in Software*. U.S. patent application Ser. No. 11/039,817, publication US 2005/0166191 A1.

[25] D. E. Knuth, *The art of computer programming, volume 2: semi-numerical algorithms*, 3rd edition, ISBN 0-201-89684-2, Addison-Wesley, Reading, Mass., 1997.

[26] *Extended Euclid's Algorithm*, Algorithm X on p. 342 in D. E. Knuth, *The art of computer programming, volume 2: semi-numerical algorithms*, 3rd edition, ISBN 0-201-89684-2, Addison-Wesley, Reading, Mass., 1997.

[27] Ronald L. Rivest. *Permutation Polynomials Modulo $2^w$*, Laboratory for Computer Science, MIT, Oct. 25, 1999.

[28] T. Sander, C. F. Tschudin, *Towards Mobile Cryptography*, pp. 215-224, Proceedings of the 1998 IEEE Symposium on Security and Privacy.

[29] T. Sander, C. F. Tschudin, *Protecting Mobile Agents Against Malicious Hosts*, pp. 44-60, Vigna, Mobile Agent Security (LNCS 1419), Springer, 1998.

[30] David R. Wallace. *System and Method for Cloaking Software*. U.S. Pat. No. 6,192,475.

[31] A. J. Menezes, P. C. van Oorschot, S. A. Vanstone, *Handbook of Applied Cryptography*, § 1.3, pp. 6-10. CRC Press, 2001 (5th printing with corrections). Down-loadable from http://www.cacr.math.uwaterloo.ca/hac/

SECTION C

Polynomial Inverse Computations Over $Z/(2^n)$, Program Component, Transformations and ClearBox Cryptography*

*Version: Jan. 30, 2012.

In the theory and practice of software obfuscation and protection, transformation over $Z/(2^n)$ and more generally over $B^n$ play an important role. ClearBox research is not an exception. In this note we present algorithms to compute the permutation inverse $f^{-1}(x)$ of a given permutation polynomial $f(x)$ and multiplicative inverse $f(x)^{-1}$ of a given invertible polynomial $f(x)$ over $Z/(2^n)$. Results of special polynomial functions for efficient implementations to cooperate with general obfuscation principles are discussed and presented.

We also investigate algorithms to generate matrices over $B^n$ with polynomials as their determinants and describe algorithms to use permutation polynomials and matrix functions over $B^n$ to transform arithmetic operations and data arrays. These transformations can be composed with existing MBA transformations[] for the protection of software operations in the general ClearBox cryptography settings. Exampes are given to illustrate new algorithms.

1 Introduction and Notations

Let N be the set of natural numbers and Z the integer ring. Let $B=\{0, 1\}$.

The mathematical base of the arithmetic logic unit of a microprocessor is abstracted in the following algebra system.

Definition 1. With $n \in N$, we define the algebraic system $(B^n, \Lambda, V, \oplus, \neg, \leq, \geq, >, <, \leq^s, \geq^s, >^s, <^s, \neq, =, >>^s, >>, <<, +, -, *)$, a Boolean-arithmetic algebra (BA-algebra), or BA[n], where $<<, >>$ denote left and right shifts, $*$ denotes multiply, and signed compares and arithmetic right shift are indicated by $^s$, n is the dimension of the algebra.

BA[n] includes the Boolean algebra $(B^n, \Lambda, V, \neg)$, the integer modular ring $Z/(2^n)$, and Galois field $GF(2^n)$.

Note that a very basic requirement of protection design is to make its implementation easily mix with application code. Therefore, building transformations on BA[n] becomes an efficient approach. We also argue that it is sufficient because there are enough number of computational hard problems directly related to BA[n].

C2 Polynomials Over $Z/(2^n)$

Let $f(x)$ be a function over $Z/(2^n)$, where $n \in N$. If $f(x)$ is representable as $\Sigma_{i=0}^{m} a_i x^i$, where $a_i \in Z/(2^n)$, $i=0, \ldots, m-1$ and $m \in N$, then $f(x)$ is a polynomial function, or a polynomial. $Z/(2^n)[x]$ is the set of all polynomials over the ring $Z/(2^n)$.

Let $PP(2^n)[x]$ be the set of all permutation polynomials in $Z/(2^n)[x]$.

Let $x^{(k)}$ be the falling factorial power $x(x-1)(x-2) \ldots (x-k+1)$, where $k \in N$. Any polynomial $f(x)$ can be represented as $\Sigma_{k=0}^{m} a_i x^{(k)}$, where $x^{(0)}$ is 1.

For $i \in N$, let $v(i) = \Sigma_{r=1}^{\infty} \lfloor i/2^r \rfloor$. Each polynomial over $Z/(2^n)$ can be uniquely expressed in the form $f(x) = \Sigma_{j=0}^{w} a_j x^{(j)}$, where $a_j \in Z/(2^{n-v(j)})$ and w is the unique integer for which $2^n | (w+1)!$ but $2^n \nmid w!$. Because of this uniqueness, w is called the degree of $f(x)$, denoted by $\deg(f(x))$, or $\partial(f(x))$.

Note that $v(i)$ equals to the 2-adic order of i!, which is i−s where s is the sum of all digits of i in binary number representation, or the Hamming weight of i. This is quite useful in several algorithms in this note.

For polynomials over $Z/(2^n)$, the upper bound of their degrees is number w such that $v(w+1)=n$ but $v(w)<n$. Assume n is a power of 2, and $n=2^t$. Because $v(n+1)=v(2^t+1)=2^t+1-2=2^t-1<n$, and $v(n+2)=v(2^t+2)=2^t+2-2=2^t=n$, we have $w=2^t+1=n+1$. For example, polynomials over $Z/(2^{32})$, the highest possible degree is 33.

Because of the fact that the highest degree of polynomials in $Z/(2^n)[x]$ is about $\ln(n)$, this greatly reduces the computation cost comparing to polynomials over finite field $GF(2^n)$.

There are quite amount of permutation polynomials over the ring. The cardinality of $Z/(2^n)[x]$ is $2^{n(n+2)-\Sigma_{k=1}^{n+1} v(k)}$. One eighth, or $2^{n(n+2)-\Sigma_{k=1}^{n+1} v(k)-3}$ are permutations. For n=32, 64, there are $2^{007}$, $2^{2271}$ permutations, respectively.

C3 Permutation Polynomials

For a given polynomial, $f(x) = \Sigma_{k=0}^{n+1} a_k x^k \in Z/(2^n)[x]$, it is a permutation if and only if $a_1$ is odd and both $\Sigma_{s=1} a_{2s+1}$ and $\Sigma_{s=1} a_{2s}$ are even. An interesting observation is that in falling factorial representation $f(x) = \Sigma_{k=0}^{n+1} b_k x^{(k)}$, the conditions become $b_1$ odd and both b2 and $b_3$ even.

In this section, we provide an efficient algorithm to compute the permutation inverse $f^{-1}(x)$, which is also referred as composition inverse.

C3.1 Compute Preimages (Roots) of a Permutation Polynomial

For a given permutation polynomial, we have an algorithm to compute its preimages.

Proposition 1. Let $y=f(x)=\Sigma_{i=0}^{n+1} a_i x^i$ be a permutation polynomial over $Z/(2^n)$. For any given value $\beta \in Z/(2^n)$, we can find $\alpha \in Z/(2^n)$ such that $f(\alpha)=\beta$ by the following steps:
1. Inputs $f(x)$ and $\beta$;
2. $\alpha=0$;
3. the 0th bit of $\alpha$ is the 0th bit of $\beta - a_0$;
   (a) for i from 1 to n−1
   (b) the ith bit of $\alpha$ is the ith bit of $\beta - a_0 - (a_1-1)\alpha - \Sigma_{i=2}^{n+1} a_i \alpha^i$;
4. Output $\alpha$.

The computation is correct because for a permutation polynomial $f(x)$, the ith bit of $(f(x)-x)$ is fully determined by bit values of x i=0, 1, ..., i−1 and coefficients of $f(x)$.

C3.2 The Inverse of a Permutation Polynomial

In this section we present the following algorithm to compute the composition inverse of any given permutation polynomials in $Z/(2^n)[x]$.

Proposition 2. Let $f(x)=\Sigma_{i=0}^{n+1} a_i x^{(i)}$ be a permutation polynomial over $Z/(2^n)$, and let $f^{-1}(x)=\Sigma_{i=0}^{n+1} b_i x^{(i)}$ be its permutation inverse. The following steps provide a method to compute coefficients of $f^{-1}(x)$.
1. Input $f(x)$;
2. for i from 0 to (n+1)
   (a) Inputs $f(x)$ and i to Proposition??;
   (b) Output $x_i$ (Note: $f(x_i)=i$):
3. $b_0 = x_0$;
4. for j from 1 to n+1
   (a) $t_1 = \Sigma_{k=0}^{j-1} b_k j^{(k)}$
   (b) $t_2 = (j! >> v(j))^{-1} \mod 2^n$
   (c) $b_j = ((x_j - t_1) >> v(j)) * t_2 \mod 2^n$
5. Output $b_0, b_1, \ldots, b_{n+1}$.

The correctness of the algorithm is based on the following arguments. Since $f^{-1}(x) = \Sigma_{i=0}^{n+1} b_i x^{(i)}$ is determined by (n+2) pairs of values $(i, f^{-1}(i))=(i, x_i)$, the coefficients of $f^{-1}(x)$ can be computed by solving a system of equations.

The complexity of the algorithm is $O(n^2)$.

C4 Multiplicative Inverse Function of a Polynomial

For a given polynomial function $f(x)$ over $Z/(2^n)$, we want to determine if $f(x)$ has a multiplicative inverse function $g(x)$ such that $f(x)*g(x)=1$, for all $x \in Z/(2^n)$, and denoted by $f(x)^{-1}$ if it exists. We also want to compute $f(x)^{-1}$.

Let $MIP(2^n)[x]$ be the set of all multiplicative invertible polynomials in $Z/(2^n)[x]$.

C4.1 Criterion of $f(x) \in MIP(2^n)[x]$

Proposition 3. Let $f(x)$ be a polynomial function over $Z/(2^n)$.

1. $f(x)$ has a multiplicative inverse function $f(x)^{-1}$ if and only if the coefficients $c_0$ is odd and $c_1$ is even in a falling factorial power expression;
2. There are $2^{n(n+2)-\Sigma_{k=1}^{n+1} v(k)-2}$ multiplicative invertible polynomials in $Z/(2^n)[x]$;
3. $f(x)^{-1}$ is a polynomial and can be computed by an efficient algorithm.

Proof. Obviously, over $Z/(2^n)$, $f(x)$ has a multiplicative inverse function if and only if $f(x)\&1=1$ for all $x \in Z/(2^n)$. In its falling factorial power expression, only coefficients of $x^{(1)}$ and constant play a role in the least significant bit because 2 divides $x^{(k)}$ for all $k \geq 2$. If $x=0$, $c_0$ must be odd, and if $x=1$, $c_1$ must be even. On the other hand, with these conditions $f(x)\&1=1$ is true for all $x \in Z/(2^n)$.

The efficient algorithm is stated in the following proposition.

Proposition 4. Let $f(x)$ be a multiplicative invertible polynomial in $Z/(2^n)[x]$. Its multiplicative inverse $f(x)^{-1}$ can be generated by the following steps:

1. Set $$x_0 = f(x) + 8*g(x),$$

where $g(x) \in Z/(2^n)[x]$ is any polynomial;

2. Execute the recurrence equation $$x_{k+1} = x_k(2 - f(x)*x_k)$$

by $\ln(n)$ times to generate a new polynomial $t(x)$;
3. Standardize $t(x)$ to its falling factorial representation of degree at most $(n+1)$;
4. output $t(x)$.

The correctness of the algorithm is based on the following observation: for any invertible element $\alpha \in Z/(2^n)$, the Newton iteration used in the process doubles the number of bits in term of accuracy of computing $\alpha^{-1}$. The number 8 is used because the first 3 bits of $f(x)$ and $f(x)^{-1}$ are identical for all x due to the fact the first 3 bits of a and $a^{-1}$ are identical for all odd number $a \in Z/(2^n)$. Since polynomials are closed under the composition operation, we have the inverse in polynomial format.

Note that the algorithm with different initial values produces different intermediate computations, and therefore diversified code.

The performance of the algorithm is efficient since it takes only $\ln(n)$ iterations. This symbolic computation produces a formula of the polynomial inverse which can be used to compute the coefficient instances of the inverse.

C4.2 An Algorithm to Compute $f(x)^{-1}$

Another method to compute the inverse of a given multiplicatively invertible polynomial $f(x)$ is due to the fact that any polynomial $f(x)$ over $Z/(2^n)$ can be determined by the set of values $\{f(0), f(1), \ldots, f(n+1)\}$. The following is a simple algorithm.

1. Take a multiplicatively invertible $f(x)$ as input
2. Compute $\{f(0), f(1), \ldots, f(n+1)\}$
3. Compute the mod inverses $\{f(0)^{-1}, f(1)^{-1}, \ldots, f(n+1)^{-1}\}$
4. Compute the coefficients of polynomial $g(x)=f(x)^{-1}$
   (a) Compute falling factorial format coefficients $\{a_i\}$ of $g(x)$ based on the value set $\{g(0)=f(0)^{-1}, g(1)=f(1)^{-1}, \ldots, g(n+1)=f(n+1)^{-1}\}$
   (b) Trim coefficients $a_i$ by modulo $2^{n-v(i)}$
   (c) Convert falling factorial format to normal format
5. Output $g(x)=f(x)^{-1}$.

The algorithm holds because of the simple fact that $f(i)*g(i) \equiv 1 \mod(2^n)$, $i=0, 1, \ldots, n+1$. The step of trimming the coefficients is necessary in order to produce zero coefficients to have the shortest representation which is needed for efficient computations.

C4.3 Multiplicatively Invertible Polynomials with Nilpotent Coefficients

All multiplicatively invertible polynomials over $Z/(2^n)$ form a group, the unit group of $Z/(2^n)[x]$. Its subgroups can be investigated for efficient computations in terms of reduced number of non-zero coefficients. For example, is the inverse of a nilpotent coefficient polynomial still a nilpotent one? If so, this can be an efficient subset. The following result is what we expected.

Lemma 1. Let $f(x) = a_0 + a_1 x + \ldots a_m x^m \in Z/(2^n)[x]$ with nilpotent coefficients: $a_i^2 \equiv 0 \mod(2^n)$, $i=1, 2, \ldots, m$. Then 1. $\partial(f(x)^s) \leq \partial f(x)$, for any $s \in N$.
2. If $f(x)$ is multiplicatively invertible, that is, $a_0$ is odd, we have $\partial(f(x)^{-1}) \leq \partial f(x)$.
3. For any integer $m \in N$, the set $$N_m(Z/(2^n)) = \left\{ \sum_{t=0}^{m} a_t x^t \in Z/(2^n)[x] \,\middle|\, (a_0 \,\&\, 1) = 1, a_i^2 \equiv 0 \mod(2^n), 1 \leq i \leq m \right\}$$

is a subgroup of the unit group $U((Z/(2^n))[x], *)$.

Here is a short proof. If we let $t(x)=f(x)-a_0$, then $t(x)^2 \equiv 0$. Therefore $f(x)^2 = c_0 + c_1 t(x)$. Similarly $f(x)^3 = d_0 + d_1 t(x)$. The first result follows from an induction on $s \in N$. The second result can be proved by the Newton iteration process, $x_{n+1} = x_n(2 - f(x)*x_n)$ with $x_0 = 1$ and the first result. As a matter of fact, $x_1 = x_0(2 - f(x)*x_0) = 2 - f(x)$, and $x_2 = x_1(2 - f(x)*x_1)$. By induction $x_k$ is a polynomial of $f(x)$ and has a degree not greater than that of $f(x)$. The third result is easy to check thanks again to the nilpotent property of coefficients, and the proff is complete.

A Smalltalk implementation of the algorithm in previous subsection provides us the following examples of inverses of nilpotent coefficient polynomials over $Z/(2^{32})[x]$:

1. A quadratic polynomial $f(x)=83248235+17268340424704*x+2342188220416*x^2$ with inverse $f(x)^{-1}=1416251459+2857631744* \quad x240380048*x^2$, which is also a quadratic polymomial;
2. A cubic polynomial $f(x)=1235235789+6887876591616*x+4678345031680*x^2+13937963433984*x^3$ with inverse $f(x)^{-1}=646443269+3893362688*x+2102048128*x^2+1208221696*x^3$, which is also a cubic polymomial;
3. A quartic polynomial $f(x)=98653231+1720291426304*x23392219299840*x^2+1393677070761984*x^3+13938167906304*x^4$ with inverse $f(x)^{-1}=2846913231+3760455680*x+3063152640*x^2+180617216*x^3+200540160*x^4$, which is also a quartic polymomial.

Remark 1. The nilpotent coefficients condition could be relaxed by $a_i^t \equiv \mod(2^n) 0$, $t \geq 2$. More detailed investigation needed.

C5 Decomposition, Factorization of Permutation and Multiplicatively Invertible Polynomials In this section we study polynomials $f(x)$ with small representations. This is useful because a general polynomial over $Z/(2^n)$ has degree (n+1) and if a high degree permutation is used as transformation transformed code would become inefficient. Moreover code obfuscation can also benefit from small representations based on the rational that small language components make the management of code diversity and uniformity easier. Note that in the context of data transformation, small representations are required for both $f(x)$ and its inverse $f^{-1}(x)$ ($(f(x))^{-1}$ in case of MIP($2^n$)), which turns out to be a challenging issue.

For a given permutation polynomial $f(x)$ the number of its no-zero terms in conventional polynomial representation is defined as its weight wei($f(x)$) (in falling factorial representation, we can have similar definition of weight, but it will be treated different since there is no repeated squaring algorithm works here). Obvious wei($f(x)$)≤deg($f(x)$). To have both $f(x)$ and $f^{-1}(x)$ in small representations, put restrictions on degree is an obvious option, as in which provides a class of permutation polynomials $f(x)$ such that deg($f(x)$)=deg($f^{-1}(x)$). On the other hand, finding $f(x)$ with small wei($f(x)$) and wei($f^{-1}(x)$) is an option to find useful small representations, because of the existence of efficient exponentiation computations such as repeated squaring method.

Polynomial function decomposition provides us another means to find $f(x)$ with small representations. If $f(x)=g(h(x))$, deg($g(x)$) and deg($h(x)$) are integer factors of deg($f(x)$). We have similar case for multivariate polynomials, which can be morpher code of an arithmetic operation.

Polynomial factorization is our third approach to have small representations. Note that there are about 1/m irreducible polynomials of degrees m in GF(2) [x]. For example, there are only 99 degree 10 polynomials over GF(2) are irreducible. Fortunately, permutation polynomials, ⅛ of GF(2)[x], are far from irreducible. Existing mathematical resules make any factorization of $f(x)$ over GF(2) extend to fractorizations (not unique) over $Z/(2^n)$, for any n≥2, and coefficient conditions over GF(2) for a polynomial to be a permutation (or multiplicatively invertible) does not restrict it being irreducible. In this context, for $f(x)$ and $f^{-1}(x)$ ideal small representations are small number of factors and each factor is a power of a polynomial with a small representation such as low degree one or low weight one (kind of recursive definition).

Representing polynomials using mixed addition terms, composition components, multiplication factors provides another excellent example that the same set of techniques serve both efficient computation and software obfuscation purposes (an existing example is addition chain for RSA key obfuscation). Since our ultimate goal is for the morpher code which is a composition of three permutation polynomials with arithmetic operations, and a bivariate polynomial as last result, we have good chances to construct/find large number of permutation polynomials of small representations to have optimized result code (general algorithm is to be determined—we have some basic ideas).

In the following subsections we describe algorithms of these three approaches as well as their mixture.

C5.1 Low Degree or Low Weight $f(x)$

We have obtained a sufficient condition on coefficients of a permutation polynomial $f(x)$ such that both $f(x)$ and $f^{-1}(x)$ has the same degree, which can be small.

Here is the result about the degree of h($f(x)$+g(t)), where $f(x)$, g(y), h(z)∈$P_m(Z/(2^n))$ Let m be a positive integer and let $P_m(Z/(2^n))$ be a set of polynomials over $Z/(2^n)$:

$$P_m(Z/(2^n)) = \left\{ \sum_{i=0}^{m} a_i x^i \;\middle|\; \forall a_i \in Z/(2^n),\, a_1 \wedge 1 = 1,\, a_i^2 = 0,\, i = 2, \ldots, m \right\}.$$

The degree is m and there are 2m−1 coefficients.

We investigated the case of less restricted conditions, and possible necessary and sufficient conditions for deg($f(x)$)=deg($f^{-1}(x)$), but it turned out that the theoretical condition based on a system of coefficient equations is complicated but it does shine some light on the computation of such polynomials (details omitted here). At this point we use computation to do search and would resume theoretical studies if the computation results could provide further information.

The basic computation algorithm is to apply algorithm in section 3.2 for the computation of inverse and tune the coefficients to find small representation.

Over Galois field, low weight polynomials, such as low weight irreducible polynomials are studied through computation. In this Galois ring $Z/(2^n)$ case, we shall use algorithm in section 3.2 again, to compute and find low weight ones. Again coefficient tuning process happens at runtime.

C5.2 Decomposition

Polynomial time decomposition methods over field (not necessarily finite) can ar known, but over Galois rings, no convincing general algorithm founded/discovered yet, to my knowledge so far. On the other hand, methods and ideas over fields provide valuable information for works on rings.

A special class of polynomials called Chebyshev polynomials (of the first kind) $T_n(x)$ deserve our attention. Recall that $T_n(x)$ can be defined by the following recurrence relation: $T_0(x)=1$, $T_1(x)=x$, $T_{n+1}(x)=2xT_n(x)-T_{n-1}(x)$. A property of Chebyshev polynomials is about the composition: $T_{nm}(x)=T_n(T_m(x))$. An interesting observation is that all odd indexed polynomial $T_{2k+1}(x)$, k=1, 2, . . . , are permutation polynomials over $Z/(2^n)$. Therefore big odd indexed Chebyshev polynomials can be decomposed into low degree Chebyshev permutation polynomials.

Note that if $f(x)=g(h(x))$, and g(x) and h(x)∈$Z/(2^n)$[x], these components g(x) and h(x) are still permutations. Decomposition of multiplicatively invertible will be interesting, because components are not necessarily multiplicatively invertible.

C5.3 Factorization of $f(x)$ and $f(x,y)$

Factorization of a given polynomial $f(x)$∈$Z/(2^n)$[x] starts at $Z/(2)[x]$=GF(2)[x]. Then various forms of Hensel lifting can be choosen to factor $f(x)$ over $Z/(2^n)$. Algorithms in this area are well studied (except factoring multivariate polynomials) and we will use existing algorithms.

Most permutation polynomials are not basic primitive polynomials and have non-trivial factors. For example, permutation polynomial $$f(x)=x+8*x^2+16*x^3=x(4*x+1)^2.$$

For any $f(x)$∈$Z/(2^n)$[x], square-free factorization algorithm and Berlekamp's Q-matrix algorithm [] are used to factor $f(x)$∈$Z/(2)$[x]. Note that we may just have a partial factorization, finding two coprime factors, to go to the next step to factor $f(x)$∈$Z/(2^i)$[x], i≥2.

The following form of Hensel's Lemma is the one having the essence of the technique.

Let R be a ring and ideal I⊂R. For any $f$∈R, and any factorization $f$≡gh(modI) of $f$ in R/I such that gcd(g, h)≡1 (modI), then there exist g* and h* such that $f$≡g*h*mod$I^2$, g*≡gmodI, h*≡hmodI, and moreover, gcd(g*, h*)≡1mod$I^2$.

Also note that h* and g* can be constructed directly from the Bzout's identity of gcd(g, h)≡1(modI).

Iterate this procress we can have desired results.

Note that factors of a permutation polynomial are not necessarily permutations. This provides another flavor in terms of diversity amoung different species. However, factors of a multiplicatively invertible polynomial are still multiplicatively invertible.

C5.4 Mixing Addition Terms, Multiplication Factors, and Composition Components

We know that all permutation polynomials over $Z/(2^n)$ form a group $PP(2^n)[x]$ based on function composition operation ∘. The unit group $\cup(Z/(2^n)[x], \cdot)$ of polynomial ring $Z/(2^n)[x]$ based on ring multiplication is the set of all multiplicatively invertible polynomials $MIP(2^n)[x]$ (see section 4).

Here is a simple but interesting observation:
Proposition 5. Let $f(x)=xh(x) \in PP(2^n)[x]$, a permutation polynomial with zero constant term. Then $h(x) \in MIP(2^n)[x]$. That is, $h(x)$ is multiplicatively invertible.

Note that the coefficients of $x^{(1)}$, $x^{(2)}$, and $x^{(3)}$ of $f(x)$ must be odd, even and even, respectively. In that format these conditions enable $h(x)$'s constant term to be odd, and coefficient if $x^{(1)}$ even. The correctness of the observation follows Proposition 3.

Another observation is the intersection $PP(2^n)[x] \cap MIP(2^n)[x]$, which is empty (containing only odd constant functions if we allow $PP(2^n)[x]$ has constant functions). This implies that the two function sets are orthogonal in some sense.

Back to the set of Chebyshev polynomials (of the first kind) $T_n(x)$. Previously we mentioned odd indexed ones are permutations. It is easy to see that even indexed $T_{2k}(x)$ (also even indexed Chebyshev polynomials of the second kind) are multiplicative invertible polynomials. Therefore big even indexed ones can be decomposed into small ones based on $T_{nm}(x)=T_n(T_m(x))$, and alternatively, it can be factored into small factors for reducible ones.

More studies can be done in this area, including algorithms to select suitable transformations for the purpose of generating highly obfuscated code.

C6 Generalized Polynomials $\widetilde{f(x)} = a_0 \oplus_+ a_1 x \oplus_+ \ldots \oplus_+ a_d x^d$ For a generalized polynomial $\widetilde{f(x)}$ to be a permutation, Klimov gave an interesting if and only if condition based on its coefficient set $\{a_0, \ldots, a_d\}$. That is the same condition for the polynomial function $f(x) = \sum_{i=0}^{d} a_i x^i$, obtained by replacing all ⊕ operations with +, referred as the reduced polynomial of $\widetilde{f(x)}$.

Because the associative law is invalid in $\widetilde{f(x)}$, it actually represents a set of functions, generated from all possible orders of operations as well as combinations of operators + and ⊕.

An interesting new result was published in the end of 2011 on conditions of single cycle property: assuming the operation order is from left to right, that is, $\widetilde{f(x)}$ has functions of the format $(\ldots((a_0 \oplus_+ (a_1 x)) \oplus_+ (a_2 x^2) \oplus_+ \ldots \oplus_+ (a_d x^d))$.

Proposition 6. With the order restriction and an assumption that there are no consecutive + operators, $\widetilde{f(x)} = a_0 \oplus_+ a_1 x \oplus_+ \ldots \oplus_+ a_d x^d$ is a single cycle permutation if and only if it is a single cycle permutation over the ring $Z/(2^{5+2^l})$, where l is the number of odd numbers in $\{i_1, i_2, \ldots, i_m\} \subset \{1, 2, \ldots, d\}$, which is the set of degree indices of terms $a_{i_j} x^{i_j}$ with an + operator before them.

This is an interesting result although $Z/(2^{5+2^l})$ could be a big ring.

C7 Matrix Transformations

Matrix functions over $Z/(2^n)$ with predetermined detrminant functions are constructed in this section for the transformations of arithmetic operations and vectors. The following is a set of matrices we try to work on:

$$\Omega = \{M_{s \times s}(a_{i,j}(x, y, z, \ldots)) | s \in N, a_{i,j}(x, y, z, \ldots) \in B^n$$
$$[x, y, z, \ldots], |M| = g(x), \forall g(x) \in MIP(2^n)\}$$

where $B^n[x, y, z, \ldots]$ are multivariate functions over $BA[n]$.

Recalled that $MIP(2^n)$ is the set of all multiplicative invertible polynomials over $Z/(2^n)$.

A few lines of explanations. This is a set of matrices whose determinants are multiplicative invertible polynomials. With a predetermined determinant a matrix in $\Omega$ can be constructed based on elementary row and column operations over the ring $Z/(2^n)$. Note that other operations in $BA[n]$ are also involved but we "favor" multiplication and addition. The following standard algorithm which is remarkably similar to matrices over fields offers more details.

Proposition 7. Let m, n∈N. Let $\Lambda_n$ be a set of functions from $BA[n][x, y, z, \ldots]$ referred as context function set. Let $\Lambda_n^\infty$ be the set of generated functions from $\Lambda_n$. The following process generates an invertible matrix $M = (m_{i,j}(x, y, z, \ldots))_{m \times m}$ over $BA[n]$ (more precisely entries $m_{i,j}(x, y, z, \ldots) \in (\Lambda_n \cup MIP(2^n))^\infty$) whose determinant is a polynomial $f(x) \in MIP(2^n)$:

1. Inputs: BA algebra dimension n, $\Lambda_n$, $MIP(2^n)$ and matrix dimension m;
2. Randomly choose m polynomials $f_1(x), f_2(x), \ldots, f_m$ from $MIP(2^n)$ and set $m_{i,i}(x, y, z, \ldots) = f_i(x)$;
3. Repeat finite steps of the following process
   (a) Randomly pickup i, j∈$\{1, 2, \ldots, m\} \times \{1, 2, \ldots, m\}$;
   (b) Randomly pickup $r(x, y, z, \ldots) \in \Lambda_n^\infty$;
   (c) Randomly perform a row operation $R_i * r(x, y, z, \ldots) + R_j$ or a column operation $C_i * r(x, y, z, \ldots) + C_j$;
4. Output: a m×m matrix with determinant $\Pi_{i=1}^{m} f_i(x)$.

In the algorithm the context function set $\Lambda_n$ is an interesting concept. This set of functions from $BA[n][x, y, z, \ldots]$ defines the required 'similarity' for the matrix transformations to seamlessly blend into the application code environment. $\Lambda$ can be predefined based on existing application code format and projected code format. A typical example of $\Lambda$ is a set of expressions in the code context.

This concept can also helps us introduce dependencies between code variables in both application and transformations. See example in Section D.

Remark 2. An alternative algorithm to construct the matrix is by upper (or lower) triangular matrices with polynomials in $MIP(2^n)$ to form the diagonal entries and elements from $\Lambda_n^\infty$ to form the upper (or lower) enties. The product of these matrices is still in $MIP(2^n)$.

Remark 3. About the uniformity of inverses of matrices in $\Omega$. There are two types of applications: with or without the matrix inverse code in application code. To transform vectors (data arrays) it is may not been necessary because the inverse computation can be happened in server side which does not need code obfuscation. But to transform operands in operations using matrix inverse becomes necessary to keep original functionality.

Matrices in Ω serves the later case well becase entries of the inverse matrix are composed of elements $\Lambda_n$ and polynomials (the inverse of determinants).

Remark 4. The algorithm can be fine tuned based on precise criteria of defined code uniformity level and criteria of performance of transformed code.

C8 Block-invertible Function Matrices

In this section we construct a special set of square block matrices with block invertible properties to be applied to the coding context that both internal and external transformations keep multiplicative invertibilities.

Note that this is also an extension of the constant case construction that applied in White-Box AES key hiding.

C8.1 The Existence of Block-invertible Function Matrices

In this section, we refer an even polynomial in $(Z/(2^n))[x]$ as a polynomial whose coefficient of x and constant term are both even numbers (relationship with the nilpotent radical of the polynomial ring $Z/(2^n))[x]$). Let subset $\psi \subset (Z/(2^n))[x]$ be the union of multiplicative invertible polynomials and even polynomials. Then $$\psi = \left\{ f(x) = \sum_{i=0}^{n+1} c_i x^i \in (Z/(2^n))[x] \,\middle|\, c_1 \text{is even} \right\}$$

is subring ($\psi$, +, *). Let $\Xi = <2(Z/(2^n))x, (Z/(2^n))x^i | i=2, 3, \ldots, n+1>$, the ideal generated in the ring $\psi$.

It is easy to verify that $\psi/\Xi$ is isomorphic to Z: the set of multiplicatively invertible polynomials becomes odd numbers and even polynomials are turned into even numbers. We will see that this isomorphism transforms the construction method over filed $Z/(2)$ to the ring $\psi$.

Note that $\psi$ contains the subring generated by unit group $U((Z/(2^n))[x], *)$ and nilpotent radical ideal $N((Z/(2^n))[x], *)$. The matrix ring $M(\psi)_{s \times s}$ is what we work on in this section. First we have the following result:

Lemma 2. For a given non-zero square matrix $A \in M(\psi)_{s \times s}$, there exist two invertible matrices P, $Q \in M(\psi)_{s \times s}$ such that $M = P*D*Q$, where D is a diagonal matrix with r ones and s−r zeros, where r∈N.

Lemma 3. For any, s, r∈N with s≥r, there exit two invertiable matrices T, $A \in M(\psi)_{s \times s}$ such that T=D+A, where D is a diagonal matrix with r ones and s−r zeros, where r∈N.

The correctness of these two lemmas follows the isomorphism above. For this subset of polynomials in $\psi$, the basic idea of the construction algorithm works fine here in the function matrices cases (even over the BA algebra, essentially over the modular ring $Z/(2^n)$).

C10 Transformations of Program Components in General

We describe an approach to transform program components (see next section for arithmetic operations and data arrays and permutation polynomials, invertible polynomials and matrices as primary transformations). Note that the approach described in this section is essentially the complexity extension of the data transformation concept of Cloakware data transformation technology.

C10.1 Transformation Process and Configurations

Definition of a configuration. In this note, a configuration is defined as a state of a set of variables (no operations) involved in the transformation process. In most cases, the variable set includes 1. Variables in program components;
2. Transformated variables of the program components;
3. Transformations represented by their types;
4. Coefficients and/or their values of transformations;
5. Coefficients and/or their values of inverses of transformations;
6. Variables representing the configuration itself
7. Other variables The transformation process comprises series of
1. Input configuration
2. Component transformation section
3. Output configuration The management of configurations, which is the major part of the transformation process, can be represented by a Finite State Machine. Note that the transformation (encryption) of a program is much compicated than binary strings for cryptography purpose.

Example: existing data transformations

C10.2 Complexity Analysis of Transformed Program Components and Program

1. Serach space of all possible compositions;
2. Complexity of propagation of dependencies of transformed program components;
3. System of equations for each instance

C11 Transformations of Program Components in Mark I/Woodenman Constructions

Based on the Woodenman construction requirements, we have the following program component transformations.

C11.1 Transformation of Addition

Let z=x+y be the addition to be transformed. The basic process is

1. Decode the input configurations to find out input expressions of both x and y;
2. Transform the two operands by permutation polynomials in $PP(2^n)$ and generate new expressions;
3. Create a vector with the encoded operands and other terms as its entries;
4. Transform the vector by a matrix in Ω;
5. Compose the decoding of the matrix and the two operands with the encoding of the addition operation by a polynomial in $PP(2^n)$, and/or a matrix in Ω;
6. Apply a permutation polynomial to transform z and save the results in a vector;
7. Save information about the encoding in the final vector for the consumer of the addition.

The interfaces between those steps are an array of variables with specified/different configurations.

C11.2 Transformation of Multiplication

Similar steps above just replacing addition by multiplication.

C11.3 Transformation of Vectors/Arrays

Similar to steps of addition without the addition coding.

C11.4 Transformation of Addition, Multiplication and Vector

Uniform the three transformations by selections of matrix transformations.

C13 Attacks

For permutation polynomials—simplified representation
Proposition 8. Possible attacks: if all permutation polynomials can be represented by low degree permutation polynomials then there are (simplification) attacks HINT: count number of low degree permutations over Finite field to show these is no such attack Proposition 9. Possible attacks: Using value set $f(i)|i\in 0, 1, \ldots, n+1$ to represent polynomials and compositions to compute the probability . . .

C14 Remarks

Java code implementation of the algorithms is tested.

C15 The Concept of Dynamic Permutation Transformations

In the existing data transformation techniques in Irdeto/Cloakware patents permutations are used to transform operands of an operation. For example, operands u, v, and w of an addition operation w=u+v can be transformed by a linear function y=a*x+b, where a and b are constants (a must be odd to be a permutation). In the computation of transformed code, variables are related to u and v only because transformed operations have fixed constants as coefficients of the newly transformed operations, such as those for add operation. Therefore we will refer these transformations as static permutation transformations. Note that data transformations used in standard public key cryptosystem such as RSA can also be regarded as static permutation transformations, because the private and public key pair becomes fixed constants at the time an entity uses them to encrypt or decrypt data.

In contrast, dynamic permutation transformations are permutations that have new variables which can be introduced into the computation context of transformations. For example, a liner function y=a*x+b can be used to transform an operand x. But in this dynamic case, coefficients a and b are variables (with one bit restriction on variable a). In this way, the transformed add operation will have three sets of new variables (total 6 in this case).

Static permutation transformations are designed to transform operands of each individual operation. These micro transformations always have small code size. Although dynamic permutation transformations can be used as micro transformations, its main goal is to introduce connections between variables for code integrity. Therefore the code size can be and should be bigger than most micro transformations. Note that these large size transformations are still within the boundary of polynomial time computational complexity in terms of original size.

Dynamic and static permutation transformations can work together to achieve a level of code obfuscation and code protections with reasonable code size expansions.

C16 Dynamic Permutation Transformations

A permutation polynomials $f(x)=y_0+y_1*x+ \ldots +y_n*x^n$ over $Z/(2^n)$ can be used as dynamic permutation transformations, where $y_0, y_1, \ldots, y_n$ are variables with conditions that $y_1$ is odd, $y_2+y_4+ \ldots$ and $y_3+y_5+ \ldots$ are odd numbers. As in the static data transformation case, permutation inverses have to be computed.

Besides the general permutation polynomials over $Z/(2^n)$, special dynamic permutation polynomials, such as those with nilpotent coefficients can reduce the size of transformed code. Formulas of computing their inverses can be found, where all coefficients are variables in this dynamic case. The special properties of coefficient variables, such as the nilpotent properties can also be used for interlocking.

Note that nothing prevents the coefficients variables in dynamic permutation transformations have some constant coefficients as long as the permutation conditions are satisfied. They will facilitate the composition with existing static permutation transformations.

C17 Properties of Dynamic Permutation Transformations and Interlocking

In dynamic permutation transformation, there are two kinds of coefficient variables: conditional ones, such as a in y=a*x+b, and unconditional ones such as b in example above. For code obfuscation purpose, unconditional coefficient variables can be any variables from original computation context, or variables in any transformation formula, etc. The conditions ones are more interesting: the conditions can be composed with interlocking properties for the purpose of code protection. The code can be protected so because the conditions of coefficient variables are exactly the conditions for the transformation to be a permutation. Therefore breaking the conditions implies a non-permutation transformation for an operand of an operation, resulting in a faulty computation which is the way we want it happen when tampering occurs.

Because dynamic permutation conditions are represented by a property of a set of variables it becomes hard to distinguish these properties from original code properties. It is also hard to figure out coefficient variable set from all variables in the transformed code.

Besides properties of coefficient variables, conditions of the correctness of formula can also be composed with integrity verification properties: it will break the f(g(x))=x identity if the condition is broken!

Permutation polynomials are also fully determined by its roots. In addition to the normal coefficient representation, root representation format can also be used. Special root structures and value properties can also reduce the code size for more efficient computations. Note that in this dynamic context, roots are variables, not fixed values. Conditions for the correctness of root computation process can also be composed with verification properties.

Other dynamic properties in the process of computing the inverse can also be used to compose with integrity properties. For instance, the algorithm based on Newton iteration algorithm to compute modular inverse over the ring $Z/(2^n)$ works correctly only for odd variables, a nice property.

C17.1 Identities and Dynamic Equations

An equation that involves multiple variables inherently has a dynamic property: the identity itself. Mixed Boolean arithmetic identities are examples of these equations: breaking of MBA identities implies the occurrence of tampering.

Multiplicatively invertible dynamic polynomials $f(x)$ over ring $Z/(2^n)$ also provide a set of equations $f(x)*f(x)^{-1}=1$. Similar to dynamic permutation polynomials, conditions on the coefficient variables also provide a property to compose with integrity verification properties. Polynomials with special coefficient variables provide implementations of flexible code size.

Dynamic permutation transformations composed with MBA identities. This can be done either by transforming variables in the equations or transformation of the equations themselves.

C17.2 Permutation T-functions

In general any permutation T-functions from Boolean arithmetic algebraic system can also be used as dynamic permutation transformations. The computation of their inverses can be achieved through bit by bit computations. One example is the generalized permutation polynomials. The computations of their inverses are still efficient computer programs.

NOTE: Not all program components are necessary to obfuscate; Not transformation of data variables but integrity code; just composed with variables and operations.

C18 Block Data Protection

Block data variables, such a members in a data structure or fields in a class an be (1) transformed using dynamic permutation polynomials: coefficients can be individual data variables, (2) composed with individual static permutation transformations of each data variables.

REFERENCES

1. G. H. Hardy and E. M. Wright. *An Introduction to the Theory of Numbers*, Oxford Press.
2. Zhaopeng Dai, and Zhuojun Lin, *The Single Cycle T-functions*. On line: http://eprint.iacr.org/2011/547.pdf 3. Alexander Klimov, *Applications of T-functions in Cryptography*, PhD Thesis, Weizmann Institute of Science, 2004.
4. Dexter Kozen, Susan Landau, *Polynomial decomposition algorithms*, J. Symb. Comp. 7(5)(1989), 445-456.
5. A. Menezes, P. Oorschot, S. Vanstone, *Handbook of Applied cryptography*, CRC Press, 1996.
6. Medhu Sudan, *Algebra and computation*, MIT lecture notes. On line: http://people.csail.mit.edu/madhu/FT98/course.html
7. G. Mullen, H. Stevens, Polynomial functions (mod m), Acta Math. Hungary, 44(3-4)(1984), 237-241.
8. Ronald L. Rivest, Permutation Polynomials Modulo $2^w$, Finite Fields and their Applications, vol. 7, 2001, pp 287-292.
9. Henry S. Warren, Jr., *Hacker's Delight*, Addison-Wesley, Boston, 2002. On line: www.hackersdelight.org.
10. James Xiao, Y. Zhon, *Generating large non-singular matrices over an arbitrary field with block of full rank*, 2002, On line: http://eprint.iacr.org/2002/096.pdf.
11. Kejian Xu, Zhaopeng Dai and Zongduo Dai *The formulas of coefficients of sum and product of p-adic integers with applications to Witt vectors*, Acta Arithmetica. 150 (2011), 361-384. On line: http://arziv.org/abs/1007.0878 http://journals.impan.pl/cgi-bin/doi?aa150-4-3.
12. Y. Zhou, S. Chow, System and method of hiding cryptographic private keys, U.S. Pat. No. 7,634,091, 2009.
13. Y. Zhou, A. Main, Y. Gu and H. Johnson, Information Hiding in Software with Mixed Boolean-Arithmetic Transforms, *Information Security Applications*, 8th International Workshop, WISA 2007, LNCS 4867, 2008.

D An Example of Transformations of 2-dimensional Vector

Here is a very simple example about transformation of 2-dimensional vectors $(X, Y) \in (B^{32})^2$. The code context, we assume, is $$A_{32} = \{(x \oplus y), y^2, z, (x \& y)\}.$$

The first step is to pick up two permutation polynomials $39*x+42$, $67*+981$ to transform X and Y:

$$X_1 = 39*X+42,$$

and $$Y_1 = 67*Y+981.$$

The next step is to pick up a matrix whose determinant is a multiplicatively invertible polynomial $(1335+2860*x+1657*x*(x-1))(6539+8268*x)$:

$$A = \begin{pmatrix} (1335 + 2860*x + 1657*x*(x-1)) & (67*(x \oplus y) + 8*y^2) \\ 0 & (6539 + 8268*x) \end{pmatrix}$$

A column operation $$C = \begin{pmatrix} 1 & 0 \\ 716*z + 93*(x \& y) & 1 \end{pmatrix}$$

on A gives us $A = A \times C = \text{Matrix}[[1335+2860*x+1657*x*(x-1)+(67*(x \oplus y)+8*y^2)*(716*z+93*(x \& y)), (67*(x \oplus y)+8*y^2)], [(6539+8268*x)*(716*z+93*(x \& y)), (6539+8268*x)]]$.

Then a row operation $$R = \begin{pmatrix} 1 & 0 \\ 34*(x \& y) & 1 \end{pmatrix}$$

on A produces $A = R \times A = \text{Matrix}[[1335+2860*x+1657*x*(x-1)+(67*(x \oplus y)+8*y^2)*(716*z+93*(x \& y)), 67*(x \oplus y)+8*y^2], [34*(x \& y)*(1335+2860*x+1657*x*(x-1)+(67*(x \oplus y)+8*y^2)*(716*z+93*(x \& y)))+(6539+8268*x)*(716*z+93*(x \& y)), 34*(x \& y)*(67*(x \oplus y)+8*y^2)+6539+8268*x]]$.

Applying this invertible matrix A to transform $(X_1, Y_1)$, we have the transformed vector $(X_2, Y_2)$ with $X_2 = 52065*X+56070+46917*x*X+50526*x+64623*x^2*X+69594*x^2+1870908*(x \oplus y)*z*X+2014824*(x \oplus y)*z+243009*(x \oplus y)*(x \& y)*X+261702*(x \oplus y)*(x \& y)+223392*y^2*z*X+240576*y^2*z+29016*y^2*(x \& y)*X+31248*y^2*(x \& y)+4489*(x \oplus y)*Y+65727*(x \oplus y)+536*y^2*Y+7848*y^2$, and $Y_2 = 8110908*x+7595328*(x \& y)*y^2*z*X+63610872*(x \& y)*(x \oplus y)*z*X+2231718*(x \oplus y)*(x \& y)+266832*y^2*(x \& y)+182595036*z*X+553956*x*Y+1062432*y^2*(x \& y)^2+248635296*x*z+254871 63*(x \& y)*X+34012692*(x \& y)*x+2366196*(x \& y)*x^2+8897868*(x \oplus y)*(x \& y)^2+8179584*(x \& y)*y^2*z+68504016*(x \& y)*(x \oplus y)*z+18224*y^2*(x \& y)*Y+152626*(x \oplus y)*(x \& y)*Y+230875632*x*z*X+986544*y^2*(x \& y)^2*X+8262306*(x \oplus y)*(x \& y)^2*X+2197182*(x \& y)*x^2*X+31583214*(x \& y)*x*X = 6414759+27447714*(x \& y)+196640808*z+438113*Y$.

Then we can replace x, y and z by any expressions of any variables, including X and Y, or constants in the code context to inject new dependencies into these transformed code. Further code optimization could become necessary depent on expressions chosen.

E Polynomial Representation of Carry Bit Values

Given a binary representation $a = \Sigma_{i=0}^{\infty} a_i 2^i$ and $b = \Sigma_{i=0}^{\infty} b_i 2^i$ of two numbers a and b as well as the sum $c = a+b = \Sigma_{i=0}^{\infty} c_i 2^i$ to represent the carry bits by bit values $a_j$, $b_j$, $0 \leq j \leq t$ is an interesting problem. Recently the following formula was developed:

$$c_0 = a_0 \oplus b_0.$$

for $t \geq 1$, $$c_t = (a_t \oplus b_t) \oplus (\oplus_{i=0}^{t-1}(a_i \cdot b_i \cdot (\Pi_{j=i+1}^{t-1}(a_j \oplus b_j)))).$$

Obviously, the second term above is a polynomial representation of a carry bit value. Similar formula for multiplication can be derived.

The invention claimed is:

1. A method, implemented by one or more processors, comprising:
receiving computer-executable program code comprising instructions to execute a first operation $f(x)$ for x encoded as aX+b and a second operation g(y), wherein a and b have constant values during execution of $f(x)$, and g(y) produces at least a first value c when executed;
storing the computer-executable program code on a computer readable storage medium; and
modifying, by the one or more processors, the computer-executable program code stored on the computer readable storage medium to encode x as cX+d, to execute f(cX+d), wherein c and d have constant values during execution of $f(cX+d)$ and to
discard c and d.

2. The method of claim 1, wherein the computer-executable program code further comprises instructions to execute a third operation $h(z)$ that produces a value d when executed.

3. The method of claim 1, further comprising:
selecting c based upon the length of time that c is stored in a computer-readable memory.

4. The method of claim 1, further comprising:
modifying the computer-executable program code to accept a different value for c upon each execution of $f(cX+d)$.

5. The method of claim 1, wherein at least one of a, b, c, or d is a value obtained from a portion of code present in the computer-executable program prior to the computer-executable program code being modified.

6. The method of claim 5, wherein the at least one of a, b, c, or d is an output of a function present in the computer-executable program prior to the computer-executable program code being modified.

7. The method of claim 1, wherein $f(x)$ is an operation in a code segment selected from the group consisting of: a base function; and the computer-executable program code.

8. The method of claim 1, wherein $f(x)$ is a base function.

9. A method, implemented by one or more processors executing instructions stored on a computer readable medium, comprising:
executing, by the one or more processors, a first operation $g(y)$ that produces at least a first constant a as an output and recording the output on a computer readable storage medium;
encoding, by the one or more processors, a first variable x as $aX+b$, wherein b is a second constant;
executing, by the one or more processors, a second operation $f(aX+b)$ using $aX+b$ as an input;
performing, by the one or more processors, a decoding operation using a and b; and
discarding, by the one or more processors, a and b.

10. The method of claim 9, further comprising:
executing a third operation $h(z)$ that produces at least b as an output.

11. The method of claim 9, further comprising:
encoding a plurality of input values as $aX+b$, each input value encoded using a value of a based upon a different execution instance of $g(y)$, and upon a value of b based upon a different execution instance of $h(z)$.

12. The method of claim 9, further comprising:
encoding an input as $aX+b$ a plurality of times, each time using a value of a based upon a different execution instance of $g(y)$.

13. The method of claim 9, further comprising:
selecting a from a plurality of constants stored in a computer-readable memory based upon the expected duration of storage of a in the computer-readable memory and upon the execution time of $f(aX+b)$.

14. The method of claim 9, further comprising:
selecting a from a plurality of constants stored in a computer-readable memory based upon the expected duration of storage of a in the computer-readable memory and upon the combined execution time of $f(aX+b)$ and the decoding operation.

15. The method of claim 9, further comprising:
for each execution of $f(aX+b)$, encoding x using a value for at least one of a and b different from at least one previous value used for the at least one of a and b, respectively.

16. The method of claim 9, wherein $f(x)$ is a base function.

17. A system comprising:
one or more processors; and
a computer-readable storage medium storing instructions which cause the one or more processors to:
receive computer-executable program code comprising instructions to execute a first operation $f(x)$ for x encoded as $aX+b$ and a second operation $g(y)$, wherein a and b have constant values during execution of $f(x)$, and $g(y)$ produces at least a first value c when executed; and
modify the computer-executable program code to encode x as $cX+d$ wherein c and d have constant values during execution of $f(x)$, to
execute $f(cX+d)$, and to
discard c and d.

18. A system comprising:
one or more processors; and
a computer-readable storage medium storing instructions which cause the one or more processors to:
execute a first operation $g(y)$ that produces at least a first constant a as an output;
encode a first variable x as $aX+b$, wherein b is a second constant;
execute a second operation $f(aX+b)$ using $aX+b$ as an input;
perform a decoding operation using a and b;and discard a and b.

* * * * *